US006985809B2

(12) United States Patent
Yasui

(10) Patent No.: US 6,985,809 B2
(45) Date of Patent: Jan. 10, 2006

(54) CONTROL APPARATUS, CONTROL METHOD, AND ENGINE CONTROL UNIT

(75) Inventor: Yuji Yasui, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 155 days.

(21) Appl. No.: 10/201,894

(22) Filed: Jul. 25, 2002

(65) Prior Publication Data

US 2003/0125865 A1 Jul. 3, 2003

(30) Foreign Application Priority Data

Dec. 28, 2001 (JP) ....................................... 2001-400988

(51) Int. Cl.
*B60T 7/12* (2006.01)

(52) U.S. Cl. ........................... 701/109; 60/276; 60/285; 123/672; 123/679; 701/103; 700/28; 700/29; 700/40; 700/44

(58) Field of Classification Search ................. 341/143; 700/28, 29, 40, 44; 123/679, 672; 701/109, 701/103; 60/276, 271, 285
See application file for complete search history.

(56) References Cited

U.S. PATENT DOCUMENTS 5,070,846 A * 12/1991 Dudek et al. ............... 123/488
5,266,907 A 11/1993 Dacus ........................ 331/1 A
5,467,185 A 11/1995 Engeler et al. ............... 356/44
5,623,432 A 4/1997 Degrauwe ................... 364/707
5,857,443 A * 1/1999 Kono et al. ................ 23/339.2
5,992,383 A * 11/1999 Scholten et al. ............ 123/399
6,188,953 B1 * 2/2001 Yasui et al. ................. 701/109
6,351,943 B1 * 3/2002 Tagami et al. ................ 60/285
6,481,201 B2 * 11/2002 Kako et al. ................... 60/285
6,535,153 B1 * 3/2003 Zierhofer .................... 341/143
6,633,793 B2 * 10/2003 Wu et al. ................... 700/110

FOREIGN PATENT DOCUMENTS

| | | |
|---|---|---|
| EP | 0 589 517 A1 | 3/1993 |
| JP | 5079374 | 3/1993 |
| JP | 5289703 | 11/1993 |
| JP | 11324767 | 11/1999 |
| JP | 2001154704 | 6/2001 |

* cited by examiner

*Primary Examiner*—Tony M. Argenbright
*Assistant Examiner*—Johnny H. Hoang
(74) *Attorney, Agent, or Firm*—Squire, Sanders & Dempsey L.L.P.

(57) ABSTRACT

A control apparatus is provided for eliminating a slippage in control timing between the input/output of a controlled object, even when the control object exhibits a relatively large dynamic characteristic such as a phase delay, a dead time, or the like, to improve the stability and the controllability of the control. The control apparatus comprises a state predictor for calculating a predicted value of a value indicative of an output of a controlled object based on a prediction algorithm, and a DSM controller for calculating a control input to the controlled object based on one modulation algorithm selected from a Δ modulation algorithm, a ΔΣ modulation algorithm, and a ΣΔ modulation algorithm for controlling the output of the controlled object in accordance with the calculated predicted value.

186 Claims, 43 Drawing Sheets

F I G. 1
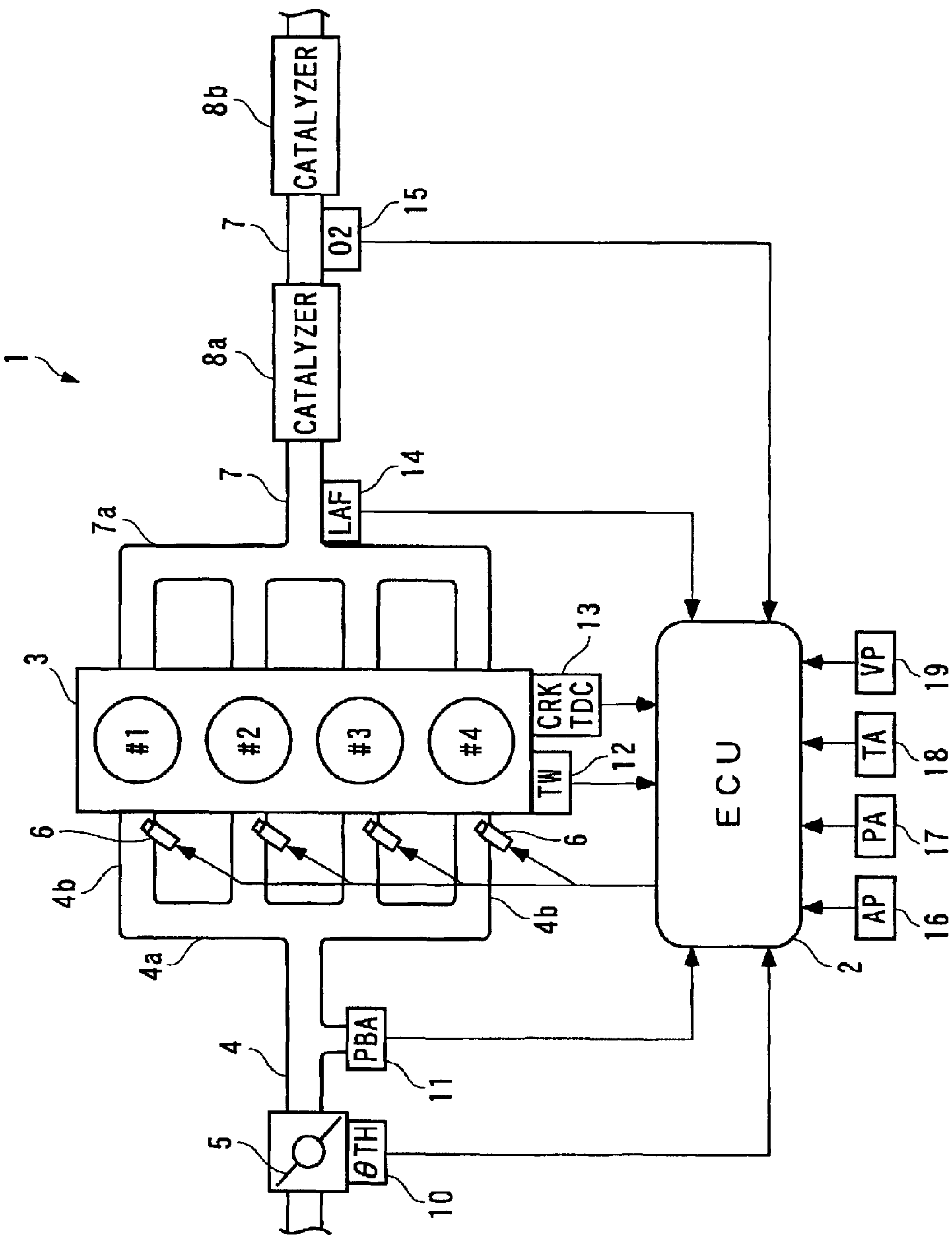

F I G. 2
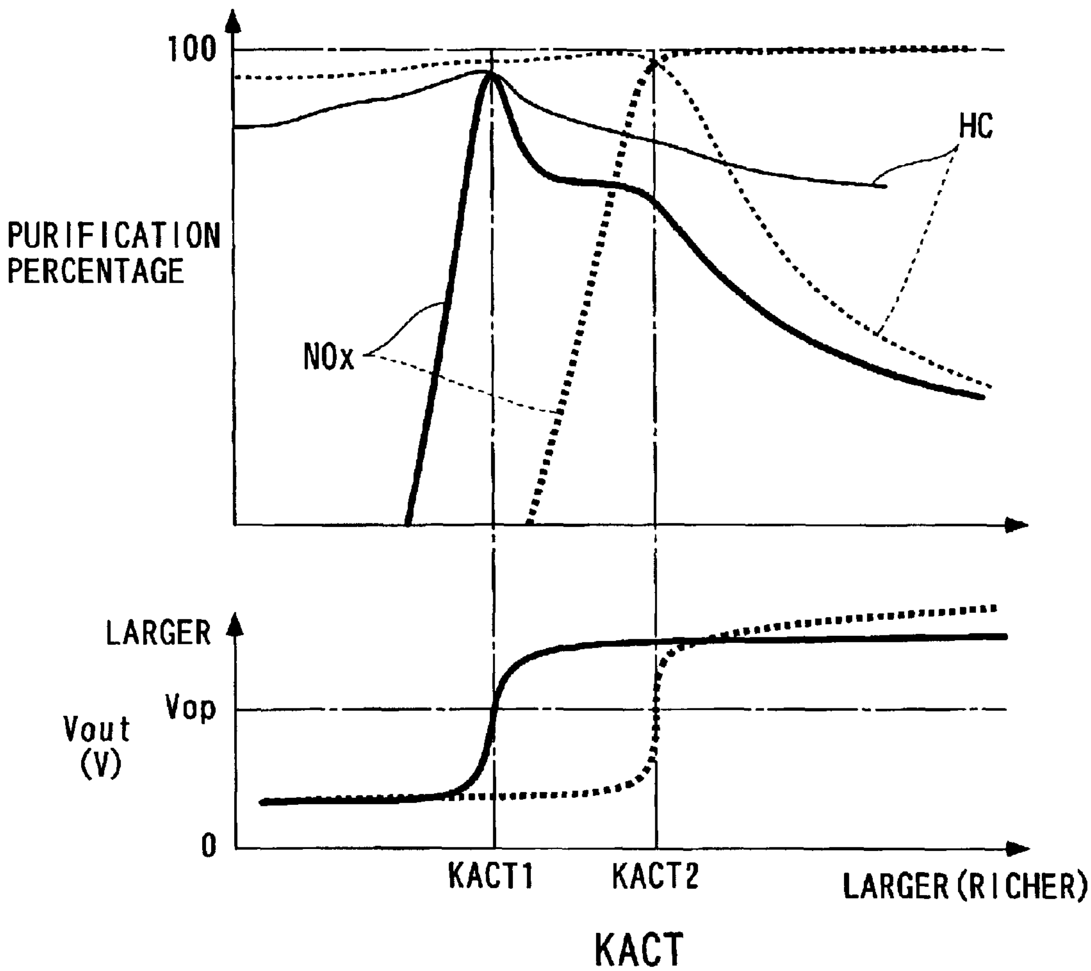

F I G. 3
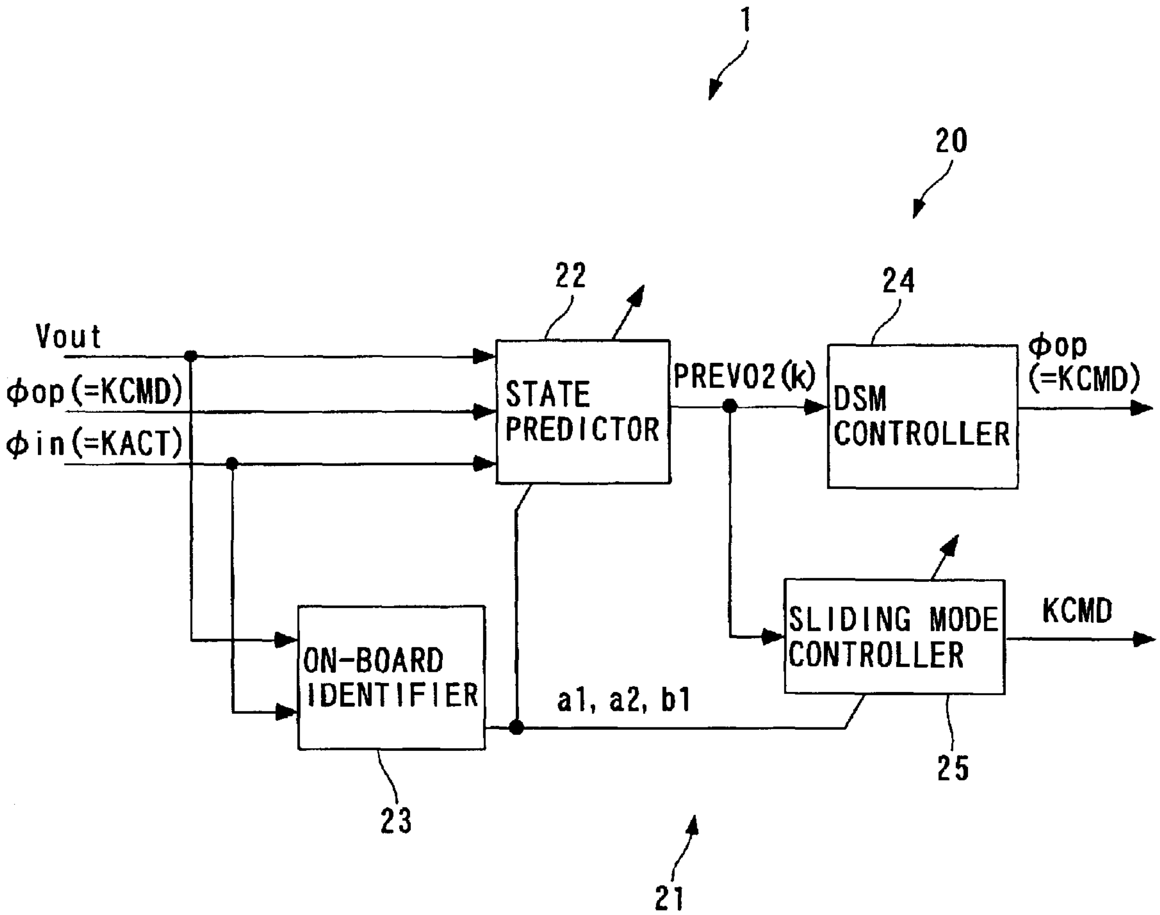

FIG. 4

$$A=\begin{bmatrix} a1 & a2 \\ 1 & 0 \end{bmatrix} \quad \cdots\cdots (4)$$

$$B=\begin{bmatrix} b1 \\ 0 \end{bmatrix} \quad \cdots\cdots (5)$$

$$PREVO2(k)=\alpha 1\cdot VO2(k)+\alpha 2\cdot VO2(k-1)+\sum_{i=1}^{dt}\beta i\cdot DKCMD(k-i) \quad \cdots\cdots (6)$$

WHERE $\alpha 1$ :ONE-ROW, ONE-COLUMN ELEMENT OF $A^{dt}$
$\alpha 2$ :ONE-ROW, TWO-COLUMN ELEMENT OF $A^{dt}$
$\beta i$ :ONE-ROW, ELEMENT OF $A^{i-1}B$ $$PREVO2(k)=\alpha 1\cdot VO2(k)+\alpha 2\cdot VO2(k-1)+\sum_{i=1}^{d'-1}\beta i\cdot DKCMD(k-i)+\sum_{j=d'}^{dt}\beta j\cdot DKACT(k-j) \quad \cdots\cdots (7)$$

WHERE $\beta j$ :ONE-ROW ELEMENT OF $A^{j-1}B$

F I G. 5

$$\theta(k) = \theta(k-1) + KP(k) \cdot ide\_f(k) \quad \cdots\cdots (8)$$

$$\theta(k)^T = [a1'(k), a2'(k), b1'(k)] \quad \cdots\cdots (9)$$

$$ide\_f(k) = \frac{1}{n}\sum_{i=1}^{n} ide(i) \quad \cdots\cdots (10)$$

$$ide(k) = VO2(k) - VO2HAT(k) \quad \cdots\cdots (11)$$

$$VO2HAT(k) = \theta(k-1)^T \zeta(k) \quad \cdots\cdots (12)$$

$$\zeta(k)^T = [VO2(k-1), VO2(k-2), DKCMD(k-dt)] \quad \cdots\cdots (13)$$

$$KP(k) = \frac{P(k)\,\zeta(k)}{1 + \zeta(k)^T P(k)\,\zeta(k)} \quad \cdots\cdots (14)$$

$$P(k+1) = \frac{1}{\lambda_1}\left(I - \frac{\lambda_2 P(k)\,\zeta(k)\,\zeta(k)^T}{\lambda_1 + \lambda_2\,\zeta(k)^T P(k)\,\zeta(k)}\right) P(k) \quad \cdots\cdots (15)$$

WHERE I IS UNIT MATRIX

FIG. 6

$$\theta(k) = \theta(k-1) + KP(k) \cdot ide\_f(k) \quad \cdots\cdots (16)$$

$$\theta(k)^T = [a1'(k), a2'(k), b1'(k)] \quad \cdots\cdots (17)$$

$$ide\_f(k) = \frac{1}{n} \sum_{i=1}^{n} ide(i) \quad \cdots\cdots (18)$$

$$ide(k) = VO2(k) - VO2HAT(k) \quad \cdots\cdots (19)$$

$$VO2HAT(k) = \theta(k-1)^T \zeta(k) \quad \cdots\cdots (20)$$

$$\zeta(k)^T = [VO2(k-1), VO2(k-2), DKACT(k-d-dd)] \quad \cdots\cdots (21)$$

$$KP(k) = \frac{P(k)\,\zeta(k)}{1 + \zeta(k)^T P(k)\,\zeta(k)} \quad \cdots\cdots (22)$$

$$P(k+1) = \frac{1}{\lambda_1}\left(I - \frac{\lambda_2 P(k)\,\zeta(k)\,\zeta(k)^T}{\lambda_1 + \lambda_2\,\zeta(k)^T P(k)\,\zeta(k)}\right) P(k) \quad \cdots\cdots (23)$$

WHERE I IS UNIT MATRIX

F I G. 7
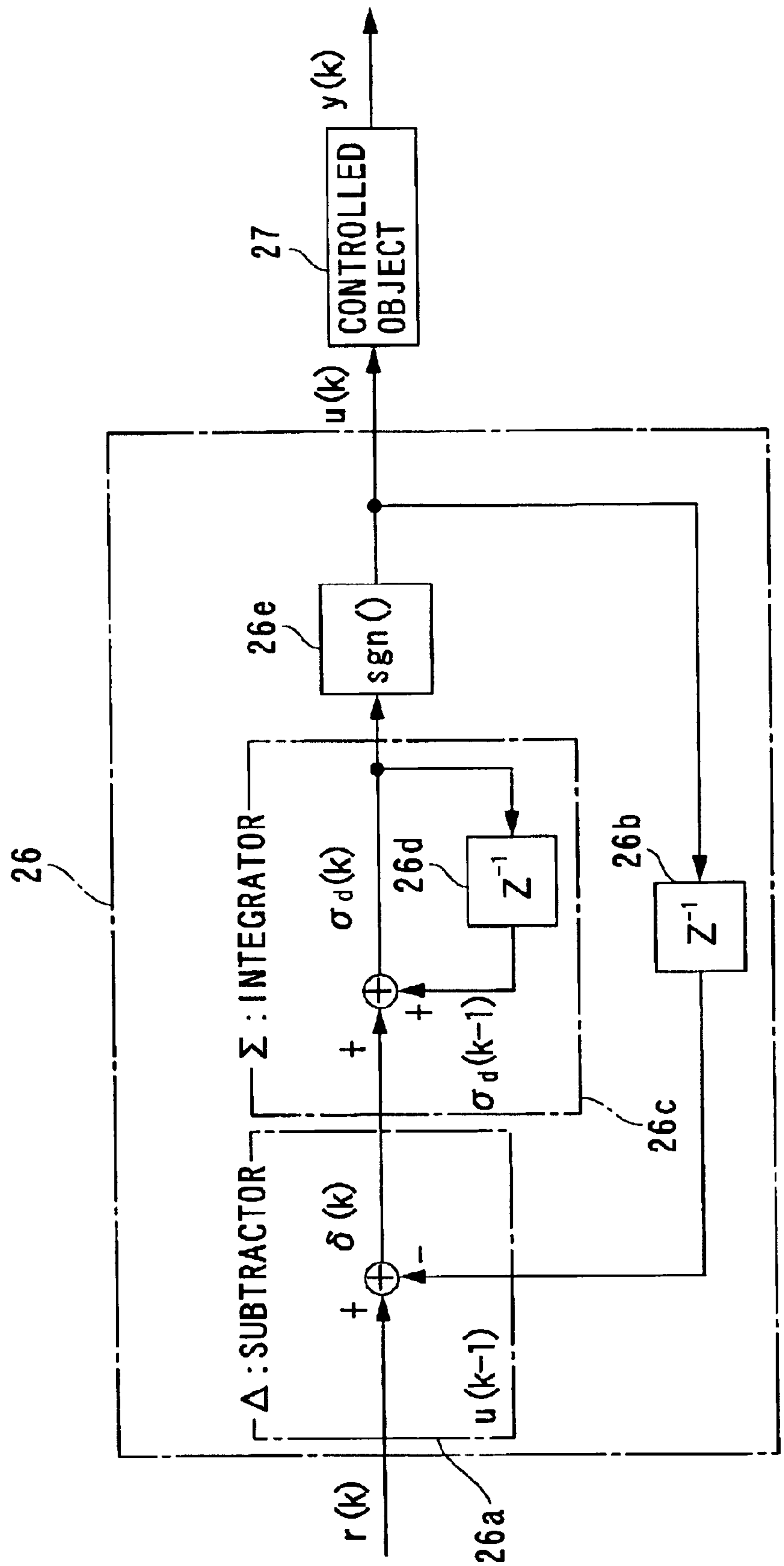

F I G. 8
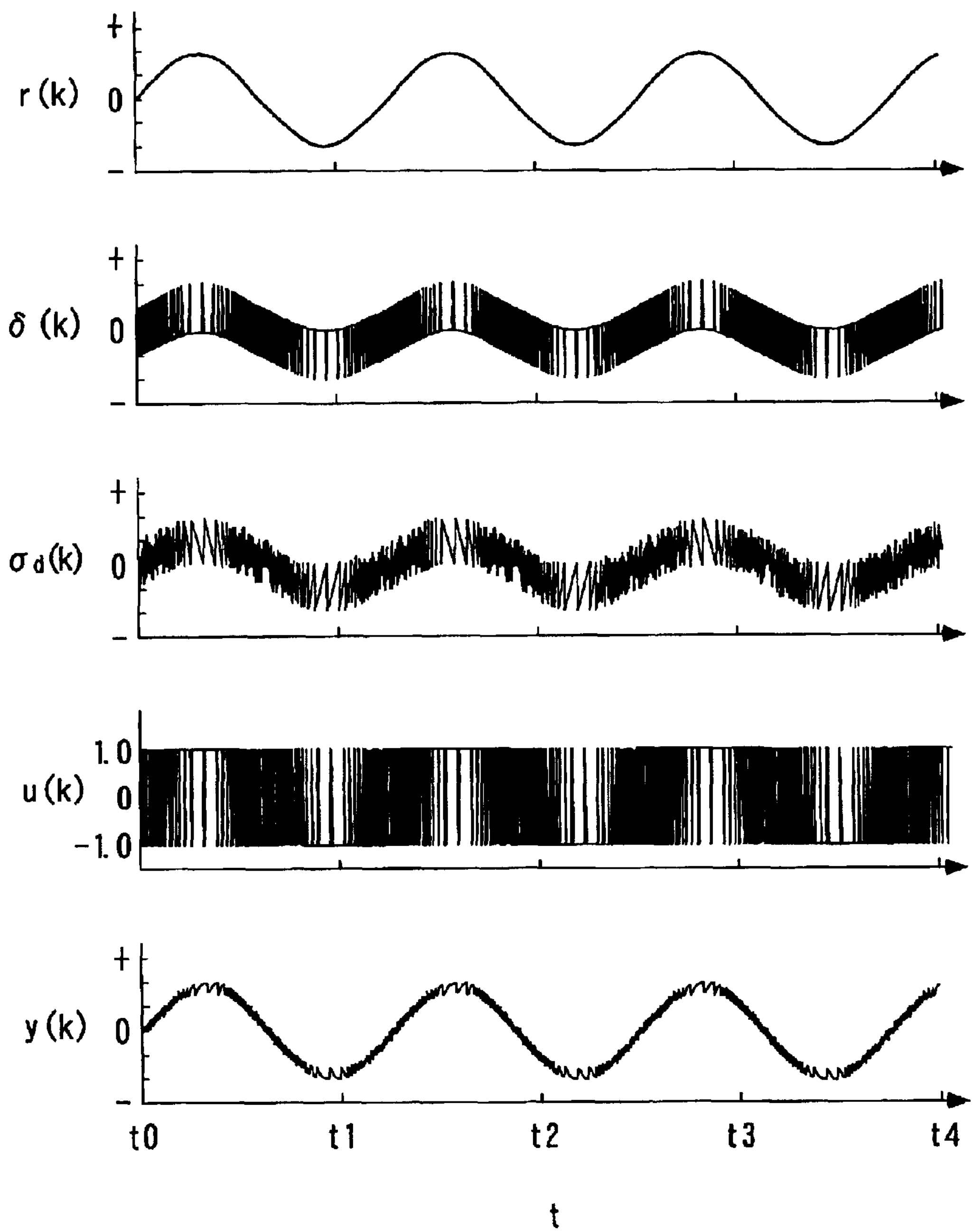

F I G. 9
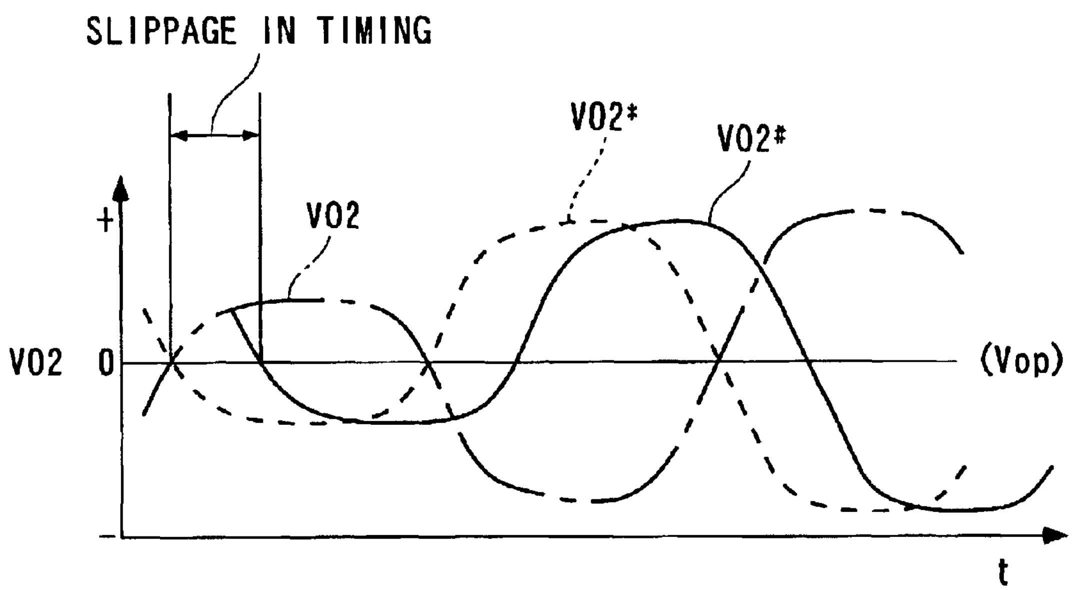

F I G. 1 0
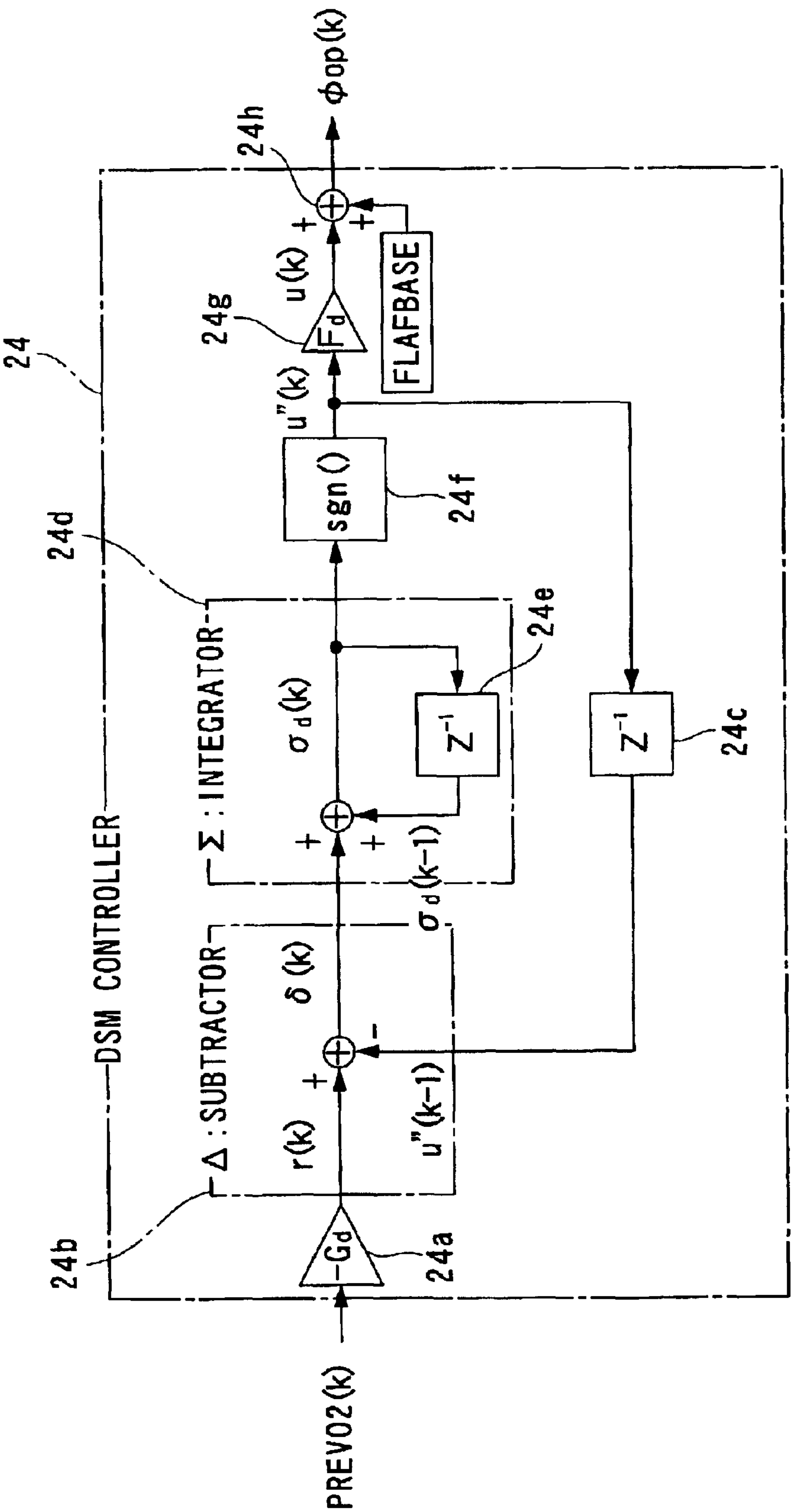

FIG. 11

$$Usl(k)=Ueq(k)+Urch(k)+Uadp(k) \quad \cdots\cdots (34)$$

$$Ueq(k)=\frac{-1}{S1\cdot b1}\{[S1\cdot(a1-1)+S2]\cdot VO2(k+dt) + (S1\cdot a2-S2)\cdot VO2(k+dt-1)\} \quad \cdots\cdots (35)$$

$$Urch(k)=\frac{-F}{S1\cdot b1}\cdot\sigma(k+dt) \quad \cdots\cdots (36)$$

$$Uadp(k)=\frac{-G}{S1\cdot b1}\sum_{i=0}^{k+dt}\Delta T\cdot\sigma(i) \quad \cdots\cdots (37)$$

FIG. 12

$$\sigma PRE(k) = S1 \cdot PREVO2(k) + S2 \cdot PREVO2(k-1) \quad \cdots\cdots (38)$$

$$Usl(k) = Ueq(k) + Urch(k) + Uadp(k) \quad \cdots\cdots (39)$$

$$Ueq(k) = \frac{-1}{S1 \cdot b1}\{[S1 \cdot (a1-1) + S2] \cdot PREVO2(k) + (S1 \cdot a2 - S2) \cdot PREVO2(k-1)\} \quad \cdots\cdots (40)$$

$$Urch(k) = \frac{-F}{S1 \cdot b1} \cdot \sigma PRE(k) \quad \cdots\cdots (41)$$

$$Uadp(k) = \frac{-G}{S1 \cdot b1} \sum_{i=0}^{k} \Delta T \cdot \sigma PRE(i) \quad \cdots\cdots (42)$$

F I G. 1 4
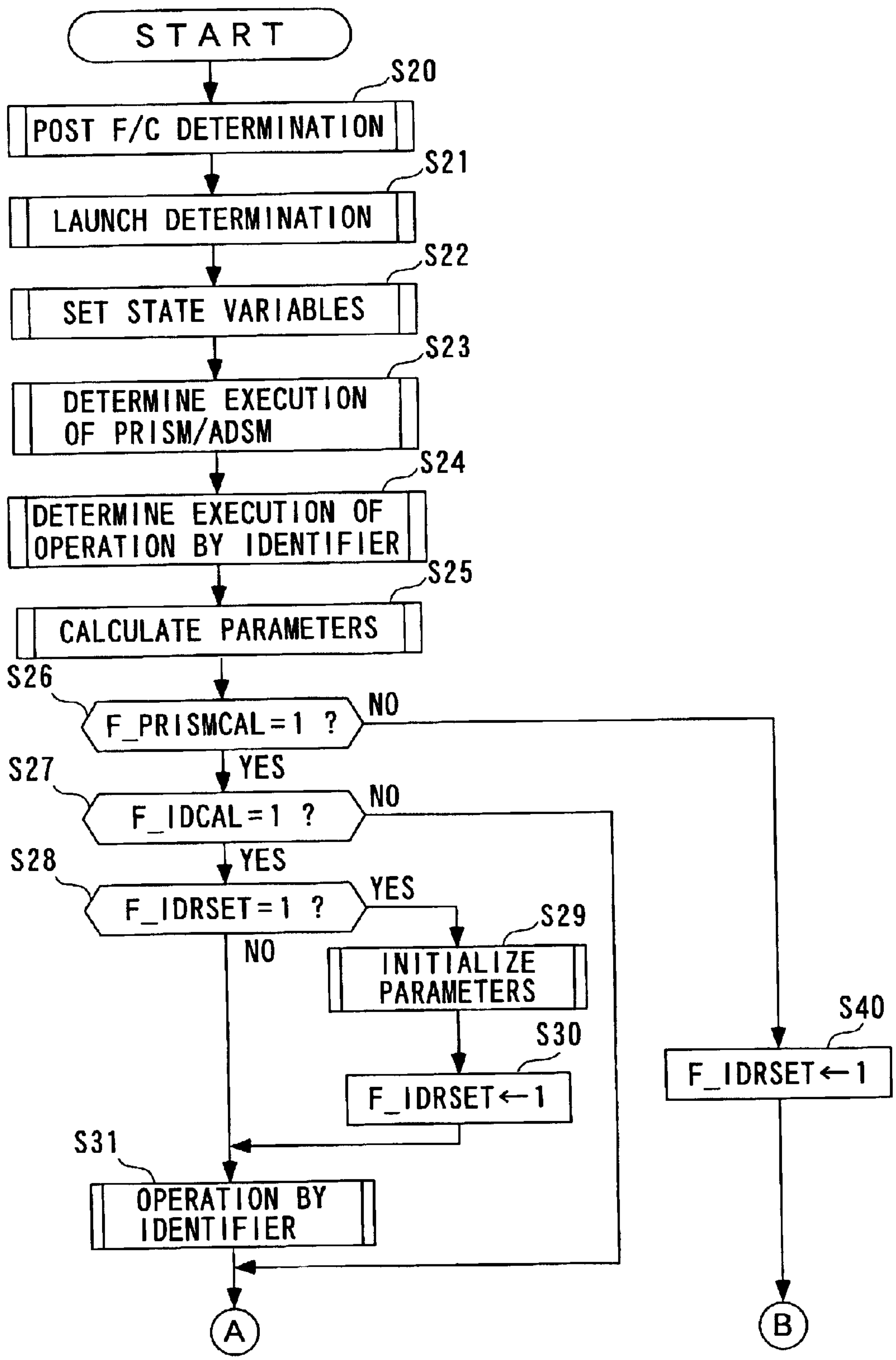

F I G. 1 5
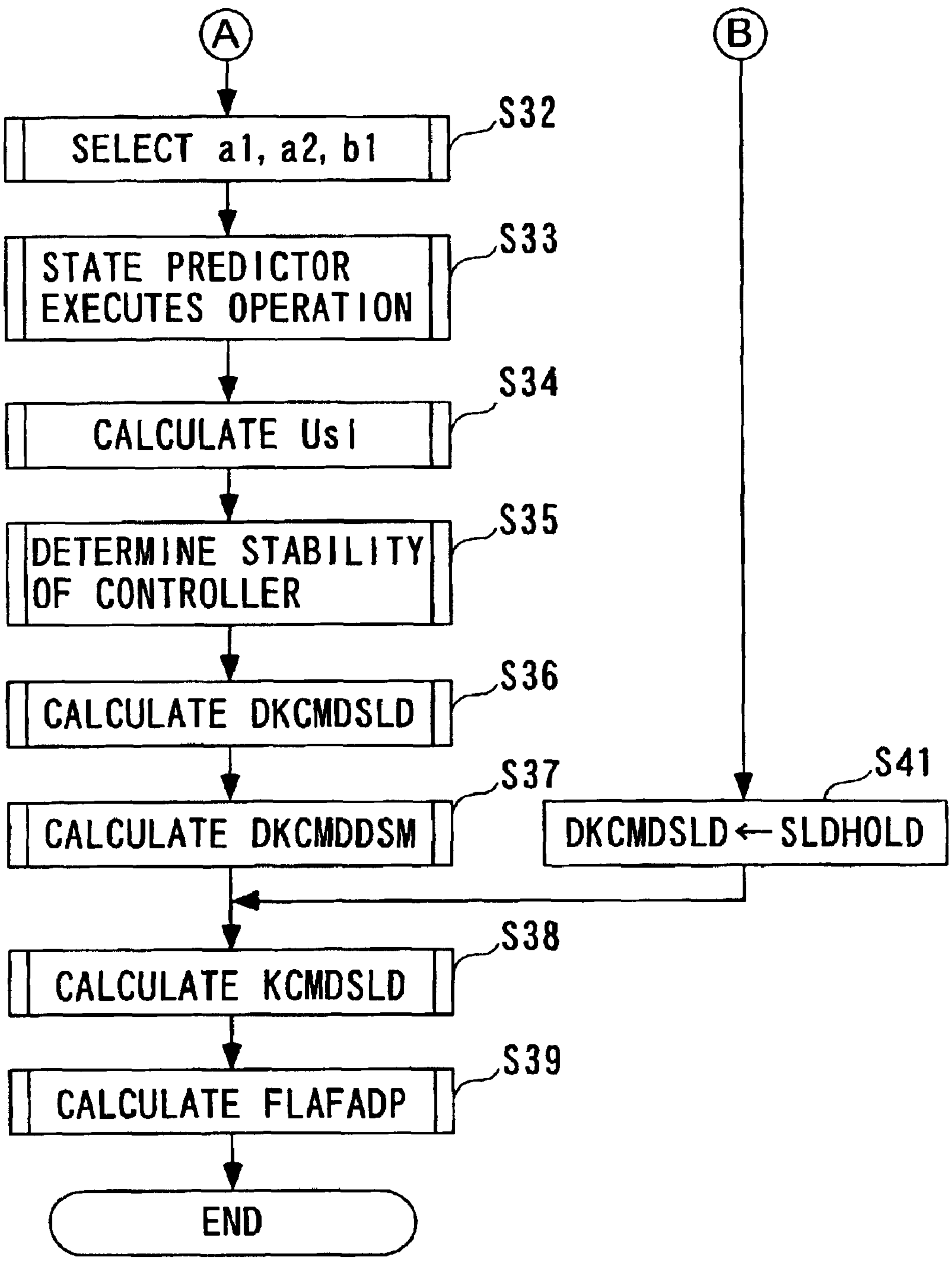

F I G. 1 8
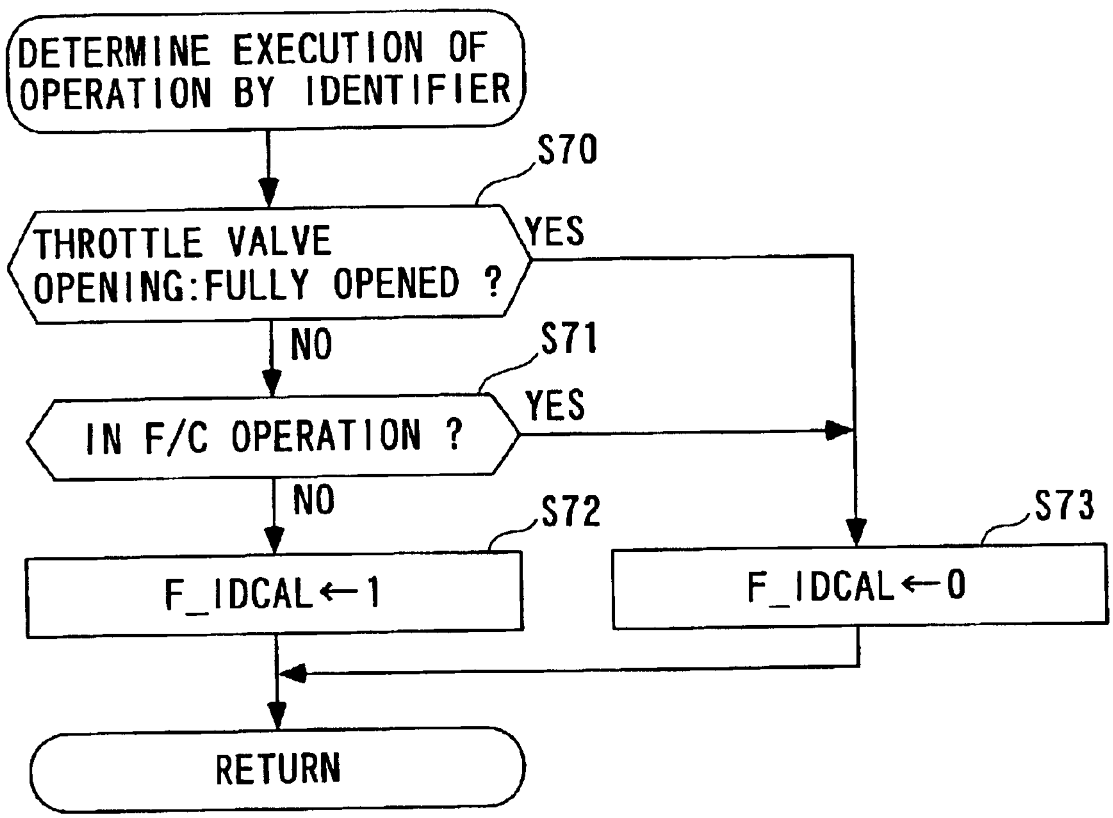

F I G. 2 2
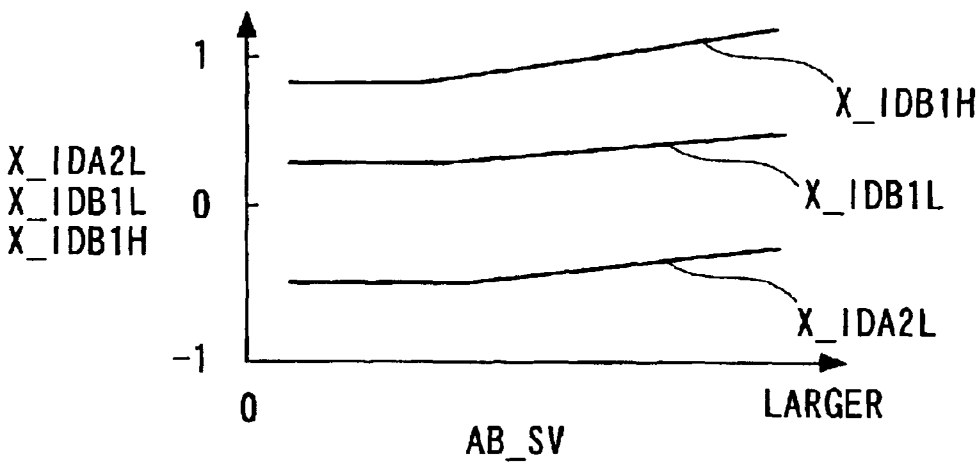
F I G. 2 3
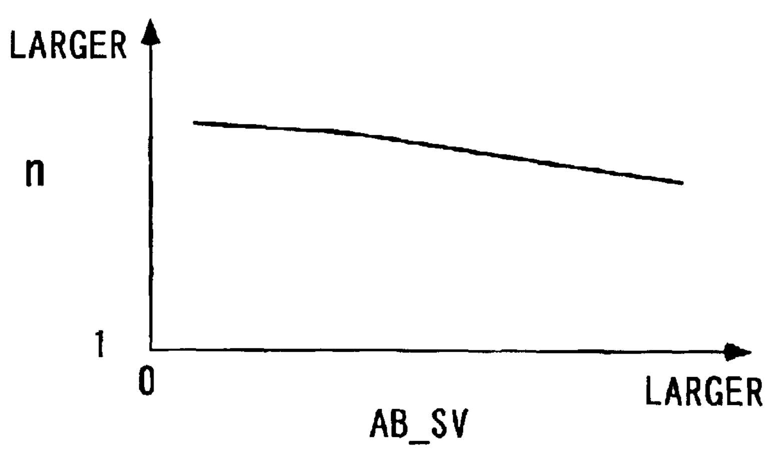

F I G. 25
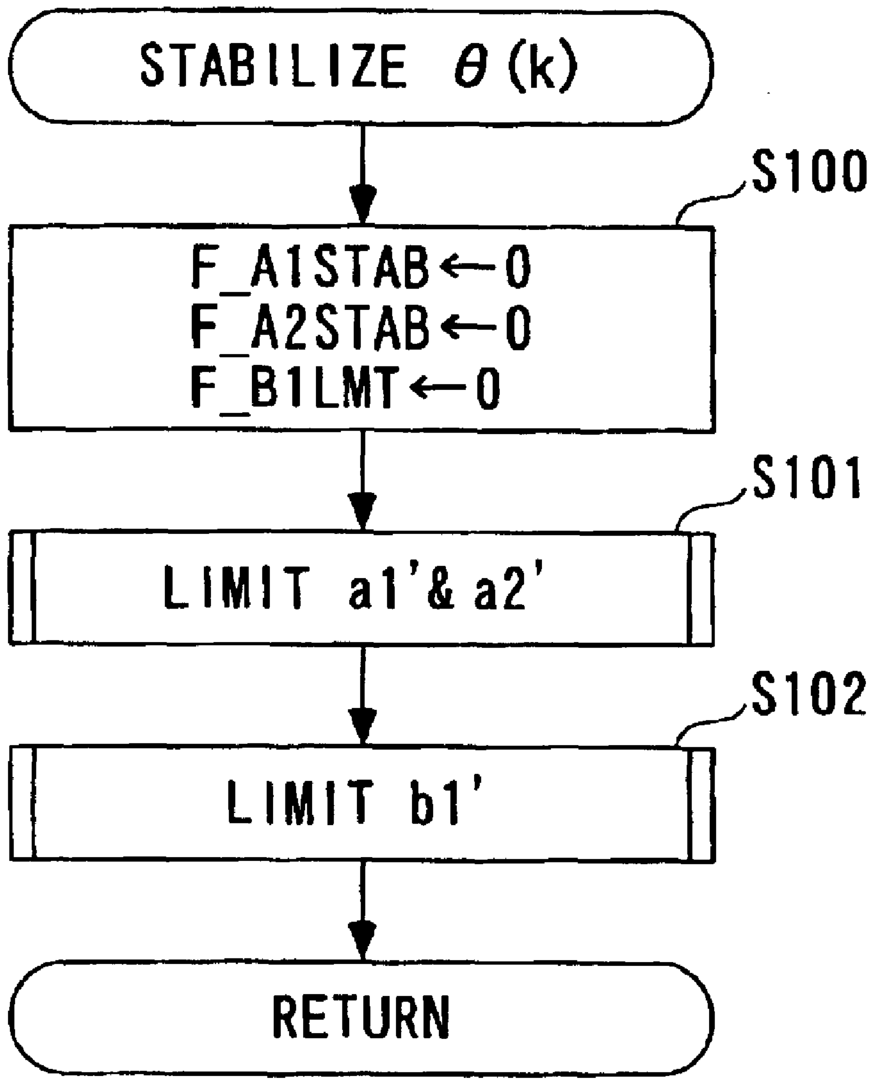

F I G. 3 1
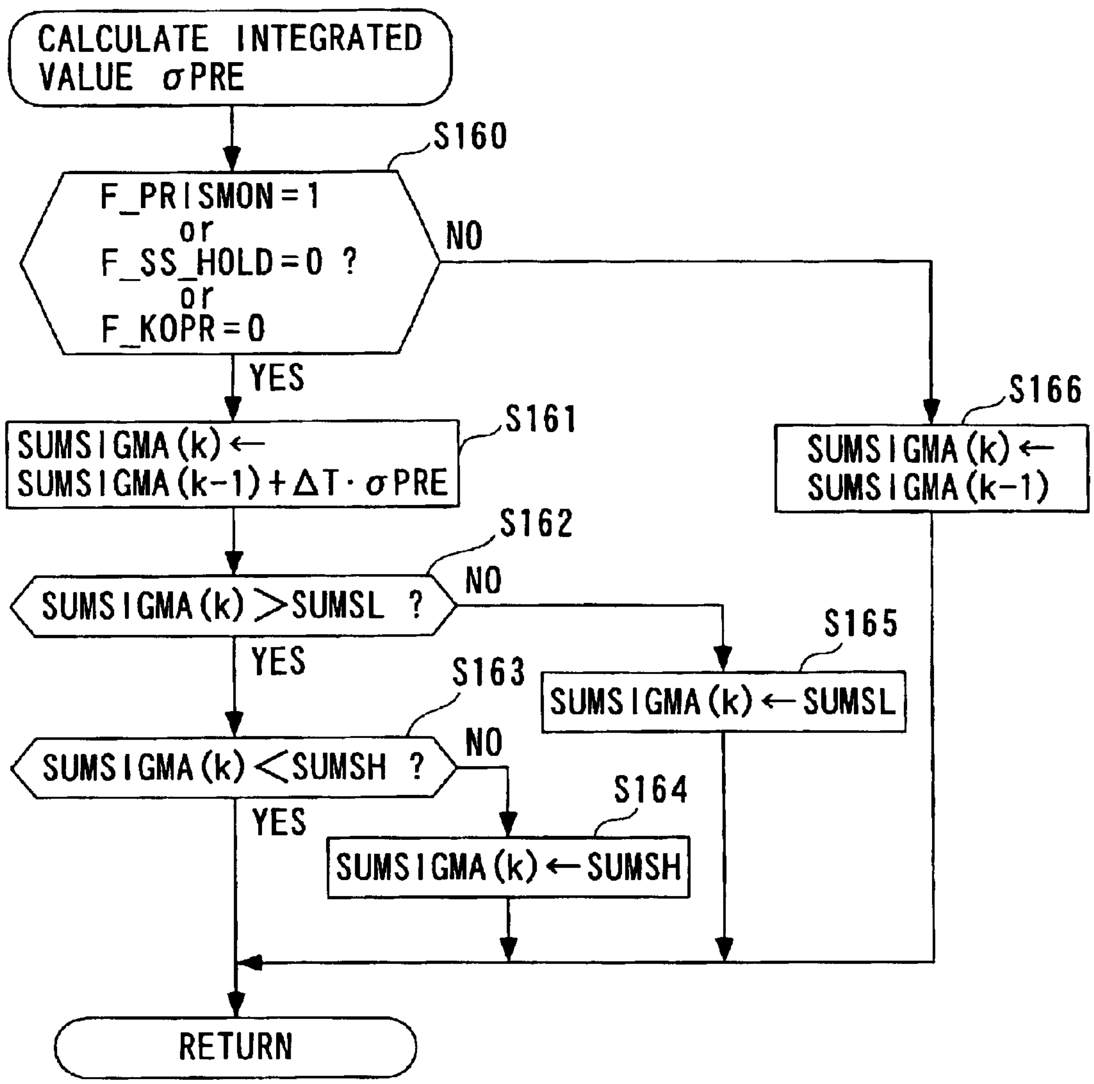

F I G. 32
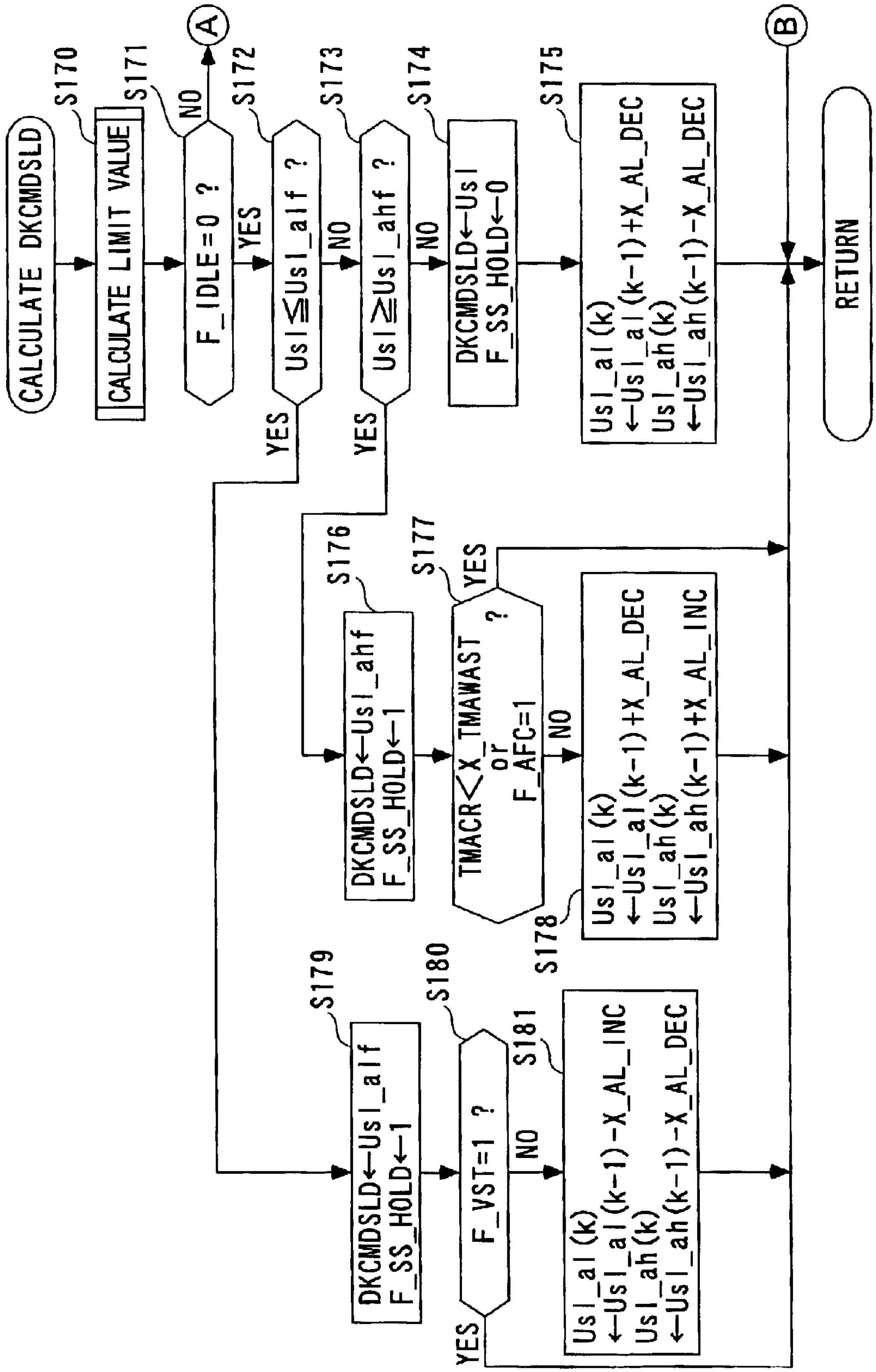

F I G. 3 4
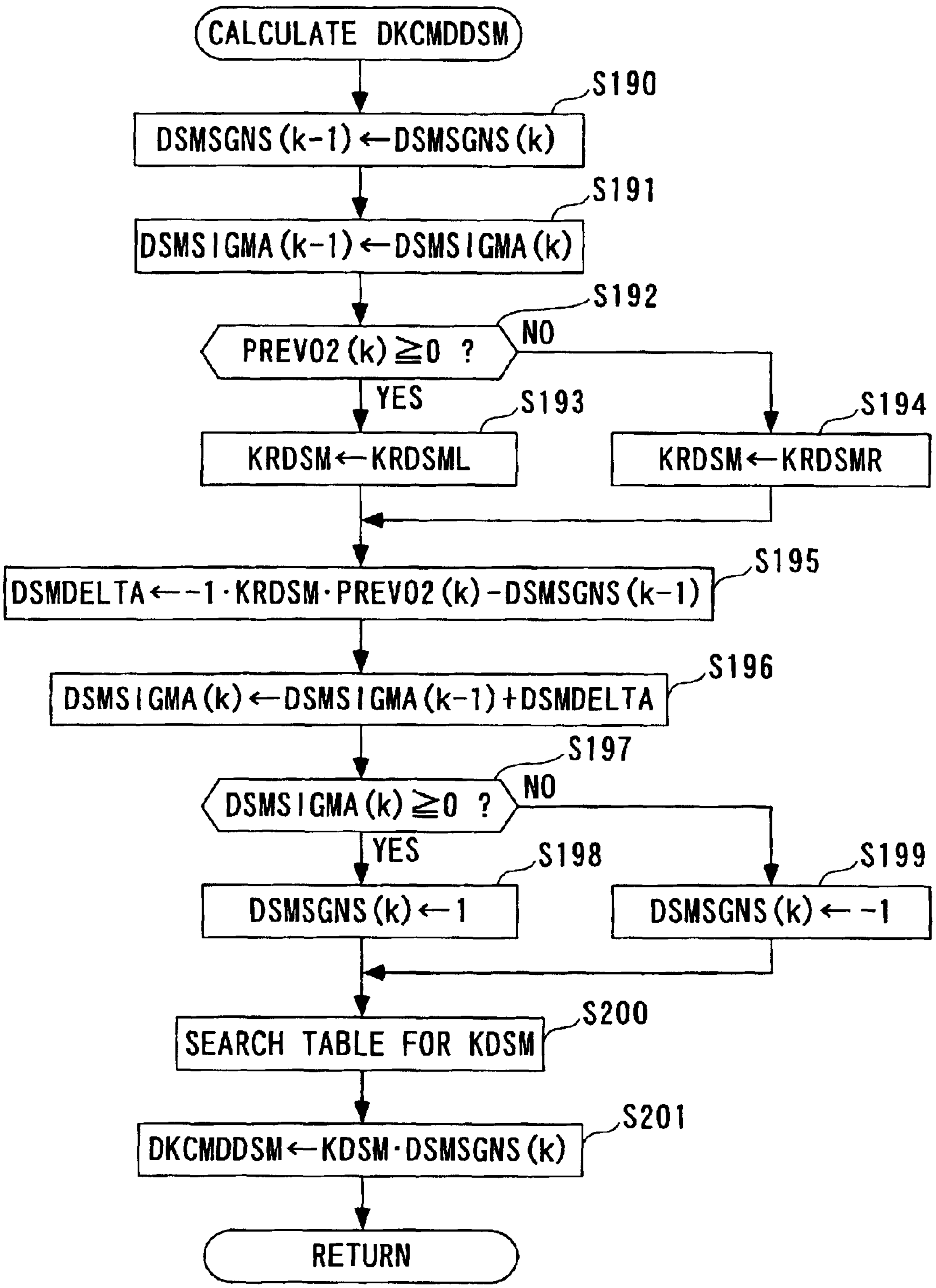

F I G. 3 5
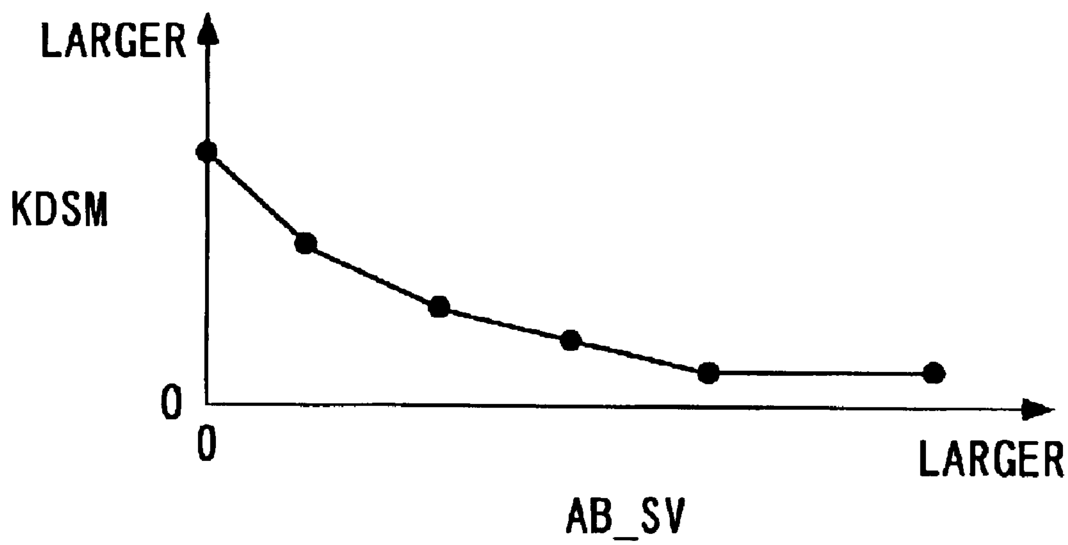

F I G. 3 7
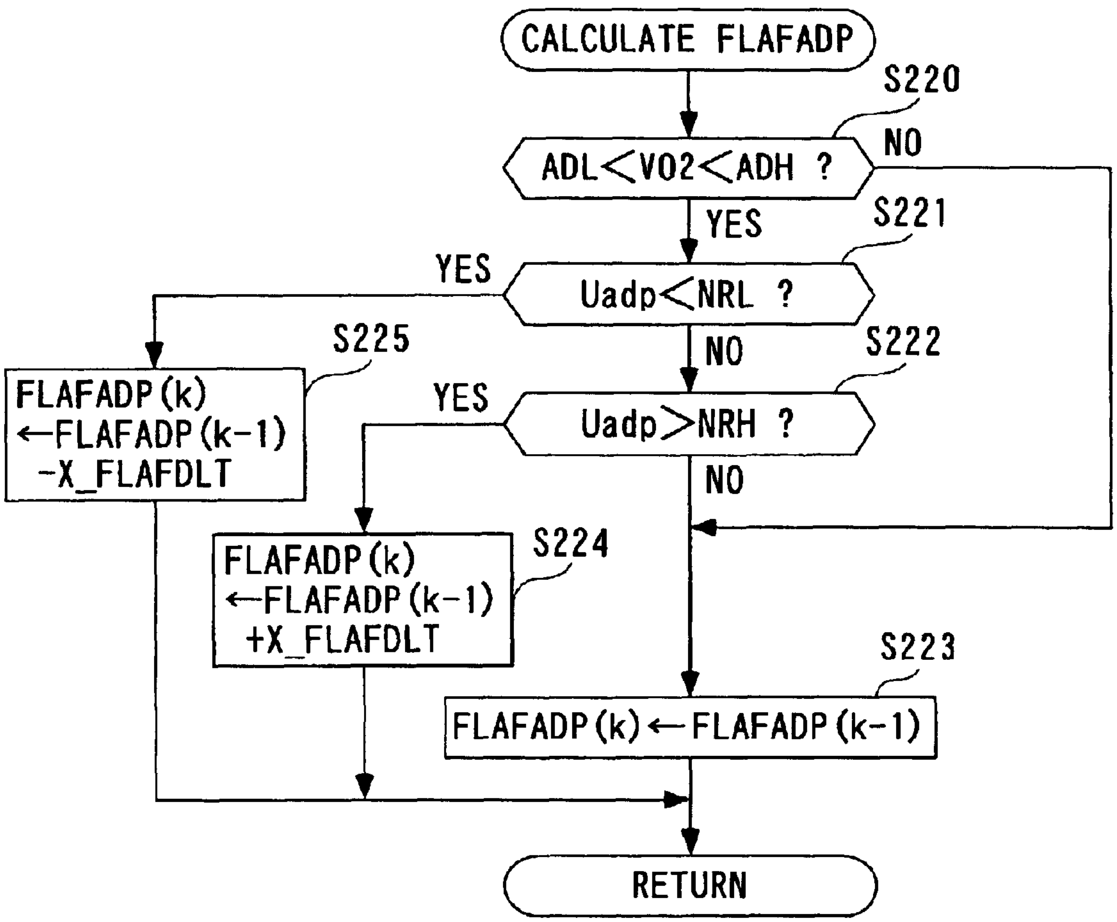

F I G. 38
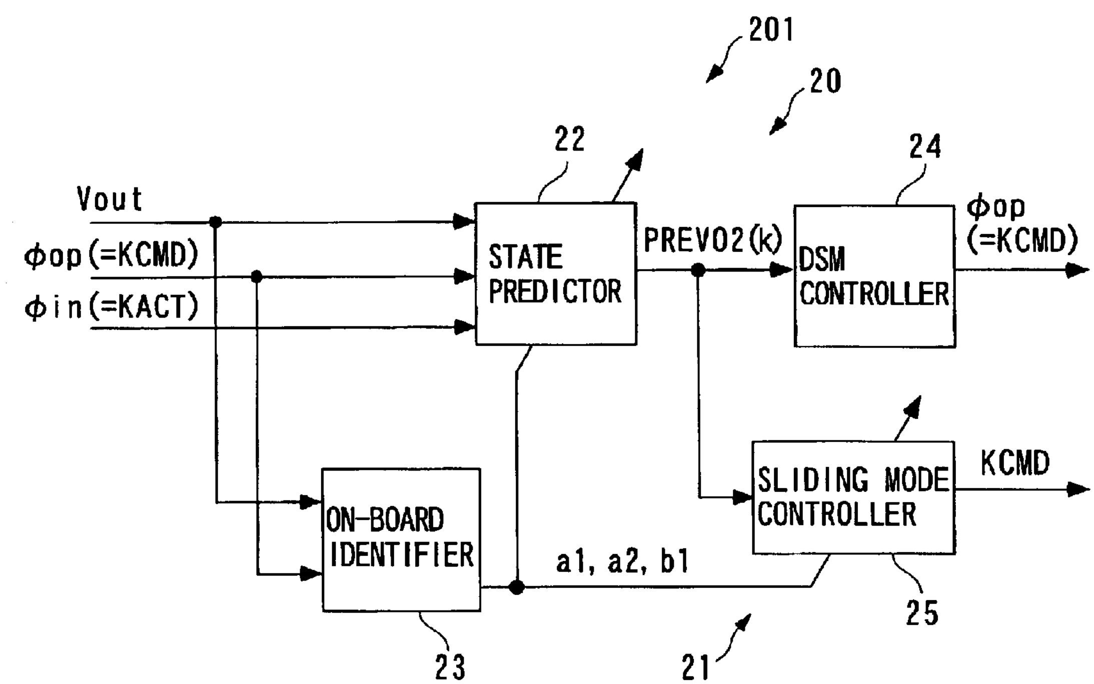
F I G. 39
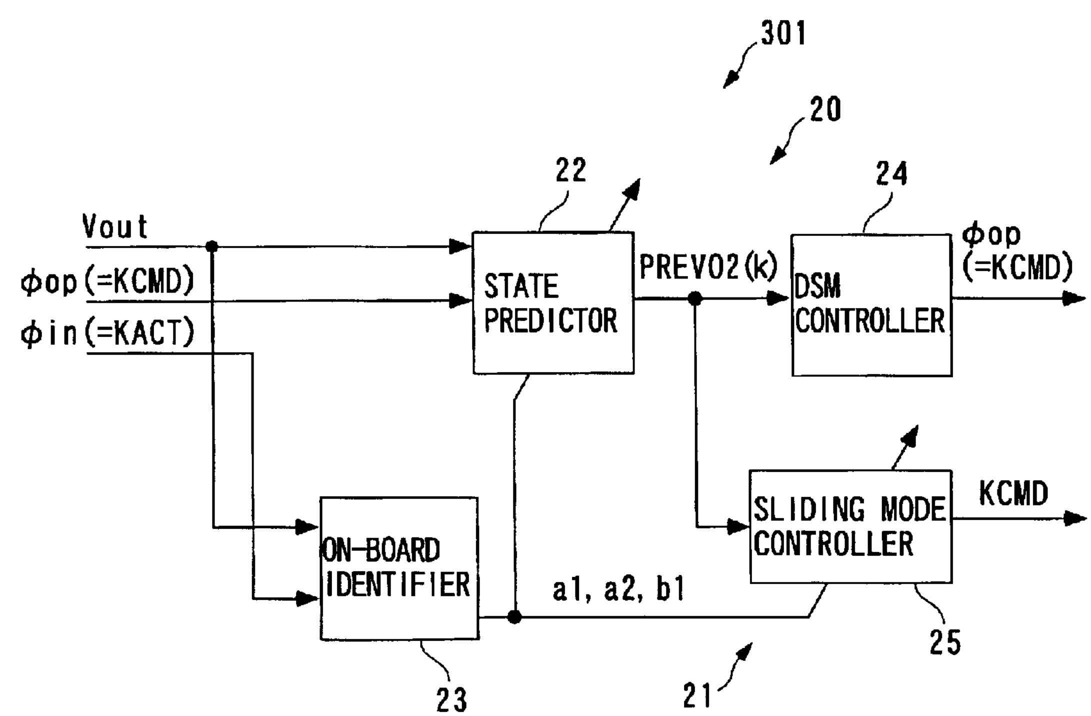

F I G. 40
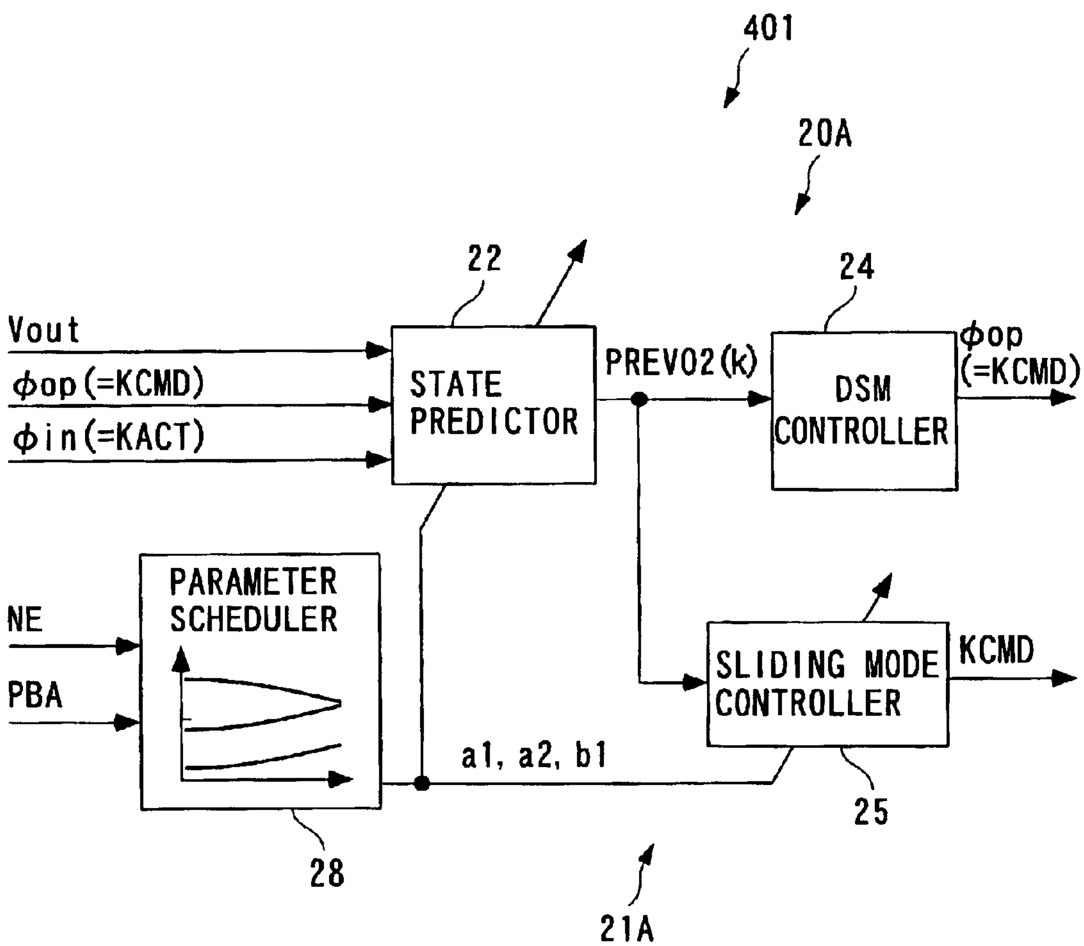

F I G. 41
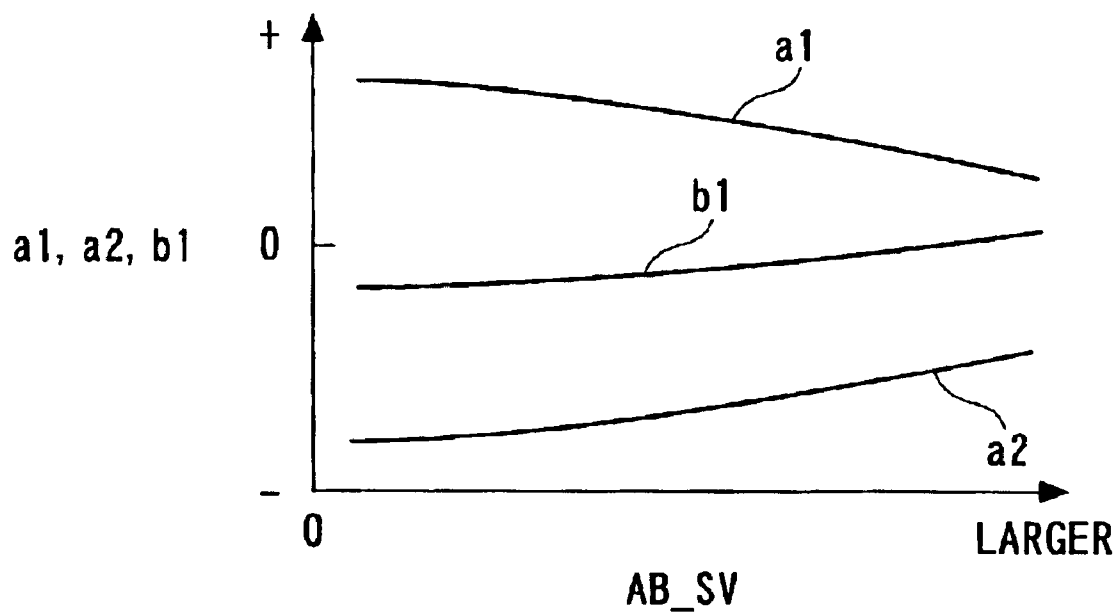

F I G. 4 3
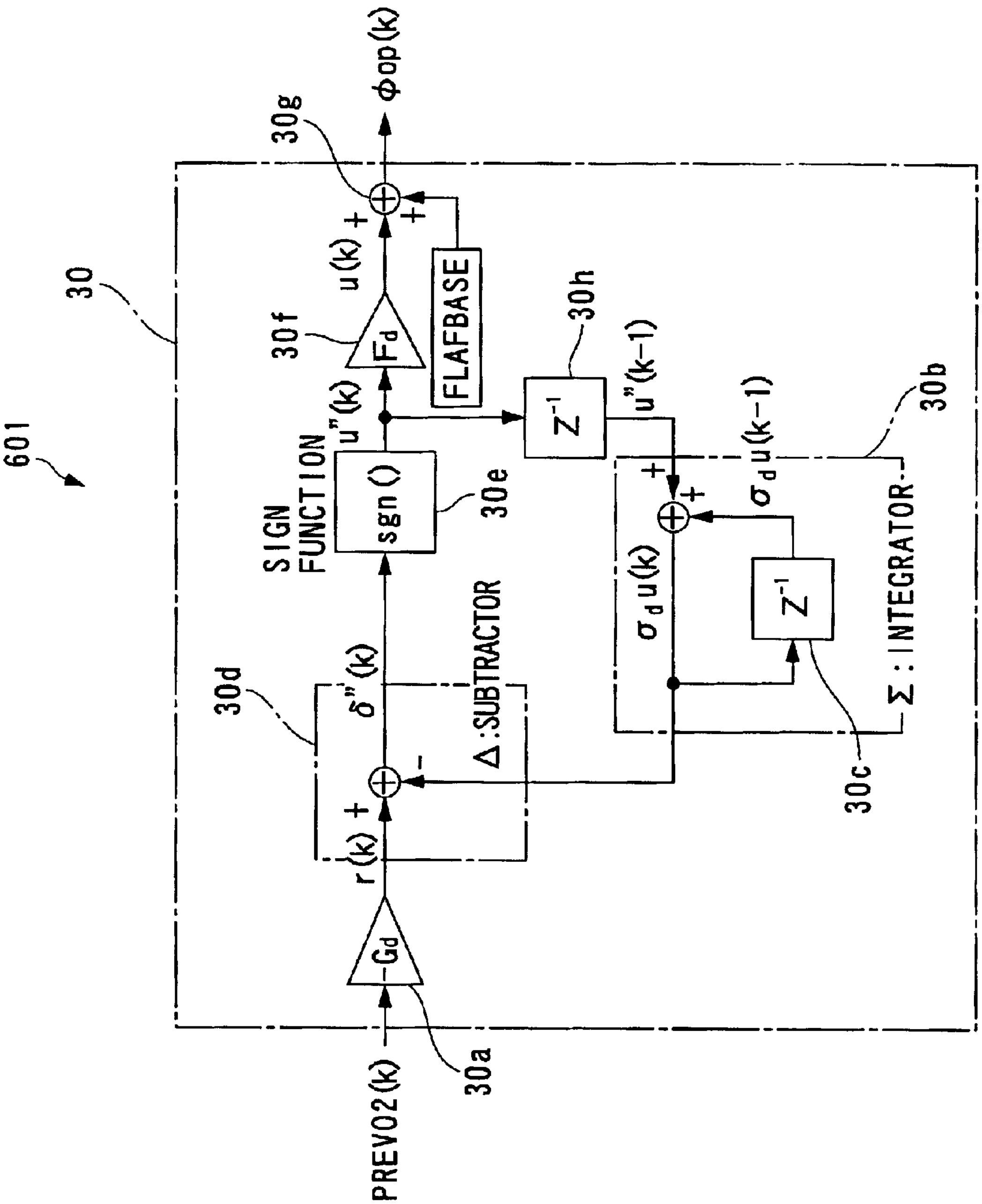

CONTROL APPARATUS, CONTROL METHOD, AND ENGINE CONTROL UNIT

BACKGROUND OF THE INVENTION

1. Field of the Invention

The present invention relates to a control apparatus, a control method, and an engine control unit which calculate a control input to a controlled object based on a ΔΣ modulation algorithm or the like to converge the output of the controlled object to a target value.

2. Description of the Prior Art

Conventionally, a control apparatus of the type mentioned above is known, for example, from Laid-open Japanese Patent Application No. 2001-154704. This control apparatus comprises detecting means for detecting an output of a controlled object to output the result of detection as a detection signal indicative of a detected analog amount; deviation calculating means for calculating a deviation of the detection signal from a target value of an analog amount inputted from a higher rank apparatus; converting means for converting the calculated deviation to a 1-bit digital signal; and compensating means for compensating the 1-bit digital signal from the converting means to output the compensated signal as a manipulation signal (see FIG. 6 of the application).

In this control apparatus, the deviation calculating means calculates a deviation of a detection signal from a target value (analog amount) which is converted to a 1-bit digital signal by a ΔΣ modulation in the converting means. The converted signal is further compensated by the compensating means before it is inputted to a controlled object as a manipulation signal. In the foregoing configuration, the manipulation amount is generated in the opposite phase to the deviation so as to cancel the deviation of the output of the controlled object from the target value, and inputted to the controlled object. As a result, the output of the controlled object is controlled in feedback to converge to the target value.

According to the conventional control apparatus mentioned above, when a dynamic characteristic of a controlled object has a relatively large phase delay, a dead time, or the like, this causes a delay in outputting an output signal, which reflects an input signal from the controlled object, after the controlled object is fed with the input signal, leading to a slippage in control timing between the input and output of the controlled object. As a result, a control system could lose the stability. For example, when an internal combustion engine is controlled for an air/fuel ratio of exhaust gases using a fuel injection amount of the internal combustion engine as an input, a time lag is needed until the air/fuel ratio of the exhaust gases actually change after a fuel has been actually injected, so that the air/fuel ratio control experiences lower stability and controllability, resulting in an instable characteristic of exhaust gases purified by a catalyst.

OBJECT AND SUMMARY OF THE INVENTION

The present invention has been made to solve the foregoing problem, and it is an object of the invention to provide a control apparatus, a control method, and an engine control unit which are capable of eliminating a slippage in control timing between the input and output of a controlled object, even when the controlled object exhibits a relatively large dynamic characteristic such as a phase delay, a dead time, and the like, and of capable of improving the stability and controllability of control.

To achieve the above object, according to a first aspect of the invention, there is provided a control apparatus which is characterized by comprising predicted value calculating means for calculating a predicted value of a value indicative of an output of a controlled object based on a prediction algorithm; and control input calculating means for calculating a control input to the controlled object based on one modulation algorithm selected from a Δ modulation algorithm, a ΔΣ modulation algorithm, and a ΣΔ modulation algorithm for controlling the output of the controlled object in accordance with the calculated predicted value.

According to this control apparatus, the control input is calculated in accordance with a predicted value of the value indicative of the output of the controlled object based on one modulation algorithm selected from the Δ modulation algorithm, ΔΣ modulation algorithm, and ΣΔ modulation algorithm. Therefore, a slippage in control timing can be eliminated between the input and output of the controlled object by calculating such a predicted value as a value which reflects a dynamic characteristic of the controlled object, for example, a phase delay, a dead time, or the like. As a result, the control apparatus can ensure the stability of the control and improve the controllability (it should be noted that in this specification, "calculation" in "calculation of a predicted value," "calculation of a control input" and the like is not limited to a program-based operation but includes hardware-based generation of electric signals indicative of such values).

To achieve the above object, according to a second aspect of the invention, there is provided a control method which is characterized by comprising the steps of calculating a predicted value of a value indicative of an output of a controlled object based on a prediction algorithm; and calculating a control input to the controlled object based on one modulation algorithm selected from a Δ modulation algorithm, a ΔΣ modulation algorithm, and a ΣΔ modulation algorithm for controlling the output of the controlled object in accordance with the calculated predicted value.

This control method provides the same advantageous effects as described above concerning the control apparatus according to the first aspect of the invention.

To achieve the above object, according to a third aspect of the invention, there is provided an engine control unit including a control program for causing a computer to calculate a predicted value of a value indicative of an output of a controlled object based on a prediction algorithm; and calculate a control input to the controlled object based on one modulation algorithm selected from a Δ modulation algorithm, a ΔΣ modulation algorithm, and a ΣΔ modulation algorithm for controlling the output of the controlled object in accordance with the calculated predicted value.

This engine control unit provides the same advantageous effects as described above concerning the control apparatus according to the first aspect of the invention.

Preferably, in the control apparatus described above, the predicted value calculating means calculates the predicted value in accordance with at least one of the calculated control input and a value which reflects a control input inputted to the controlled object, and the output of the controlled object, based on the prediction algorithm.

According to this preferred embodiment of the control apparatus, the predicted value can be calculated while reflecting the state of the control input, so that the predicted value can be correspondingly calculated with an improved accuracy (prediction accuracy). As a result, the control apparatus can ensure the stability of the control and improve the controllability.

Preferably, in the control method described above, the step of calculating a predicted value includes calculating the predicted value in accordance with at least one of the calculated control input and a value which reflects a control input inputted to the controlled object, and the output of the controlled object, based on the prediction algorithm.

This preferred embodiment of the control method provides the same advantageous effects provided by the corresponding preferred embodiment of the control apparatus.

Preferably, in the engine control unit described above, the control program causes the computer to calculate a predicted value includes calculating the predicted value in accordance with at least one of the calculated control input and a value which reflects a control input inputted to the controlled object, and the output of the controlled object, based on the prediction algorithm.

This preferred embodiment of the engine control unit provides the same advantageous effects provided by the corresponding preferred embodiment of the control apparatus.

Preferably, in the control apparatus described above, the prediction algorithm is an algorithm based on a controlled object model which has a variable associated with a value indicative of one of the control input and the value which reflects a control input inputted to the controlled object such as an air/fuel ratio deviation and LAF output deviation, and a variable associated with a value indicative of the output of the controlled object.

According to this preferred embodiment of the control apparatus, since the predicted value is calculated based on a controlled object model which has a variable associated with a value indicative of one of the control input and the value which reflects a control input inputted to the controlled object, and a variable associated with a value indicative of the output of the controlled object, this controlled object model can be defined as a model which reflects the dynamic characteristic such as a phase delay, a dead time and the like of the controlled object to calculate the predicted value which reflects the dynamic characteristic such as the phase delay, dead time and the like of the controlled object. As a result, the control apparatus can ensure the stability of the control and improve the controllability.

Preferably, in the control method described above, the prediction algorithm is an algorithm based on a controlled object model which has a variable associated with a value indicative of one of the control input and the value which reflects a control input inputted to the controlled object, and a variable associated with a value indicative of the output of the controlled object.

This preferred embodiment of the control method provides the same advantageous effects provided by the corresponding preferred embodiment of the control apparatus.

Preferably, in the engine control unit, the prediction algorithm is an algorithm based on a controlled object model which has a variable associated with a value indicative of one of the control input and the value which reflects a control input inputted to the controlled object, and a variable associated with a value indicative of the output of the controlled object.

This preferred embodiment of the engine control unit provides the same advantageous effects provided by the corresponding preferred embodiment of the control apparatus.

Preferably, in the control apparatus described above, the value indicative of the output of the controlled object is an output deviation which is a deviation of the output of the controlled object such as the output of an oxygen concentration sensor from a predetermined target value.

Generally, it is known in a controlled object model that the dynamic characteristic of the controlled object model can be fitted more to the actual dynamic characteristic of the controlled object when a deviation of input/output of the controlled object from a predetermined value is defined as a variable representative of the input/output than when an absolute value of the input/output is defined as a variable, because it can more precisely identify or define model parameters. Therefore, according to this preferred embodiment of the control apparatus, the controlled object model employs a variable representative of the output deviation which is a deviation of the output of the controlled object from the predetermined target value, so that the dynamic characteristic of the controlled object model can be fitted more closely to the actual dynamic characteristic of the controlled object, as compared with the case where an absolute value of the output of the controlled object is chosen as a variable, thereby making it possible to calculate the predicted value of the output deviation with a higher accuracy. As a result, the control apparatus can further enhance the ensured stability of the control and the improved controllability.

Preferably, in the control method described above, the value indicative of the output of the controlled object is an output deviation which is a deviation of the output of the controlled object from a predetermined target value.

This preferred embodiment of the control method provides the same advantageous effects provided by the corresponding preferred embodiment of the control apparatus.

Preferably, in the engine control unit described above, the value indicative of the output of the controlled object is an output deviation which is a deviation of the output of the controlled object from a predetermined target value.

This preferred embodiment of the engine control unit provides the same advantageous effects provided by the corresponding preferred embodiment of the control apparatus.

Preferably, in the control apparatus described above, the value indicative of one of the control input and the value which reflects a control input inputted to the controlled object is one of a deviation such as an air/fuel ratio deviation of the control input such as a target air/fuel ratio from a predetermined reference value, and a deviation of the value which reflects a control input inputted to the controlled object, such as the output of an LAF sensor, from the predetermined reference value.

As described above, in a controlled object model, the dynamic characteristic of the controlled object model can be fitted more to the actual dynamic characteristic of the controlled object when a deviation of input/output of the controlled object from a predetermined value is defined as a variable representative of the input/output than when an absolute value of the input/output is defined as a variable, because it can more precisely identify or define model parameters. Therefore, according to this preferred embodiment of the control apparatus, since the controlled object model employs a variable representative of a deviation of the calculated control input from the predetermined reference value, or a variable representative of a deviation of the value which reflects a control input inputted to the controlled object from the predetermined reference value, the dynamic characteristic of the controlled object model can be fitted more closely to the actual dynamic characteristic of the controlled object than when the controlled object model employs a variable representative of a control input or an absolute value of the value which reflects the control input, thereby further enhancing the ensured stability of the control and the improved controllability.

Preferably, in the control method, described above, the value indicative of one of the control input and the value which reflects a control input inputted to the controlled object is one of a deviation of the control input from a predetermined reference value, and a deviation of the value which reflects a control input inputted to the controlled object from the predetermined reference value.

This preferred embodiment of the control method provides the same advantageous effects provided by the corresponding preferred embodiment of the control apparatus.

Preferably, in the engine control unit described above, the value indicative of one of the control input and the value which reflects a control input inputted to the controlled object is one of a deviation of the control input from a predetermined reference value, and a deviation of the value which reflects a control input inputted to the controlled object from the predetermined reference value.

This preferred embodiment of the engine control unit provides the same advantageous effects provided by the corresponding preferred embodiment of the control apparatus.

Preferably, in the control apparatus described above, the control input calculating means calculates an intermediate value in accordance with the predicted value based on the one modulation algorithm, and calculates the control input, such as a target air fuel ratio or an adaptive target air/fuel ratio, based on the calculated intermediate value multiplied by a predetermined gain.

Generally, each of the ΔΣ modulation algorithm, ΣΔ modulation algorithm, and Δ modulation algorithm determines a control input on the assumption that a controlled object has a unity gain, so that if the controlled object has an actual gain different from a unity value, the controllability may be degraded due to a failure in calculating an appropriate control input. For example, when the controlled object has an actual gain larger than one, the control input is calculated as a value larger than necessity, resulting in an over-gain condition. On the other hand, according to this preferred embodiment of the control apparatus, the control input is calculated based on the intermediate value, which is calculated based on the one modulation algorithm, multiplied by a predetermined gain, so that a satisfactory controllability can be ensured by setting the predetermined gain to an appropriate value.

Preferably, in the control method described above, the step of calculating a control input includes calculating an intermediate value in accordance with the predicted value based on the one modulation algorithm, and calculating the control input based on the calculated intermediate value multiplied by a predetermined gain.

This preferred embodiment of the control method provides the same advantageous effects provided by the corresponding preferred embodiment of the control apparatus.

Preferably, in the engine control unit described above, the control program causes the computer to calculate an intermediate value in accordance with the predicted value based on the one modulation algorithm, and calculate the control input based on the calculated intermediate value multiplied by a predetermined gain.

This preferred embodiment of the engine control unit provides the same advantageous effects provided by the corresponding preferred embodiment of the control apparatus.

Preferably, the control apparatus described above further comprises gain parameter detecting means for detecting a gain parameter indicative of a gain characteristic of the controlled object, such as an exhaust gas volume, and gain setting means for setting the predetermined gain in accordance with the detected gain parameter.

According to this preferred embodiment of the control apparatus, since the predetermined gain for use in the calculation of the control input is set in accordance with the gain characteristic of the controlled object, the control input can be calculated as a value which has appropriate energy in accordance with the gain characteristic of the controlled object, thereby making it possible to avoid an over-gain condition and the like to ensure a satisfactory controllability.

Preferably, the control method described above further comprises the steps of detecting a gain parameter indicative of a gain characteristic of the controlled object; and setting the predetermined gain in accordance with the detected gain parameter.

This preferred embodiment of the control method provides the same advantageous effects provided by the corresponding preferred embodiment of the control apparatus.

Preferably, in the engine control unit described above, the control program further causes the computer to detect a gain parameter indicative of a gain characteristic of the controlled object; and set the predetermined gain in accordance with the detected gain parameter.

This preferred embodiment of the engine control unit provides the same advantageous effects provided by the corresponding preferred embodiment of the control apparatus.

Preferably, in the control apparatus described above, the control input calculating means calculates a second intermediate value, such as ΔΣ modulation control amount, in accordance with the predicted value based on the one modulation algorithm, and adds a predetermined value to the calculated second intermediate value to calculate the control input such as an adaptive target air/fuel ratio.

Generally, any of the Δ modulation algorithm, ΔΣ modulation algorithm, and ΣΔ modulation algorithm can only calculate a positive-negative inversion type control input centered at zero. On the contrary, according to this preferred embodiment of the control apparatus, the control input calculating means calculates the control input by adding the predetermined value to the second intermediate value calculated based on the one modulation algorithm, so that the control input calculating means can calculate the control input not only as a value which positively and negatively inverts centered at zero, but also as a value which repeats predetermined increase and decrease about a predetermined value, thereby making it possible to improve the degree of freedom in control.

Preferably, in the control method described above, the step of calculating a control input includes calculating a second intermediate value in accordance with the predicted value based on the one modulation algorithm, and adding a predetermined value to the calculated second intermediate value to calculate the control input.

This preferred embodiment of the control method provides the same advantageous effects provided by the corresponding preferred embodiment of the control apparatus.

Preferably in the engine control unit described above, the control program causes the computer to calculate a second intermediate value in accordance with the predicted value based on the one modulation algorithm; and add a predetermined value to the calculated second intermediate value to calculate the control input.

This preferred embodiment of the engine control unit provides the same advantageous effects provided by the corresponding preferred embodiment of the control apparatus.

Preferably, in the control apparatus described above, the predicted value calculating means calculates a prediction time from the time at which the control input is inputted to the controlled object to the time at which the control input is reflected to the output of the controlled object in accordance with a dynamic characteristic of the controlled object, and calculates the predicted value in accordance with the calculated prediction time.

According to this preferred embodiment of the control apparatus, the prediction time from the time at which the control input is inputted to the controlled object to the time at which the control input is reflected to the output of the controlled object is calculated in accordance with the dynamic characteristic of the controlled object, and the predicted value is calculated in accordance with the calculated prediction time, so that a slippage in control timing between the input/output of the controlled object, possibly caused by a response delay, a dead time, and the like of the controlled object, can be eliminated without fail by calculating the control input using the predicted value calculated in this manner, thereby making it possible to further improve the controllability.

Preferably, in the control method described above, the step of calculating a predicted value includes calculating a predicted value includes calculating a prediction time from the time at which the control input is inputted to the controlled object to the time at which the control input is reflected to the output of the controlled object in accordance with a dynamic characteristic of the controlled object; and calculating the predicted value in accordance with the calculated prediction time.

This preferred embodiment of the control method provides the same advantageous effects provided by the corresponding preferred embodiment of the control apparatus.

Preferably, in the engine control unit described above, the control program causes the computer to calculate a predicted value includes calculating a prediction time from the time at which the control input is inputted to the controlled object to the time at which the control input is reflected to the output of the controlled object in accordance with a dynamic characteristic of the controlled object; and calculate the predicted value in accordance with the calculated prediction time.

This preferred embodiment of the engine control unit provides the same advantageous effects provided by the corresponding preferred embodiment of the control apparatus.

Preferably, in the control apparatus described above, the controlled object comprises a downstream air/fuel ratio sensor, such as an oxygen concentration sensor, disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The value indicative of the output of the controlled object is an output deviation of an output of the downstream air/fuel ratio sensor from a predetermined target value. The control input to the controlled object is a target air/fuel ratio of an air/fuel mixture supplied to the internal combustion engine. The value reflecting a control input inputted to the controlled object is an output of an upstream air/fuel ratio sensor disposed at a location upstream of the catalyst in the exhaust passage for detecting an air/fuel ratio of exhaust gases which have not passed through the catalyst. The predicted value calculating means calculates the predicted value of the output deviation in accordance with at least one of the target air/fuel ratio of the air/fuel mixture supplied to the internal combustion engine, the output of the upstream air/fuel ratio sensor, and the output of the downstream air/fuel ratio sensor based on the prediction algorithm. The control input calculating means comprises air/fuel ratio calculating means for calculating the target air/fuel ratio of the air/fuel mixture supplied to the internal combustion engine for converging the output of the downstream air/fuel ratio sensor to the predetermined target value in accordance with the calculated predicted value of the output deviation based on the on modulation algorithm.

According to this preferred embodiment of the control apparatus, the predicted value of the output deviation, which is a deviation of the output of the downstream air/fuel ratio sensor from the predetermined target value, is calculated in accordance with the target air/fuel ratio of the air/fuel mixture supplied to the internal combustion engine, the output of the upstream air/fuel ratio sensor, and the output of the downstream air/fuel ratio sensor, and the target air/fuel ratio of the air/fuel mixture is calculated based on the one modulation algorithm for converging the output of the downstream air/fuel ratio sensor to the predetermined target value in accordance with the thus calculated predicted value of the output deviation. Since the control input is calculated in the foregoing manner, the air/fuel ratio of exhaust gases can be controlled such that the exhaust gases can be satisfactorily purified by the catalyst by appropriately setting the predetermined target value, resulting in an improved characteristic of the exhaust gases purified by the catalyst (hereinafter called the "post-catalyst exhaust gas characteristic). Also, since the predicted value is calculated in accordance with the output of the upstream air/fuel ratio sensor disposed at a location upstream of the catalyst, the air/fuel ratio of exhaust gases actually supplied to the catalyst can be more appropriately reflected to the predicted value, resulting in a correspondingly improved accuracy in which the predicted value can be calculated.

Preferably, in the control method described above, the controlled object comprises a downstream air/fuel ratio sensor disposed at a location downstream of a catalyst in an exhaust passage of an internal combustion engine for detecting an air/fuel ratio of exhaust gases which have passed through the catalyst, and the output of the controlled object is an output of the downstream air/fuel ratio sensor. The value indicative of the output of the controlled object is an output deviation of an output of the downstream air/fuel ratio sensor from a predetermined target value. The control input to the controlled object is a target air/fuel ratio of an air/fuel mixture supplied to the internal combustion engine. The value reflecting a control input inputted to the controlled object is an output of an upstream air/fuel ratio sensor disposed at a location upstream of the catalyst in the exhaust passage for detecting an air/fuel ratio of exhaust gases which have not passed through the catalyst. The step of calculating a predicted value includes calculating the predicted value of the output deviation in accordance with at least one of the target air/fuel ratio of the air/fuel mixture supplied to the internal combustion engine, the output of the upstream air/fuel ratio sensor, and the output of the downstream air/fuel ratio sensor based on the prediction algorithm. The step of calculating a control input includes calculating the target air/fuel ratio of the air/fuel mixture supplied to the internal combustion engine for converging the output of the downstream air/fuel ratio sensor to the predetermined target value in accordance with the calculated predicted value of the output deviation based on the one modulation algorithm.

This preferred embodiment of the control method provides the same advantageous effects provided by the corresponding preferred embodiment of the control apparatus.

Preferably, in the engine control unit described above, the controlled object comprises a downstream air/fuel ratio sensor disposed at a location downstream of a catalyst in an exhaust passage of an internal combustion engine for detecting an air/fuel ratio of exhaust gases which have passed through the catalyst, and the output of the controlled object is an output of the downstream air/fuel ratio sensor. The value indicative of the output of the controlled object is an output deviation of an output of the downstream air/fuel ratio sensor from a predetermined target value. The control input to the controlled object is a target air/fuel ratio of an air/fuel mixture supplied to the internal combustion engine. The value reflecting a control input inputted to the controlled object is an output of an upstream air/fuel ratio sensor disposed at a location upstream of the catalyst in the exhaust passage for detecting an air/fuel ratio of exhaust gases which have not passed through the catalyst. The engine control unit causes the computer to calculate the predicted value of the output deviation in accordance with at least one of the target air/fuel ratio of the air/fuel mixture supplied to the internal combustion engine, the output of the upstream air/fuel ratio sensor, and the output of the downstream air/fuel ratio sensor based on the prediction algorithm; and calculate the target air/fuel ratio of the air/fuel mixture supplied to the internal combustion engine for converging the output of the downstream air/fuel ratio sensor to the predetermined target value in accordance with the calculated predicted value of the output deviation based on the one modulation algorithm.

This preferred embodiment of the engine control unit provides the same advantageous effects provided by the corresponding preferred embodiment of the control apparatus.

Preferably, the control apparatus described above further comprises operating condition detecting means for detecting an operating condition, such as an engine rotational speed or an intake pipe inner absolute pressure, of the internal combustion engine, wherein the predicted value calculating means calculates a prediction time from the time at which the air/fuel mixture is supplied to the internal combustion engine in the target air/fuel ratio to the time at which the target air/fuel ratio is reflected to the output of the downstream air/fuel ratio sensor in accordance with the detected operating condition of the internal combustion engine, and calculates the predicted value of the output deviation further in accordance with the calculated prediction time.

In this type of control apparatus for controlling the air/fuel ratio, the dynamic characteristic (for example, a response delay and a dead time) of a controlled object including an internal combustion engine and a catalyst varies depending on an operating condition of the internal combustion engine, for example, an exhaust gas volume. On the contrary, according to this preferred embodiment of the control apparatus, the prediction time from the time at which the air/fuel mixture is supplied to the internal combustion engine in the target air/fuel ratio to the time at which the target air/fuel ratio is reflected to the output of the downstream air/fuel ratio sensor is calculated in accordance with the detected operating condition of the internal combustion engine, and the predicted value of the output deviation is calculated further in accordance with the calculated prediction time, so that the control apparatus can eliminate without fail a slippage in control timing between the input and output of the controlled object, caused by the dynamic characteristic of the controlled object, by calculating the control input using the predicted value calculated in this manner, thereby making it possible to further improve the post-catalyst exhaust gas characteristic.

Preferably, the control method described above further comprises the step of detecting an operating condition of the internal combustion engine, wherein the step of calculating a predicted value includes calculating a prediction time from the time at which the air/fuel mixture is supplied to the internal combustion engine in the target air/fuel ratio to the time at which the target air/fuel ratio is reflected to the output of the downstream air/fuel ratio sensor in accordance with the detected operating condition of the internal combustion engine; and calculating the predicted value of the output deviation further in accordance with the calculated prediction time.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; calculate a prediction time from the time at which the air/fuel mixture is supplied to the internal combustion engine in the target air/fuel ratio to the time at which the target air/fuel ratio is reflected to the output of the downstream air/fuel ratio sensor in accordance with the detected operating condition of the internal combustion engine; and calculate the predicted value of the output deviation further in accordance with the calculated prediction time.

This preferred embodiment of the engine control unit provides the same advantageous effects provided by the corresponding preferred embodiment of the control apparatus.

Preferably, the control apparatus described above further comprises operating condition detecting means for detecting an operating condition of the internal combustion engine, wherein the air/fuel ratio calculating means includes intermediate value calculating means for calculating an intermediate value of the target air/fuel ratio of the air/fuel mixture supplied to the internal combustion engine in accordance with the predicted value of the output deviation based on the one modulation algorithm; gain setting means for setting a gain in accordance with the detected operating condition of the internal combustion engine; and target air/fuel ratio calculating means for calculating the target air/fuel ratio of the air/fuel mixture supplied to the internal combustion engine based on the calculated intermediate value multiplied by the set gain.

In this type of control apparatus for controlling the air/fuel ratio, the gain characteristic to the air/fuel ratio of a controlled object including an internal combustion engine and a catalyst varies depending on an operating condition of the internal combustion engine, for example, an exhaust gas volume. In this event, the one modulation algorithm determines the control input on the assumption that the controlled object has a unity gain, as described above, so that if the gain characteristic of the controlled object varies as described above, the target air/fuel ratio of the air/fuel mixture, as a control input, largely deviates from an appropriate value and becomes oscillatory, causing an oscillatory output of the downstream air/fuel ratio sensor at a location downstream of the catalyst. This would result in a degradation in the post-catalyst exhaust gas characteristic. On the contrary, according to this preferred embodiment of the control apparatus, since the target air/fuel ratio of the air/fuel mixture is calculated based on the intermediate value calculated based on the one modulation algorithm, multiplied by the gain, and the gain is set in accordance with an operating condition of the internal combustion engine, the target air/fuel ratio of the air/fuel mixture can be calculated as a value which appropriately reflects a change in the gain characteristic of the controlled object resulting from a change in the operating condition, thereby making it possible to further improve the post-catalyst exhaust gas characteristic.

Preferably, the control method described above further comprises the step of detecting an operating condition of the internal combustion engine, wherein the step of calculating the target air/fuel ratio includes calculating an intermediate value of the target air/fuel ratio of the air/fuel mixture supplied to the internal combustion engine in accordance with the predicted value of the output deviation based on the one modulation algorithm; setting a gain in accordance with the detected operating condition of the internal combustion engine; and calculating the target air/fuel ratio of the air/fuel mixture supplied to the internal combustion engine based on the calculated intermediate value multiplied by the set gain.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; calculate an intermediate value of the target air/fuel ratio of the air/fuel mixture supplied to the internal combustion engine in accordance with the predicted value of the output deviation based on the one modulation algorithm; set a gain in accordance with the detected operating condition of the internal combustion engine; and calculate the target air/fuel ratio of the air/fuel mixture supplied to the internal combustion engine based on the calculated intermediate value multiplied by the set gain.

This preferred embodiment of the engine control unit provides the same advantageous effects provided by the corresponding preferred embodiment of the control apparatus.

Preferably, the control apparatus described above further comprises multiplying means for multiplying the calculated predicted value of the output deviation by a correction coefficient, and correction coefficient setting means for setting the correction coefficient to a smaller value when the predicted value of the output deviation is equal to or larger than a predetermined value than when the predicted value of the output deviation is smaller than the predetermined value, wherein the air/fuel ratio calculating means calculates the target air/fuel ratio of the air/fuel mixture in accordance with the predicted value of the output deviation multiplied by the correction coefficient based on the one modulation algorithm.

According to this preferred embodiment of the control apparatus, the target air/fuel ratio of the air/fuel mixture is calculated in accordance with the predicted value of the output deviation multiplied by the correction coefficient, and the correction coefficient is set to a smaller value when the predicted value of the output deviation is equal to or larger than a predetermined value than when the predicted value of the output deviation is smaller than the predetermined value, so that the output of the downstream air/fuel ratio sensor can be converged at a different rate in accordance with the order of the predicted value of the output deviation with respect to the predetermined value. Therefore, for changing the target air/fuel ratio to be leaner because of the predicted value of the output deviation being equal to or larger than zero, i.e., the output of the downstream air/fuel ratio sensor being larger than a target value when the predetermined value is set, for example, to zero, the correction coefficient is set such that the output of the downstream air/fuel ratio sensor is converged at a lower rate than when the target air/fuel ratio is changed to be richer, thereby providing the effect of suppressing the amount of exhausted NOx by a lean bias. On the other hand, when the target air/fuel ratio is changed to be richer, the correction coefficient is set such that the output of the downstream air/fuel ratio sensor is converted at a higher rate than when the target air/fuel ratio is changed to be leaner, thereby making it possible to sufficiently recover the NOx purifying rate of the catalyst.

Preferably, the control method described above further comprises the steps of multiplying the calculated predicted value of the output deviation by a correction coefficient; and setting the correction coefficient to a smaller value when the predicted value of the output deviation is equal to or larger than a predetermined value than when the predicted value of the output deviation is smaller than the predetermined value, wherein the step of calculating the target air/fuel ratio includes calculating the target air/fuel ratio of the air/fuel mixture in accordance with the predicted value of the output deviation multiplied by the correction coefficient based on the one modulation algorithm.

This preferred embodiment of the control method provides the same advantageous effects provided by the corresponding preferred embodiment of the control apparatus.

Preferably, in the engine control unit described above, the control program further causes the computer to multiply the calculated predicted value of the output deviation by a correction coefficient; set the correction coefficient to a smaller value when the predicted value of the output deviation is equal to or larger than a predetermined value than when the predicted value of the output deviation is smaller than the predetermined value; and calculate the target air/fuel ratio of the air/fuel mixture in accordance with the predicted value of the output deviation multiplied by the correction coefficient based on the one modulation algorithm.

This preferred embodiment of the engine control unit provides the same advantageous effects provided by the corresponding preferred embodiment of the control apparatus.

Preferably, in the control apparatus described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The value indicative of the output of the controlled object is an output deviation of an output of the air/fuel ratio sensor from a predetermined target value. The control input to the controlled object is a target air/fuel ratio of an air/fuel mixture supplied to the internal combustion engine. The predicted value calculating means calculates the predicted value of the output deviation in accordance with the target air/fuel ratio of the air/fuel mixture supplied to the internal combustion engine, and the output of the air/fuel ratio sensor based on the prediction algorithm. The control input calculating means includes an air/fuel ratio calculating means for calculating the target air/fuel ratio of the air/fuel mixture supplied to the internal combustion engine for converging the output of the air/fuel ratio sensor to the predetermined target value in accordance with the calculated predicted value of the output deviation based on the one modulation algorithm.

According to this preferred embodiment of the control apparatus, the predicted value of the output deviation, which is a deviation of the output of the air/fuel ratio sensor from the predetermined target value, is calculated in accordance with the target air/fuel ratio of the air/fuel mixture supplied to the internal combustion engine, and the output of the air/fuel ratio sensor, and the target air/fuel ratio of the air/fuel mixture for converging the output of the air/fuel ratio sensor to the predetermined target value is calculated in accordance with the predicted value of the output deviation calculated in this manner based on the one modulation algorithm. Since the control input is calculated as described above, it is possible to control the air/fuel ratio of exhaust gases such that the catalyst purifies exhaust gases in a satisfactory manner by appropriately setting the predetermined target value, resulting in an improved post-catalyst exhaust gas characteristic. In addition, the control apparatus can be realized at a relatively low cost because it only requires a single air/fuel ratio sensor.

Preferably, in the control method described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The value indicative of the output of the controlled object is an output deviation of an output of the air/fuel ratio sensor from a predetermined target value. The control input to the controlled object is a target air/fuel ratio of an air/fuel mixture supplied to the internal combustion engine. The step of calculating a predicted value includes calculating the predicted value of the output deviation in accordance with the target air/fuel ratio of the air/fuel mixture supplied to the internal combustion engine, and the output of the air/fuel ratio sensor based on the prediction algorithm. The step of calculating a control input includes calculating the target air/fuel ratio of the air/fuel mixture supplied to the internal combustion engine for converging the output of the air/fuel ratio sensor to the predetermined target value in accordance with the calculated predicted value of the output deviation based on the one modulation algorithm.

This preferred embodiment of the control method provides the same advantageous effects provided by the corresponding preferred embodiment of the control apparatus.

Preferably, in the An engine control unit described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The value indicative of the output of the controlled object is an output deviation of an output of the air/fuel ratio sensor from a predetermined target value. The control input to the controlled object is a target air/fuel ratio of an air/fuel mixture supplied to the internal combustion engine. The control program causes the computer to calculate the predicted value of the output deviation in accordance with the target air/fuel ratio of the air/fuel mixture supplied to the internal combustion engine, and the output of the air/fuel ratio sensor based on the prediction algorithm; and calculate the target air/fuel ratio of the air/fuel mixture supplied to the internal combustion engine for converging the output of the air/fuel ratio sensor to the predetermined target value in accordance with the calculated predicted value of the output deviation based on the one modulation algorithm.

This preferred embodiment of the engine control unit provides the same advantageous effects provided by the corresponding preferred embodiment of the control apparatus.

Preferably, the control apparatus described above further comprises operating condition detecting means for detecting an operating condition of the internal combustion engine, wherein the predicted value calculating means calculates a prediction time from the time at which the air/fuel mixture is supplied to the internal combustion engine in the target air/fuel ratio to the time at which the target air/fuel ratio is reflected to the output of the air/fuel ratio sensor in accordance with the detected operating condition of the internal combustion engine, and calculates the predicted value of the output deviation further in accordance with the calculated prediction time.

According to this preferred embodiment of the control apparatus, the prediction time from the time at which the air/fuel mixture is supplied to the internal combustion engine in the target air/fuel ratio to the time at which the target air/fuel ratio is reflected to the output of the air/fuel ratio sensor is calculated in accordance with the detected operating condition of the internal combustion engine, and the predicted value of the output deviation is calculated further in accordance with the calculated prediction time, so that the control apparatus can eliminate without fail a slippage in control timing between the input and output of the controlled object, caused by the dynamic characteristic of the controlled object, by calculating the control input using the predicted value calculated in this manner, thereby making it possible to further improve the post-catalyst exhaust gas characteristic.

Preferably, the control method described above further comprises the step of detecting an operating condition of the internal combustion engine, wherein the step of calculating a predicted value includes calculating a prediction time from the time at which the air/fuel mixture is supplied to the internal combustion engine in the target air/fuel ratio to the time at which the target air/fuel ratio is reflected to the output of the air/fuel ratio sensor in accordance with the detected operating condition of the internal combustion engine; and calculating the predicted value of the output deviation further in accordance with the calculated prediction time.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; calculate a prediction time from the time at which the air/fuel mixture is supplied to the internal combustion engine in the target air/fuel ratio to the time at which the target air/fuel ratio is reflected to the output of the air/fuel ratio sensor in accordance with the detected operating condition of the internal combustion engine; and calculate the predicted value of the output deviation further in accordance with the calculated prediction time.

This preferred embodiment of the engine control unit provides the same advantageous effects provided by the corresponding preferred embodiment of the control apparatus.

Preferably, the control apparatus described above further comprises operating condition detecting means for detecting an operating condition of the internal combustion engine, wherein the air/fuel ratio calculating means includes intermediate value calculating means for calculating an intermediate value of the target air/fuel ratio of the air/fuel mixture supplied to the internal combustion engine in accordance with the predicted value of the output deviation based on the one modulation algorithm; gain setting means for setting a gain in accordance with the detected operating condition of the internal combustion engine; and target air/fuel ratio calculating means for calculating the target air/fuel ratio of the air/fuel mixture supplied to the internal combustion engine based on the calculated intermediate value multiplied by the set gain.

According to this preferred embodiment of the control apparatus, since the target air/fuel ratio of the air/fuel mixture is calculated based on the intermediate value calculated based on the one modulation algorithm, multiplied by the gain, and the gain is set in accordance with an operating condition, the target air/fuel ratio of the air/fuel mixture can be calculated as a value which appropriately reflects a change in the gain characteristic of the controlled object, thereby making it possible to further improve the post-catalyst exhaust gas characteristic.

Preferably, the control method described above further comprises the step of detecting an operating condition of the internal combustion engine, wherein the step of calculating the air/fuel ratio calculating means includes calculating an intermediate value of the target air/fuel ratio of the air/fuel mixture supplied to the internal combustion engine in accordance with the predicted value of the output deviation based on the one modulation algorithm; setting a gain in accordance with the detected operating condition of the internal combustion engine; and calculating the target air/fuel ratio of the air/fuel mixture supplied to the internal combustion engine based on the calculated intermediate value multiplied by the set gain.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; calculate an intermediate value of the target air/fuel ratio of the air/fuel mixture supplied to the internal combustion engine in accordance with the predicted value of the output deviation based on the one modulation algorithm; set a gain in accordance with the detected operating condition of the internal combustion engine; and calculate the target air/fuel ratio of the air/fuel mixture supplied to the internal combustion engine based on the calculated intermediate value multiplied by the set gain.

This preferred embodiment of the engine control unit provides the same advantageous effects provided by the corresponding preferred embodiment of the control apparatus.

Preferably, the control apparatus described above further comprises multiplying means for multiplying the calculated predicted value of the output deviation by a correction coefficient, and correction coefficient setting means for setting the correction coefficient to a smaller value when the predicted value of the output deviation is equal to or larger than a predetermined value than when the predicted value of the output deviation is smaller than the predetermined value, wherein the air/fuel ratio calculating means calculates the target air/fuel ratio of the air/fuel mixture in accordance with the predicted value of the output deviation multiplied by the correction coefficient based on the one modulation algorithm.

According to this preferred embodiment of the control apparatus, the target air/fuel ratio of the air/fuel mixture is calculated in accordance with the predicted value of the output deviation multiplied by the correction coefficient, and the correction coefficient is set to a smaller value when the predicted value of the output deviation is equal to or larger than a predetermined value than when the predicted value of the output deviation is smaller than the predetermined value, so that the output of the downstream air/fuel ratio sensor can be converged at a different rate in accordance with the order of the predicted value of the output deviation with respect to the predetermined value. Therefore, for changing the air/fuel ratio to be leaner because of the predicted value of the output deviation being equal to or larger than zero, i.e., the output of the downstream air/fuel ratio sensor being larger than a target value when the predetermined value is set, for example to zero, the correction coefficient is set such that the output of the downstream air/fuel ratio sensor is converged at a lower rate than when the air/fuel ratio is changed to be richer, thereby providing the effect of suppressing the amount of exhausted NOx by a lean bias. On the other hand, when the air/fuel ratio is changed to be richer, the correction coefficient is set such that the output of the downstream air/fuel ratio sensor is converted at a higher rate than when the air/fuel ratio is changed to be leaner, thereby making it possible to sufficiently recover the NOx purifying rate of the catalyst.

Preferably, the control method described above further comprises the steps of multiplying the calculated predicted value of the output deviation by a correction coefficient; and setting the correction coefficient to a smaller value when the predicted value of the output deviation is equal to or larger than a predetermined value than when the predicted value of the output deviation is smaller than the predetermined value, wherein the step of calculating the target air/fuel ratio includes calculating the target air/fuel ratio of the air/fuel mixture in accordance with the predicted value of the output deviation multiplied by the correction coefficient based on the one modulation algorithm.

This preferred embodiment of the control method provides the same advantageous effects provided by the corresponding preferred embodiment of the control apparatus.

Preferably, in the engine control unit described above, the control program further causes the computer to multiply the calculated predicted value of the output deviation by a correction coefficient; set the correction coefficient to a smaller value when the predicted value of the output deviation is equal to or larger than a predetermined value than when the predicted value of the output deviation is smaller than the predetermined value; and calculate the target air/fuel ratio of the air/fuel mixture in accordance with the predicted value of the output deviation multiplied by the correction coefficient based on the one modulation algorithm.

This preferred embodiment of the engine control unit provides the same advantageous effects provided by the corresponding preferred embodiment of the control apparatus.

To achieve the above object, according to a fourth aspect of the present invention, there is provided a control apparatus which comprises control input calculating means for calculating a control input, such as a target air/fuel ratio, to a controlled object, based on one modulation algorithm selected from a Δ modulation algorithm, a ΔΣ modulation algorithm, and a ΣΔ modulation algorithm, and a controlled object model which models the controlled object, for controlling an output of the controlled.

According to the control apparatus described above, since the control input is calculated based on the one modulation algorithm selected from the Δ modulation algorithm, ΔΣ modulation algorithm, and ΣΔ modulation algorithm, and the controlled object model which models the controlled object, the control input can be calculated as a value which reflects a dynamic characteristic such as a phase delay, a dead time, or the like of the controlled object by defining the controlled object model as appropriately reflecting the dynamic characteristic of the controlled object, consequently making it possible to ensure the stability of the control and improve the controllability.

To achieve the above object, according to a fifth aspect of the invention, there is provided a control method which is characterized by comprising the step of calculating a control input to a controlled object based on one modulation algorithm selected from a Δ modulation algorithm, and ΔΣ modulation algorithm, and a ΣΔ modulation algorithm, and a controlled object model which models the controlled object, for controlling an output of the controlled object.

This control method provides the same advantageous effects as described above concerning the control apparatus according to the fourth aspect of the invention.

To achieve the above object, according to a sixth aspect of the invention, there is provided an engine control unit including a control program for causing a computer to calculate a control input to a controlled object based on one modulation algorithm selected from a Δ modulation algorithm, and ΔΣ modulation algorithm, and a ΣΔ modulation algorithm, and a controlled object model which models the controlled object, for controlling an output of the controlled object.

This engine control unit provides the same advantageous effects as described above concerning the control apparatus according to the fourth aspect of the invention.

Preferably, in the control apparatus described above, the controlled object model is built as a discrete time system model, and the control apparatus further comprises identifying means for sequentially identifying model parameters of the controlled object model in accordance with one of the calculated control input and a value reflecting a control input inputted to the controlled object, and the output of the controlled object.

According to this preferred embodiment of the control apparatus, the model parameters are sequentially identified in accordance with the value which reflects the control input and/or the value reflecting the control input, and the output of the controlled object, i.e., the model parameters are identified in real time, and the control input is calculated based on the controlled object model, the model parameters of which are identified in the foregoing manner. Thus, even if the dynamic characteristic of the controlled object varies due to a changing environment or has been aged, the dynamic characteristic of the controlled object model can be fitted to the actual dynamic characteristic of the controlled object, while avoiding the influence of the variations and aging changes thereof. As a result, the control apparatus can appropriately correct a slippage in control timing between the input and output, caused by the dynamic characteristic of the controlled object, for example, a response delay, a dead time, or the like, thereby making it possible to ensure the stability of the control and improve the controllability.

Preferably, in the control method described above, the controlled object model is built as a discrete time system model, and the control method further comprises the step of sequentially identifying model parameters of the controlled object model in accordance with one of the calculated control input and a value reflecting a control input inputted to the controlled object, and the output of the controlled object.

This preferred embodiment of the control method provides the same advantageous effects provided by the corresponding preferred embodiment of the control apparatus.

Preferably, in the engine control unit described above, the controlled object model is built as a discrete time system model, and the control program further causes the computer to sequentially identify model parameters of the controlled object model in accordance with one of the calculated control input and a value reflecting a control input inputted to the controlled object, and the output of the controlled object.

This preferred embodiment of the engine control unit provides the same advantageous effects provided by the corresponding preferred embodiment of the control apparatus.

Preferably, in the control apparatus described above, the identifying means includes identification error calculating means for calculating an identification error of the model parameters; filtering means for filtering the calculated identification error in a predetermined manner; and parameter determining means for determining the model parameters based on the filtered identification error.

Generally, an identification algorithm for identifying model parameters based on an identification error, for example, an identification algorithm based on a least-square algorithm, and the like identifies model parameters with the frequency characteristic of the controlled object emphasized in a predetermined frequency band due to a frequency weighting characteristic of the identification algorithm, so that the gain characteristic of the controlled object model may fail to fit to the actual gain characteristic of the controlled object. For example, when a controlled object has a low pass characteristic, model parameters may be identified with a high frequency characteristic of the controlled object which is emphasized due to the frequency weighting characteristic of the identification algorithm, in which case the controlled object model exhibits the gain characteristic which tends to be lower than the actual gain characteristic of the controlled object. Therefore, according to this preferred embodiment of the control apparatus, the model parameters are identified based on the identification error of the filtered model parameters, so that the controlled object model can be matched with the control object in the gain characteristic by appropriately setting the filtering characteristic, for example, in accordance with the frequency characteristic of the controlled object, thereby making it possible to correct a slippage in control timing between the input and output of the controlled object with an improved accuracy.

Preferably, in the control method described above, the step of identifying includes calculating an identification error of the model parameters; filtering the calculated identification error in a predetermined manner; and determining the model parameters based on the filtered identification error.

This preferred embodiment of the control method provides the same advantageous effects provided by the corresponding preferred embodiment of the control apparatus.

Preferably, in the engine control unit described above, the control program causes the computer to calculate an identification error of the model parameters; filter the calculated identification error in a predetermined manner; and determine the model parameters based on the filtered identification error.

This preferred embodiment of the engine control unit provides the same advantageous effects provided by the corresponding preferred embodiment of the control apparatus.

Preferably, in the control apparatus described above, the filtering means sets a filtering characteristic for the filtering in accordance with a dynamic characteristic of the controlled object, such as an exhaust gas volume.

According to this preferred embodiment of the control apparatus, since the filtering characteristic is set in accordance with the dynamic characteristic of the controlled object, the controlled object model can be matched with the controlled object in the gain characteristic for the reason set forth above, thereby making it possible to correct a slippage in control timing between the input and output of the controlled object with a more improved accuracy.

Preferably, in the control method described above, the step of filtering includes setting a filtering characteristic for the filtering in accordance with a dynamic characteristic of the controlled object.

This preferred embodiment of the control method provides the same advantageous effects provided by the corresponding preferred embodiment of the control apparatus.

Preferably, in the engine control unit described above, the control program causes the computer to set a filtering characteristic for the filtering in accordance with a dynamic characteristic of the controlled object.

This preferred embodiment of the engine control unit provides the same advantageous effects provided by the corresponding preferred embodiment of the control apparatus.

Preferably, in the control apparatus described above, the controlled object model comprises an input variable indicative of one of the control input and the value reflecting a control input inputted to the controlled object, and an output variable indicative of the output of the controlled object. The identifying means identifies a model parameter multiplied by the input variable and a model parameter multiplied by the output variable such that the model parameters fall within respective predetermined restriction ranges.

Generally, with a sequential identification algorithm, when the input and output of a controlled object enter a steady state, a control system may become instable or oscillatory because a so-called drift phenomenon is more likely to occur, in which absolute values of identified model parameters increase due to a shortage of self excitation condition. On the contrary, according to this preferred embodiment of the control apparatus, since the model parameters of the controlled object model, i.e., the model parameter multiplied by the input variable and the model parameter multiplied by the output variable are sequentially identified such that they fall within respective predetermined restriction ranges, it is possible to avoid the drift phenomenon by appropriately setting the predetermined restriction ranges, to enhance the ensured stability of the control.

Preferably, in the control method described above, the controlled object model comprises an input variable indicative of one of the control input and the value reflecting a control input inputted to the controlled object, and an output variable indicative of the output of the controlled object. The step of identifying includes identifying a model parameter multiplied by the input variable and a model parameter multiplied by the output variable such that the model parameters fall within respective predetermined restriction ranges.

This preferred embodiment of the control method provides the same advantageous effects provided by the corresponding preferred embodiment of the control apparatus.

Preferably, in the engine control unit described above, the controlled object model comprises an input variable indicative of one of the control input and the value reflecting a control input inputted to the controlled object, and an output variable indicative of the output of the controlled object. The control program causes the computer to identify a model parameter multiplied by the input variable and a model parameter multiplied by the output variable such that the model parameters fall within respective predetermined restriction ranges.

This preferred embodiment of the engine control unit provides the same advantageous effects provided by the corresponding preferred embodiment of the control apparatus.

Preferably, in the control apparatus described above, the output variable comprises a plurality of time-series data of output variables which are multiplied by a plurality of model parameters, respectively, and the identifying means identifies the plurality of model parameters such that a combination of the model parameters falls within the predetermined restriction range.

With this type of identification algorithm, when a plurality of model parameters are identified independently of one another such that they fall within a predetermined restriction range in which a control system is stable, the control system may become instable or oscillatory depending on a combination of the model parameters. On the contrary, according to this preferred embodiment of the control apparatus, since the plurality of model parameters are identified such that a combination of the model parameters falls within the predetermined restriction range, the control system can be more securely held in a stable state by appropriately setting the predetermined restriction range, as compared with an identification algorithm which identifies a plurality of model parameters independently of one another.

Preferably, in the control method described above, the output variable comprises a plurality of time-series data of output variables which are multiplied by a plurality of model parameters, respectively, and the step of identifying includes identifying the plurality of model parameters such that a combination of the model parameters falls within the predetermined restriction range.

This preferred embodiment of the control method provides the same advantageous effects provided by the corresponding preferred embodiment of the control apparatus.

Preferably, in the engine control unit described above, the output variable comprises a plurality of time-series data of output variables which are multiplied by a plurality of model parameters, respectively, and the control program causes the computer to identify the plurality of model parameters such that a combination of the model parameters falls within the predetermined restriction range.

This preferred embodiment of the engine control unit provides the same advantageous effects provided by the corresponding preferred embodiment of the control apparatus.

Preferably, in the control apparatus described above, the identifying means sets the predetermined restriction range in accordance with a dynamic characteristic of the controlled object.

According to this preferred embodiment of the control apparatus, since the restriction range for restricting the model parameters is set in accordance with the dynamic characteristic of the controlled object, the control input can be calculated as a value which can ensure the stability of the controlled object by calculating the control input based on the controlled object model which uses the model parameters that are set in the foregoing manner, thereby making it possible to enhance the ensured stability of the control.

Preferably, in the control method described above, the step of identifying further includes setting the predetermined restriction range in accordance with a dynamic characteristic of the controlled object.

This preferred embodiment of the control method provides the same advantageous effects provided by the corresponding preferred embodiment of the control apparatus.

Preferably, in the engine control unit described above, the control program causes the engine to set the predetermined restriction range in accordance with a dynamic characteristic of the controlled object.

This preferred embodiment of the engine control unit provides the same advantageous effects provided by the corresponding preferred embodiment of the control apparatus.

Preferably, in the control apparatus described above, the output variable is a deviation of the output of the controlled object from a predetermined target value, and the input variable is one of a deviation of the control input from a predetermined reference value, and a deviation of the value reflecting a control input inputted to the controlled object from the predetermined reference value.

As described above, the dynamic characteristic of a controlled object model can be fitted more closely to the actual dynamic characteristic of a controlled object when a deviation of the input/output of the controlled object from a predetermined value is defined as a variable indicative of the input/output than when the input/output itself is defined as a variable. Therefore, according to this preferred embodiment of the control apparatus, since the controlled object model has a variable associated with a deviation of a control input and/or a value reflecting the control input inputted to the controlled object from a predetermined reference value, and a variable associated with a deviation of the output of the controlled object from a predetermined target value, the dynamic characteristic of the controlled object model can be fitted more closely to the actual dynamic characteristic of the controlled object, as compared with a controlled object model which has a variable associated with an absolute value of a control input and/or a value reflecting a control input, and a variable associated with an absolute value of the output of the controlled object. It is therefore possible to enhance the ensured stability of the control by calculating the control input based on the controlled object model as described above.

Preferably, in the control method described above, the output variable is a deviation of the output of the controlled object from a predetermined target value, and the input variable is one of a deviation of the control input from a predetermined reference value, and a deviation of the value reflecting a control input inputted to the controlled object from the predetermined reference value.

This preferred embodiment of the control method provides the same advantageous effects provided by the corresponding preferred embodiment of the control apparatus.

Preferably, in the engine control unit described above, the output variable is a deviation of the output of the controlled object from a predetermined target value, and the input variable is one of a deviation of the control input from a predetermined reference value, and a deviation of the value reflecting a control input inputted to the controlled object from the predetermined reference value.

This preferred embodiment of the engine control unit provides the same advantageous effects provided by the corresponding preferred embodiment of the control apparatus.

Preferably, in the control apparatus described above, the identifying means further includes identifying the model parameters based on a weighted identification algorithm which uses weighting parameters for determining behaviors of the model parameters, and setting the weighting parameters in accordance with a dynamic characteristic of the controlled object.

In this type of control apparatus, the output of a controlled object is more likely to be oscillatory under a condition in which the dynamic characteristic of the controlled object varies, particularly, under a condition in which a response delay and a dead time become larger, causing associated variations in identified model parameters. On the contrary, according to this preferred embodiment of the present invention, since the weighting parameters for determining the behaviors of the model parameters are set in accordance with the dynamic characteristic of the controlled object, the weighting parameters can be appropriately set to stabilize the behaviors of the model parameters even under a condition in which a response delay and a dead time of the controlled object become larger, thereby making it possible to further enhance the ensured stability of the control.

Preferably, in the control method described above, the step of identifying further includes identifying the model parameters based on a weighted identification algorithm which uses weighting parameters for determining behaviors of the model parameters, and setting the weighting parameters in accordance with a dynamic characteristic of the controlled object.

This preferred embodiment of the control method provides the same advantageous effects provided by the corresponding preferred embodiment of the control apparatus.

Preferably, in the engine control unit described above, the control program causes the computer to identify the model parameters based on a weighted identification algorithm which uses weighting parameters for determining behaviors of the model parameters; and set the weighting parameters in accordance with a dynamic characteristic of the controlled object.

This preferred embodiment of the engine control unit provides the same advantageous effects provided by the corresponding preferred embodiment of the control apparatus.

Preferably, in the control apparatus described above, the identifying means further includes dead time setting means for setting a dead time between one of the control input inputted to the controlled object and the value reflecting the control input inputted to the controlled object and the output of the controlled object in accordance with a dynamic characteristic of the controlled object, wherein the dead time is used in the identification algorithm.

This type of identification algorithm can increase an identification accuracy for a model parameter multiplied by the control input of the controlled object model when a dead time between a control input or a value reflecting the control input inputted to the controlled object and the output of the control object is set to be highly correlated to an actual input to the controlled object. Therefore, according to this preferred embodiment of the control apparatus, since the dead time between the control input to the controlled object or the value reflecting the control input inputted to the controlled object, and the output of the controlled object, used in the identification algorithm, is set in accordance with the dynamic characteristic of the controlled object, the model parameter multiplied by the control input of the controlled object model can be identified with a higher accuracy to more accurately calculate the control input.

Preferably, in the control method described above, the step of identifying further includes setting a dead time between one of the control input inputted to the controlled object and the value reflecting the control input inputted to the controlled object and the output of the controlled object in accordance with a dynamic characteristic of the controlled object, wherein the dead time is used in the identification algorithm.

This preferred embodiment of the control method provides the same advantageous effects provided by the corresponding preferred embodiment of the control apparatus.

Preferably, in the engine control unit described above, the control program causes the computer to set a dead time between one of the control input inputted to the controlled object and the value reflecting the control input inputted to the controlled object and the output of the controlled object in accordance with a dynamic characteristic of the controlled object, wherein the dead time is used in the identification algorithm.

This preferred embodiment of the engine control unit provides the same advantageous effects provided by the corresponding preferred embodiment of the control apparatus.

Preferably, in the control apparatus described above, the control input calculating means calculates a predicted value of a value indicative of the output of the controlled object based on a prediction algorithm which applies the controlled object model, and calculates the control input in accordance with the calculated predicted value based on the one modulation algorithm.

According to this preferred embodiment of the control apparatus, the predicted value of the value indicative of the output of the controlled object is calculated based on the predication algorithm which applies the controlled object model, and the control input is calculated in accordance with the calculated predicted value based on the one modulation algorithm. In this event, since the dynamic characteristic of the controlled object model can be fitted to the actual dynamic characteristic of the controlled object by using the model parameters identified by the identifying means as described above, the predicted value can be calculated as a value reflecting the actual dynamic characteristic of the controlled object by calculating the predicted value based on the prediction algorithm which applies the controlled object model as described above. As a result, the control apparatus can more appropriately correct a slippage in control timing between the control input and the output of the controlled object to further improve the stability of the control and the controllability.

Preferably, in the control method described above, the step of calculating a control input includes calculating a predicted value of a value indicative of the output of the controlled object based on a prediction algorithm which applies the controlled object model; and calculating the control input in accordance with the calculated predicted value based on the one modulation algorithm.

This preferred embodiment of the control method provides the same advantageous effects provided by the corresponding preferred embodiment of the control apparatus.

Preferably, in the engine control unit described above, the control program causes the computer to calculate a predicted value of a value indicative of the output of the controlled object based on a prediction algorithm which applies the controlled object model; and calculate the control input in accordance with the calculated predicted value based on the one modulation algorithm.

This preferred embodiment of the engine control unit provides the same advantageous effects provided by the corresponding preferred embodiment of the control apparatus.

Preferably, in the control apparatus described above, the control input calculating means calculates a prediction time from the time at which the control input is inputted to the controlled object to the time at which the control input is reflected to the output of the controlled object in accordance with a dynamic characteristic of the controlled object, and calculates the predicted value in accordance with the calculated prediction time based on the prediction algorithm.

According to this preferred embodiment of the control apparatus, the prediction time from the time at which the control input is inputted to the controlled object to the time at which the control input is reflected to the output of the controlled object is calculated in accordance with the dynamic characteristic of the controlled object, and the predicted value is calculated in accordance with the calculated prediction time, so that a slippage in control timing between the input/output of the controlled object, possibly caused by a response delay, a dead time, and the like of the controlled object, can be eliminated without fail by calculating the control input calculated in this manner, thereby making it possible to further improve the controllability.

Preferably, in the control method described above, the step of calculating a control input includes calculating a prediction time from the time at which the control input is inputted to the controlled object to the time at which the control input is reflected to the output of the controlled object in accordance with a dynamic characteristic of the controlled object; and calculating the predicted value in accordance with the calculated prediction time based on the prediction algorithm.

This preferred embodiment of the control method provides the same advantageous effects provided by the corresponding preferred embodiment of the control apparatus.

Preferably, in the engine control unit described above, the control program causes the computer to calculate a prediction time from the time at which the control input is inputted to the controlled object to the time at which the control input is reflected to the output of the controlled object in accordance with a dynamic characteristic of the controlled object; and calculate the predicted value in accordance with the calculated prediction time based on the prediction algorithm.

This preferred embodiment of the engine control unit provides the same advantageous effects provided by the corresponding preferred embodiment of the control apparatus.

Preferably, in the control apparatus described above, the control input calculating means calculates an intermediate value based on the controlled object model and the one modulation algorithm, and calculates the control input based on the calculated intermediate value multiplied by a predetermined gain.

According to this preferred embodiment of the control apparatus, the control input is calculated based on the intermediate value calculated based on the controlled object model and one modulation algorithm multiplied by a predetermined gain, so that a satisfactory controllability can be ensured by setting the predetermined gain to an appropriate value.

Preferably, in the control method described above, the step of calculating a control input includes calculating an intermediate value based on the controlled object model and the one modulation algorithm; and calculating the control input based on the calculated intermediate value multiplied by a predetermined gain.

This preferred embodiment of the control method provides the same advantageous effects provided by the corresponding preferred embodiment of the control apparatus.

Preferably, in the engine control unit described above, the control program causes the computer to calculate an intermediate value based on the controlled object model and the one modulation algorithm; and calculate the control input based on the calculated intermediate value multiplied by a predetermined gain.

This preferred embodiment of the engine control unit provides the same advantageous effects provided by the corresponding preferred embodiment of the control apparatus.

Preferably, the control apparatus described above further comprises gain parameter detecting means for detecting a gain parameter indicative of a gain characteristic of the controlled object; and gain setting means for setting the predetermined gain in accordance with the detected gain parameter.

According to this preferred embodiment of the control apparatus, since the predetermined gain for use in the calculation of the control input is set in accordance with the gain characteristic of the controlled object, the control input can be calculated as a value which has appropriate energy in accordance with the gain characteristic of the controlled object, thereby making it possible to avoid an over-gain condition and the like to ensure a satisfactory controllability.

Preferably, the control method described above further comprises the steps of detecting a gain parameter indicative of a gain characteristic of the controlled object; and setting the predetermined gain in accordance with the detected gain parameter.

This preferred embodiment of the control method provides the same advantageous effects provided by the corresponding preferred embodiment of the control apparatus.

Preferably, in the engine control unit described above, the control program further causes the computer to detect a gain parameter indicative of a gain characteristic of the controlled object; and set the predetermined gain in accordance with the detected gain parameter.

This preferred embodiment of the engine control unit provides the same advantageous effects provided by the corresponding preferred embodiment of the control apparatus.

Preferably, in the control apparatus described above, the control input calculating means calculates a second intermediate value in accordance with the predicted value based on the one modulation algorithm, and calculates the control input by adding a predetermined value to the calculated second intermediate value.

According to this preferred embodiment of the control apparatus, the control input calculating means calculates the control input by adding the predetermined value to the second intermediate value calculated based on one modulation algorithm, so that the control input calculating means can calculate the control input not only as a value which positively and negatively inverts centered at zero, but also as a value which repeats predetermined increase and decrease about a predetermined value, thereby making it possible to improve the degree of freedom in control.

Preferably, in the control method described above, the step of calculating a control input includes calculating a second intermediate value in accordance with the predicted value based on the one modulation algorithm; and calculating the control input by adding a predetermined value to the calculated second intermediate value.

This preferred embodiment of the control method provides the same advantageous effects provided by the corresponding preferred embodiment of the control apparatus.

Preferably, in the engine control unit described above, the control program causes the computer to calculate a second intermediate value in accordance with the predicted value based on the one modulation algorithm; and calculate the control input by adding a predetermined value to the calculated second intermediate value.

This preferred embodiment of the engine control unit provides the same advantageous effects provided by the corresponding preferred embodiment of the control apparatus.

Preferably, in the control apparatus described above, the controlled object comprises a downstream air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is a target air/fuel ratio of an air/fuel mixture supplied to the internal combustion engine. The value reflecting a control input inputted to the controlled object is an output of an upstream air/fuel ratio sensor disposed at a location upstream of the catalyst in the exhaust passage of the internal combustion engine for detecting an air/fuel ratio of exhaust gases which have not passed through the catalyst. The controlled object model is a model which has a variable associated with a value indicative of the output of the downstream air/fuel ratio sensor, and a variable associated with one of a value indicative of the target air/fuel ratio and the output of the upstream air/fuel ratio sensor. The identifying means sequentially identifies a model parameter multiplied by the value indicative of the output of the downstream air/fuel ratio sensor, and a model parameter multiplied by one of the value indicative of the target air/fuel ratio and a value indicative of the output of the upstream air/fuel ratio sensor in accordance with one of the output of the upstream air/fuel ratio sensor and the target air/fuel ratio, and the output of the downstream air/fuel ratio sensor. The control input calculating means includes air/fuel ratio calculating means for calculating the target air/fuel ratio of the air/fuel mixture supplied to the internal combustion engine for converging the output of the downstream air/fuel ratio sensor to a predetermined target value based on the one modulation algorithm and the controlled object model.

According to this preferred embodiment of the control apparatus, the model parameters are sequentially identified in accordance with the output of the upstream air/fuel ratio sensor and the output of the downstream air/fuel ratio sensor, i.e., the model parameters are identified in real time, and the target air/fuel ratio of the air/fuel mixture supplied to the internal combustion engine is calculated based on the controlled object model,the model parameters of which are identified in the foregoing manner, and one modulation algorithm. Thus, even if the characteristics of the catalyst and both air/fuel ratio sensors vary due to a changing environment or have been aged, the output of the downstream air/fuel ratio sensor can be converged to the predetermined target value, while avoiding the influence of the variations and aging changes of the characteristics. Also, since the model parameters are identified in accordance with the upstream air/fuel ratio sensor disposed at a location upstream of the catalyst, the model parameters can be identified while more precisely reflecting exhaust gases actually supplied to the catalyst, thereby making it possible to identify the model parameters with an improved accuracy. Consequently, the control apparatus can appropriately correct a slippage in control timing of the air/fuel ratio control, caused by a response delay, a dead time, and the like of exhaust gases with respect to the air/fuel mixture supplied to the internal combustion engine, thereby making it possible to improve the post-catalyst exhaust gas characteristic.

Preferably, in the control method described above, the controlled object comprises a downstream air/fuel ratio sensor disposed at a location downstream of a catalyst in an exhaust passage of an internal combustion engine for detecting an air/fuel ratio of exhaust gases which have passed through the catalyst, and the output of the controlled object is an output of the downstream air/fuel ratio sensor. The control input to the controlled object is a target air/fuel ratio of an air/fuel mixture supplied to the internal combustion engine. The value reflecting a control input inputted to the controlled object is an output of an upstream air/fuel ratio sensor disposed at a location upstream of the catalyst in the exhaust passage of the internal combustion engine for detecting an air/fuel ratio of exhaust gases which have not passed through the catalyst. The controlled object model is a model which has a variable associated with a value indicative of the output of the downstream air/fuel ratio sensor, and a variable associated with one of a value indicative of the target air/fuel ratio and the output of the upstream air/fuel ratio sensor. The step of identifying includes sequentially identifying a model parameter multiplied by the value indicative of the output of the downstream air/fuel ratio sensor, and a model parameter multiplied by one of the value indicative of the target air/fuel ratio and a value indicative of the output of the upstream air/fuel ratio sensor in accordance with one of the output of the upstream air/fuel ratio sensor and the target air/fuel ratio, and the output of the downstream air/fuel ratio sensor. The step of calculating a control input includes calculating the target air/fuel ratio of the air/fuel mixture supplied to the internal combustion engine for converging the output of the downstream air/fuel ratio sensor to a predetermined target value based on the one modulation algorithm and the controlled object model.

This preferred embodiment of the control method provides the same advantageous effects provided by the corresponding preferred embodiment of the control apparatus.

Preferably, in the engine control unit described above, the controlled object comprises a downstream air/fuel ratio sensor disposed at a location downstream of a catalyst in an exhaust passage of an internal combustion engine for detecting an air/fuel ratio of exhaust gases which have passed through the catalyst, and the output of the controlled object is an output of the downstream air/fuel ratio sensor. The control input to the controlled object is a target air/fuel ratio of an air/fuel mixture supplied to the internal combustion engine. The value reflecting a control input inputted to the controlled object is an output of an upstream air/fuel ratio sensor disposed at a location upstream of the catalyst in the exhaust passage of the internal combustion engine for detecting an air/fuel ratio of exhaust gases which have not passed through the catalyst. The controlled object model is a model which has a variable associated with a value indicative of the output of the downstream air/fuel ratio sensor, and a variable associated with one of a value indicative of the target air/fuel ratio and the output of the upstream air/fuel ratio sensor. The control program causes the computer to sequentially identify a model parameter multiplied by the value indicative of the output of the downstream air/fuel ratio sensor, and a model parameter multiplied by one of the value indicative of the target air/fuel ratio and a value indicative of the output of the upstream air/fuel ratio sensor in accordance with one of the output of the upstream air/fuel ratio sensor and the target air/fuel ratio, and the output of the downstream air/fuel ratio sensor; and calculate the target air/fuel ratio of the air/fuel mixture supplied to the internal combustion engine for converging the output of the downstream air/fuel ratio sensor to a predetermined target value based on the one modulation algorithm and the controlled object model.

This preferred embodiment of the engine control unit provides the same advantageous effects provided by the corresponding preferred embodiment of the control apparatus.

Preferably, in the control apparatus described above, the value indicative of the output of the downstream air/fuel ratio sensor is an output deviation which is a deviation of the output of the downstream air/fuel ratio sensor from the predetermined target value. The value indicative of the output of the upstream air/fuel ratio sensor is an upstream output deviation which is a deviation of the output of the upstream air/fuel ratio sensor from a predetermined reference value. The value indicative of the target air/fuel ratio is an air/fuel ratio deviation which is a deviation of the target air/fuel ratio from the predetermined reference value. The controlled object model is a model which has a variable associated with the output deviation, and a variable associated with one of the air/fuel ratio deviation and the upstream output deviation. The identifying means identifies a model parameter multiplied by the output deviation, and a model parameter multiplied by one of the air/fuel ratio deviation and the upstream output deviation such that the parameters fall within respective predetermined restriction ranges.

According to this preferred embodiment of the control apparatus, since the controlled object model has a variable associated with the output deviation, and a variable associated with one of the air/fuel ratio deviation and upstream output deviation, the dynamic characteristic of the controlled object model can be fitted to the actual dynamic characteristic of the controlled object because the model parameters can be more precisely identified or defined for the controlled object model, for the reason set forth above, as compared with a controlled object model which has a variable associated with an absolute value of the output of the downstream air/fuel ratio sensor, and a variable associated with one of an absolute value of the target air/fuel ratio and an absolute value of the output of the upstream air/fuel ratio sensor. Also, as described above, with a sequential identification algorithm, when the input and output of a controlled object enter a steady state, a control system may become instable or oscillatory because a so-called drift phenomenon is more likely to occur, in which absolute values of identified model parameters increase due to a shortage of self excitation condition. On the contrary, according to this preferred embodiment of the control apparatus, since the model parameter multiplied by the output deviation and the model parameter multiplied by one of the air/fuel ratio deviation and upstream output deviation are identified such that they fall within respective predetermined restriction ranges, it is possible to avoid the drift phenomenon by appropriately setting the predetermined restriction ranges, to securely ensure the stability of the air/fuel ratio control and improve the post-catalyst exhaust gas characteristic.

Preferably, in the control method described above, the value indicative of the output of the downstream air/fuel ratio sensor is an output deviation which is a deviation of the output of the downstream air/fuel ratio sensor from the predetermined target value. The value indicative of the output of the upstream air/fuel ratio sensor is an upstream output deviation which is a deviation of the output of the upstream air/fuel ratio sensor from a predetermined reference value. The value indicative of the target air/fuel ratio is an air/fuel ratio deviation which is a deviation of the target air/fuel ratio from the predetermined reference value. The controlled object model is a model which has a variable associated with the output deviation, and a variable associated with one of the air/fuel ratio deviation and the upstream output deviation. The step of identifying includes identifying a model parameter multiplied by the output deviation, and a model parameter multiplied by one of the air/fuel ratio deviation and the upstream output deviation such that the parameters fall within respective predetermined restriction ranges.

This preferred embodiment of the control method provides the same advantageous effects provided by the corresponding preferred embodiment of the control apparatus.

Preferably, in the engine control unit described above, the value indicative of the output of the downstream air/fuel ratio sensor is an output deviation which is a deviation of the output of the downstream air/fuel ratio sensor from the predetermined target value. The value indicative of the output of the upstream air/fuel ratio sensor is an upstream output deviation which is a deviation of the output of the upstream air/fuel ratio sensor from a predetermined reference value. The value indicative of the target air/fuel ratio is an air/fuel ratio deviation which is a deviation of the target air/fuel ratio from the predetermined reference value. The controlled object model is a model which has a variable associated with the output deviation, and a variable associated with one of the air/fuel ratio deviation and the upstream output deviation. The control program causes the computer to identify a model parameter multiplied by the output deviation, and a model parameter multiplied by one of the air/fuel ratio deviation and the upstream output deviation such that the parameters fall within respective predetermined restriction ranges.

This preferred embodiment of the engine control unit provides the same advantageous effects provided by the corresponding preferred embodiment of the control apparatus.

Preferably, in the control apparatus described above, the output deviation comprises a plurality of time-series data of the output deviation. The control apparatus further comprises operating condition detecting means for detecting an operating condition of the internal combustion engine. The identifying means further includes restriction range setting means for identifying a plurality of model parameters respectively multiplied by the plurality of time-series data of the output deviation such that a combination of the model parameters falls within the predetermined restriction range, and setting the predetermined restriction range in accordance with the detected operating condition of the internal combustion engine.

As described above, with this type of identification algorithm, when a plurality of model parameters are identified independently of one another, the control system may become instable or oscillatory depending on a combination of the model parameters. In addition, generally, as an operating condition of an internal combustion engine changes, its stable limit also changes. For example, in a low load operating condition, a reduction in exhaust gas volume causes an increase in a response delay, a dead time, and the like of exhaust gases with respect to a supplied air/fuel mixture, so that the downstream air/fuel ratio sensor is likely to generate an oscillatory output. As a result, identified parameters are also likely to fluctuate associated with the oscillatory output of the downstream air/fuel ratio sensor, so that the post-catalyst exhaust gas characteristic becomes instable. On the contrary, according to this preferred embodiment of the control apparatus, since the plurality of model parameters are identified such that a combination of the model parameters falls within the predetermined restriction range, and the predetermined restriction range is set in accordance with a detected operating condition of the internal combustion engine, the control apparatus can avoid the instable post-catalyst exhaust gas characteristic as described above to further improve the post-catalyst exhaust gas characteristic and further improve the stability of the air/fuel ratio control.

Preferably, in the control method described above, the output deviation comprises a plurality of time-series data of the output deviation. The control method further comprises the step of detecting an operating condition of the internal combustion engine, wherein step of identifying further includes identifying a plurality of model parameters respectively multiplied by the plurality of time-series data of the output deviation such that a combination of the model parameters falls within the predetermined restriction range, and setting the predetermined restriction range in accordance with the detected operating condition of the internal combustion engine.

This preferred embodiment of the control method provides the same advantageous effects provided by the corresponding preferred embodiment of the control apparatus.

Preferably, in the engine control unit described above, the output deviation comprises a plurality of time-series data of the output deviation. The control program further causes the computer to detect an operating condition of the internal combustion engine; identify a plurality of model parameters respectively multiplied by the plurality of time-series data of the output deviation such that a combination of the model parameters falls within the predetermined restriction range; and set the predetermined restriction range in accordance with the detected operating condition of the internal combustion engine.

This preferred embodiment of the engine control unit provides the same advantageous effects provided by the corresponding preferred embodiment of the control apparatus.

Preferably, the control apparatus described above further comprises an operating condition detecting means for detecting an operating condition of the internal combustion engine, wherein the identifying means further includes weighting parameter setting means for identifying the model parameters based on a weighted identification algorithm which uses weighting parameters for determining behaviors of the model parameters, and setting the weighting parameters in accordance with the detected operating condition of the internal combustion engine.

As described above, when an internal combustion engine is in a low load operating condition, a reduction in the exhaust gas volume causes susceptibility to an oscillatory output of the downstream air/fuel ratio sensor, and to an instable control system. On the contrary, according to this preferred embodiment of the control apparatus, since the model parameters are identified based on the weighted identification algorithm using weighting parameters for determining the behaviors of the model parameters, and the weighting parameters are set in accordance with the detected operating condition of the internal combustion engine, the post-catalyst exhaust gas characteristic can be improved during a low load operation of the internal combustion engine by appropriately setting the weighting parameters to values which stabilize the behaviors of the model parameters during the low load operating condition.

Preferably, the control method described above further comprises the step of detecting an operating condition of the internal combustion engine, wherein the step of identifying further includes identifying the model parameters based on a weighted identification algorithm which uses weighting parameters for determining behaviors of the model parameters, and setting the weighting parameters in accordance with the detected operating condition of the internal combustion engine.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; identify the model parameters based on a weighted identification algorithm which uses weighting parameters for determining behaviors of the model parameters; and set the weighting parameters in accordance with the detected operating condition of the internal combustion engine.

This preferred embodiment of the engine control unit provides the same advantageous effects provided by the corresponding preferred embodiment of the control apparatus.

Preferably, the control apparatus described above further comprises an operating condition detecting means for detecting an operating condition of the internal combustion engine, wherein the identifying means further includes dead time setting means for identifying the model parameters based on an identification algorithm which uses a dead time between the output of the upstream air/fuel ratio sensor and the output of the downstream air/fuel ratio sensor, and setting the dead time in accordance with the detected operating condition of the internal combustion engine.

This type of control apparatus can increase an identification accuracy for a model parameter multiplied by the input of the controlled object model when a dead time between the input and output of the controlled object model is set to be highly correlated to an actual input/output of the controlled object, as compared with when the dead time is set to be lowly correlated to the actual input/output of the controlled object. In addition, the dynamic characteristic such as a dead time, a response delay, and the like in an exhaust system of the internal combustion engine, including the catalyst, varies in accordance with an operating condition, i.e., an exhaust gas volume of the internal combustion engine. Therefore, according to this preferred embodiment of the control apparatus, since the dead time between the output of the upstream air/fuel ratio sensor and the output of the downstream air/fuel ratio sensor, used for identifying the model parameters, is set in accordance with a detected operating condition of the internal combustion engine, the control apparatus can calculate the control input based on the controlled object model with an improved accuracy to more accurately correct a slippage in control timing of the air/fuel ratio control.

Preferably, the control method described above, further comprises the step of detecting an operating condition of the internal combustion engine, wherein the step of identifying further includes identifying the model parameters based on an identification algorithm which uses a dead time between the output of the upstream air/fuel ratio sensor and the output of the downstream air/fuel ratio sensor, and setting the dead time in accordance with the detected operating condition of the internal combustion engine.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; identify the model parameters based on an identification algorithm which uses a dead time between the output of the upstream air/fuel ratio sensor and the output of the downstream air/fuel ratio sensor; and set the dead time in accordance with the detected operating condition of the internal combustion engine.

This preferred embodiment of the engine control unit provides the same advantageous effects provided by the corresponding preferred embodiment of the control apparatus.

Preferably, the control apparatus described above further comprises an operating condition detecting means for detecting an operating condition of the internal combustion engine, wherein the air/fuel ratio calculating means includes prediction time calculating means for calculating a prediction time from the time at which the air/fuel mixture is supplied to the internal combustion engine in the target air/fuel ratio to the time at which the target air/fuel ratio is reflected to the output of the downstream air/fuel ratio sensor in accordance with the detected operating condition of the internal combustion engine; predicted value calculating means for calculating a predicted value of the value indicative of the target air/fuel ratio in accordance with the calculated prediction time based on a prediction algorithm which applies the controlled target model; and target air/fuel ratio calculating means for calculating the target air/fuel ratio in accordance with the calculated predicted value based on the one modulation algorithm.

According to this preferred embodiment of the control apparatus, the prediction time from the time at which the air/fuel mixture is supplied to the internal combustion engine in the target air/fuel ratio to the time at which the target air/fuel ratio is reflected to the output of the downstream air/fuel ratio sensor is calculated in accordance with the detected operating condition of the internal combustion engine, the predicted value of the value indicative of the target air/fuel ratio is calculated in accordance with the calculated prediction time, and the target air/fuel ratio is calculated in accordance with the calculated predicted value, so that the target air/fuel ratio can be calculated while reflecting a response delay and a dead time between the input and output of the controlled object, i.e., a response delay and a dead time of the output of the downstream air/fuel ratio sensor with respect to the air/fuel mixture supplied to the internal combustion engine, thereby making it possible to more securely eliminate a slippage in control timing of the air/fuel ratio control.

Preferably, the control method described above further comprises the step of detecting an operating condition of the internal combustion engine, wherein the step of calculating the target air/fuel ratio includes calculating a prediction time from the time at which the air/fuel mixture is supplied to the internal combustion engine in the target air/fuel ratio to the time at which the target air/fuel ratio is reflected to the output of the downstream air/fuel ratio sensor in accordance with the detected operating condition of the internal combustion engine; calculating a predicted value of the value indicative of the target air/fuel ratio in accordance with the calculated prediction time based on a prediction algorithm which applies the controlled object model; and calculating the target air/fuel ratio in accordance with the calculated predicted value based on the one modulation algorithm.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; calculate a prediction time from the time at which the air/fuel mixture is supplied to the internal combustion engine in the target air/fuel ratio to the time at which the target air/fuel ratio is reflected to the output of the downstream air/fuel ratio sensor in accordance with the detected operating condition of the internal combustion engine; calculate a predicted value of the value indicative of the target air/fuel ratio in accordance with the calculated prediction time based on a prediction algorithm which applies the controlled object model; and calculate the target air/fuel ratio in accordance with the calculated predicted value based on the one modulation algorithm.

This preferred embodiment of the engine control unit provides the same advantageous effects provided by the corresponding preferred embodiment of the control apparatus.

Preferably, the control apparatus described above further comprises multiplying means for multiplying the predicted value by a correction coefficient; and correction coefficient setting means for setting the correction coefficient to be a smaller value when the predicted value is equal to or larger than a predetermined value than when the predicted value is smaller than the predetermined value, wherein the air/fuel ratio calculating means calculates the target air/fuel ratio of the air/fuel mixture in accordance with the predicted value multiplied by the correction coefficient based on the one modulation algorithm.

According to this preferred embodiment of the control apparatus, the target air/fuel ratio of the air/fuel mixture is calculated in accordance with the predicted value of the output deviation multiplied by the correction coefficient, and the correction coefficient is set to a smaller value when the predicted value of the output deviation is equal to or larger than a predetermined value than when the predicted value of the output deviation is smaller than the predetermined value, so that the output of the downstream air/fuel ratio sensor can be converged at a different rate in accordance with the order of the predicted value of the output deviation with respect to the predetermined value. Therefore, for changing the air/fuel ratio to be leaner because of the predicted value of the output deviation being equal to or larger than zero, i.e., the output of the downstream air/fuel ratio sensor being larger than a target value when the predetermined value is set, for example to zero, the correction coefficient is set such that the output of the downstream air/fuel ratio sensor is converged at a lower rate than when the air/fuel ratio is changed to be richer, thereby providing the effect of suppressing the amount of exhausted NOx by a lean bias. On the other hand, when the air/fuel ratio is changed to be richer, the correction coefficient is set such that the output of the downstream air/fuel ratio sensor is converted at a higher rate than when the air/fuel ratio is changed to be leaner, thereby making it possible to sufficiently recover the NOx purifying rate of the catalyst.

Preferably, the control method described above further comprises the steps of multiplying the predicted value by a correction coefficient; and setting the correction coefficient to be a smaller value when the predicted value is equal to or larger than a predetermined value than when the predicted value is smaller than the predetermined value, wherein the step of calculating the target air/fuel ratio includes calculating the target air/fuel ratio of the air/fuel mixture in accordance with the predicted value multiplied by the correction coefficient based on the one modulation algorithm.

This preferred embodiment of the control method provides the same advantageous effects provided by the corresponding preferred embodiment of the control apparatus.

Preferably, in the engine control unit described above, the control program further causes the computer to multiply the predicted value by a correction coefficient; set the correction coefficient to be a smaller value when the predicted value is equal to or larger than a predetermined value than when the predicted value is smaller than the predetermined value; and calculate the target air/fuel ratio of the air/fuel mixture in accordance with the predicted value multiplied by the correction coefficient based on the one modulation algorithm.

This preferred embodiment of the engine control unit provides the same advantageous effects provided by the corresponding preferred embodiment of the control apparatus.

Preferably, the control apparatus described above further comprises operating condition detecting means for detecting an operating condition of the internal combustion engine, wherein the air/fuel ratio calculating means further includes intermediate value calculating means for calculating an intermediate value of the target air/fuel ratio of the air/fuel mixture supplied to the internal combustion engine in accordance with the predicted value of the output deviation based on the controlled object model and the one modulation algorithm; gain setting means for setting a gain in accordance with the detected operating condition of the internal combustion engine; and target air/fuel ratio calculating means for calculating the target air/fuel ratio based on the calculated intermediate value multiplied by the set gain.

Generally, in this type of internal combustion engine, the gain characteristic between the input and output of the controlled object, i.e., between the target air/fuel ratio and the output of the downstream air/fuel ratio sensor varies in response to a change in an operating condition, i.e., an exhaust gas volume of the internal combustion engine. Therefore, according to this preferred embodiment of the control apparatus, since the target air/fuel ratio is calculated based on the intermediate value multiplied by a predetermined gain set in accordance with the operating condition of the internal combustion engine, the target air/fuel ratio can be calculated while reflecting a change in the dynamic characteristic such as a dead time, a response delay, or the like associated with a change in the operating condition, i.e., the exhaust gas volume of the internal combustion engine. It is therefore possible to ensure the stability of the air/fuel ratio control, suppress unnecessary fluctuations in the air/fuel ratio to maintain satisfactorily purified exhaust gases by the catalyst, and avoid surging due to the fluctuations in the air/fuel ratio, for example, in a high load operation.

Preferably, the control method described above further comprises the step of detecting an operating condition of the internal combustion engine, wherein the step of calculating the target air/fuel ratio further includes calculating an intermediate value of the target air/fuel ratio of the air/fuel mixture supplied to the internal combustion engine based on the controlled object model and the one modulation algorithm; setting a gain in accordance with the detected operating condition of the internal combustion engine; and calculating the target air/fuel ratio based on the calculated intermediate value multiplied by the set gain.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; calculate an intermediate value of the target air/fuel ratio of the air/fuel mixture supplied to the internal combustion engine based on the controlled object model and the one modulation algorithm; set a gain in accordance with the detected operating condition of the internal combustion engine; and calculate the target air/fuel ratio based on the calculated intermediate value multiplied by the set gain.

This preferred embodiment of the engine control unit provides the same advantageous effects provided by the corresponding preferred embodiment of the control apparatus.

Preferably, in the control apparatus described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is a target air/fuel ratio of an air/fuel mixture supplied to the internal combustion engine. The controlled object model is a model which has a variable associated with a value indicative of the output of the air/fuel ratio sensor, and a variable associated with a value indicative of the target air/fuel ratio. The identifying means sequentially identifies a model parameter multiplied by the value indicative of the output of the air/fuel ratio sensor, and a model parameter multiplied by the value indicative of the target air/fuel ratio in accordance with the output of the air/fuel ratio sensor and the target air/fuel ratio of the air/fuel mixture. The control input calculating means includes air/fuel ratio calculating means for calculating the target air/fuel ratio of the air/fuel mixture supplied to the internal combustion engine for converging the output of the air/fuel ratio sensor to a predetermined target value based on the one modulation algorithm and the controlled object model.

According to this preferred embodiment of the control apparatus, the model parameters of the controlled object model are sequentially identified in accordance with the target air/fuel ratio and the output of the air/fuel ratio sensor, i.e., identified in real time, and the target/air fuel ratio of the air/fuel mixture supplied to the internal combustion engine is calculated based on the controlled object model, the model parameters of which are identified in this manner, and the one modulation algorithm. Thus, even if the characteristics of the catalyst and air/fuel ratio sensor vary due to a changing environment or have been aged, the output of the air/fuel ratio sensor can be converged to the predetermined target value, while avoiding the influence of the variations and aging changes of the characteristics. Consequently, the control apparatus can appropriately correct a slippage in control timing of the air/fuel ratio control caused by a response delay, a dead time, and the like of exhaust gases with respect to the air/fuel mixture supplied to the internal combustion engine to improve the post-catalyst exhaust gas characteristic. In addition, the control apparatus can be realized at a relatively low cost because it only requires a single air/fuel ratio sensor.

Preferably, in the control method described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is a target air/fuel ratio of an air/fuel mixture supplied to the internal combustion engine. The controlled object model is a model which has a variable associated with a value indicative of the output of the air/fuel ratio sensor, and a variable associated with a value indicative of the target air/fuel ratio. The step of identifying includes sequentially identifying a model parameter multiplied by the value indicative of the output of the air/fuel ratio sensor, and a model parameter multiplied by the value indicative of the target air/fuel ratio in accordance with the output of the air/fuel ratio sensor and the target air/fuel ratio of the air/fuel mixture. The step of calculating a control input includes calculating the target air/fuel ratio of the air/fuel mixture supplied to the internal combustion engine for converging the output of the air/fuel ratio sensor to a predetermined target value based on the one modulation algorithm and the controlled object model.

This preferred embodiment of the control method provides the same advantageous effects provided by the corresponding preferred embodiment of the control apparatus.

Preferably, in the engine control unit described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is a target air/fuel ratio of an air/fuel mixture supplied to the internal combustion engine. The controlled object model is a model which has a variable associated with a value indicative of the output of the air/fuel ratio sensor, and a variable associated with a value indicative of the target air/fuel ratio. The control program causes the computer to sequentially identify a model parameter multiplied by the value indicative of the output of the air/fuel ratio sensor, and a model parameter multiplied by the value indicative of the target air/fuel ratio in accordance with the output of the air/fuel ratio sensor and the target air/fuel ratio of the air/fuel mixture; and calculate the target air/fuel ratio of the air/fuel mixture supplied to the internal combustion engine for converging the output of the air/fuel ratio sensor to a predetermined target value based on the one modulation algorithm and the controlled object model.

This preferred embodiment of the engine control unit provides the same advantageous effects provided by the corresponding preferred embodiment of the control apparatus.

Preferably, in the control apparatus described above, the value indicative of the output of the air/fuel ratio sensor is an output deviation which is a deviation of the output of the air/fuel ratio sensor from the predetermined target value. The value indicative of the target air/fuel ratio is an air/fuel ratio deviation which is a deviation of the target air/fuel ratio from a predetermined reference value. The controlled object model is a model which has variables associated with the output deviation and the air/fuel ratio deviation. The identifying means identifies a model parameter multiplied by the output deviation, and a model parameter multiplied by the air/fuel ratio deviation such that the model parameters fall within respective predetermined restriction ranges.

According to this preferred embodiment of the control apparatus, since the controlled object model has a variable associated with the output deviation, and a variable associated with the air/fuel ratio deviation, the dynamic characteristic of the controlled object model can be fitted to the actual dynamic characteristic of the controlled object because the model parameters can be more precisely identified or defined for the controlled object model, for the reason set forth above, as compared with a controlled object model which has a variable associated with an absolute value of the output of the air/fuel ratio sensor, and a variable associated with an absolute value of the target air/fuel ratio. Also, as described above, with a sequential identification algorithm, when the input and output of a controlled object enter a steady state, a control system may become instable or oscillatory because a so-called drift phenomenon is more likely to occur, in which absolute values of identified model parameters increase due to a shortage of self excitation condition. On the contrary, according to this preferred embodiment of the control apparatus, since the model parameter multiplied by the output deviation and the model parameter multiplied by the air/fuel ratio deviation are identified such that they fall within respective predetermined restriction ranges, it is possible to avoid the drift phenomenon by appropriately setting the predetermined restriction ranges, to securely ensure the stability of the air/fuel ratio control and improve the post-catalyst exhaust gas characteristic.

Preferably, in the control method described above, the value indicative of the output of the air/fuel ratio sensor is an output deviation which is a deviation of the output of the air/fuel ratio sensor from the predetermined target value. The value indicative of the target air/fuel ratio is an air/fuel ratio deviation which is a deviation of the target air/fuel ratio from a predetermined reference value. The controlled object model is a model which has variables associated with the output deviation and the air/fuel ratio deviation. The step of identifying includes identifying a model parameter multiplied by the output deviation, and a model parameter multiplied by the air/fuel ratio deviation such that the model parameters fall within respective predetermined restriction ranges.

This preferred embodiment of the control method provides the same advantageous effects provided by the corresponding preferred embodiment of the control apparatus.

Preferably, in the engine control unit described above, the value indicative of the output of the air/fuel ratio sensor is an output deviation which is a deviation of the output of the air/fuel ratio sensor from the predetermined target value. The value indicative of the target air/fuel ratio is an air/fuel ratio deviation which is a deviation of the target air/fuel ratio from a predetermined reference value. The controlled object model is a model which has variables associated with the output deviation and the air/fuel ratio deviation. The control program causes the computer to identify a model parameter multiplied by the output deviation, and a model parameter multiplied by the air/fuel ratio deviation such that the model parameters fall within respective predetermined restriction ranges.

This preferred embodiment of the engine control unit provides the same advantageous effects provided by the corresponding preferred embodiment of the control apparatus.

Preferably, in the control apparatus described above, the output deviation comprises a plurality of time-series data of the output deviation. The control apparatus further comprises operating condition detecting means for detecting an operating condition of the internal combustion engine. The identifying means further includes restriction range setting means for identifying a plurality of model parameters respectively multiplied by the plurality of time-series data of the output deviation such that a combination of the model parameters falls within the predetermined restriction range, and setting the predetermined restriction range in accordance with the detected operating condition of the internal combustion engine.

According to this preferred embodiment of the control apparatus, since the plurality of model parameters are identified such that a combination of the model parameters falls within the predetermined restriction range, and the predetermined restriction range is set in accordance with a detected operating condition of the internal combustion engine, the control system can avoid the instable post-catalyst exhaust gas characteristic as described above, further improve the post-catalyst exhaust gas characteristic, and further improve the stability of the air/fuel ratio control.

Preferably, in the control method described above, the output deviation comprises a plurality of time-series data of the output deviation. The control method further comprises the step of detecting an operating condition of the internal combustion engine. The step of identifying further includes identifying a plurality of model parameters respectively multiplied by the plurality of time-series data of the output deviation such that a combination of the model parameters falls within the predetermined restriction range, and setting the predetermined restriction range in accordance with the detected operating condition of the internal combustion engine. This preferred embodiment of the control method provides the same advantageous effects provided by the corresponding preferred embodiment of the control apparatus.

Preferably, in the engine control unit described above, the output deviation comprises a plurality of time-series data of the output deviation. The control program further causes the computer to detect an operating condition of the internal combustion engine; identify a plurality of model parameters respectively multiplied by the plurality of time-series data of the output deviation such that a combination of the model parameters falls within the predetermined restriction range; and set the predetermined restriction range in accordance with the detected operating condition of the internal combustion engine.

This preferred embodiment of the engine control unit provides the same advantageous effects provided by the corresponding preferred embodiment of the control apparatus.

Preferably, the control apparatus described above further comprises operating condition detecting means for detecting an operating condition of the internal combustion engine, wherein the identifying means further includes weighting parameter setting means for identifying the model parameters based on a weighted identification algorithm which uses weighting parameters for determining behaviors of the model parameters, and setting the weighting parameters in accordance with the detected operating condition of the internal combustion engine.

According to this preferred embodiment of the control apparatus, since the model parameters are identified based on the weighted identification algorithm using weighting parameters for determining the behaviors thereof, and the weighting parameters are set in accordance with the detected operating condition of the internal combustion engine, the post-catalyst exhaust gas characteristic can be improved during a low load operation of the internal combustion engine by appropriately setting the weighting parameters to values which stabilize the behaviors of the model parameters during the low load operating condition.

Preferably, the control method described above further comprises the step of detecting an operating condition of the internal combustion engine, wherein the step of identifying further includes identifying the model parameters based on a weighted identification algorithm which uses weighting parameters for determining behaviors of the model parameters, and setting the weighting parameters in accordance with the detected operating condition of the internal combustion engine.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; identify the model parameters based on a weighted identification algorithm which uses weighting parameters for determining behaviors of the model parameters; and set the weighting parameters in accordance with the detected operating condition of the internal combustion engine.

This preferred embodiment of the engine control unit provides the same advantageous effects provided by the corresponding preferred embodiment of the control apparatus.

Preferably, the control apparatus described above further comprises operating condition detecting means for detecting an operating condition of the internal combustion engine, wherein the air/fuel ratio calculating means includes prediction time calculating means for calculating a prediction time from the time at which the air/fuel mixture is supplied to the internal combustion engine in the target air/fuel ratio to the time at which the target air/fuel ratio is reflected to the output of the air/fuel ratio sensor in accordance with the detected operating condition of the internal combustion engine; predicted value calculating means for calculating a predicted value of the value indicative of the target air/fuel ratio in accordance with the calculated prediction time based on a prediction algorithm which applies the controlled target model; and target air/fuel ratio calculating means for calculating the target air/fuel ratio in accordance with the calculated predicted value based on the one modulation algorithm.

According to this preferred embodiment of the control apparatus, the prediction time from the time at which the air/fuel mixture is supplied to the internal combustion engine in the target air/fuel ratio to the time at which the target air/fuel ratio is reflected to the output of the downstream air/fuel ratio sensor is calculated in accordance with the detected operating condition of the internal combustion engine, the predicted value of the value indicative of the target air/fuel ratio is calculated in accordance with the calculated prediction time, and the target air/fuel ratio is calculated in accordance with the calculated predicted value, so that the target air/fuel ratio can be calculated while reflecting a response delay and a dead time between the input and output of the controlled object, i.e., a response delay and a dead time of the output of the downstream air/fuel ratio sensor with respect to the air/fuel mixture supplied to the internal combustion engine, thereby making it possible to more securely eliminate a slippage in control timing of the air/fuel ratio control.

Preferably, the control method described above further comprises the step of detecting an operating condition of the internal combustion engine, wherein the step of calculating the air/fuel ratio includes calculating a prediction time from the time at which the air/fuel mixture is supplied to the internal combustion engine in the target air/fuel ratio to the time at which the target air/fuel ratio is reflected to the output of the air/fuel ratio sensor in accordance with the detected operating condition of the internal combustion engine; calculating a predicted value of the value indicative of the target air/fuel ratio in accordance with the calculated prediction time based on a prediction algorithm which applies the controlled target model; and calculating the target air/fuel ratio in accordance with the calculated predicted value based on the one modulation algorithm.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; calculate a prediction time from the time at which the air/fuel mixture is supplied to the internal combustion engine in the target air/fuel ratio to the time at which the target air/fuel ratio is reflected to the output of the air/fuel ratio sensor in accordance with the detected operating condition of the internal combustion engine; calculate a predicted value of the value indicative of the target air/fuel ratio in accordance with the calculated prediction time based on a prediction algorithm which applies the controlled target model; and calculate the target air/fuel ratio in accordance with the calculated predicted value based on the one modulation algorithm.

This preferred embodiment of the engine control unit provides the same advantageous effects provided by the corresponding preferred embodiment of the control apparatus.

Preferably, the control apparatus described above further comprises multiplying means for multiplying the predicted value by a correction coefficient; and correction coefficient setting means for setting the correction coefficient to be a smaller value when the predicted value is equal to or larger than a predetermined value than when the predicted value is smaller than the predetermined value, wherein the target air/fuel ratio calculating means calculates the target air/fuel ratio of the air/fuel mixture in accordance with the predicted value multiplied by the correction coefficient based on the one modulation algorithm.

According to this preferred embodiment of the control apparatus, the target air/fuel ratio of the air/fuel mixture is calculated in accordance with the predicted value of the output deviation multiplied by the correction coefficient, and the correction coefficient is set to a smaller value when the predicted value of the output deviation is equal to or larger than a predetermined value than when the predicted value of the output deviation is smaller than the predetermined value, so that the output of the downstream air/fuel ratio sensor can be converged at a different rate in accordance with the order of the predicted value of the output deviation with respect to the predetermined value. Therefore, for changing the air/fuel ratio to be leaner because of the predicted value of the output deviation being equal to or larger than zero, i.e., the output of the downstream air/fuel ratio sensor being larger than a target value when the predetermined value is set, for example to zero, the correction coefficient is set such that the output of the downstream air/fuel ratio sensor is converged at a lower rate than when the air/fuel ratio is changed to be richer, thereby providing the effect of suppressing the amount of exhausted NOx by a lean bias. On the other hand, when the air/fuel ratio is changed to be richer, the correction coefficient is set such that the output of the downstream air/fuel ratio sensor is converted at a higher rate than when the air/fuel ratio is changed to be leaner, thereby making it possible to sufficiently recover the NOx purifying rate of the catalyst.

Preferably, the control method described above further comprises the steps of multiplying the predicted value by a correction coefficient; and setting the correction coefficient to be a smaller value when the predicted value is equal to or larger than a predetermined value than when the predicted value is smaller than the predetermined value, wherein the step of calculating the target air/fuel ratio includes calculating the target air/fuel ratio of the air/fuel mixture in accordance with the predicted value multiplied by the correction coefficient based on the one modulation algorithm.

This preferred embodiment of the control method provides the same advantageous effects provided by the corresponding preferred embodiment of the control apparatus.

Preferably, in the engine control unit described above, the control program further causes the computer to multiply the predicted value by a correction coefficient; set the correction coefficient to be a smaller value when the predicted value is equal to or larger than a predetermined value than when the predicted value is smaller than the predetermined value; calculate the target air/fuel ratio of the air/fuel mixture in accordance with the predicted value multiplied by the correction coefficient based on the one modulation algorithm.

This preferred embodiment of the engine control unit provides the same advantageous effects provided by the corresponding preferred embodiment of the control apparatus.

Preferably, the control apparatus described above further comprises operating condition detecting means for detecting an operating condition of the internal combustion engine, wherein the air/fuel ratio calculating means further includes intermediate value calculating means for calculating an intermediate value of the target air/fuel ratio of the air/fuel mixture supplied to the internal combustion engine based on the controlled object model and the one modulation algorithm; gain setting means for setting a gain in accordance with the detected operating condition of the internal combustion engine; and target air/fuel ratio calculating means for calculating the target air/fuel ratio based on the calculated intermediate value multiplied by the set gain.

According to this preferred embodiment of the control apparatus, since the target air/fuel ratio is calculated based on the intermediate value multiplied by a predetermined gain set in accordance with the operating condition of the internal combustion engine, the target air/fuel ratio can be calculated while reflecting a change in the dynamic characteristic such as a dead time, a response delay, or the like associated with a change in the operating condition, i.e., the exhaust gas volume of the internal combustion engine. It is therefore possible to ensure the stability of the air/fuel ratio control, suppress unnecessary fluctuations in the air/fuel ratio to maintain satisfactorily purified exhaust gases by the catalyst, and avoid surging due to fluctuations in the air/fuel ratio, for example, in a high load operation.

Preferably, the control method described above further comprises the step of detecting an operating condition of the internal combustion engine, wherein the step of calculating the target air/fuel ratio further includes calculating an intermediate value of the target air/fuel ratio of the air/fuel mixture supplied to the internal combustion engine based on the controlled object model and the one modulation algorithm; setting a gain in accordance with the detected operating condition of the internal combustion engine; and calculating the target air/fuel ratio based on the calculated intermediate value multiplied by the set gain.

This preferred embodiment of the control method provides the same advantageous effects provided by the corresponding preferred embodiment of the control apparatus.

Preferably, in the engine control unit described above, the control program further causes the computer to detect an operating condition of the internal combustion engine; calculate an intermediate value of the target air/fuel ratio of the air/fuel mixture supplied to the internal combustion engine based on the controlled object model and the one modulation algorithm; set a gain in accordance with the detected operating condition of the internal combustion engine; and calculate the target air/fuel ratio based on the calculated intermediate value multiplied by the set gain.

This preferred embodiment of the engine control unit provides the same advantageous effects provided by the corresponding preferred embodiment of the control apparatus.

Preferably, the control apparatus described above further comprises parameter detecting means for detecting a dynamic characteristic parameter indicative of a change in a dynamic characteristic of the controlled object; and model parameter setting means for setting model parameters of the controlled object model in accordance with the detected dynamic characteristic parameter.

According to this preferred embodiment of the control apparatus, the parameter detecting means detects the dynamic characteristic parameter indicative of a change in a dynamic characteristic of the controlled object, and the model parameter setting means sets the model parameters of the controlled object model in accordance with the detected dynamic characteristic parameter, so that the control apparatus can rapidly fit the dynamic characteristic of the controlled object model to the actual dynamic characteristic of the controlled object. As a result, the control apparatus can rapidly and appropriately correct a slippage in control timing between the input and output of the controlled object, caused by the dynamic characteristic of the controlled object, for example, a response delay, a dead time, or the like, to improve the stability of the control and the controllability.

Preferably, the control method described above further comprises the steps of detecting a dynamic characteristic parameter indicative of a change in a dynamic characteristic of the controlled object; and setting model parameters of the controlled object model in accordance with the detected dynamic characteristic parameter.

This preferred embodiment of the control method provides the same advantageous effects provided by the corresponding preferred embodiment of the control apparatus.

Preferably, in the engine control unit described above, the control program further causes the computer to detect a dynamic characteristic parameter indicative of a change in a dynamic characteristic of the controlled object; and set model parameters of the controlled object model in accordance with the detected dynamic characteristic parameter.

This preferred embodiment of the engine control unit provides the same advantageous effects provided by the corresponding preferred embodiment of the control apparatus.

Preferably, in the control apparatus described above, the control input calculating means calculates a predicted value of a value indicative of the output of the controlled object based on a prediction algorithm which applies the controlled object model, and calculates the control input in accordance with the calculated predicted value based on the one modulation algorithm.

According to this preferred embodiment of the control apparatus, the predicted value of the value indicative of the output of the controlled object is calculated based on the predication algorithm which applies the controlled object model, and the control input is calculated in accordance with the calculated predicted value based on the one modulation algorithm. In this event, since the dynamic characteristic of the controlled object model can be fitted to the actual dynamic characteristic of the controlled object by using the model parameters identified by the identifying means as described above, the predicted value can be calculated as a value reflecting the actual dynamic characteristic of the controlled model by calculating the predicted value based on the prediction algorithm which applies the controlled object model as described above. As a result, the control apparatus can more appropriately correct a slippage in control timing between the control input and the output of the controlled object to further improve the stability of the control and the controllability.

Preferably, in the control method described above, the step of calculating a control input includes calculating a predicted value of a value indicative of the output of the controlled object based on a prediction algorithm which applies the controlled object model; and calculating the control input in accordance with the calculated predicted value based on the one modulation algorithm.

This preferred embodiment of the control method provides the same advantageous effects provided by the corresponding preferred embodiment of the control apparatus.

Preferably, in the engine control unit described above, the control program causes the computer to calculate a predicted value of a value indicative of the output of the controlled object based on a prediction algorithm which applies the controlled object model; and calculate the control input in accordance with the calculated predicted value based on the one modulation algorithm.

This preferred embodiment of the engine control unit provides the same advantageous effects provided by the corresponding preferred embodiment of the control apparatus.

Preferably, in the control apparatus described above, the control input calculating means calculates a prediction time from the time at which the control input is inputted to the controlled object to the time at which the control input is reflected to the output of the controlled object in accordance with the dynamic characteristic parameter of the controlled object, and calculates the predicted value in accordance with the calculated prediction time based on the prediction algorithm.

According to this preferred embodiment of the control apparatus, the prediction time from the time at which the control input is inputted to the controlled object to the time at which the control input is reflected to the output of the controlled object is calculated in accordance with the dynamic characteristic of the controlled object, and the predicted value is calculated in accordance with the calculated prediction time, so that a slippage in control timing between the input/output of the controlled object, possibly caused by a response delay, a dead time, and the like of the controlled object, can be eliminated without fail by calculating the control input calculated in this manner, thereby making it possible to further improve the controllability.

Preferably, in the control method described above, the step of calculating a control input includes calculating a prediction time from the time at which the control input is inputted to the controlled object to the time at which the control input is reflected to the output of the controlled object in accordance with the dynamic characteristic parameter of the controlled object; and calculating the predicted value in accordance with the calculated prediction time based on the prediction algorithm.

This preferred embodiment of the control method provides the same advantageous effects provided by the corresponding preferred embodiment of the control apparatus.

Preferably, in the engine control unit described above, the control program causes the computer to calculate a prediction time from the time at which the control input is inputted to the controlled object to the time at which the control input is reflected to the output of the controlled object in accordance with the dynamic characteristic parameter of the controlled object; and calculate the predicted value in accordance with the calculated prediction time based on the prediction algorithm.

This preferred embodiment of the engine control unit provides the same advantageous effects provided by the corresponding preferred embodiment of the control apparatus.

Preferably, in the control apparatus described above, the control input calculating means calculates an intermediate value based on the controlled object model and the one modulation algorithm, and calculates the control input based on the calculated intermediate value multiplied by a predetermined gain.

According to this preferred embodiment of the control apparatus, the control input is calculated based on the intermediate value calculated based on one modulation algorithm multiplied by a predetermined gain, so that a satisfactory controllability can be ensured by setting the predetermined gain to an appropriate value.

Preferably, in the control method described above, the step of calculating a control input includes calculating an intermediate value based on the controlled object model and the one modulation algorithm; and calculating the control input based on the calculated intermediate value multiplied by a predetermined gain.

This preferred embodiment of the control method provides the same advantageous effects provided by the corresponding preferred embodiment of the control apparatus.

Preferably, in the engine control unit described above, the control program causes the computer to calculate an intermediate value based on the controlled object model and the one modulation algorithm; and calculate the control input based on the calculated intermediate value multiplied by a predetermined gain.

This preferred embodiment of the engine control unit provides the same advantageous effects provided by the corresponding preferred embodiment of the control apparatus.

Preferably, the control apparatus described above further comprises gain parameter detecting means for detecting a gain parameter indicative of a gain characteristic of the controlled object; and gain setting means for setting the predetermined gain in accordance with the detected gain parameter.

According to this preferred embodiment of the control apparatus, since the predetermined gain for use in the calculation of the control input is set in accordance with the gain characteristic of the controlled object, the control input can be calculated as a value which has appropriate energy in accordance with the gain characteristic of the controlled object, thereby making it possible to avoid an over-gain condition and the like to ensure a satisfactory controllability.

Preferably, the control method described above further comprises the steps of detecting a gain parameter indicative of a gain characteristic of the controlled object; and setting the predetermined gain in accordance with the detected gain parameter.

This preferred embodiment of the control method provides the same advantageous effects provided by the corresponding preferred embodiment of the control apparatus.

Preferably, in the engine control unit described above, the control program further causes the computer to detect a gain parameter indicative of a gain characteristic of the controlled object; and set the predetermined gain in accordance with the detected gain parameter.

This preferred embodiment of the engine control unit provides the same advantageous effects provided by the corresponding preferred embodiment of the control apparatus.

Preferably, in the control apparatus described above, the control input calculating means calculates a second intermediate value in accordance with the predicted value based on the one modulation algorithm, and calculates the control input by adding a predetermined value to the calculated second intermediate value.

According to this preferred embodiment of the control apparatus, the control input calculating means calculates the control input by adding the predetermined value to the second intermediate value calculated based on one modulation algorithm, so that the control input calculating means can calculate the control input not only as a value which positively and negatively inverts centered at zero, but also as a value which repeats predetermined increase and decrease about a predetermined value, thereby making it possible to improve the degree of freedom in control.

Preferably, in the control method described above, the step of calculating a control input includes calculating a second intermediate value in accordance with the predicted value based on the one modulation algorithm; and calculating the control input by adding a predetermined value to the calculated second intermediate value.

This preferred embodiment of the control method provides the same advantageous effects provided by the corresponding preferred embodiment of the control apparatus.

Preferably, in the engine control unit described above, the control program causes the computer to calculate a second intermediate value in accordance with the predicted value based on the one modulation algorithm; and calculate the control input by adding a predetermined value to the calculated second intermediate value.

This preferred embodiment of the engine control unit provides the same advantageous effects provided by the corresponding preferred embodiment of the control apparatus.

Preferably, in the control apparatus described above, the controlled object model has a variable associated with at least one of a deviation of the control input from a predetermined reference value, and the value reflecting a control input inputted to the controlled object from the predetermined reference value, and a variable associated with a deviation of the output of the controlled object from a predetermined target value.

According to this preferred embodiment of the control apparatus, since the controlled object model has a variable associated with at least one of the deviation of the control input from the predetermined reference value, and the value reflecting a control input inputted to the controlled object from the predetermined reference value, and a variable associated with the deviation of the output of the controlled object from the predetermined target value, the dynamic characteristic of the controlled object model can be fitted more closely to the actual dynamic characteristic of the controlled object, as compared with a controlled object model which has a variable associated with an absolute value of a value reflecting a control input and/or a control output, and a variable associated with an absolute value of the output of the controlled object. It is therefore possible to more securely ensure the stability of the control by calculating the control input based on the controlled object model as described above.

Preferably, in the control method described above, the controlled object model has a variable associated with at least one of a deviation of the control input from a predetermined reference value, and the value reflecting a control input inputted to the controlled object from the predetermined reference value, and a variable associated with a deviation of the output of the controlled object from a predetermined target value.

This preferred embodiment of the control method provides the same advantageous effects provided by the corresponding preferred embodiment of the control apparatus.

Preferably, in the engine control unit described above, the controlled object model has a variable associated with at least one of a deviation of the control input from a predetermined reference value, and the value reflecting a control input inputted to the controlled object from the predetermined reference value, and a variable associated with a deviation of the output of the controlled object from a predetermined target value.

This preferred embodiment of the engine control unit provides the same advantageous effects provided by the corresponding preferred embodiment of the control apparatus.

Preferably, in the control apparatus described above, the controlled object comprises a downstream air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is the target air/fuel ratio of the air/fuel mixture supplied to the internal combustion engine. The controlled object model is a model representative of a relationship between the output of the downstream air/fuel ratio sensor and the target air/fuel ratio. The parameter detecting means comprises operating condition detecting means for detecting an operating condition of the internal combustion engine. The model parameter setting means sets model parameters of the controlled object model in accordance with the detected operating condition of the internal combustion engine. The control apparatus further comprises an upstream air/fuel ratio sensor disposed at a location upstream of the catalyst in the exhaust passage of the internal combustion engine. The control input calculating mean includes predicted value calculating means for calculating a predicted value of a value indicative of the output of the downstream air/fuel ratio sensor in accordance with the output of the downstream air/fuel ratio sensor, the output of the upstream air/fuel ratio sensor, and the target air/fuel ratio of the air/fuel mixture based on a prediction algorithm which applies the controlled object model; and air/fuel ratio calculating means for calculating the target air/fuel ratio of the air/fuel mixture supplied to the internal combustion engine for converging the output of the downstream air/fuel ratio sensor to a predetermined target value in accordance with the calculated predicted value based on the one modulation algorithm.

According to this preferred embodiment of the control apparatus, since the model parameters are set in accordance with the detected operating condition of the internal combustion engine, the model parameters can be rapidly calculated, even when the operating condition of the internal combustion engine suddenly changes, while precisely reflecting exhaust gases supplied to the catalyst. In addition, since the target air/fuel ratio is calculated for the air/fuel mixture supplied to the internal combustion engine based on the controlled object model, the model parameters of which are calculated in this manner, and the one modulation algorithm, the output of the downstream air/fuel ratio sensor can be rapidly converged to the predetermined target value. Further, since the predicted value is calculated in accordance with the output of the upstream air/fuel ratio sensor disposed at a location upstream of the catalyst, the air/fuel ratio of exhaust gases actually supplied to the catalyst can be more appropriately reflected to the predicted value, with a corresponding improvement on the accuracy of calculating the predicted value. Consequently, the control apparatus can rapidly and appropriately correct a slippage in control timing of the air/fuel ratio control, caused by a response delay, a dead time, and the like of exhaust gases with respect to the air/fuel mixture supplied to the internal combustion engine, to improve the stability of the air/fuel ratio control, and the post-catalyst exhaust gas characteristic.

Preferably, in the control method described above, the controlled object comprises a downstream air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is the target air/fuel ratio of the air/fuel mixture supplied to the internal combustion engine. The controlled object model is a model representative of a relationship between the output of the downstream air/fuel ratio sensor and the target air/fuel ratio. The step of detecting a parameter includes detecting an operating condition of the internal combustion engine. The step of setting model parameters includes setting model parameters of the controlled object model in accordance with the detected operating condition of the internal combustion engine. The step of calculating a control input includes calculating a predicted value of a value indicative of the output of the downstream air/fuel ratio sensor in accordance with the output of the downstream air/fuel ratio sensor, an output of an upstream air/fuel ratio sensor disposed at a location upstream of the catalyst in the exhaust passage of the internal combustion engine, and the target air/fuel ratio of the air/fuel mixture based on a prediction algorithm which applies the controlled object model; and calculating the target air/fuel ratio of the air/fuel mixture supplied to the internal combustion engine for converging the output of the downstream air/fuel ratio sensor to a predetermined target value in accordance with the calculated predicted value based on the one modulation algorithm.

This preferred embodiment of the control method provides the same advantageous effects provided by the corresponding preferred embodiment of the control apparatus.

Preferably, in the engine control unit described above, the controlled object comprises a downstream air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is the target air/fuel ratio of the air/fuel mixture supplied to the internal combustion engine. The controlled object model is a model representative of a relationship between the output of the downstream air/fuel ratio sensor and the target air/fuel ratio. The control program causes the computer to detect an operating condition of the internal combustion engine; set model parameters of the controlled object model in accordance with the detected operating condition of the internal combustion engine; calculate a predicted value of a value indicative of the output of the downstream air/fuel ratio sensor in accordance with the output of the downstream air/fuel ratio sensor, an output of an upstream air/fuel ratio sensor disposed at a location upstream of the catalyst in the exhaust passage of the internal combustion engine, and the target air/fuel ratio of the air/fuel mixture based on a prediction algorithm which applies the controlled object model; and calculate the target air/fuel ratio of the air/fuel mixture supplied to the internal combustion engine for converging the output of the downstream air/fuel ratio sensor to a predetermined target value in accordance with the calculated predicted value based on the one modulation algorithm.

This preferred embodiment of the engine control unit provides the same advantageous effects provided by the corresponding preferred embodiment of the control apparatus.

Preferably, in the control apparatus described above, the predicted value calculating means calculates a prediction time from the time at which the air fuel mixture is supplied to the internal combustion engine in the target air/fuel ratio to the time at which the target air/fuel ratio is reflected to the output of the downstream air/fuel ratio sensor, in accordance with an operating condition of the internal combustion engine, and calculates the predicted value further in accordance with the calculated prediction time.

According to this preferred embodiment of the control apparatus, the prediction time from the time at which the air/fuel mixture is supplied to the internal combustion engine in the target air/fuel ratio to the time at which the target air/fuel ratio is reflected to the output of the downstream air/fuel ratio sensor is calculated in accordance with the detected operating condition of the internal combustion engine, and the predicted value of the output deviation is calculated further in accordance with the calculated prediction time, so that the control apparatus can eliminate without fail a slippage in control timing between the input and output of the controlled object, caused by the dynamic characteristic of the controlled object, by calculating the control input using the predicted value calculated in this manner, thereby making it possible to further improve the post-catalyst exhaust gas characteristic. In addition, since the model parameters can be rapidly calculated, the control apparatus can rapidly ensure a satisfactory post-catalyst exhaust gas characteristic.

Preferably, in the control method described above, the step of calculating a predicted value includes calculating a prediction time from the time at which the air fuel mixture is supplied to the internal combustion engine in the target air/fuel ratio to the time at which the target air/fuel ratio is reflected to the output of the downstream air/fuel ratio sensor, in accordance with an operating condition of the internal combustion engine; and calculating the predicted value further in accordance with the calculated prediction time.

This preferred embodiment of the control method provides the same advantageous effects provided by the corresponding preferred embodiment of the control apparatus.

Preferably, in the engine control unit described above, the control program causes the computer to calculate a prediction time from the time at which the air fuel mixture is supplied to the internal combustion engine in the target air/fuel ratio to the time at which the target air/fuel ratio is reflected to the output of the downstream air/fuel ratio sensor, in accordance with an operating condition of the internal combustion engine; and calculate the predicted value further in accordance with the calculated prediction time.

This preferred embodiment of the engine control unit provides the same advantageous effects provided by the corresponding preferred embodiment of the control apparatus.

Preferably, in the control apparatus described above, the air/fuel ratio calculating means includes intermediate value calculating means for calculating an intermediate value of the target air/fuel ratio of the air/fuel mixture supplied to the internal combustion engine in accordance with the calculated predicted value based on the controlled object model and the one modulation algorithm; gain setting means for setting a gain in accordance with an operating condition of the internal combustion engine; and target air/fuel ratio calculating means for calculating the target air/fuel ratio of the air/fuel mixture supplied to the internal combustion engine for converging the output of the downstream air/fuel ratio sensor to a predetermined target value based on the calculated intermediate value multiplied by the set gain.

According to this preferred embodiment of the control apparatus, since the target air/fuel ratio of the air/fuel mixture is calculated based on the intermediate value calculated based on the one modulation algorithm, multiplied by the gain, and the gain is set in accordance with an operating condition, the target air/fuel ratio of the air/fuel mixture can be calculated as a value which appropriately reflects a change in the gain characteristic of the controlled object, thereby making it possible to further improve the post-catalyst exhaust gas characteristic. In addition, since the model parameters can be rapidly calculated, the control apparatus can rapidly ensure a satisfactory post-catalyst exhaust gas characteristic.

Preferably, in the control method described above, the step of calculating the target air/fuel ratio includes calculating an intermediate value of the target air/fuel ratio of the air/fuel mixture supplied to the internal combustion engine in accordance with the calculated predicted value based on the one modulation algorithm; setting a gain in accordance with an operating condition of the internal combustion engine; and calculating the target air/fuel ratio of the air/fuel mixture supplied to the internal combustion engine for converging the output of the downstream air/fuel ratio sensor to a predetermined target value based on the calculated intermediate value multiplied by the set gain.

This preferred embodiment of the control method provides the same advantageous effects provided by the corresponding preferred embodiment of the control apparatus.

Preferably, in the engine control unit described above, the control program causes the computer to calculate an intermediate value of the target air/fuel ratio of the air/fuel mixture supplied to the internal combustion engine in accordance with the calculated predicted value based on the one modulation algorithm; set a gain in accordance with an operating condition of the internal combustion engine; and calculate the target air/fuel ratio of the air/fuel mixture supplied to the internal combustion engine for converging the output of the downstream air/fuel ratio sensor to a predetermined target value based on the calculated intermediate value multiplied by the set gain.

This preferred embodiment of the engine control unit provides the same advantageous effects provided by the corresponding preferred embodiment of the control apparatus.

Preferably, the control apparatus described above further comprises multiplying means for multiplying the predicted value by a correction coefficient; and correction coefficient setting means for setting the correction coefficient to be a smaller value when the predicted value is equal to or larger than a predetermined value than when the predicted value is smaller than the predetermined value, wherein the air/fuel ratio calculating means calculates the target air/fuel ratio of the air/fuel mixture in accordance with the predicted value multiplied by the correction coefficient based on the one modulation algorithm.

According to this preferred embodiment of the control apparatus, the target air/fuel ratio of the air/fuel mixture is calculated in accordance with the predicted value of the output deviation multiplied by the correction coefficient, and the correction coefficient is set to a smaller value when the predicted value of the output deviation is equal to or larger than a predetermined value than when the predicted value of the output deviation is smaller than the predetermined value, so that the output of the downstream air/fuel ratio sensor can be converged at a different rate in accordance with the order of the predicted value of the output deviation with respect to the predetermined value. Therefore, for changing the air/fuel ratio to be leaner because of the predicted value of the output deviation being equal to or larger than zero, i.e., the output of the downstream air/fuel ratio sensor being larger than a target value when the predetermined value is set, for example to zero, the correction coefficient is set such that the output of the downstream air/fuel ratio sensor is converged at a lower rate than when the air/fuel ratio is changed to be richer, thereby providing the effect of suppressing the amount of exhausted NOx by a lean bias. On the other hand, when the air/fuel ratio is changed to be richer, the correction coefficient is set such that the output of the downstream air/fuel ratio sensor is converted at a higher rate than when the air/fuel ratio is changed to be leaner, thereby making it possible to sufficiently recover the NOX purifying rate of the catalyst. In addition, since the model parameters can be rapidly calculated, the control apparatus can rapidly ensure a satisfactory post-catalyst exhaust gas characteristic.

Preferably, the control method described above further comprises the steps of multiplying the predicted value by a correction coefficient; and setting the correction coefficient to be a smaller value when the predicted value is equal to or larger than a predetermined value than when the predicted value is smaller than the predetermined value, wherein the step of calculating the target air/fuel ratio calculating means includes calculating the target air/fuel ratio of the air/fuel mixture in accordance with the predicted value multiplied by the correction coefficient based on the one modulation algorithm.

This preferred embodiment of the control method provides the same advantageous effects provided by the corresponding preferred embodiment of the control apparatus.

Preferably, in the engine control unit described above, the control program further causes the computer to multiply the predicted value by a correction coefficient; set the correction coefficient to be a smaller value when the predicted value is equal to or larger than a predetermined value than when the predicted value is smaller than the predetermined value; and calculate the target air/fuel ratio of the air/fuel mixture in accordance with the predicted value multiplied by the correction coefficient based on the one modulation algorithm.

This preferred embodiment of the engine control unit provides the same advantageous effects provided by the corresponding preferred embodiment of the control apparatus.

Preferably, in the control apparatus described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is the target air/fuel ratio of the air/fuel mixture supplied to the internal combustion engine. The controlled object model is a model representative of a relationship between the output of the downstream air/fuel ratio sensor and the target air/fuel ratio. The parameter detecting means comprises operating condition detecting means for detecting an operating condition of the internal combustion engine. The model parameter setting means sets model parameters of the controlled object model in accordance with the detected operating condition of the internal combustion engine. The control input calculating means includes air/fuel ratio calculating means for calculating the target air/fuel ratio of the air/fuel mixture supplied to the internal combustion engine for converging the output of the downstream air/fuel ratio sensor to a predetermined target value based on the one modulation algorithm and the controlled object model.

According to this preferred embodiment of the control apparatus, since the model parameters are set in accordance with the detected operating condition of the internal combustion engine, the model parameters can be rapidly calculated, even when the operating condition of the internal combustion engine suddenly changes, while precisely reflecting exhaust gases supplied to the catalyst. In addition, since the target air/fuel ratio is calculated for the air/fuel mixture supplied to the internal combustion engine based on the controlled object model, the model parameters of which are calculated in this manner, and the one modulation algorithm, the output of the air/fuel ratio sensor can be rapidly converged to the predetermined target value. Consequently, the control apparatus can rapidly and appropriately correct a slippage in control timing of the air/fuel ratio control, caused by a response delay, a dead time, and the like of exhaust gases with respect to the air/fuel mixture supplied to the internal combustion engine, to improve the stability of the air/fuel ratio control, and the post-catalyst exhaust gas characteristic. Further, the control apparatus can be realized at a relatively low cost because it only requires a single air/fuel ratio sensor.

Preferably, in the control method described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is the target air/fuel ratio of the air/fuel mixture supplied to the internal combustion engine. The controlled object model is a model representative of a relationship between the output of the air/fuel ratio sensor and the target air/fuel ratio. The step of detecting a parameter includes detecting an operating condition of the internal combustion engine. The step of setting model parameters includes setting model parameters of the controlled object model in accordance with the detected operating condition of the internal combustion engine. The step of calculating a control includes calculating the target air/fuel ratio of the air/fuel mixture supplied to the internal combustion engine for converging the output of the air/fuel ratio sensor to a predetermined target value based on the one modulation algorithm and the controlled object model.

This preferred embodiment of the control method provides the same advantageous effects provided by the corresponding preferred embodiment of the control apparatus.

Preferably, in the engine control unit described above, the controlled object comprises an air/fuel ratio sensor disposed at a location downstream of a catalyst in an exhaust pipe of an internal combustion engine for detecting an air/fuel ratio of exhaust gases which have passed through the catalyst, and the output of the controlled object is an output of the downstream air/fuel ratio sensor. The control input to the controlled object is the target air/fuel ratio of the air/fuel mixture supplied to the internal combustion engine. The controlled object model is a model representative of a relationship between the output of the air/fuel ratio sensor and the target air/fuel ratio. The control program causes the computer to detect a parameter includes detecting an operating condition of the internal combustion engine; set model parameters of the controlled object model in accordance with the detected operating condition of the internal combustion engine; and calculate the target air/fuel ratio of the air/fuel mixture supplied to the internal combustion engine for converging the output of the air/fuel ratio sensor to a predetermined target value based on the one modulation algorithm and the controlled object model.

This preferred embodiment of the engine control unit provides the same advantageous effects provided by the corresponding preferred embodiment of the control apparatus.

Preferably, in the control apparatus described above, the air/fuel ratio calculating means includes predicted value calculating means for calculating a predicted value of a value indicative of the output of the air/fuel ratio sensor in accordance with the output of the air/fuel ratio sensor and the target air/fuel ratio based on a prediction algorithm which applies the controlled object model; and target air/fuel ratio calculating means for calculating the target air/fuel ratio of the air/fuel mixture supplied to the internal combustion engine in accordance with the calculated predicted value based on the one modulation algorithm.

According to this preferred embodiment of the control apparatus, the prediction time from the time at which the air/fuel mixture is supplied to the internal combustion engine in the target air/fuel ratio to the time at which the target air/fuel ratio is reflected to the output of the downstream air/fuel ratio sensor is calculated in accordance with the detected operating condition of the internal combustion engine, and the predicted value of the output deviation is calculated further in accordance with the calculated prediction time, so that the control apparatus can eliminate without fail a slippage in control timing between the input and output of the controlled object, caused by the dynamic characteristic of the controlled object, by calculating the control input using the predicted value calculated in this manner, thereby making it possible to further improve the post-catalyst exhaust gas characteristic. In addition, since the model parameters can be rapidly calculated, the control apparatus can rapidly ensure a satisfactory post-catalyst exhaust gas characteristic.

Preferably, in the control method described above, the step of calculating the target air/fuel ratio includes calculating a predicted value of a value indicative of the output of the air/fuel ratio sensor in accordance with the output of the air/fuel ratio sensor and the target air/fuel ratio based on a prediction algorithm which applies the controlled object model; and calculating the target air/fuel ratio of the air/fuel mixture supplied to the internal combustion engine in accordance with the calculated predicted value based on the one modulation algorithm.

This preferred embodiment of the control method provides the same advantageous effects provided by the corresponding preferred embodiment of the control apparatus.

Preferably, in the engine control unit described above, the control program causes the computer to calculate a predicted value of a value indicative of the output of the air/fuel ratio sensor in accordance with the output of the air/fuel ratio sensor and the target air/fuel ratio based on a prediction algorithm which applies the controlled object model; and calculate the target air/fuel ratio of the air/fuel mixture supplied to the internal combustion engine in accordance with the calculated predicted value based on the one modulation algorithm.

This preferred embodiment of the engine control unit provides the same advantageous effects provided by the corresponding preferred embodiment of the control apparatus.

Preferably, in the control apparatus described above, the predicted value calculating means calculates a prediction time from the time at which the air/fuel mixture is supplied to the internal combustion engine in the target air/fuel ratio to the time at which the target air/fuel ratio is reflected to the output of the air/fuel ratio sensor in accordance with an operating condition of the internal combustion engine, and calculates a predicted value of a value indicative of the output of the air/fuel ratio sensor further in accordance with the calculated prediction time.

According to this preferred embodiment of the control apparatus, since the target air/fuel ratio of the air/fuel mixture is calculated based on the intermediate value calculated based on the one modulation algorithm, multiplied by the gain, and the gain is set in accordance with an operating condition, the target air/fuel ratio of the air/fuel mixture can be calculated as a value which appropriately reflects a change in the gain characteristic of the controlled object, thereby making it possible to further improve the post-catalyst exhaust gas characteristic. In addition, since the model parameters can be rapidly calculated, the control apparatus can rapidly ensure a satisfactory post-catalyst exhaust gas characteristic.

Preferably, in the control method described above, the step of calculating a predicted value includes calculating a prediction time from the time at which the air/fuel mixture is supplied to the internal combustion engine in the target air/fuel ratio to the time at which the target air/fuel ratio is reflected to the output of the air/fuel ratio sensor in accordance with an operating condition of the internal combustion engine; and calculating a predicted value of a value indicative of the output of the air/fuel ratio sensor further in accordance with the calculated prediction time.

This preferred embodiment of the control method provides the same advantageous effects provided by the corresponding preferred embodiment of the control apparatus.

Preferably, in the engine control unit described above, the control program causes the computer to calculate a prediction time from the time at which the air/fuel mixture is supplied to the internal combustion engine in the target air/fuel ratio to the time at which the target air/fuel ratio is reflected to the output of the air/fuel ratio sensor in accordance with an operating condition of the internal combustion engine; and calculate a predicted value of a value indicative of the output of the air/fuel ratio sensor further in accordance with the calculated prediction time.

This preferred embodiment of the engine control unit provides the same advantageous effects provided by the corresponding preferred embodiment of the control apparatus.

Preferably, in the control apparatus described above, the target air/fuel ratio calculating means includes intermediate value calculating means for calculating an intermediate value of the target air/fuel ratio of the air/fuel mixture supplied to the internal combustion engine in accordance with the predicted value based on the controlled object model and the one modulation algorithm; gain setting means for setting a gain in accordance with the operating condition of the internal combustion engine; and target air/fuel ratio determining means for determining a target air/fuel ratio of the air/fuel mixture supplied to the internal combustion engine based on the calculated intermediate value multiplied by the set gain.

According to this preferred embodiment of the control apparatus, the prediction time from the time at which the air/fuel mixture is supplied to the internal combustion engine in the target air/fuel ratio to the time at which the target air/fuel ratio is reflected to the output of the downstream air/fuel ratio sensor is calculated in accordance with the detected operating condition of the internal combustion engine, and the predicted value of the output deviation is calculated further in accordance with the calculated prediction time, so that the control apparatus can eliminate without fail a slippage in control timing between the input and output of the controlled object, caused by the dynamic characteristic of the controlled object, by calculating the control input using the predicted value calculated in this manner, thereby making it possible to further improve the post-catalyst exhaust gas characteristic. In addition, since the model parameters can be rapidly calculated, the control apparatus can rapidly ensure a satisfactory post-catalyst exhaust gas characteristic.

Preferably, in the control method described above, the step of calculating the target air/fuel ratio includes calculating an intermediate value of the target air/fuel ratio of the air/fuel mixture supplied to the internal combustion engine in accordance with the predicted value based the one modulation algorithm; setting a gain in accordance with the operating condition of the internal combustion engine; and determining a target air/fuel ratio of the air/fuel mixture supplied to the internal combustion engine based on the calculated intermediate value multiplied by the set gain.

This preferred embodiment of the control method provides the same advantageous effects provided by the corresponding preferred embodiment of the control apparatus.

Preferably, in the engine control unit described above, the control program causes the computer to calculate an intermediate value of the target air/fuel ratio of the air/fuel mixture supplied to the internal combustion engine in accordance with the predicted value based the one modulation algorithm; set a gain in accordance with the operating condition of the internal combustion engine; and determine a target air/fuel ratio of the air/fuel mixture supplied to the internal combustion engine based on the calculated intermediate value multiplied by the set gain.

This preferred embodiment of the engine control unit provides the same advantageous effects provided by the corresponding preferred embodiment of the control apparatus.

Preferably, the control apparatus described above further comprises multiplying means for multiplying the predicted value by a correction coefficient; and correction coefficient setting means for setting the correction coefficient to be a smaller value when the predicted value is equal to or larger than a predetermined value than when the predicted value is smaller than the predetermined value, wherein the target air/fuel ratio calculating means calculates the target air/fuel ratio of the air/fuel mixture in accordance with the predicted value multiplied by the correction coefficient based on the one modulation algorithm.

According to this preferred embodiment of the control apparatus, the target air/fuel ratio of the air/fuel mixture is calculated in accordance with the predicted value of the output deviation multiplied by the correction coefficient, and the correction coefficient is set to a smaller value when the predicted value of the output deviation is equal to or larger than a predetermined value than when the predicted value of the output deviation is smaller than the predetermined value, so that the output of the downstream air/fuel ratio sensor can be converged at a different rate in accordance with the order of the predicted value of the output deviation with respect to the predetermined value. Therefore, for changing the air/fuel ratio to be leaner because of the predicted value of the output deviation being equal to or larger than zero, i.e., the output of the downstream air/fuel ratio sensor being larger than a target value when the predetermined value is set, for example to zero, the correction coefficient is set such that the output of the downstream air/fuel ratio sensor is converged at a lower rate than when the air/fuel ratio is changed to be richer, thereby providing the effect of suppressing the amount of exhausted NOx by a lean bias. On the other hand, when the air/fuel ratio is changed to be richer, the correction coefficient is set such that the output of the downstream air/fuel ratio sensor is converted at a higher rate than when the air/fuel ratio is changed to be leaner, thereby making it possible to sufficiently recover the NOX purifying rate of the catalyst. In addition, since the model parameters can be rapidly calculated, the control apparatus can rapidly ensure a satisfactory post-catalyst exhaust gas characteristic.

Preferably, the control method described above further comprises the steps of multiplying the predicted value by a correction coefficient; and setting the correction coefficient to be a smaller value when the predicted value is equal to or larger than a predetermined value than when the predicted value is smaller than the predetermined value, wherein the step of calculating the target air/fuel ratio includes calculating the target air/fuel ratio of the air/fuel mixture in accordance with the predicted value multiplied by the correction coefficient based on the one modulation algorithm.

This preferred embodiment of the control method provides the same advantageous effects provided by the corresponding preferred embodiment of the control apparatus.

Preferably, in the engine control unit described above, the control program further causes the computer to multiply the predicted value by a correction coefficient; set the correction coefficient to be a smaller value when the predicted value is equal to or larger than a predetermined value than when the predicted value is smaller than the predetermined value; and calculate the target air/fuel ratio of the air/fuel mixture in accordance with the predicted value multiplied by the correction coefficient based on the one modulation algorithm.

This preferred embodiment of the engine control unit provides the same advantageous effects provided by the corresponding preferred embodiment of the control apparatus.

BRIEF DESCRIPTION OF THE DRAWINGS

FIG. 1 is a block diagram generally illustrating a control apparatus according to a first embodiment of the present invention, and an internal combustion engine to which the control apparatus is applied;

FIG. 2 is a graph showing an exemplary result of measurements made for HC and NOx purification percentages of a first catalyzer and an output Vout of an O2 sensor 15, with respect to an output KACT of an LAF sensor, when a deteriorated and a normal first catalyzer are used;

FIG. 3 is a block diagram illustrating the configuration of an ADSM controller and a PRISM controller in the control apparatus according to the first embodiment;

FIG. 4 shows exemplary equations which express a prediction algorithm associated with a state predictor;

FIG. 5 shows exemplary equations which express an identification algorithm associated with an on-board identifier;

FIG. 6 shows other exemplary equations which express an identification algorithm associated with the on-board identifier;

FIG. 7 is a block diagram illustrating the configuration of a controller which executes and ΔΣ modulation, and a control system which comprises the controller;

FIG. 8 is a timing chart showing an exemplary result of control conducted by the control system in FIG. 7;

FIG. 9 is a timing chart for explaining the principles of an adaptive prediction type ΔΣ modulation control conducted by the ADSM controller in the first embodiment;

FIG. 10 is a block diagram illustrating the configuration of a DSM controller in the ADSM controller;

FIG. 11 shows equations which express a sliding mode control algorithm;

FIG. 12 shows equations which express a sliding mode control algorithm for the PRISM controller;

FIGS. 14 and 15 are flow charts illustrating in combination a routine for executing adaptive air/fuel ratio control processing;

FIG. 18 is a flow chart illustrating a routine for executing the processing for determining whether or not the identifier should execute its operation at step 24 in FIG. 14;

FIG. 22 shows an exemplary table for use in calculating limit values X_IDA2L, X_IDB1L, X_IDB1H for limiting ranges of model parameters a1, a2, b1;

FIG. 23 shows an exemplary table for use in calculating a filter order n;

FIG. 25 is a flow chart illustrating a routine for executing θ(k) stabilization processing at step 94 in FIG. 24;

FIG. 31 is a flow chart illustrating a routine for executing the processing for calculating an integrated value of a prediction switching function σPRE;

FIGS. 32 and 33 are flow charts illustrating in combination a routine for executing the processing for calculating a sliding mode control amount DKCMDSLD at step 36 in FIG. 15;

FIG. 34 is a flow chart illustrating a routine for executing the processing for calculating a ΔΣ modulation control amount DKCMDDSM at step 37 in FIG. 15;

FIG. 35 shows an exemplary table for use in calculating a gain KDSM;

FIG. 37 is a flow chart illustrating a routine for executing the processing for calculating an adaptive correction term FLAFADP at step 39 in FIG. 15;

FIG. 38 is a block diagram generally illustrating the configuration of a control apparatus according to a second embodiment;

FIG. 39 is a block diagram generally illustrating the configuration of a control apparatus according to a third embodiment;

FIG. 40 is a block diagram generally illustrating the configuration of a control apparatus according to a fourth embodiment;

FIG. 41 shows an exemplary table for use in calculating model parameters in a parameter scheduler in the control apparatus according to the fourth embodiment;

FIG. 43 is a block diagram generally illustrating the configuration of an DM controller in a control apparatus according to a sixth embodiment;

DETAILED DESCRIPTION OF THE EMBODIMENTS

Figure 13:
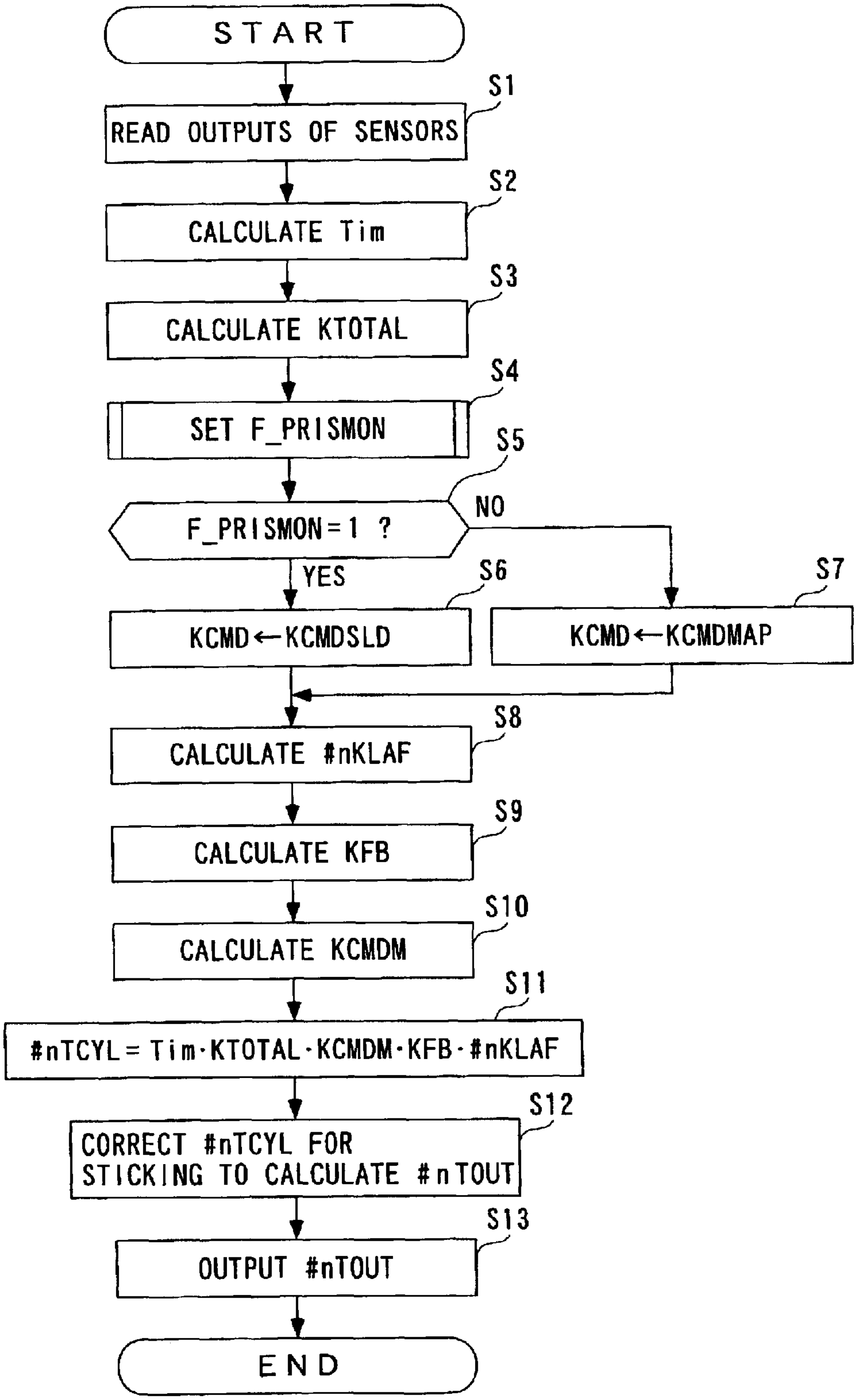
FIG. 13 is a flow chart illustrating a routine for executing fuel injection control processing for an internal combustion engine.

In the following, a control apparatus according to a first embodiment of the present invention will be described with reference to the accompanying drawings. The control apparatus according to the first embodiment is configured to control, by way of example, an air/fuel ratio of an internal combustion engine. FIG. 1 generally illustrates the configuration of the control apparatus 1 and an internal combustion engine (hereinafter called the "engine") 3 which applies the control apparatus 1. As illustrated, the control apparatus 1 comprises an electronic control unit (ECU) 2 which controls the air/fuel ratio of an air/fuel mixture supplied to the engine 3 in accordance with an operating condition thereof.

The engine is an in-line four-cylinder gasoline engine equipped in a vehicle, not shown, and has four, a first to a fourth cylinder #1–#4. A throttle valve opening sensor 10, for example, comprised of a potentiometer or the like, is provided near a throttle valve 5 in an intake pipe 4 of the engine 3. The throttle valve opening sensor 10 detects an opening θTH of the throttle valve 5 (hereinafter called the "throttle valve opening"), and sends a detection signal indicative of the throttle valve opening θTH to the ECU 2.

An absolute intake pipe inner pressure sensor 11 is further provided at a location of the intake pipe 4 downstream of the throttle valve 5. The absolute intake pipe inner pressure sensor 11, which implements gain parameter detecting means, operating condition detecting means, and dynamic characteristic parameter detecting means, is comprised, for example, of a semiconductor pressure sensor or the like for detecting an absolute intake pipe inner pressure PBA within the intake pipe 4 to output a detection signal indicative of the absolute intake pipe inner pressure PBA to the ECU 2.

The intake pipe 4 is connected to the four cylinders #1–#4, respectively, through four branches **4*b* of an intake manifold 4*a*. An injector 6 is attached to each of the branches 4*b* at a location upstream of an intake port, not shown. Each injector 6 is controlled by a driving signal from the ECU 2 in terms of a final fuel injection amount TOUT, which indicates a valve opening time, and an injection timing when the engine 3** is in operation.

A water temperature sensor 12 comprised, for example, of a thermistor or the like is attached to the body of the engine 3. The water temperature sensor 12 detects an engine water temperature TW, which is the temperature of cooling water that circulates within a cylinder block of the engine 3, and outputs a detection signal indicative of the engine water temperature TW to the ECU 2.

A crank angle sensor 13 is mounted on a crank shaft (not shown) of the engine 3. The crank angle sensor 13, which implements gain parameter detecting means, operating condition detecting means, and dynamic characteristic parameter detecting means, outputs a CRK signal and a TDC signal, both of which are(pulse signals, to the ECU 2 as the crank shaft is rotated.

The CRK signal generates one pulse every predetermined crank angle (for example, 30°). The ECU 2 calculates a rotational speed NE of the engine 3 (hereinafter called the "engine rotational speed") in response to the CRK signal. The TDC signal in turn indicates that a piston (not shown) of each cylinder is present at a predetermined crank angle position which is slightly in front of a TDC (top dead center) position in an intake stroke, and generates one pulse every predetermined crank angle.

At locations downstream of an exhaust manifold 7*a* in an exhaust pipe (exhaust passage), a first and a second catalyzer 8*a*, 8*b* (catalysts) are provided in this order from the upstream side, spaced apart from each other. Each catalyzer 8*a*, 8*b* is a combination of an NOx catalyst and a three-way catalyst. The NOx catalyst is made up of an iridium catalyst (a sintered product of iridium supported on silicon carbide whisker powder, and silica) coated on the surface of a base material in honeycomb structure, and a perovskite double oxide (a sintered product of $LaCoO_3$ powder and silica) coated on the iridium catalyst. The catalyzers 8*a*, 8*b* purify NOx in exhaust gases during a lean burn operation through oxidation/reduction actions of the NOx catalyst, and purify CO, HC and NOx in exhaust gases during an operation other than the lean burn operation through oxidation/reduction actions of the three-way catalyst. It should be noted that the catalyzers 8 are not limited to a combination of NOx catalyst and three-way catalyst, but may be made of any material as long as it can purify CO, HC and NOx in exhaust gases. For example, the catalyzers 8*a*, 8*b* may be made of a non-metal catalyst such as a perovskite catalyst and the like, and/or a metal-based catalyst such as a three-way catalyst and the like.

An oxygen concentration sensor (hereinafter called the "O2 sensor) 15 is mounted between the first and second catalyzers 8*a*, 8*b*. The O2 sensor 15 (which implements a downstream air/fuel ratio sensor) is made of zirconium, a platinum electrode, and the like, and sends an output Vout to the ECU 2 based on the oxygen concentration in exhaust gases downstream of the first catalyzer 8*a*. The output Vout of the O2 sensor 15 (output of a controlled object) goes to a voltage value at high level (for example, 0.8 V) when an air/fuel mixture richer than the stoichiometric air/fuel ratio is burnt, and goes to a voltage value at low level (for example, 0.2 V) when the air/fuel mixture is lean. Also, the output Vout goes to a predetermined target value Vop (for example, 0.6 V) when the air/fuel mixture is near the stoichiometric air/fuel ratio (see FIG. 2).

An LAF sensor 14 (which implements an upstream air/fuel ratio sensor) is mounted near a junction of the exhaust manifold 7*a* upstream of the first catalyzer 8*a*. The LAF sensor 14 is comprised of a sensor similar to the O2 sensor 15, and a detecting circuit such as a linearizer in combination for linearly detecting an oxygen concentration in exhaust gases over a wide range of the air/fuel ratio extending from a rich region to a lean region to send an output KACT proportional to the detected oxygen concentration to the ECU 2. The output KACT is represented as an equivalent ratio proportional to an inverse of the air/fuel ratio.

Next, referring to FIG. 2, description will be made on the relationship between an exhaust gas purifying percentage provided by the first catalyzer 8*a* and the output Vout (voltage value) of the O2 sensor 15. FIG. 2 shows exemplary results of measuring the HC and NOx purifying percentage provided by the first catalyzer 8*a* and the output Vout of the O2 sensor 15 when the output KACT of the LAF sensor 14, i.e., the air/fuel ratio of an air/fuel mixture supplied to the engine 3 varies near the stoichiometric air/fuel ratio, for two cases where the first catalyzer 8*a* is deteriorated due to a long-term use and therefore has degraded capabilities of purifying, and where the first catalyzer 8*a* is not deteriorated and therefore has high capabilities of purifying. In FIG. 2, data indicated by broken lines show the results of measurements when the first catalyzer 8*a* is not deteriorated, and data indicated by solid lines show the results of measurements when the first catalyzer 8*a* is deteriorated. FIG. 2 also shows that the air/fuel ratio of the air/fuel mixture is richer as the output KACT of the LAF sensor 14 is larger.

As shown in FIG. 2, when the first catalyzer 8*a* is deteriorated, its capabilities of purifying exhaust gases are degraded, as compared with the one not deteriorated, so that the output Vout of the O2 sensor 15 crosses the target value Vop when the output KACT of the LAF sensor 14 is at a value KACT1 deeper in a lean region. On the other hand, the first catalyzer 8*a* has the characteristic of most efficiently purifying HC and NOx when the output Vout of the O2 sensor 15 is at the target value Vop, irrespective of whether the first catalyzer 8*a* is deteriorated or not. It is therefore appreciated that exhaust gases can be most efficiently purified by the first catalyzer 8*a* by controlling the air/fuel ratio of the air/fuel mixture to bring the output Vout of the O2 sensor 15 to the target value Vop. For this reason, in the air/fuel control later described, a target air/fuel ratio KCMD is controlled such that the output Vout of the O2 sensor 15 converges to the target value Vop.

The ECU 2 is further connected to an accelerator opening sensor 16, an atmospheric pressure sensor 17, an intake air temperature sensor 18, a vehicle speed sensor 19, and the like. The accelerator opening sensor 16 detects an amount AP by which the driver treads on an accelerating pedal, not shown, of the vehicle (hereinafter called the "accelerator opening"), and outputs a detection signal indicative of the accelerator opening AP to the ECU 2. Likewise, the atmospheric pressure sensor 17, intake air temperature sensor 18 and vehicle speed sensor 19 detect the atmospheric pressure PA, an intake air temperature TA, and a vehicle speed VP, respectively, and output detection signals indicative of the respective detected values to the ECU 2.

Next, description will be made on the ECU 2 which implements predicted value calculating means, control input calculating means, gain parameter detecting means, gain setting means, air/fuel ratio calculating means, operating state detecting means, an intermediate value calculating means, target air/fuel ratio calculating means, multiplying means, correction coefficient setting means, identifying means, identification error calculating means, filtering means, parameter determining means, dead time setting means, restriction range setting means, weighting parameter setting means, dynamic characteristic parameter detecting means, and model parameter setting means.

The ECU 2, based on a microcomputer which comprises an I/O interface, a CPU, a RAM, a ROM, and the like, determines an operating condition of the engine 3 in accordance with the outputs of the variety of sensors 10–19 mentioned above, and calculates the target air/fuel ratio KCMD (control input) by executing adaptive air/fuel ratio control processing or map search processing, later described, in accordance with a control program previously stored in the ROM and data stored in the RAM. Further, as will be described later, the ECU 2 calculates the final fuel injection amount TOUT of the injector 6 for each cylinder based on the calculated target air/fuel ratio KCMD, and drives the injector 6 using a driving signal based on the calculated final fuel injection amount TOUT to control the air/fuel ratio of the air/fuel mixture.

As illustrated in FIG. 3, the control apparatus 1 comprises an ADSM controller 20 for calculating the target air/fuel ratio KCMD, and a PRISM controller 21. Specifically, both controllers 20, 21 are implemented by the ECU 2.

In the following, the ADSM controller 20 (which implements control input calculating means) will be described. The ADSM controller 20 calculates the target air/fuel ratio KCMD for converging the output Vout of the O2 sensor 15 to the target value Vop in accordance with a control algorithm of adaptive prediction ΔΣ modulation control (hereinafter abbreviated as "ADSM"), later described. The ADSM controller 20 comprises a state predictor 22, an on-board identifier 23, and a DSM controller 24. A specific program for executing the ADSM processing will be described later.

Description will first be made on the state predictor 22 (which implements predicted value calculating means). The state predictor 22 predicts (calculates) a predicted value PREVO2 of an output deviation VO2 in accordance with a prediction algorithm, later described. Assume, in this embodiment, that a control input to a controlled object is the target air/fuel ratio KCMD of an air/fuel mixture; the output of the controlled object is the output Vout of the O2 sensor 15; and the controlled object is a system from an intake system of the engine 3 including the injectors 6 to the O2 sensor 15 downstream of the first catalyzer 8*a* in an exhaust system including the first catalyzer 8*a*. Then, this controlled object is modelled, as expressed by the following equation (1), as an ARX model (auto-regressive model with exogenous input) which is a discrete time system model.

$$V02(k)=a1\cdot V02(k-1)+a2\cdot VO2(K-2)+b1DKCMD(k-dt) \tag{1}$$

where VO2 represents an output deviation which is a deviation (Vout-Vop) between the output Vout of the O2 sensor 15 and the aforementioned target value Vop; DKCMD represents an air/fuel ratio deviation which is a deviation (KCMD-FLAFBASE) between a target air/fuel ratio KCMD (=φop) and a reference value FLAFBASE; and a character k represents the order of each data in a sampling cycle. The reference value FLAFBASE is set to a predetermined fixed value. Model parameters a1, a2, b1 are sequentially identified by the on-board identifier 23 in a manner described below.

dt in the equation (1) represents a prediction time period from the time at which an air/fuel mixture set at the target air/fuel ratio KCMD is supplied to the intake system by the injectors 6 to the time at which the target air/fuel ratio KCMD is reflected to the output Vout of the O2 sensor 15, and is defined by the following equation (2):

$$dt=d+d'+dd \tag{2}$$

where d represents a dead time in the exhaust system from the LAF sensor 14 to the O2 sensor 15; d', a dead time in an air/fuel ratio manipulation system from the injectors 6 to the LAF sensor 14; and dd represents a phase delay time between the exhaust system and air/fuel ratio manipulation system, respectively (it should be noted that in a control program for the adaptive air/fuel ratio control processing, later described, the phase delay time dd is set to zero (dd=0) for calculating the target air/fuel ratio KCMD while switching between the ADSM processing and PRISM processing).

The controlled object model is comprised of time series data of the output deviation VO2 and the air/fuel ratio deviation DKCMD as described above for the reason set forth below. It is generally known in a controlled object model that the dynamic characteristic of the controlled object model can be fitted more closely to the actual dynamic characteristic of the controlled object when a deviation of input/output between the controlled object and a predetermined value is defined as a variable representative of the input/output than when an absolute value of the input/output is defined as a variable, because it can more precisely identify or define model parameters. Therefore, as is done in the control apparatus 1 of this embodiment, when the controlled object model is comprised of the time series data of the output deviation VO2 and the air/fuel ratio deviation DKCMD, the dynamic characteristic of the controlled object model can be fitted more closely to the actual dynamic characteristic of the controlled object, as compared with the case where absolute values of the output Vout of the O2 sensor 15 and target air/fuel ratio KCMD are chosen as variables, thereby making it possible to calculate the predicted value PREVO2 with a higher accuracy.

The predicted value PREVO2 in turn shows a predicted output deviation VO2(k+dt) after the lapse of the prediction time period dt from the time at which the air/fuel mixture set at the target air/fuel ratio KCMD has been supplied to the intake system. When an equation for calculating the predicted value PREVO2 is derived based on the aforementioned equation (1), the following equation (3) is defined:

$$\begin{aligned} PREVO2(k) &\approx VO2(k+dt) \\ &= a1\cdot VO2(k+dt-1)+ \\ &\quad a2\cdot VO2(k+dt-2)+b1\cdot DKCMD(k) \end{aligned} \tag{3}$$

In this equation (3), it is necessary to calculate VO2(k+dt−1), VO2(k+dt−2) corresponding to future values of the output deviation VO2 (k), so that actual programming of the equation (3) is difficult. Therefore, matrixes A, B are defined using the model parameters a1, a2, b1, as equations (4), (5) shown in FIG. 4, and a recurrence formula of the equation (3) is repeatedly used to transform the equation (3) to derive equation (6) shown in FIG. 4. When the equation (6) is used as a prediction algorithm, i.e., an equation for calculating the predicted value PREVO2, the predicted value PREVO2 is calculated from the output deviation VO2 and air/fuel ratio deviation DKCMD.

Next, when an LAF output deviation DKACT is defined as a deviation (KACT-FLAFBASE) between the output KACT (=φin) of the LAF sensor 14 and the reference value FLAFBASE, a relationship expressed by DKACT(k)=DKCMD(k−d') is established. Equation (7) shown in FIG. 4 is derived by applying this relationship to the equation (6) in FIG. 4.

The target air/fuel ratio KCMD can be calculated while appropriately compensating for a response delay and a dead time between the input/output of the controlled object by calculating the target air/fuel ratio KCMD using the predicted value PREVO2 calculated by the foregoing equation (6) or (7), as will be described later. Particularly, when the equation (7) is used as the prediction algorithm, the predicted value PREVO2 is calculated from the LAF output deviation DKACT and target air/fuel ratio KCMD, so that the predicted value PREVO2 can be calculated as a value which reflects the air/fuel ratio of exhaust gases actually supplied to the first catalyzer 8*a*, thereby improving the calculation accuracy, i.e., the prediction accuracy more than when the equation (6) is used. Also, if d' can be regarded to be smaller than 1 ($d' \leqq 1$) when the equation (7) is used, the predicted value PREVO2 can be calculated only from the output deviation VO2 and LAF output deviation DKACT without using the air/fuel ratio deviation DKCMD. In this embodiment, since the engine 3 is provided with the LAF sensor 14, the equation (7) is employed as the prediction algorithm.

The controlled object model expressed by the equation (1) can be defined as a model which employs the output deviation VO2 and LAF output deviation DKACT as variables by applying a relationship expressed by DKACT(k)=DKCMD(k−d') to the equation (1).

Next, description will be made on the on-board identifier 23 (which implements identifying means, identification error calculating means, filtering means, dead time setting means, restriction range setting means, weighting parameter setting means, and parameter determining means) . The on-board identifier 23 identifies (calculates) the model parameters a1, a2, b1 in the aforementioned equation (1) in accordance with a sequential identification algorithm described below. Specifically, a vector θ(k) for model parameters is calculated by equations (8), (9) shown in FIG. 5. In the equation (8) in FIG. 5, KP(k) is a vector for a gain coefficient, and ide_f(k) is an identification error filter value. In the equation (9), θ(k)T represents a transposed matrix of θ(k), and a1'(k), a2'(k) and b1'(k) represent model parameters before they are limited in range in limit processing, later described. In the following description, the term "vector" is omitted if possible.

An identification error filter value ide_f(k) in the equation (8) is derived by applying moving average filtering processing expressed by equation (10) in FIG. 5 to an identification error ide(k) calculated by equations (11)–(13) shown in FIG. 5. n in the equation (10) in FIG. 5 represents the order of filtering (an integer equal to or larger than one) in the moving average filtering processing, and VO2HAT(k) in the equation (12) represents an identified value of the output deviation VO2.

The identification error filter value ide_f(k) is used for the reason set forth below. Specifically, the controlled object in this embodiment has the target air/fuel ratio KCMD as a control input, and the output Vout of the O2 sensor 15 as an output. The controlled object also has a low pass frequency characteristic. In such a controlled object having the low pass characteristic, model parameters are identified while the high frequency characteristic of the controlled object is emphasized due to a frequency weighting characteristic of the identification algorithm of the on-board identifier 23, more specifically, a weighted least-square algorithm, later described, so that the controlled object model tends to have a lower gain characteristic than the actual gain characteristic of the controlled object. As a result, when the ADSM processing or PRISM processing is executed by the control apparatus 1, the control system can diverge and therefore become instable due to an excessive gain possibly resulting from the processing.

Therefore, in this embodiment, the control apparatus 1 appropriately corrects the weighted least-square algorithm for the frequency weighting characteristic, and uses the identification error filter value ide_f(k) applied with the moving average filtering processing for the identification error ide(k), as well as sets the filter order n of the moving average filtering processing in accordance with an exhaust gas volume AB_SV in order to match the gain characteristic of the controlled object model with the actual gain characteristic of the controlled object, as will be later described.

Further, the vector KP(k) for the gain coefficient in the equation (8) in FIG. 5 is calculated by equation (14) in FIG. 5. P(k) in the equation 14 is a third-order square matrix as defined by equation (15) in FIG. 5.

In the identification algorithm described above, one is selected from the following four identification algorithms by setting weighting parameters λ1, λ2 in the equation (15):

λ1=1, λ2=0: Fixed Gain Algorithm;

λ1=1, λ2=1: Least-Square Algorithm;

λ1=1, λ2=λ: Gradually Reduced Gain Algorithm; and

λ1=λ, λ2=1: Weighted Least-Square Algorithm.

where λ is a predetermined value set in a range of $0<\lambda<1$.

This embodiment employs the weighted least-square algorithm from among the four identification algorithms. This is because the weighted least-square algorithm can appropriately set an identification accuracy, and a rate at which a model parameter converges to an optimal value, by setting the weighting parameter λ1 in accordance with an operating condition of the engine 3, more specifically, the exhaust gas volume AB_SV. For example, when the engine 3 is lightly loaded in operation, a high identification accuracy can be ensured by setting the weighting parameter λ1 to a value close to one in accordance with this operating condition, i.e., by setting the algorithm close to the least-square algorithm. On the other hand, when the engine 3 is heavily loaded in operation, the model parameter can be rapidly converged to an optimal value by setting the weighting parameter λ1 to a value smaller than that during the low load operation. By setting the weighting parameter λ1 in accordance with the exhaust gas volume AB_SV in the foregoing manner, it is possible to appropriately set the identification accuracy, and the rate at which the model parameter converges to an optimal value, thereby improving the post-catalyst exhaust gas characteristic.

When the aforementioned relationship, DKACT(k)=DKCMD(k−d') is applied in the identification algorithm expressed by the equations (8)–(15), an identification algorithm is derived as expressed by equations (16)–(23) shown in FIG. 6. In this embodiment, since the engine 3 is provided with the LAF sensor 14, these equations (16)–(23) are employed. When these equations (16)–(23) are employed, the model parameter can be identified as a value which more reflects the air/fuel ratio of exhaust gases actually fed to the first catalyzer 8*a* to a higher degree, for the reason set forth above, and accordingly, the model parameter can be identified with a higher accuracy than when using the identification algorithm expressed by the equations (8)–(15).

Also, the on-board identifier 23 applies the limit processing, later described, to the model parameters a1'(k), a2'(k), b1'(k) calculated by the foregoing identification algorithm to calculate the model parameters a1(k), a2(k), b1(k). Further, the aforementioned state predictor 22 calculates the predicted value PREVO2 based on the model parameters a1(k), a2(k), b1(k) after they have been limited in range in the limit processing.

Next, the DSM controller 24 will be described. The DSM controller 24 generates (calculates) the control input ϕop(k) (=target air/fuel ratio KCMD) in accordance with a control algorithm applied with the ΔΣ modulation algorithm, based on the predicted value PREVO2 calculated by the state predictor 22, and inputs the calculated control input ϕop(k) to the controlled object to control the output Vout of the O2 sensor 15, as the output of the controlled object, such that it converges to the target value Vop.

First, a general ΔΣ modulation algorithm will be described with reference to FIG. 7. FIG. 7 illustrates the configuration of a control system which controls a controlled object 27 by a controller 26 to which the ΔΣ modulation algorithm is applied. As illustrated, in the controller 26, a subtractor 26*a* generates a deviation signal δ(k) as a deviation between a reference signal r(k) and a DSM signal u(k−1) delayed by a delay element 26*b*. Next, an integrator 26*c* generates an integrated deviation value $\sigma_d(k)$ as a signal indicative of the sum of the deviation signal δ(k) and an integrated deviation value $\sigma_d(k-1)$ delayed by a delay element 26*d*. Next, a quantizer 26*e* (sign function) generates a DSM signal u(k) as a sign of the integrated deviation value $\sigma_d(k)$ . Consequently, the DSM signal u(k) thus generated is inputted to the controlled object 27 which responsively delivers an output signal y(k).

The foregoing ΔΣ modulation algorithm is expressed by the following equations (24)–(26):

$$\delta(k)=r(k)-u(k-1) \tag{24}$$

$$\sigma_d(k)=\sigma_d(k-1)+\delta(k) \tag{25}$$

$$u(k)=sgn(\sigma_d(k)) \tag{26}$$

where the value of the sign function $sgn(\sigma_d(k))$ takes 1 ($sgn(\sigma_d(k))=1$) when $\sigma_d(k)\geqq 0$, and −1 ($sgn(\sigma_d(k))=-1$) when $\sigma_d(k)<0$ ($sgn(\sigma_d(k))$ may be set to zero ($sgn(\sigma_d(k))=0$) when $\sigma_d(k)=0$).

FIG. 8 shows the result of control simulation performed for the foregoing control system. As shown, when the sinusoidal reference signal r(k) is inputted to the control system, the DSM signal u(k) is generated as a square-wave signal and is fed to the controlled object 27 which responsively outputs the output signal y(k) which has a different amplitude from and the same frequency as the reference signal r(k), and is generally in a similar waveform though noise is included. As described, the ΔΣ modulation algorithm is characterized in that the DSM signal u(k) can be generated when the controlled object 27 is fed with the DSM signal u(k) generated from the reference signal r(k) such that the controlled object 27 generates the output y(k) which has a different amplitude from and the same frequency as the reference signal r(k) and is generally similar in waveform to the reference signal r(k). In other words, the ΔΣ modulation algorithm is characterized in that the DSM signal u(k) can be generated (calculated) such that the reference signal r(k) is reproduced in the actual output y(k) of the controlled object 27.

The DSM controller 24 takes advantage of such characteristic of the ΔΣ modulation algorithm to calculate the control input ϕop(k) for converging the output Vout of the O2 sensor 15 to the target value Vop. Describing the principles of the calculation, when the output deviation VO2 fluctuates with respect to the value of zero, for example, as indicated by a one-dot chain line in FIG. 9 (i.e., the output Vout of the O2 sensor 15 fluctuates with respect to the target value Vop), the control input ϕop(k) may be generated to produce an output deviation VO2* having an opposite phase waveform to cancel the output deviation VO2 as indicated by a broken line in FIG. 9, in order to converge the output deviation VO2 to zero (i.e., to converge the output Vout to the target value Vop).

However, as described above, the controlled object in this embodiment experiences a time delay equal to the prediction time period dt from the time at which the target air/fuel ratio KCMD is inputted to the controlled object as the control input ϕop(k) to the time at which it is reflected to the output Vout of the O2 sensor 15. Therefore, an output deviation VO2# derived when the control input ϕop(k) is calculated based on the current output deviation VO2 delays from the output deviation V02*, as indicated by a solid line in FIG. 9, thereby causing a slippage in control timing. To compensate the control timing for the slippage, the DSM controller 24 in the ADSM controller 20 according to this embodiment employs the predicted value PREVO2 of the output deviation VO2 to generate the control input ϕop(k) as a signal which generates an output deviation (an output deviation similar to the output deviation VO2* in opposite phase waveform) that cancels the current output deviation VO2 without causing a slippage in control timing.

Specifically, as illustrated in FIG. 10, an inverting amplifier 24*a* in the DSM controller 24 generates the reference signal r(k) by multiplying the value of −1, a gain $G_d$ for the reference signal, and the predicted value PREVO2(k). Next, a subtractor 24*b* generates the deviation signal δ(k) as a deviation between the reference signal r(k) and a DSM signal u"(k−1) delayed by a delay element 24*c*.

Next, an integrator 24*d* generates the integrated deviation value $\sigma_d(k)$ as the sum of the deviation signal δ(k) and an integrated deviation value $\sigma_d(k-1)$ delayed by a delay element 24*e*. Then, a quantizer 24*f* (sign function) generates a DSM signal u"(k) as a sign of the integrated deviation value $\sigma_d(k)$. An amplifier 24*g* next generates an amplified DSM signal u(k) by amplifying the DSM signal u"(k) by a predetermined gain $F_d$. Finally, an adder 24*h* adds the amplified DSM signal u(k) to a predetermined reference value FLAFBASE to generate the control input ϕop(k).

The control algorithm of the DSM controller 24 described above is expressed by the following equations (27)–(32):

$$r(k)=-1\cdot Gd\cdot PREVO2(k) \tag{27}$$

$$\delta(k)=r(k)-u''(k-1) \tag{28}$$

$$\sigma_d(k)=\sigma_d(k-1)+\delta(k) \tag{29}$$

$$u''(k)=sgn(\sigma_d(k)) \tag{30}$$

$$u(k)=F_d\cdot u''(k) \tag{31}$$

$$op(k)=FLAFBASE+u(k) \tag{32}$$

where $G_d$, $F_d$ represents gains. The value of the sign function $sgn(\sigma_d(k))$ takes 1 ($sgn(\sigma_d(k))=1$) when $\sigma_d(k)\geqq 0$, and −1 ($sgn(\sigma_{d(k))=}1$) when $\sigma_d(k)<0$ ($sgn(\sigma_d(k))$ may be set to zero ($sgn(\sigma_d(k))=0$) when $\sigma_d(k)=0$).

The DSM controller 24 calculates the control input ϕop(k) as a value which generates the output deviation VO2* that cancels the output deviation VO2 without causing a slippage in control timing, as described above. In other words, the DSM controller 24 calculates the control input ϕop(k) as a value which can converge the output Vout of the O2 sensor 15 to the target value Vop. Also, since the DSM controller 24 calculates the control input ϕop(k) by adding the amplified DSM signal u(k) to the predetermined reference value FLAFBASE, the resulting control input ϕop(k) not only inverts in the positive and negative directions about the value of zero, but also repeatedly increases and decreases about the reference value FLAFBASE. This can increase the degree of freedom for the control, as compared with a general ΣΔ modulation algorithm.

Next, the aforementioned PRISM controller 21 will be described with reference again to FIG. 3. The PRISM controller 21 relies on a control algorithm for on-board identification sliding mode control processing (hereinafter called the "PRISM processing"), later described, to calculate the target air/fuel ratio KCMD for converging the output Vout of the O2 sensor 15 to the target value Vop. The PRISM controller 21 comprises the state predictor 22, on-board identifier 23, and sliding mode controller (hereinafter called the "SLD controller") 25. A specific program for executing the PRISM processing will be described later.

Since the state predictor 22 and on-board identifier 23 have been described in the PRISM controller 21, the following description will be centered on the SLD controller 25. The SLD controller 25 performs the sliding mode control based on the sliding mode control algorithm. In the following, a general sliding mode control algorithm will be described. Since the sliding mode control algorithm uses the aforementioned discrete time system model expressed by the equation (1) as a controlled object model, a switching function σ is set as a linear function of a time series data of the output deviation VO2 as expressed by the following equation (33):

$$\sigma(k)=S1\cdot VO2(k)+S2\cdot VO2(k-1) \quad (33)$$

where S1, S2 are predetermined coefficients which are set to satisfy a relationship represented by $-1<(S2/S1)<1$.

Generally, in the sliding mode control algorithm, when the switching function σ is made up of two state variables (time series data of the output deviation VO2 in this embodiment), a phase space defined by the two state variables forms a two-dimensional phase space in which the two state variables are represented by the vertical axis and horizontal axis, respectively, so that a combination of values of the two state variables satisfying σ=0 rests on a line called a "switching line." Therefore, both the two state variables can be converged (slid) to a position of equilibrium at which the state variables take the value of zero by appropriately determining a control input to a controlled object such that a combination of the two state variables converges to (rests on) the switching line. Further, the sliding mode control algorithm can specify the dynamic characteristic, more specifically, convergence behavior and convergence rate of the state variables by setting the switching function σ. For example, when the switching function σ is made up of two state variables as in this embodiment, the state variables converge slower as the slope of the switching line is brought closer to one, and faster as it is brought closer to zero.

In this embodiment, as shown in the aforementioned equation (33), the switching function σ is made up of two time series data of the output deviation VO2 i.e., a current value VO2(k) and the preceding value VO2(k−1) of the output deviation VO2, so that the control input to the controlled object, i.e., the target air/fuel ratio KCMD may be set such that a combination of these current value VO2(k) and preceding vale VO2(k−1) of the output deviation VO2 (k) is converged onto the switching line. Specifically, assuming that the sum of a control amount Usl(k) and the reference value FLAFBASE is equal to the target air/fuel ratio KCMD, the control amount Usl(k) for converging the combination of the current value VO2(k) and preceding value VO2(k−1) onto the switching line is set as a total sum of an equivalent control input Ueq(k), an reaching law input Urch(k), and an adaptive law input Uadp(k), as shown in equation (34) shown in FIG. 11, in accordance with an adaptive sliding mode control algorithm.

The equivalent control input Ueq(k) is provided for restricting the combination of the current value VO2 (k) and preceding value VO2(k−1) of the output deviation VO2 on the switching line, and specifically is defined as equation (35) shown in FIG. 11. The reaching law input Urch(k) is provided for converging the combination of the current value VO2 (k) and preceding value VO2 (k−1) of the output deviation VO2 onto the switching line if it deviates from the switching line due to disturbance, a modelling error or the like, and specifically is defined as equation (36) shown in FIG. 11. In the equation (36), F represents a gain.

The adaptive law input Uadp(k) is provided for securely converging the combination of the current value VO2 (k) and preceding value VO2(k−1) of the output deviation VO2 onto a switching hyperplane while preventing the influence of a steady-state deviation of the controlled object, a modelling error, and disturbance, and specifically defined as equation (37) shown in FIG. 11. In the equation (37), G represents a gain, and ΔT a control period, respectively.

As described above, the SLD controller 25 in the PRISM controller 21 according to this embodiment uses the predicted value PREVO2 instead of the output deviation VO2, so that the algorithm expressed by the equations (33)–(37) is rewritten to equations (38)–(42) shown in FIG. 12 for use in the control by applying a relationship expressed by PREVO2(k)≈VO2(k+dt). σPRE in the equation (38) represents the value of the switching function when the predicted value PREVO2 is used (hereinafter called the "prediction switching function"). In other words, the SLD controller 25 calculates the target air/fuel ratio KCMD by adding the control amount Usl(k) calculated in accordance with the foregoing algorithm to the reference value FLAFBASE.

In the following, the processing for calculating a fuel injection amount, executed by the ECU 2, will be described with reference to FIG. 13. In the following description, the symbol (k) indicative of the current value is omitted as appropriate. FIG. 13 illustrates a main routine of this control processing which is executed in synchronism with an inputted TDC signal as an interrupt. In this processing, the ECU 2 uses the target air/fuel ratio KCMD calculated in accordance with adaptive air/fuel ratio control processing or map search processing, later described, to calculate the fuel injection amount TOUT for each cylinder.

First at step 1 (abbreviated as "S1" in the figure. The same applies to subsequent figures), the ECU 2 reads outputs of the variety of aforementioned sensors 10–19, and stores the read data in the RAM.

Next, the routine proceeds to step 2, where the ECU 2 calculates a basic fuel injection amount Tim. In this processing, the ECU 2 calculates the basic fuel injection amount Tim by searching a map, not shown, in accordance with the engine rotational speed NE and absolute intake pipe inner pressure PBA.

Next, the routine proceeds to step 3, where the ECU 2 calculates a total correction coefficient KTOTAL. For calculating the total correction coefficient KTOTAL, the ECU 2 calculates a variety of correction coefficients by searching a variety of tables and maps in accordance with a variety of operating parameters (for example, the intake air temperature TA, atmospheric pressure PA, engine water temperature TW, accelerator opening AP, and the like), and multiplies these correction coefficients by one another.

Next, the routine proceeds to step 4, where he ECU 2 sets an adaptive control flag F_PRISMON. Though details of this processing are not shown in the figure, specifically, when the following conditions (a)–(f) are fully satisfied, the ECU 2 sets the adaptive control flag F_PRISMON to "1," determining that the condition is met for using the target air/fuel ratio KCMD calculated in the adaptive air/fuel ratio control processing. On the other hand, if any of the conditions (a)–(f) is not satisfied, the ECU 2 sets the adaptive control flag F_PRISMON to "0."

(a) The LAF sensor 14 and O2 sensor 15 are both activated;

(b) the engine 3 is not in a lean burn operation;

(c) the throttle valve 5 is not fully opened;

(d) the ignition timing is not controlled to be retarded;

(e) the engine 3 is not in a fuel cut operation; and (f) the engine rotational speed NE and absolute intake pipe inner pressure PBA are both within their respective predetermined ranges.

Next, the routine proceeds to step 5, where it is determined whether or not the adaptive control flag F_PRISMON set at step 4 is "1." If the result of determination at step 5 is YES, the routine proceeds to step 6, where the ECU 2 sets the target air/fuel ratio KCMD to an adaptive target air/fuel ratio KCMDSLD which is calculated by adaptive air/fuel ratio control processing, later described.

On the other hand, if the result of determination at step 5 is NO, the routine proceeds to step 7, where the ECU 2 sets the target air/fuel ratio KCMD to a map value KCMDMAP. The map value KCMDMAP is calculated by searching a map, not shown, in accordance with the engine rotational speed NE and intake pipe inner absolute pressure PBA.

At step 8 subsequent to the foregoing step 6 or 7, the ECU 2 calculates an observer feedback correction coefficient #nKLAF for each cylinder. The observer feedback correction coefficient #nKLAF is provided for correcting variations in the actual air/fuel ratio for each cylinder. Specifically, the ECU 2 calculates the observer feedback correction coefficient #nKLAF based on a PID control in accordance with an actual air/fuel ratio estimated by an observer for each cylinder from the output KACT of the LAF sensor 14. The symbol #n in the observer feedback correction coefficient #nKLAF represents the cylinder number #1–#4. The same applies as well to a required fuel injection amount #nTCYL and a final fuel injection amount #nTOUT, later described.

Next, the routine proceeds to step 9, where the ECU 2 calculates a feedback correction coefficient KFB. Specifically, the ECU 2 calculates the feedback coefficient KFB in the following manner. The ECU 2 calculates a feedback coefficient KLAF based on a PID control in accordance with a deviation of the output KACT of the LAF sensor 14 from the target air/fuel ratio KCMD. Also, the ECU 2 calculates a feedback correction coefficient KSTR by calculating the feedback correction coefficient KSTR by a self tuning regulator type adaptive controller, not shown, and dividing the feedback correction coefficient KSTR by the target air/fuel ratio KCMD. Then, the ECU 2 sets one of these two feedback coefficient KLAF and feedback correction coefficient KSTR as the feedback correction coefficient KFB in accordance with an operating condition of the engine 3.

Next, the routine proceeds to step 10, where the ECU 2 calculates a corrected target air/fuel ratio KCMDM. This corrected target air/fuel ratio KCMDM is provided for compensating a change in filling efficiency due to a change in the air/fuel ratio A/F. The ECU 2 calculates the corrected target air/fuel ratio KCMDM by searching a table, not shown, in accordance with the target air/fuel ratio KCMD calculated at step 6 or 7.

Next, the routine proceeds to step 11, where the ECU 2 calculates the required fuel injection amount #nTCYL for each cylinder in accordance with the following equation (43) using the basic fuel injection amount Tim, total correction coefficient KTOTAL, observer feedback correction coefficient #nKLAF, feedback correction coefficient KFB, and corrected target air/fuel ratio KCMDM, which have been calculated as described above.

$$\#nTCYL = Tim \cdot KTOTAL \cdot KCMDM \cdot KFB \cdot \#nKLAF \tag{43}$$

Next, the routine proceeds to step 12, where the ECU 2 corrects the required fuel injection amount #nTCYL for sticking to calculate the final fuel injection amount #nTOUT. Specifically, the ECU 2 calculates this final fuel injection amount #nTOUT by calculating the proportion of fuel injected from the injector 6 which is stuck to the inner wall of the combustion chamber in the current combustion cycle in accordance with an operating condition of the engine 3, and correcting the required fuel injection amount #nTCYL based on the proportion thus calculated.

Next, the routine proceeds to step 13, where the ECU 2 outputs a driving signal based on the final fuel injection amount #nTOUT calculated in the foregoing manner to the injector 6 of a corresponding cylinder, followed by termination of this processing.

Next, the adaptive air/fuel ratio control processing including the ADSM processing and PRISM processing will be described with reference to FIGS. 14 and 15 which illustrate routines for executing the ADSM and PRISM processing, respectively. This processing is executed at a predetermined period (for example, every 10 msec). Also, in this processing, the ECU 2 calculates the target air/fuel ratio KCMD in accordance with an operating condition of the engine 3 by the ADSM processing, PRISM processing, or processing for setting a sliding mode control amount DKCMDSLD to a predetermined value SLDHOLD.

First, in this processing, the ECU 2 executes post-F/C determination processing at step 20. Though not shown in detail in the figure, during a fuel cut operation, the ECU 2 sets a F/C post-determination flag F_AFC to "1" for indicating that the engine 3 is in a fuel cut operation. When a predetermined time X_TM_TM_AFC has elapsed after the end of the fuel cut operation, the ECU 2 sets the post-F/C determination flag F_AFC to "0" for indicating this situation.

Figure 16:
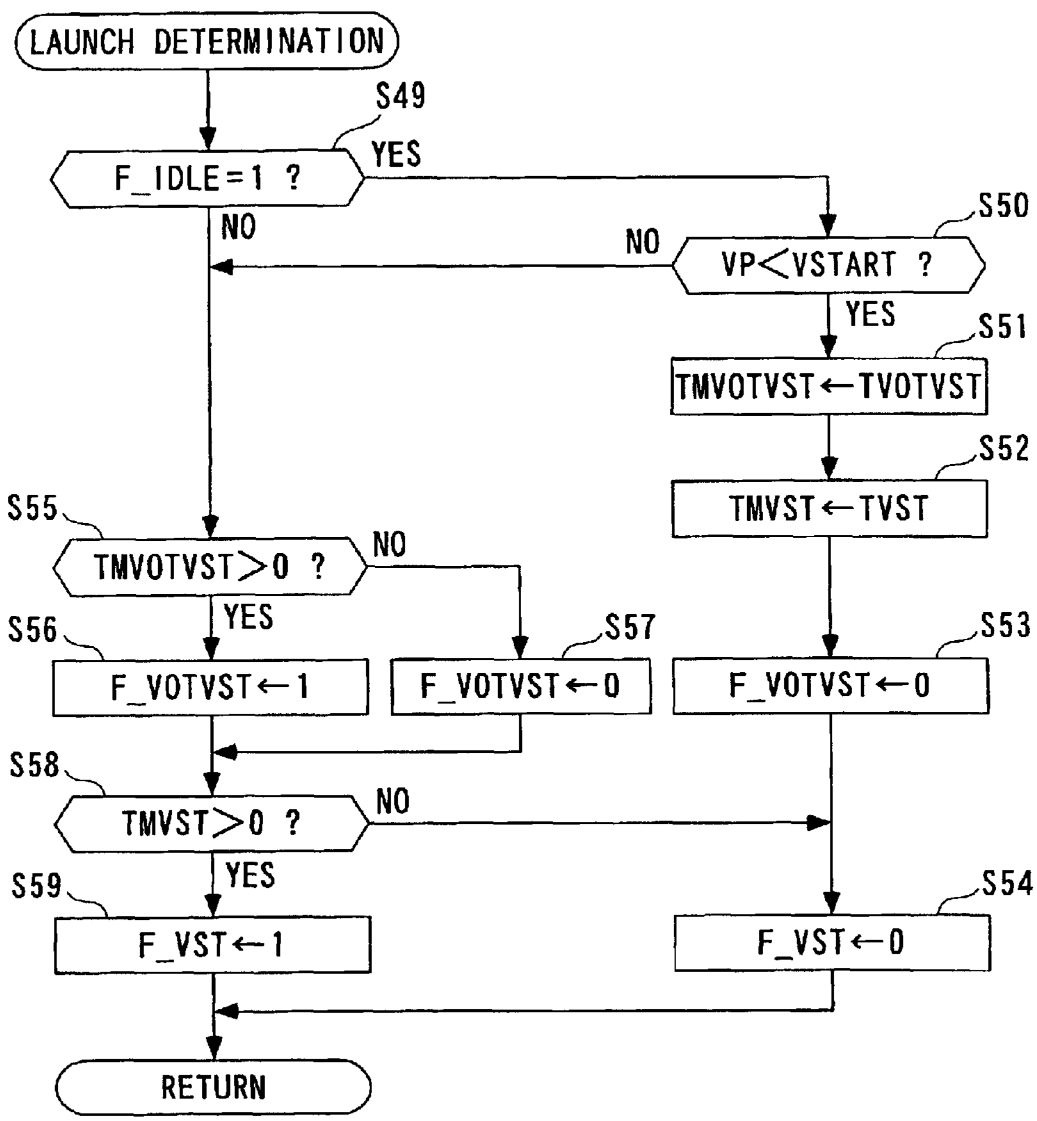
FIG. 16 is a flow chart illustrating a routine for executing launch determination processing at step 21 in FIG. 14.

Next, the routine proceeds to step 21, where the ECU 2 executes start determination processing based on the vehicle speed VP for determining whether or not the vehicle equipped with the engine 3 has started. As illustrated in FIG. 16 showing a routine for executing the start determination processing, it is first determined at step 49 whether or not an idle operation flag F_IDLE is "1." The idle operation flag F_IDLE is set to "1" during an idle operation and otherwise to "0."

If the result of determination at step 49 is YES, indicating the idle operation, the routine proceeds to step 50, where it is determined whether or not the vehicle speed VP is lower than a predetermined vehicle speed VSTART (for example, 1 km/h) . If the result of determination at step 50 is YES, indicating that the vehicle is stopped, the routine proceeds to step 51, where the ECU 2 sets a time value TMVOTVST of a fist launch determination timer of down-count type to a first predetermined time TVOTVST (for example, 3 msec).

Next, the routine proceeds to step 52, where the ECU 2 sets a timer value TMVST of a second launch determination timer of down-count type to a second predetermined time TVST (for example, 500 msec) longer than the first predetermined time TVOTVST. Then, at steps 53, 54, the ECU 2 sets a first and a second launch flag F_VOTVST, F_VST to "0," followed by termination of the processing.

On the other hand, if the determination result at step 49 or 50 is NO, i.e., when the vehicle is not in an idle operation or when the vehicle has been launched, the routine proceeds to step 55, where it is determined whether or not the timer value TMVOTVST of the first launch determination timer is larger than zero. If the result of determination at step 55 is YES, indicating that the first predetermined time TVOVST has not elapsed after the end of the idle operation or after the vehicle was launched, the routine proceeds to step 56, where the ECU 2 sets the first launch flag F_VOTVST to "1" for indicating that the vehicle is now in a first launch mode.

On the other hand, if the result of determination at step 55 is NO, indicating that the first predetermined time TVOTVST has elapsed after the end of the idle operation or after the vehicle was launched, the routine proceeds to step 57, where the ECU 2 sets the first launch flag F_VOTVST to "0" for indicating that the first launch mode has been terminated.

At step 58 subsequent to step 56 or 57, it is determined whether or not the timer value TMVST of the second launch determination timer is larger than zero. If the result of determination at step 58 is YES, i.e., when the second predetermined time TVST has not elapsed after the end of the idle operation or after the vehicle was launched, the routine proceeds to step 59, where the ECU 2 sets the second launch flag F_VST to "1," indicating that the vehicle is now in a second launch mode, followed by termination of this processing.

On the other hand, if the result of determination at step 58 is NO, i.e., when the second predetermined time TVST has elapsed after the end of the idle operation or after the vehicle was launched, the ECU 2 executes the aforementioned step 54, regarding that the second launch mode has been terminated, followed by termination of this processing.

Turning back to FIG. 14, at step 22 subsequent to step 21, the ECU 2 executes processing for setting state variables. Though not shown, in this processing, the ECU 2 shifts all of the target air/fuel ratio KCMD, the output KACT of the LAF sensor 14, and time series data of the output deviation VO2 stored in the RAM, to the past by one sampling cycle. Then, the ECU 2 calculates current values of KCMD, KACT and VO2 based on the latest values of KCMD, KACT and time series data of VO2 the reference value FLAFBASE, and an adaptive correction term FLFADP, later described.

Next, the routine proceeds to step 23, where it is determined whether or not the PRISM/ADSM processing should be executed. This processing determines whether or not the condition for executing the PRISM processing or ADSM processing is satisfied. Specifically, the processing is executed along a flow chart illustrated in FIG. 17.

Figure 17:
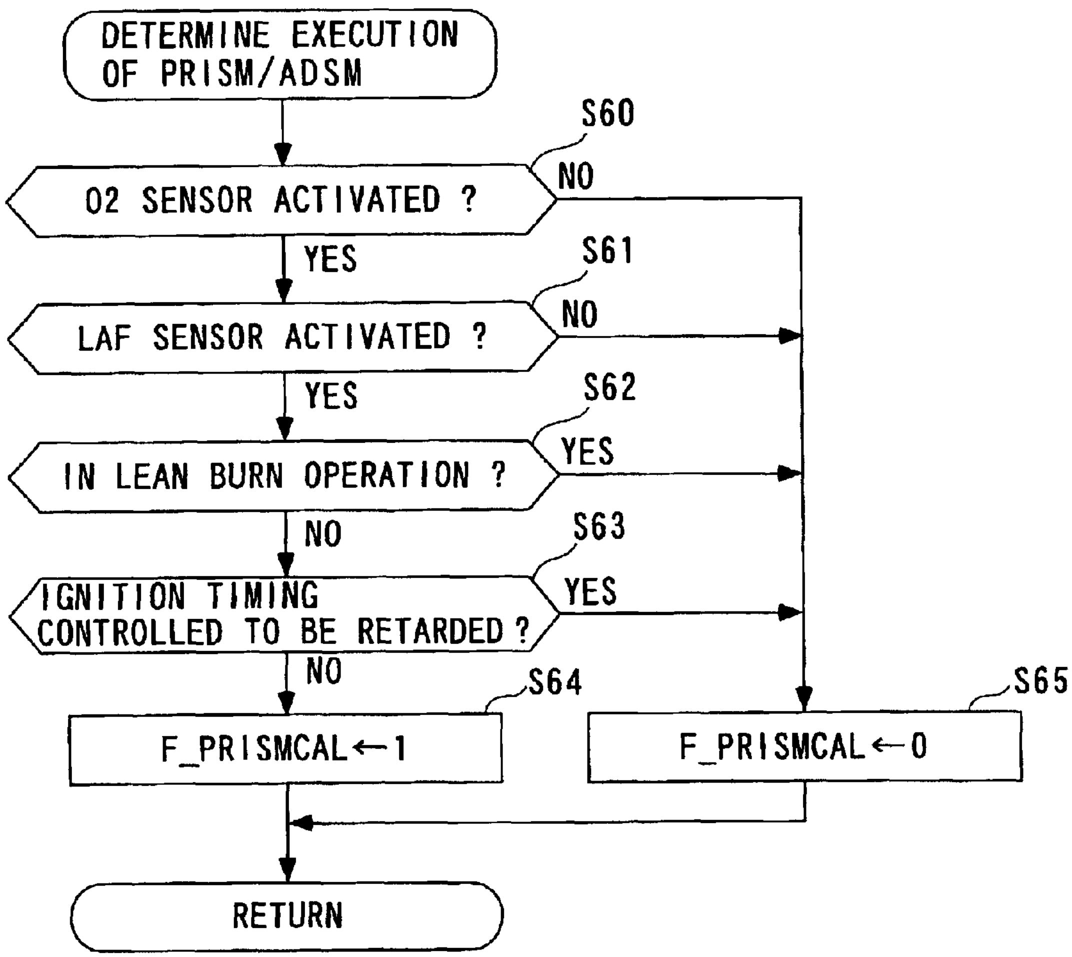
FIG. 17 is a flow chart illustrating a routine for executing PRISM/ADSM processing execution determination processing at step 23 in FIG. 14.

More specifically, at steps 60–63 in FIG. 17, when the following conditions (g)–(j) are fully satisfied, the ECU 2 sets a PRISM/ADSM execution flag F_PRISMCAL to "1", at step 64, for indicating that the vehicle is in an operating condition in which the PRISM processing or ADSM processing should be executed, followed by termination of this processing. On the other hand, if any of the conditions (g)–(j) is not satisfied, the ECU 2 sets the PRISM/ADSM execution flag F_PRISMCAL to "0" at step 65, for indicating that the vehicle is not in an operating condition in which the PRISM processing or ADSM processing should be executed, followed by termination of this processing.

(g) The O2 sensor 15 is activated;

(h) the LAF sensor 14 is activated;

(i) the engine 3 is not in a lean burn operation; and (j) the ignition timing is not controlled to be retarded.

Turning back to FIG. 14, at step 24 subsequent to step 23, the ECU 2 executes processing for determining whether or not the identifier 23 should executes the operation. ECU 2 determines whether or not conditions are met for the on-board identifier 23 to identify parameters through this processing which is executed specifically along a flow chart illustrated in FIG. 18.

When the results of determinations at step 70 and 71 in FIG. 18 are both NO, in other words, when the throttle valve opening θTH is not fully opened and the engine 3 is not in a fuel cut operation, the routine proceeds to step 72, where the ECU 2 sets an identification execution flag F_IDCAL to "1," determining that the engine 3 is in an operating condition in which the identification of parameters should be executed, followed by termination of the processing. On the other hand, if the result of determination at step 70 or 71 is YES, the routine proceeds to step 73, where the ECU 2 sets the identification execution flag F_IDCAL to "0," determining that the engine 3 is not in an operating condition in which the identification of parameters should be executed, followed by termination of the processing.

Turning back to FIG. 14, at step 25 subsequent to step 24, the ECU 2 calculates a variety of parameters (exhaust gas volume AB_SV and the like). Specific details of this calculation will be described later.

Next, the routine proceeds to step 26, where it is determined whether or not the PRISM/ADSM execution flag F_PRISMCAL set at step 23 is "1." If the result of determination at step 26 is YES, i.e., when conditions are met for executing the PRISM processing or ADSM processing, the routine proceeds to step 27, where it is determined whether or not the identification execution flag F_IDCAL set at step 24 is "1."

If the result of determination at step 27 is YES, i.e., when the engine 3 is in an operating condition in which the on-board identifier 23 should execute the identification of parameters, the routine proceeds to step 28, where it is determined whether or not a parameter initialization flag F_IDRSET is "1." If the result of determination at step 28 is NO, i.e., when the initialization is not required for the model parameters a1, a2, b1 stored in the RAM, the routine proceeds to step 31, later described.

On the other hand, if the result of determination at step 28 is YES, i.e., when the initialization is required for the model parameters a1, a2, b1, the routine proceeds to step 29, where the ECU 2 sets the model parameters a1, a2, b1 to their respective initial values. Then, the routine proceeds to step 30, where the ECU 2 sets the parameter initialization flag F_IDRSET to "0" for indicating that the model parameters a1, a2, b1 have been set to the initial values.

At step 31 subsequent to step 30 or 28, the on-board identifier 23 executes the operation to identify the model parameters a1, a2, b1, followed by the routine proceeding to step 32 in FIG. 15, later described. Specific details on the operation of the on-board identifier 23 will be described later.

On the other hand, if the result of determination at step 27 is NO, i.e., when the engine 3 is not in an operating condition in which the identification of the parameters should not be executed, the routine skips the foregoing steps 28–31, and proceeds to step 32 in FIG. 15. At step 32 subsequent to step 27 or 31, the ECU 2 selects identified values or predetermined values for the model parameters a1, a2, b1. Though details on this operation are not shown, specifically, the model parameters a1, a2, b1 are set to the identified values identified at step 31 when the identification execution flag F_IDCAL set at step 24 is "1." On the other hand, when the identification execution flag F_IDCAL is "0," the model parameters a1, a2, b1 are set to the predetermined values.

Next, the routine proceeds to step 33, where the state predictor 22 executes the operation to calculate the predicted value PREVO2 as later described. Subsequently, the routine proceeds to step 34, where the ECU 2 calculates the control amount Usl, as later described.

Next, the routine proceeds to step 35, where the ECU 2 executes processing for determining whether or not the SLD controller 25 is stable. Though details on this processing are not shown, specifically, the ECU 2 determines based on the value of the prediction switching function cPRE to determine whether or not the sliding mode control conducted by the SLD controller 25 is stable.

Next, at steps 36 and 37, the SLD controller 25 and DSM controller 24 calculate the sliding mode control amount DKCMDSLD and ΔΣ modulation control amount DKCMDDSM, respectively, as described later.

Next, the routine proceeds to step 38, where the ECU 2 calculates the adaptive target air/fuel ratio KCMDSLD using the sliding mode control amount DKCMDSLD calculated by the SLD controller 25 or the ΔΣ modulation control amount DKCMDDSM calculated by the DSM controller 24. Subsequently, the routine proceeds to step 39, where the ECU 2 calculates an adaptive correction term FLAFADP, as later described, followed by termination of the processing.

Turning back again to FIG. 14, if the result of determination at step 26 is NO, i.e., when conditions are not met for executing either the PRISM processing or the ADSM processing, the routine proceeds to step 40, where the ECU 2 sets the parameter initialization flag F_IDRSET to "1." Next, the routine proceeds to step 41 in FIG. 15, where the ECU 2 sets the sliding mode control amount DKCMDSLD to a predetermined value SLDHOLD. Then, after executing the aforementioned steps 38, 39, the processing is terminated.

Next, the processing for calculating a variety of parameters at step 25 will be described with reference to FIG. 19 which illustrates a routine for executing this processing. First, in this processing, the ECU 2 calculates the exhaust gas volume AB_SV (estimated value of a space velocity) in accordance with the following equation (44) at step 80:

$$AB\_SV=(NE/1500)\cdot PBA\cdot X\_SVPRA \tag{44}$$

where X_SVPRA is a predetermined coefficient which is determined based on the displacement of the engine 3.

Next, the routine proceeds to step 81, where the ECU 2 calculates a dead time KACT_D (=d') in the aforementioned air/fuel ratio manipulation system, a dead time CAT_DELAY (=d) in the exhaust system, and a prediction time dt. Specifically, by searching a table shown in FIG. 20 in accordance with the exhaust gas volume AB_SV calculated at step 80, the ECU 2 calculates the dead times KACT_D, CAT_DELAY, respectively, and sets the sum of these dead times (KACT_D+CAT_DELAY) as the prediction time dt. In other words, in this control program, the phase delay time dd is set to zero.

Figure 20:
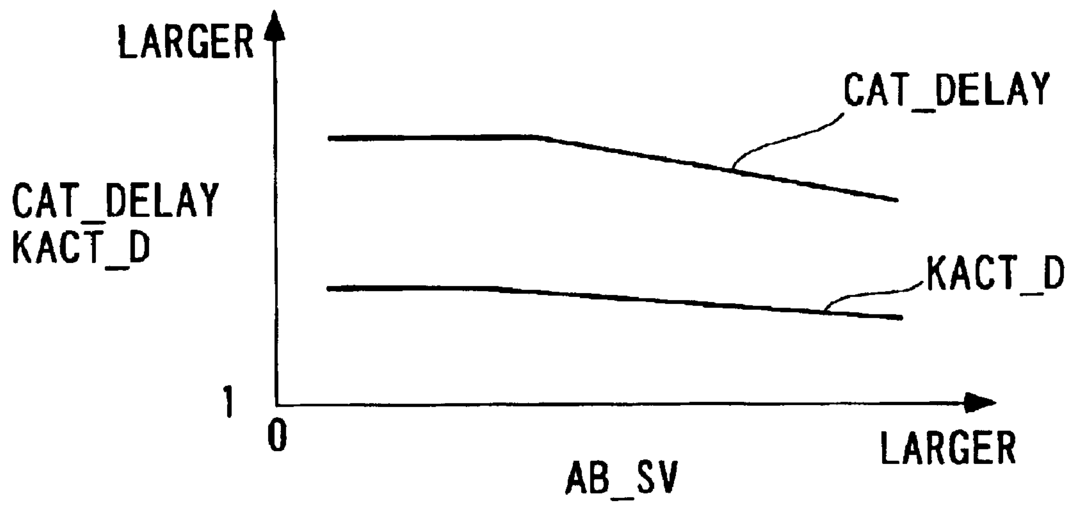
FIG. 20 shows an exemplary table for use in calculating dead times CAT_DELAY, KACT_D.

In the table shown in FIG. 20, the dead times KACT_D, CAT_DELAY are set to smaller values as the exhaust gas volume AB_SV is larger. This is because the dead times KACT_D, CAT_DELAY are shorter as the exhaust gas volume AB_SV is larger since exhaust gases flow faster. As described above, since the dead times KACT_D, CAT_DELAY and prediction time dt are calculated in accordance with the exhaust gas volume AB_SV, it is possible to eliminate a slippage in control timing between the input and output of the controlled object by calculating the adaptive target air/fuel ratio KCMDSLD, later described, based on the predicted value PREVO2 of the output deviation VO2 which has been calculated using them. Also, since the model parameters a1, a2, b1 are fixed using the dead time CAT_DELAY, the dynamic characteristic of the controlled object model can be fitted to the actual dynamic characteristic of the controlled object, thereby making it possible to more fully eliminate the slippage in control timing between the input and output of the controlled object.

Next, the routine proceeds to step 82, where the ECU 2 calculates weighting parameters λ1, λ2 of the identification algorithm. Specifically, the ECU 2 sets the weighting parameter λ2 to one, and simultaneously calculates the weighting parameter λ1 by searching a table shown in FIG. 21 in accordance with the exhaust gas volume AB_SV.

Figure 21:
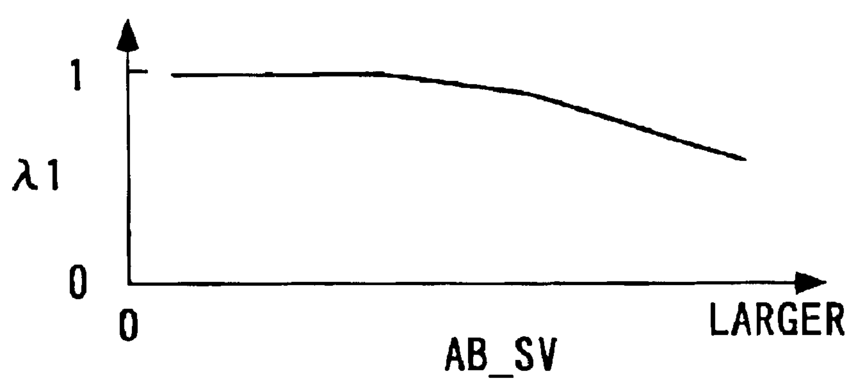
FIG. 21 shows an exemplary table for use in calculating a weighting parameter λ1.

In the table shown in FIG. 21, the weighting parameter λ1 is set to a smaller value as the exhaust gas volume AB_SV is larger. In other words, the weighting parameter λ1 is set to a larger value closer to one as the exhaust gas volume AB_SV is smaller. This setting is made for the following reason. Since the model parameters must be more rapidly identified as the exhaust gas volume AB_SV is larger, or in other words, as the engine 3 is more heavily loaded in operation, the model parameters are converged to optimal values faster by setting the weighting parameter λ1 to a smaller value. In addition, as the exhaust gas volume AB_SV is smaller, i.e., as the engine 3 is more lightly loaded in operation, the air/fuel ratio is more susceptible to fluctuations, causing the post-catalyst exhaust gas characteristic to become instable, so that a high accuracy must be ensured for the identification of the model parameters. Thus, the weighting parameter λ1 is brought closer to one (to the least square algorithm) to improve the identification accuracy for the model parameters.

Next, the routine proceeds to step 83, where the ECU 2 calculates a lower limit value X_IDA2L for limiting allowable ranges of the model parameters a1, a2, and a lower limit value X_IDB1L and an upper limit value X_IDB1H for limiting an allowable range of the model parameter b1 by searching a table shown in FIG. 22 in accordance with the exhaust gas volume AB_SV.

In the table shown in FIG. 22, the lower limit value X_IDA2L is set to a larger value as the exhaust gas volume AB_SV is larger. This is because an increase and/or a decrease in the dead times resulting from a change in the exhaust gas volume AB_SV causes a change in a combination of the model parameters a1, a2 which provide a stable state in the control system. Likewise, the lower limit value X_IDB1L and upper limit value X_IDB1H are set to larger values as the exhaust gas volume AB_SV is larger. This is because a pre-catalyst air/fuel ratio (air/fuel ratio of exhaust gases upstream of the first catalyzer 8*a*) affects more the output Vout of the O2 sensor 15, i.e., the gain of the controlled object becomes larger as the exhaust gas volume AB_SV is larger.

Next, the routine proceeds to step 84, where the ECU 2 calculates the filter order n of the moving average filtering processing, followed by termination of the processing. Specifically, the ECU 2 calculates the filter order n by searching a table shown in FIG. 23 in accordance with the exhaust gas volume AB_SV.

In the table shown in FIG. 23, the filter order n is set to a smaller value as the exhaust gas volume AB_SV is larger. This setting is made for the reason set forth below. As described above, a change in the exhaust gas volume AB_SV causes fluctuations in the frequency characteristic, in particular, the gain characteristic of the controlled object, so that the weighted least square algorithm must be appropriately corrected for the frequency weighting characteristic in accordance with the exhaust gas volume AB_SV for fitting the gain characteristic of the controlled object model to the actual gain characteristic of the controlled object. Therefore, by setting the filter order n of the moving average filtering processing in accordance with the exhaust gas volume AB_SV as in the table shown in FIG. 23, constant identification weighting can be ensured in the identification algorithm irrespective of a change in the exhaust gas volume AB_SV, and the controlled object model can be matched with the controlled object in the gain characteristic, thereby making it possible to improve the identification accuracy.

Figure 24:
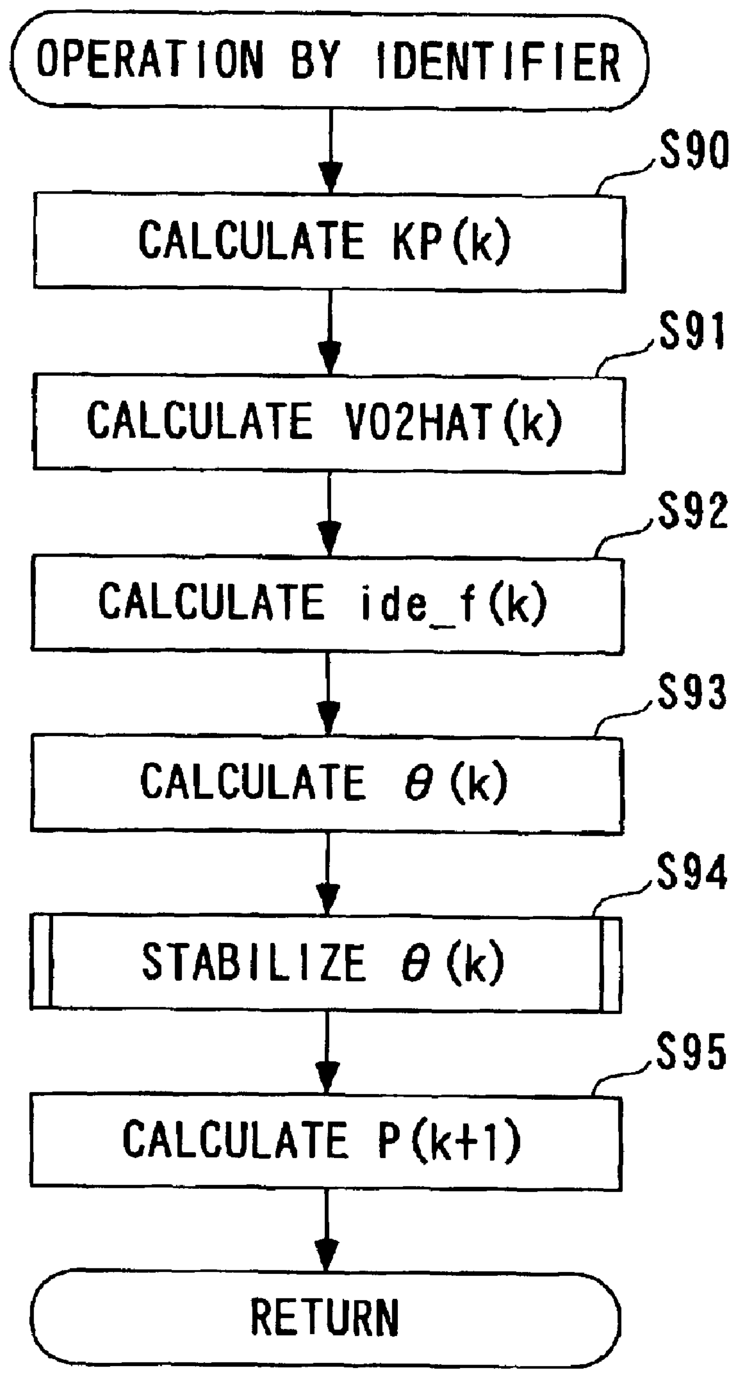
FIG. 24 is a flow chart illustrating a routine for executing the operation of the identifier at step 31 in FIG. 14.

Next, the operation performed by the on-board identifier 23 at step 31 will be described with reference to FIG. 24 which illustrates a routine for executing the processing. As illustrated in FIG. 24, in this operation, the on-board identifier 23 first calculates the gain coefficient KP(k) in accordance with the aforementioned equation (22) at step 90. Next, the routine proceeds to step 91, where the on-board identifier 23 calculates the identified value VO2HAT (k) for the output deviation VO2 in accordance with the aforementioned equation (20).

Next, the routine proceeds to step 92, where the on-board identifier 23 calculates the identification error filter value ide_f(k) in accordance with the aforementioned equations (18), (19). Next, the routine proceeds to step 93, where the on-board identifier 23 calculates the vector θ(k) for model parameters in accordance with the aforementioned equation (16), followed by the routine proceeding to step 94, where the on-board identifier 23 executes processing for stabilizing the vector θ(k) for the model parameters. The stabilization processing will be described later.

Next, the routine proceeds to step 95, where the on-board identifier 23 calculates the next value P(k+1) for the square matrix P(k) in accordance with the aforementioned equation (23). This next value P(k+1) is used as the value for the square matrix P(k) in the calculation in the next loop.

In the following, the processing for stabilizing the vector θ(k) for the model parameters at step 94 will be described with reference to FIG. 25. As illustrated in FIG. 25, the ECU 2 first sets three flags F_A1STAB, F_A2STAB, F_B1STAB to "0" at step 100.

Next, the routine proceeds to step 101, where the ECU 2 limits the identified values a1', a2', as described later. Next, at step 102, the ECU 2 limits the identified value b1', as later described, followed by termination of the processing for stabilizing the vector θ(k) for the model parameters.

In the following, the processing involved in limiting the identified values a1', a2' at step 101 will be described with reference to FIG. 26 which illustrates a routine for executing the processing. As illustrated, it is first determined at step 110 whether or not the identified value a2' for the model parameter calculated at step 93 is equal to or larger than the lower limit value X_IDA2L calculated at step 83 in FIG. 19. If the result of determination at step 110 is NO, the routine proceeds to step 111, where the ECU 2 sets the model parameter a2 to the lower limit value X_IDA2L for stabilizing the control system, and simultaneously sets the flag F_A2STAB to "1" for indicating that the stabilization has been executed for the model parameter a2. On the other hand, if the result of determination at step 110 is YES, indicating that a2'≧X_IDA2L, the routine proceeds to step 112, where the ECU 2 sets the model parameter a2 to the identified value a2'.

At step 113 subsequent to the foregoing step 111 or 112, it is determined whether or not the identified value a1' for the model parameter calculated at step 93 is equal to or larger than a predetermined lower limit value X_IDA1L (for example, a constant value equal to or larger than −2 and smaller than 0). If the result of determination at step 113 is NO, the routine proceeds to step 114, where the ECU 2 sets the model parameter al to the lower limit value X_IDA1L for stabilizing the control system, and simultaneously sets the flag F_A1STAB to "1" for indicating that the stabilization has been executed for the model parameter al.

On the other hand, if the result of determination at step 113 is YES, the routine proceeds to step 115, where it is determined whether or not the identified value all is equal to or lower than a predetermined upper limit value X_IDA1H (for example, 2). If the result of determination at step 115 is YES, indicating that X_IDA1L≦a1'≦X_IDA1H, the routine proceeds to step 116, where the ECU 2 sets the model parameter a1 to the identified value a1'. On the other hand, if the result of determination at step 115 is NO, indicating that X_IDA1H<a1', the routine proceeds to step 117, where the ECU 2 sets the model parameter a1 to the upper limit value X_IDA1H, and simultaneously sets the flag F_A1STAB to "1" for indicating that the stabilization has been executed for the model parameter a1.

At step 118 subsequent to the foregoing steps 114, 116 or 117, it is determined whether or not the sum of the absolute value of the model parameter a1 calculated in the manner described above and the model parameter a2 (|a1|+a2) is equal to or smaller than a predetermined determination value X_A2STAB (for example, 0.9). If the result of determination at step 118 is YES, the processing for limiting the identified values a1', a2' is terminated without further processing, on the assumption that a combination of the model parameters a1, a2 is within a range (a restriction range indicated by hatchings in FIG. 27) in which the stability can be ensured for the control system.

On the other hand, if the result of determination at step 118 is NO, the routine proceeds to step 119, where it is determined whether or not the model parameter a1 is equal to or smaller than a value calculated by subtracting the lower limit value X_IDA2L from the determination value X_A2STAB (X_A2STAB-X_IDA2L) . If the result of determination at step 119 is YES, the routine proceeds to step 120, where the ECU 2 sets the model parameter a2 to a value calculated by subtracting the absolute value of the model parameter a1 from the determination value X_A2STAB (X_A2STAB-|a1|), and simultaneously sets the flag F_A2STAB to "1" for indicating that the stabilization has been executed for the model parameter a2, followed by termination of the processing for limiting the identified values a1', a2'.

No the other hand, if the result of determination at step 119 is NO, indicating that a1>(X_A2STAB-X_IDA2L), the routine proceeds to step 121, where the ECU 2 sets the model parameter a1 to the value calculated by subtracting the lower limit value X_IDA2L from the determination value X_A2STAB (X_A2STAB-X_IDA2L) for stabilizing the control system, and sets the model parameter a2 to the lower limit value X_IDA2L. Simultaneously with these settings, the ECU 2 sets both flags F_A1STAB, F_A2STAB to "1" for indicating that the stabilization has been executed for the model parameters a1, a2, followed by termination of the processing for limiting the identified values a1', a2'.

As described above, in the sequential identification algorithm, when the input and output of a controlled object enter a steady state, a control system may become instable or oscillatory because a so-called drift phenomenon is more likely to occur, in which absolute values of identified model parameters increase due to a shortage of self excitation condition. Also, its stability limit varies depending on the operating condition of the engine 3. For example, during a low load operating condition, the exhaust gas volume AB_SV becomes smaller to cause an increase in a response delay, a dead time and the like of exhaust gases with respect to a supplied air/fuel mixture, resulting in a high susceptibility to an oscillatory output Vout of the O2 sensor 15.

Figure 27:
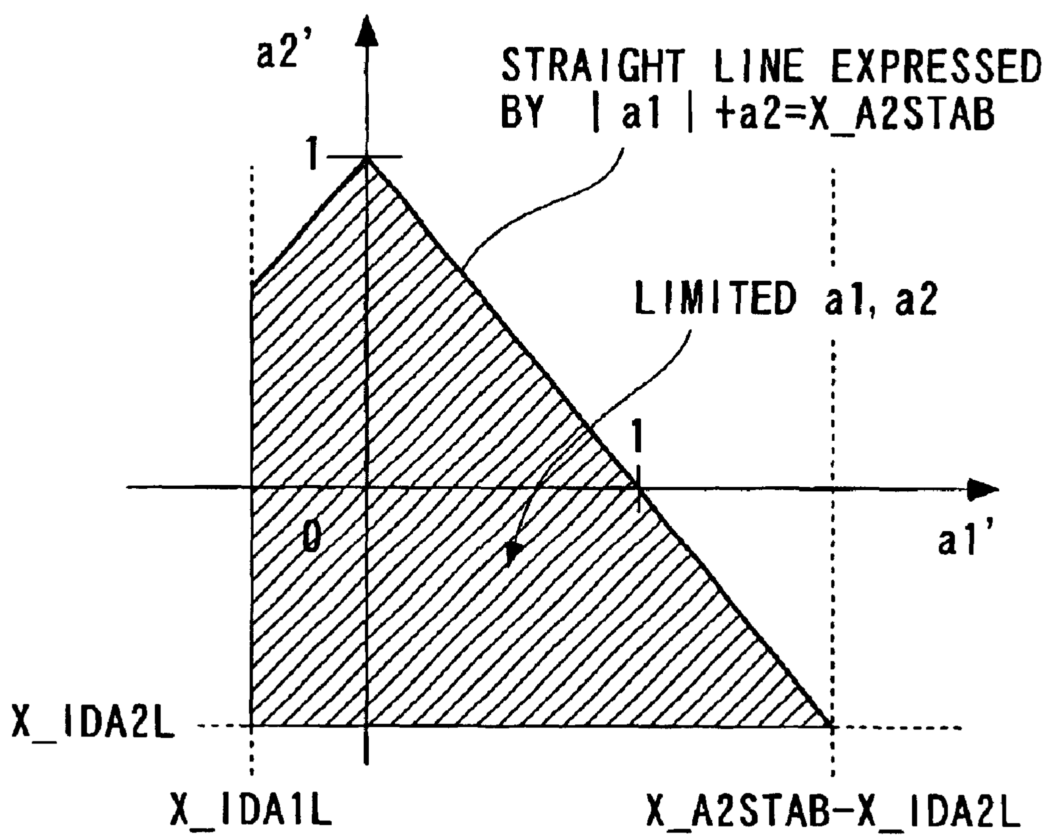
FIG. 27 is a diagram showing a restriction range in which a combination of the identified values a1' and a2' is restricted by the processing of FIG. 26.

In contrast, the foregoing a1' and a2' limit processing sets a combination of model parameters a1, a2 within the restriction range indicated by hatchings in FIG. 27, and sets the lower limit value X_IDA2L for determining this restriction range in accordance with the exhaust gas volume AB_SV, so that this restriction range can be set as an appropriate stability limit range which reflects a change in the stability limit associated with a change in the operating condition of the engine 3, i.e., a change in the dynamic characteristic of the controlled object. With the use of the model parameters a1, a2 which are restricted to fall within such a restriction range, it is possible to avoid the occurrence of the drift phenomenon to ensure the stability of the control system. In addition, by setting the combination of model parameters a1, a2 as values within the restriction range in which the stability can be ensured for the control system, it is possible to avoid an instable state of the control system which would otherwise be seen when the model parameters a1, a2 are restricted independently of each other. With the foregoing strategy, it is possible to improve the stability of the control system and the post-catalyst exhaust gas characteristic.

Next, the b1' limit processing at step 102 will be described with reference to FIG. 28 which illustrates a routine for executing this processing. As illustrated, it is determined at step 130 whether or not the identified value b1' for the model parameter calculated at step 93 is equal to or larger than the lower limit value X_IDB1L calculated at step 83 in FIG. 19.

Figure 19:
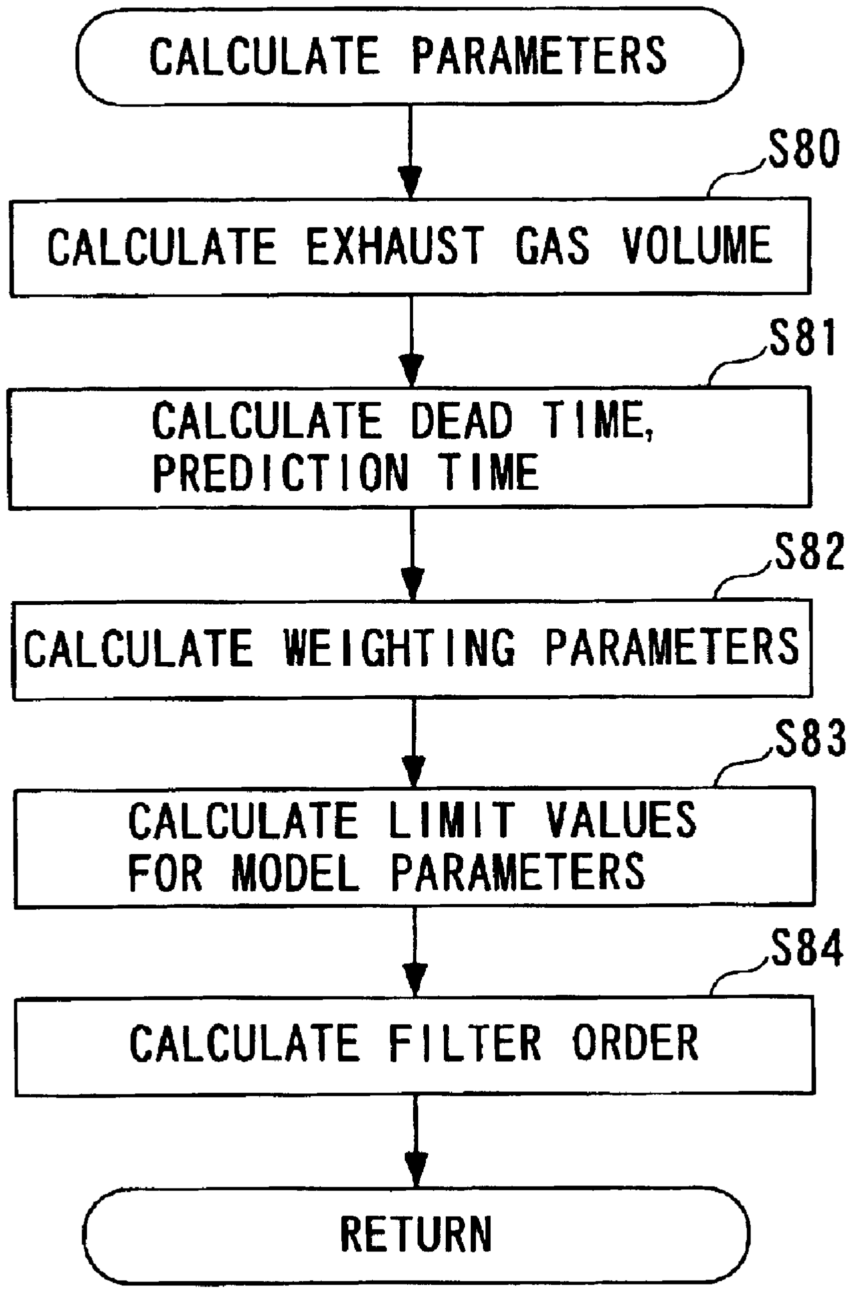
FIG. 19 is a flow chart illustrating a routine for executing the processing for calculating a variety of parameters at step 25 in FIG. 14.

If the result of determination at step 130 is YES, indicating that b1'>X_IDB1L, the routine proceeds to step 131, where it is determined whether or not the identified value b1' for the model parameter is equal to or smaller than the upper limit value X_IDB1H calculated at step 83 in FIG. 19. If the result of determination at step 131 is YES, indicating that X_IDB1L≦b1'≦X_IDB1H, the routine proceeds to step 132, where the ECU 2 sets the model parameter b1 to the identified value b1', followed by termination of the b1' limit processing.

On the other hand, if the result of determination at step 131 is NO, indicating that b1'>X_IDB1H, the routine proceeds to step 133, where the ECU 2 sets the model parameter b1 to the upper limit value X_IDB1H, and simultaneously sets a flag F_B1LMT to "1" for indicating this setting, followed by termination of the b1' limiting processing.

On the other hand, if the result of determination at step 130 is NO, indicating that b1'<X_IDB1L, the routine proceeds to step 134, where the ECU 2 sets the model parameter b1 to the lower limit value X_IDB1L, and simultaneously sets the F_B1LMT to "1" for indicating this setting, followed by termination of the b1' limit processing.

By executing the foregoing b1' limit processing, the model parameter b1 can be restricted within the restriction range from X_IDB1L to X_IDB1H, thereby avoiding the drift phenomenon caused by the sequential identification algorithm. Further, as described above, these upper and lower limit values X_IDB1H, X_IDB1L are set in accordance with the exhaust gas volume AB_SV, so that the restriction range can be set as an appropriate stability limit range which reflects a change in the stability limit associated with a change in the operating condition of the engine 3, i.e., a change in the dynamic characteristic of the controlled object. With the use of the model parameter b1 restricted in such a restriction range, the stability can be ensured for the control system. The foregoing strategy can provide an improvement in the stability of the control system and a resulting improvement in the post-catalyst exhaust gas characteristic.

Figure 29:
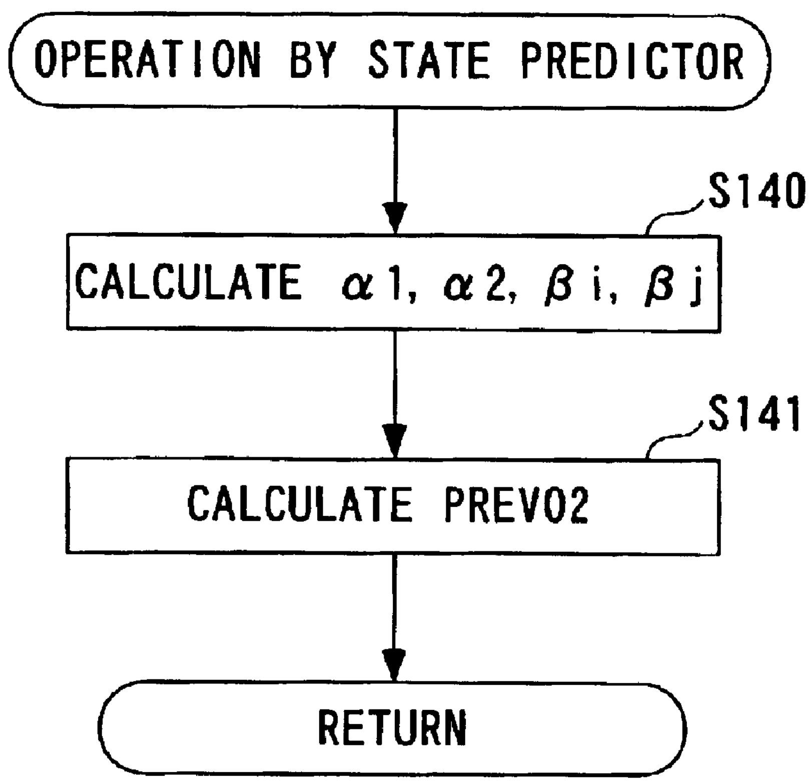
FIG. 29 is a flow chart illustrating the operation performed by the state predictor at step 33 in FIG. 15.

Next, the aforementioned operation performed by the state predictor 22 at step 33 will be described with reference to FIG. 29 which illustrates a routine for executing this processing. First, the state predictor 22 calculates matrix elements α1, α2, βi, βj in the aforementioned equation (7) at step 140. Then, the routine proceeds to step 141, where the state predictor 22 applies the matrix elements α1, α2, βi, βj calculated at step 140 to the equation (7) to calculate the predicted value PREVO2 of the output deviation VO2 followed by termination of the processing.

Next, the aforementioned processing for calculating the control amount Usl at step 34 in FIG. 15 will be described with reference to FIG. 30 which illustrates a routine for executing this processing. First, at step 150, the ECU 2 calculates the prediction switching function σPRE in accordance with the aforementioned equation (38) in FIG. 12.

Then, the routine proceeds to step 151, where the ECU 2 calculates an integrated value SUMSIGMA of the prediction switching function σPRE. As illustrated in FIG. 31, in the calculation of the integrated value SUMSIGMA, it is first determined at step 160 whether or not at least one of the following three conditions (l)–(n) is satisfied:

(l) the adaptive control flag F_PRISMON is "1";

(m) an integrated value holding flag F_SS_HOLD, later described, is "0"; and (n) an ADSM execution end flag F_KOPR, later described, is "0."

If the result of determination at step 160 is YES, i.e., when the condition is satisfied for calculating the integrated value SUMSIGMA, the routine proceeds to step 161, where the ECU 2 sets a current value SUMSIGMA(k) of the integrated value SUMSIGMA to a value which is calculated by adding the product of a control period ΔT and the prediction switching function σPRE to the preceding value SUMSIGMA(k−1) [SUMSIGMA(k−1)+ΔT·σPRE].

Next, the routine proceeds to step 162, where it is determined whether or not the current value SUMSIGMA(k) calculated at step 161 is larger than a predetermined lower limit value SUMSL. If the result of determination at step 162 is YES, the routine proceeds to step 163, where it is determined whether or not the current value SUMSIGMA(k) is smaller than a predetermined upper limit value SUMSH. If the result of determination at step 163 is YES, indicating that SUMSL<SUMSIGMA(k)<SUMSH, the processing for calculating the prediction switching function σPRE is terminated without further processing.

On the other hand, if the result of determination at step 163 is NO, indicating that SUMSIGMA(k)≧SUMSH, the routine proceeds to step 164, where the ECU 2 sets the current value SUMSIGMA(k) to the upper limit value SUMSH, followed by termination of the processing for calculating the prediction switching function σPRE. On the other hand, if the result of determination at step 162 is NO, indicating SUMSIGMA(k)≦SUMSL, the routine proceeds to step 165, where the ECU 2 sets the current value SUMSIGMA(k) to the lower limit value SUMSL, followed by termination of the processing for calculating the prediction switching function σPRE.

On the other hand, if the result of determination at step 160 is NO, i.e., when any of the three conditions (l)–(n) is not satisfied to result in a failed establishment of the condition for calculating the integrated value SUMSIGMA, the routine proceeds to step 166, where the ECU 2 sets the current value SUMSIGMA(k) to the preceding value SUMSIGMA(k−1). In other words, the integrated value SUMSIGMA is held unchanged. Subsequently, the processing for calculating the prediction switching function σPRE is terminated.

Turning back to FIG. 30, at steps 152–154 subsequent to step 151, the ECU 2 calculates the equivalent control input Ueq, reaching law input Urch, and adaptive law input Uadp in accordance with the aforementioned equations (40)–(42), respectively, in FIG. 12.

Next, the routine proceeds to step 155, where the ECU 2 sets the sum of these equivalent control input Ueq, reaching law input Urch, and adaptive law input Uadp as the control amount Usl, followed by termination of processing for calculating the control amount Usl.

Next, the aforementioned processing for calculating the sliding mode control amount DKCMDSLD at step 36 in FIG. 15 will be described in detail with reference to FIGS. 32, 33 which illustrate routines for executing this processing. First, at step 170, the ECU 2 executes processing for calculating a limit value for the control amount Usl. In this processing, though detailed description is omitted, the ECU 2 calculates upper and lower limit values Usl_ahf, Usl_alf for non-idle operation, as well as upper and lower limit values Usl_ahfi, Usl_alfi for idle operation, respectively, based on the result of determination for determining the stability of the controller at step 35, and adaptive upper and lower limit values Usl_ah, Usl_al, later described, for the control amount Usl.

Figure 30:
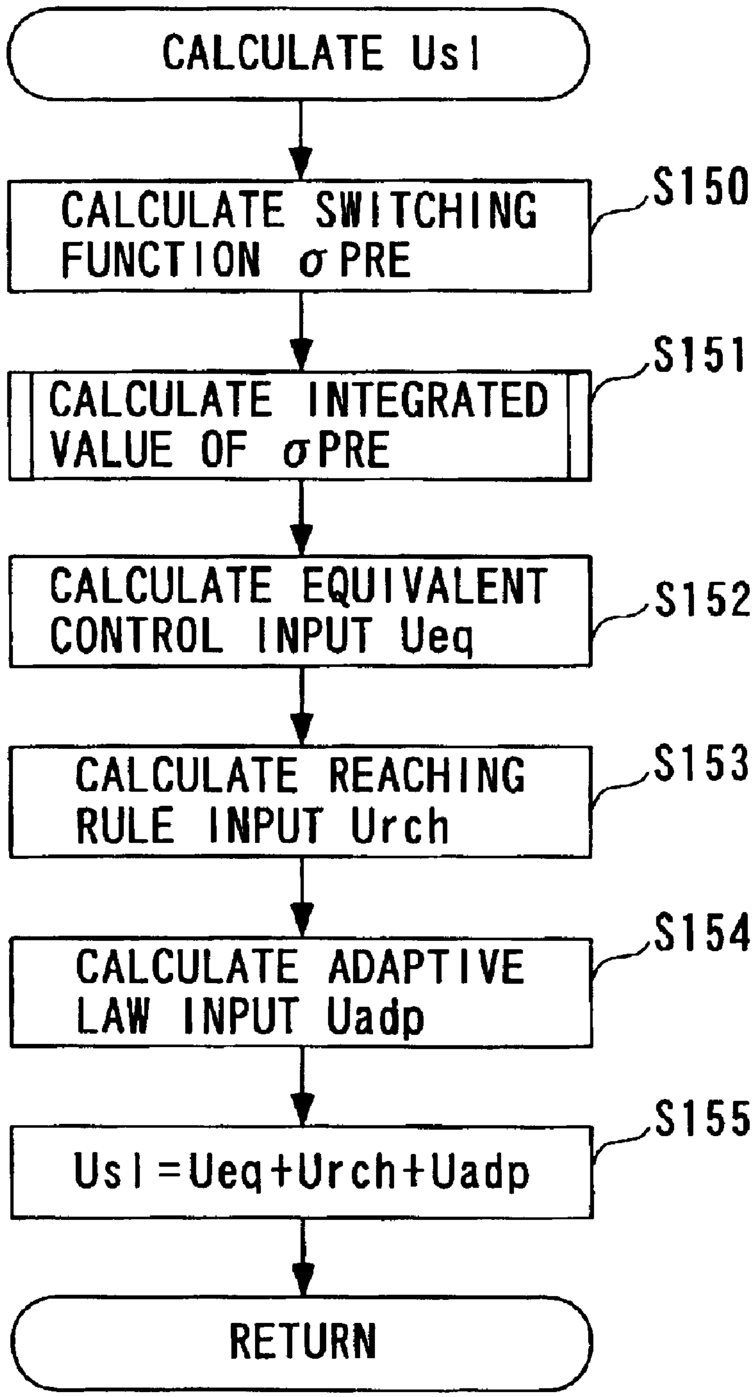
FIG. 30 is a flow chart illustrating a routine for executing the processing for calculating a control amount Us1 at step 34 in FIG. 15.

Next, the routine proceeds to step 171, where it is determined whether or not an idle operation flag F_IDLE is "0." If the result of determination at step 171 is YES, indicating that the engine 3 is not in an idle operation, the routine proceeds to step 172, where it is determined whether or not the control amount Usl calculated in the aforementioned processing of FIG. 30 is equal to or smaller than the lower limit value Usl_alf for non-idle operation.

If the result of determination at step 172 is NO, indicating that Usl>Usl_alf, the routine proceeds to step 173, where it is determined whether or not the control amount Usl is equal to or larger than the upper limit value Usl_ahf for non-idle operation. If the result of determination at step 173 is NO, indicating that Usl_alf<Usl<Usl_ahf, the routine proceeds to step 174, where the ECU 2 sets the sliding mode control amount DKCMDSLD to the control amount Usl, and simultaneously sets the integrated value holding flag F_SS_HOLD to "0."

Next, the routine proceeds to step 175, where the ECU 2 sets the current value Usl_al(k) of the adaptive lower limit value to a value [Usl_al(k−1)+X_AL_DEC] which is calculated by adding a predetermined decrement value X_AL_DEC to the preceding value Usl_al(k−1), and simultaneously sets the current value Usl_ah(k) of the adaptive upper limit value to a value which is calculated by subtracting the predetermined decrement value X_AL_DEC from the preceding value Usl_ah(k−1) [Usl_al(k−1)−X_AL_DEC], followed by termination of the processing for calculating the sliding mode control amount DKCMDSLD.

On the other hand, if the result of determination at step 173 is YES, indicating that Usl≧Usl_ahf, the routine proceeds to step 176, where the ECU 2 sets the sliding mode control amount DKCMDSLD to the adaptive upper limit value Usl_ahf for non-idle operation, and simultaneously sets the integrated value holding flag F_SS_HOLD to "1."

Next, the routine proceeds to step 177, where it is determined whether or not a post-start timer presents a timer value TMACR smaller than a predetermined time X_TMAWAST, or whether or not an post-F/C determination flag F_AFC is "1." This post-start timer is an up-count type timer for measuring a time elapsed after the start of the engine 3.

If the result of determination at step 177 is YES, i.e., when a predetermined time X_TMAWAST has not elapsed after the start of the engine 3, or when a predetermined time X_TM_AFC has not elapsed after a fuel cut operation is terminated, the processing for calculating the sliding mode control amount DKCMDSLD is terminated without further processing.

On the other hand, if the result of determination at step 177 is NO, i.e., when the predetermined time X_TMAWAST has elapsed after the start of the engine 3, and when the predetermined time X_TM_AFC has elapsed after a fuel cut operation, the routine proceeds to step 178, where the ECU 2 sets the current value Usl_al(k) of the adaptive lower limit value to a value which is calculated by adding the decrement value X_AL_DEC to the preceding value Usl_al(k−1) [Usl_al(k−1)+X_AL_DEC], and simultaneously sets the current value Usl_ah(k) of the adaptive upper limit value to a value which is calculated by adding a predetermined increment value X_AL_INC to the preceding value Usl_ah(k−1) [Usl_ah(k−1)+X_AL_INC], followed by termination of the processing for calculating the sliding mode control amount DKCMDSLD.

On the other hand, if the result of determination at step 172 is YES, indicating that Usl≦Usl_alf, the routine proceeds to step 179, where the ECU 2 sets the sliding mode control amount DKCMDSLD to the adaptive lower limit value Usl_alf for non-idle operation, and simultaneously sets the integrated value holding flag F_SS_HOLD to "1."

Next, the routine proceeds to step 180, where it is determined whether or not a second launch flag F_VST is "1." If the result of determination at step 180 is YES, i.e., when a second predetermined time TVST has not elapsed after the launch of the vehicle so that the vehicle is still in a second launch mode, the processing for calculating the sliding mode control amount DKCMDSLD is terminated without further processing.

On the other hand, if the result of determination at step 180 is NO, i.e., when the second predetermined time TVST has elapsed after the launch of the vehicle so that the second launch mode has been terminated, the routine proceeds to step 181, where the ECU 2 sets the current value Usl_al(k) of the adaptive lower limit value to a value which is calculated by subtracting the increment value X_AL_INC from the preceding value Usl_al(k−1) [Usl_al(k−1)−X_AL_INC], and simultaneously sets the current value Usl-ah(k) of the adaptive upper limit value to a value which is calculated by subtracting the decrement value X_AL_DEC from the preceding value Usl_ah(k−1) [Usl_ah(k−1)−X_AL_DEC], followed by termination of the processing for calculating the sliding mode control amount DKCMDSLD.

Figure 33:
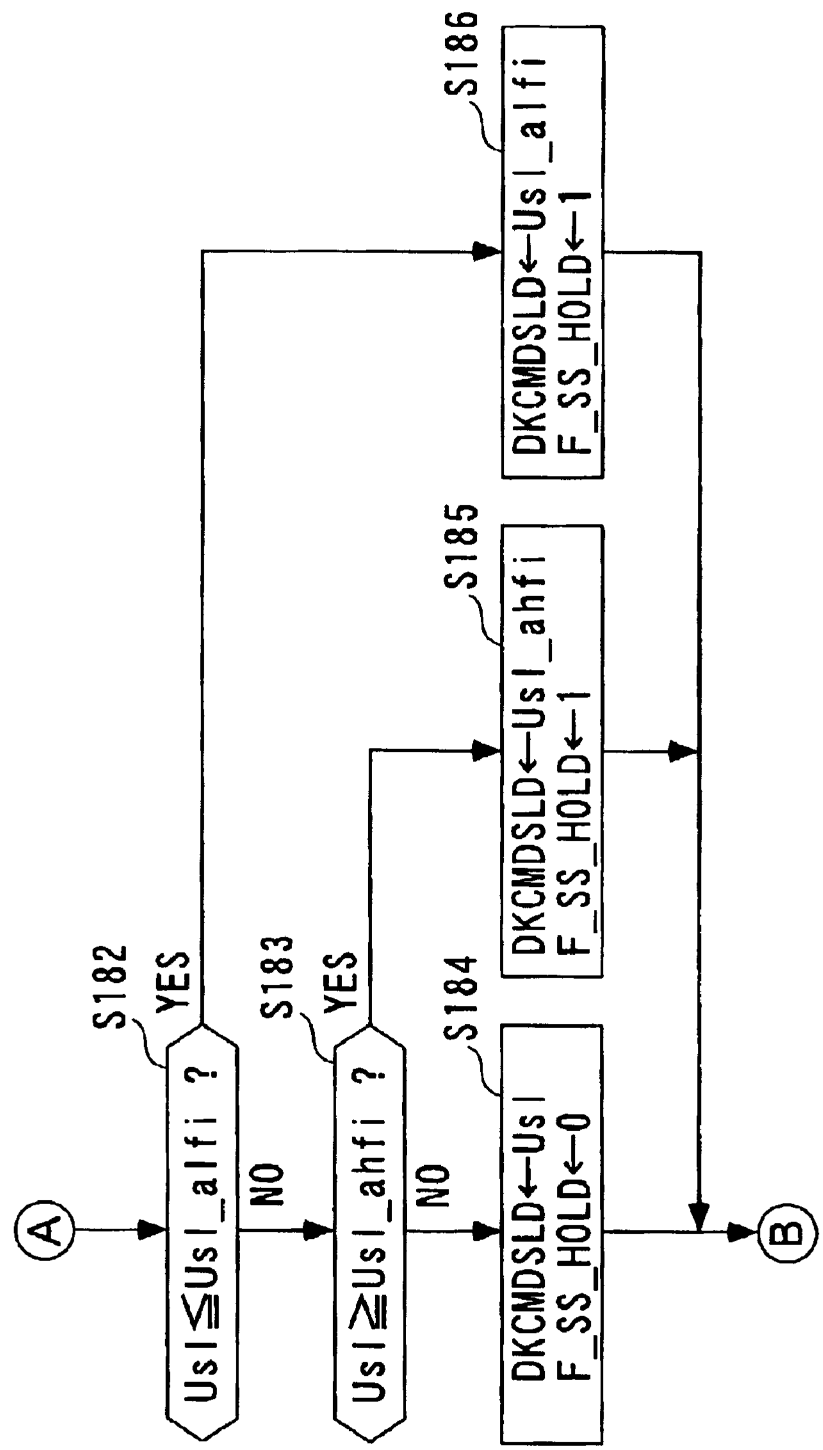

On the other hand, if the result of determination at step 171 is NO, indicating that the engine 3 is in an idle operation, the routine proceeds to step 182 in FIG. 33, where it is determined whether or not the control amount Usl is equal to or smaller than the lower limit value Usl_alfi for idle operation. If the result of determination at step 182 is NO, indicating that Usl>Usl_alfi, the routine proceeds to step 183, where it is determined whether or not the control amount Us1 is equal to or larger than the upper limit value Usl_ahfi for idle operation.

If the result of determination at step 183 is NO, indicating that Usl_alfi<Usl<Usl_ahfi, the routine proceeds to step 184, where the ECU 2 sets the sliding mode control amount DKCMDSLD to the control amount Usl, and simultaneously sets the integrated value holding flag F_SS_HOLD to "0," followed by termination of the processing for calculating the sliding mode control amount DKCMDSLD. On the other hand, if the result of determination at step 183 is YES, indicating that Usl≧Usl_ahfi, the routine proceeds to step 185, where the ECU 2 sets the sliding mode control amount DKCMDSLD to the upper limit value Usl-ahfi for idle operation, and simultaneously sets the integrated value holding flag F_SS_HOLD to "1," followed by termination of the processing for calculating the sliding mode control amount DKCMDSLD.

On the other hand, if the result of determination at step 182 is YES, indicating that Usl≦Usl_alfi, the routine proceeds to step 186, where the ECU 2 sets the sliding mode control amount DKSMDSLD to the lower limit value Usl_alfi for idle operation, and simultaneously sets the integrated value holding flag F_SS_HOLD to "1," followed by termination of the processing for calculating the sliding mode control amount DKCMDSLD.

Next, the processing for calculating the ΔΣ modulation control amount DKCMDDSM at step 37 in FIG. 15 will be described with reference to FIG. 34 which illustrates a routine for executing this processing. As illustrated, at step 190, the ECU 2 first sets a current value DSMSGNS(k) [=u"(k)] of a DSM signal value calculated in the preceding loop, which is stored in the RAM, as the preceding value DSMSGNS(k−1) [=u"(k−1)].

Next, the routine proceeds to step 191, where the ECU 2 sets a current value DSMSIGMA(k) [=$\sigma_d$(k)] of a deviation integrated value calculated in the preceding loop and stored in the RAM as the preceding value DSMSIGMA(k−1) [=$\sigma_d$(k−1)].

Next, the routine proceeds to step 192, where it is determined whether or not the predicted value PREVO2 (k) of the output deviation is equal to or larger than zero. If the result of determination at step 192 is YES, the routine proceeds to step 193, where a gain KRDSM (=Gd) for reference signal value is set to a leaning coefficient KRDSML, on the assumption that the engine 3 is in an operating condition in which the air/fuel ratio of the air-fuel mixture should be changed to be leaner. Then, the routine proceeds to step 195, later described.

On the other hand, if the result of determination at step 192 is NO, the routine proceeds to step 194, where the gain KRDSM for reference signal value is set to an enriching coefficient KRDSMR, larger than the leaning coefficient KRDSML, on the assumption that the engine 3 is in an operating condition in which the air/fuel ratio of the air-fuel mixture should be changed to be richer. Then, the routine proceeds to step 195.

The leaning coefficient KRDSML and the enriching coefficient KRDSMR are set to values different from each other, as described above, for the reason set forth below. For changing the air/fuel ratio of the air/fuel mixture to be leaner, the leaning coefficient KRDSML is set to a value smaller than the enriching coefficient KRDSMR for effectively suppressing the amount of exhausted NOx by lean biasing to ensure an NOx purification percentage of the first catalyzer 8a. Thus, the air/fuel ratio is controlled such that the output Vout of the O2 sensor 15 converges to the target value Vop slower than when the air/fuel ratio is changed to be richer. On the other hand, for changing the air/fuel ratio of the air/fuel mixture to be richer, the enriching coefficient KRDSMR is set to a value larger than the leaning coefficient KRDSML for sufficiently recovering the NOx purification percentage of the first and second catalyzers 8a, 8b. Thus, the air/fuel ratio is controlled such that the output Vout of the O2 sensor 15 converges to the target value Vop faster than when the air/fuel ratio is changed to be leaner. In the foregoing manner, a satisfactory post-catalyst exhaust gas characteristic can be ensured whenever the air/fuel ratio of the air/fuel mixture is changed to be either leaner or richer.

At step 195 subsequent to step 193 or 194, the ECU 2 sets a value calculated by subtracting the preceding value DSMSGNS(k−1) of the DSM signal value calculated at the aforementioned step 190 from the product of a value of −1, the gain KRDSM for reference signal value, and the current value PREVO2(k) of the predicted value [−1·KRDSM·PREVO2(k)−DSMSGNS(k−1)] as a deviation signal value DSMDELTA [=δ(k)]. This setting corresponds to the aforementioned equations (27), (28).

Next, the routine proceeds to step 196, where the ECU 2 sets the current value DSMSIGMA(k) of the deviation integrated value to the sum of the preceding value DSMSIGMA(k−1) calculated at step 191 and the deviation signal value DSMDELTA calculated at step 195 [DSMSIGMA(k−1)+DSMDELTA]. This setting corresponds to the aforementioned equation (29).

Next, in a sequence of steps 197–199, the ECU 2 sets the current value DSMSGNS (k) of the DSM signal value to 1 when the current value DSMSIGMA(k) of the deviation integrated value calculated at step 196 is equal to or larger than 0, and sets the current value DSMSGNS(k) of the DSM signal value to −1 when the current value DSMSIGMA(k) of the deviation integrated value is smaller than 0. The setting in this sequence of steps 197–199 corresponds to the aforementioned equation (30).

Next, the ECU 2 calculates a gain KDSM (=$F_d$) for the DSM signal value at step 200 by searching a table shown in FIG. 35 in accordance with the exhaust gas volume AB_SV. As shown in FIG. 35, the gain KDSM is set to a larger value as the exhaust gas volume AB_SV is smaller. This is because the responsibility of the output Vout of the O2 sensor 15 is degraded as the exhaust gas volume AB_SV is smaller, i.e., as the engine 3 is operating with a smaller load, so that the gain KDSM is set larger to compensate for the degraded responsibility of the output Vout. By thus setting the gain KDSM, the ΔΣ modulation control amount DKCMDDSM can be appropriately calculated in accordance with an operating condition of the engine 3, while avoiding, for example, an over-gain state, thereby making it possible to improve the post-catalyst exhaust gas characteristic.

The table for use in the calculation of the gain KDSM is not limited to the table of FIG. 35 which sets the gain KDSM in accordance with the exhaust gas volume AB_SV, but any table may be used instead as long as it previously sets the gain KDSM in accordance with a parameter indicative of an operating load of the engine 3 (for example, a basic fuel injection time Tim). Also, when a deterioration determining unit is provided for the catalyzers 8a, 8b, the gain KDSM may be corrected to a smaller value as the catalyzers 8a, 8b are deteriorated to a higher degree, as determined by the deterioration determining unit.

Next, the routine proceeds to step 201, where the ECU 2 sets the ΔΣ modulation control amount DKCMDDSM to the product of the gain KDSM for DSM signal value and the current value DSMSGNS(k) of the DSM signal value [KDSM·DSMSGNS(k)], followed by termination of the processing for calculating the ΔΣ modulation control amount DKCMDDSM. The setting at step 201 corresponds to the aforementioned equation (31).

Next, the aforementioned processing for calculating the adaptive target air/fuel ratio KCMDSLD at step 38 in FIG.

Figure 36:
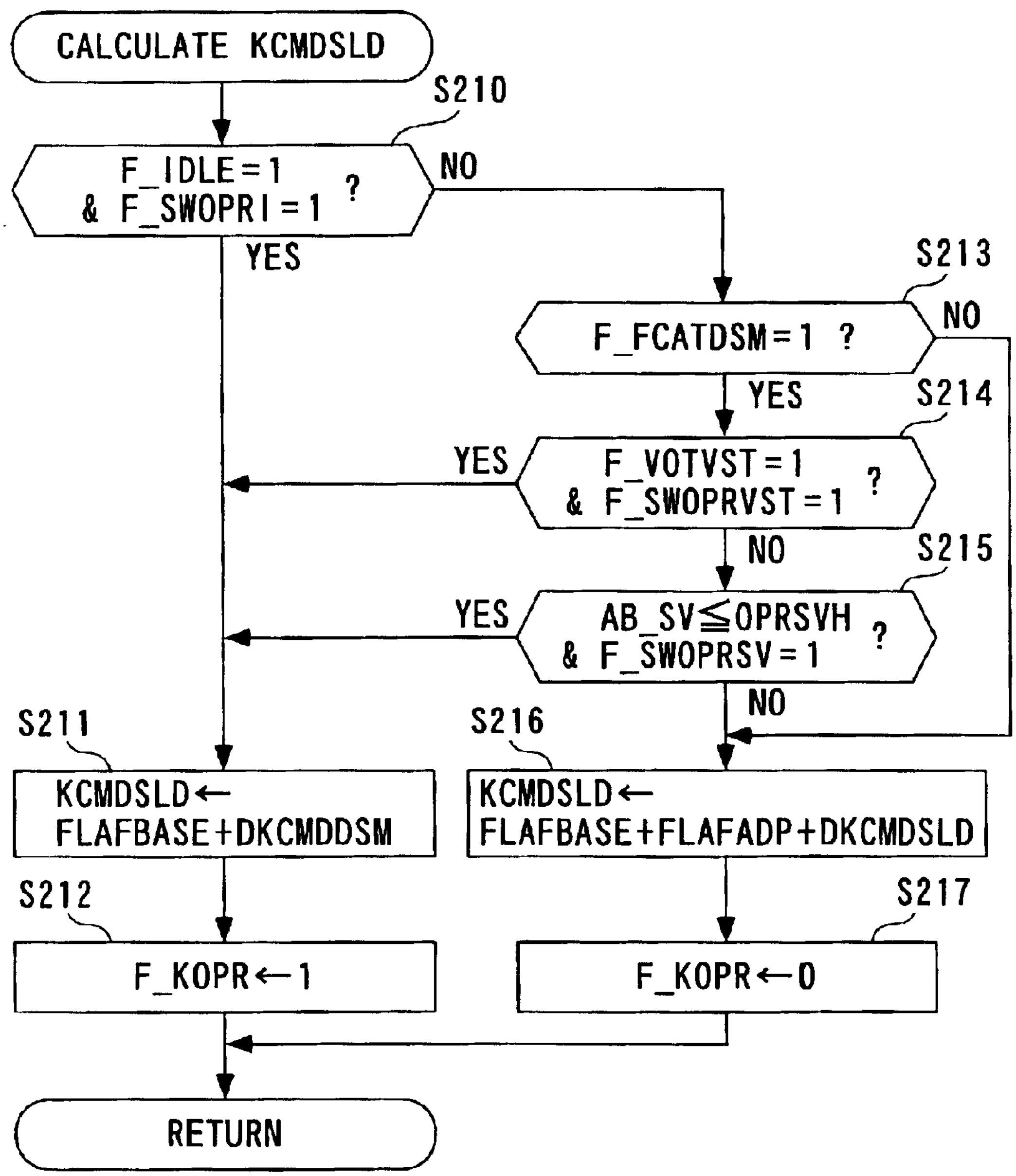
FIG. 36 is a flow chart illustrating a routine for executing the processing for calculating an adaptive target air/fuel ratio KCMDSLD at step 38 in FIG. 15.

15 will be described with reference to FIG. 36 which illustrates a routine for executing this processing. As illustrated, it is first determined at step 210 whether or not the idle operation flag F_IDLE is "1" and whether or not an idle time ADSM execution flag F_SWOPRI is "1." The idle time ADSM execution flag F_SWOPRI is set to "1" when the engine 3 is idling in an operating condition in which the ADSM processing should be executed, and otherwise to "0."

If the result of determination at step 210 is YES, i.e., when the engine 3 is idling in an operating condition in which the adaptive target air/fuel ratio KCMDSLD should be calculated by the ADSM processing, the routine proceeds to step 211, where the ECU 2 sets the adaptive target air/fuel ratio KCMDSLD to the sum of the reference value FLAFBASE and the ΔΣ modulation control amount DKCMDDSM [FLAFBASE+DKCMDDSM]. This setting corresponds to the aforementioned equation (32).

Next, the routine proceeds to step 212, where the ECU 2 sets an ADSM execution end flag F_KOPR to "1" for indicating that the ADSM processing has been executed, followed by termination of the processing for calculating the adaptive target air/fuel ratio KCMDSLD.

On the other hand, if the result of determination at step 210 is NO, the routine proceeds to step 213, where it is determined whether or not a catalyst/O2 sensor flag F_FCATDSM is "1." This catalyst/O2 sensor flag F_FCATDSM is set to "1" when at least one of the four following conditions (o)–(r) is satisfied, and otherwise to "0":

(o) the first catalyzer 8*a* has a catalyst capacity equal to or higher than a predetermined value;

(p) the first catalyzer 8*a* has a noble metal content equal to or larger than a predetermined value;

(q) the LAF sensor 14 is not provided in the exhaust pipe 7 of the engine 3; and (r) the O2 sensor 15 is provided downstream of the second catalyzer 8*b*.

If the result of determination at step 213 is YES, the routine proceeds to step 214, where it is determined whether or not a first launch flag F_VOTVST and a post-launch ADSM execution flag F_SWOPRVST are both "1." The post-launch ADSM execution flag F_SWOPRVST is set to "1" when the engine 3 is in an operating condition in which the ADSM processing should be executed after the vehicle has been launched, and otherwise to "0."

If the result of the determination at step 214 is YES, i.e., when a first predetermined time TVOTVST has elapsed after the vehicle was launched and when the engine 3 is in an operating condition in which the ADSM processing should be executed, the ECU 2 executes steps 211, 212, in the manner described above, followed by termination of the processing for calculating the adaptive target air/fuel ratio KCMDSLD.

On the other hand, if the result of determination at step 214 is NO, the routine proceeds to step 215, where it is determined whether or not the following conditions are both satisfied: the exhaust gas volume AB_SV is equal to or smaller than a predetermined value OPRSVH, and a small-exhaust-period ADSM execution flag F_SWOPRSV is "1." The small-exhaust-period ADSM execution flag F_SWOPRSV is set to "1" when the engine 3 has a small exhaust gas volume AB_SV and when the engine 3 is in an operating condition in which the ADSM processing should be executed, and otherwise to "0."

If the result of determination at step 215 is YES, i.e., when the exhaust gas volume AB_SV is small and when the engine 3 is in an operating condition in which the ADSM processing should be executed, the ECU 2 executes steps 211, 212 in the manner described above, followed by termination of the processing for calculating the adaptive target air/fuel ratio KCMDSLD.

On the other hand, if the result of determination at step 215 is NO, the routine proceeds to step 216, on the assumption that the engine 3 is in an operating condition in which the PRISM processing should be executed, where the ECU 2 sets the adaptive target air/fuel ratio KCMDSLD to the sum of the reference value FLAFBASE, the adaptive correction term FLAFADP, and the sliding mode control amount DKCMDSLD [FLAFBASE+FLAFADP+DKCMDSLD]. Next, the routine proceeds to step 217, where the ECU 2 sets the ADSM execution end flag F_KOPR to "0" for indicating that the PRISM processing has been executed, followed by termination of the processing for calculating the adaptive target air/fuel ratio KCMDSLD.

On the other hand, if the result of determination at step 213 is NO, i.e., when any of the four conditions (o)–(r) is not satisfied, the ECU 2 skips steps 214, 215, and executes the aforementioned steps 216, 217, followed by termination of the processing for calculating the adaptive target air/fuel ratio KCMDSLD. In the foregoing manner, in the processing for calculating the adaptive target air/fuel ratio KCMDSLD, the ECU 2 calculates the adaptive target air/fuel ratio KCMDSLD for the ADSM processing or PRISM processing, switched in accordance with an operating condition of the engine 3.

Next, the processing for calculating the adaptive correction term FLAFADP at step 39 in FIG. 15 will be described with reference to FIG. 37 which illustrates a routine for executing this processing. As illustrated in FIG. 37, it is first determined at step 220 whether or not the output deviation VO2 is within a predetermined range ($ADL<VO2<ADH$). If the result of determination at step 220 is YES, i.e., when the output deviation VO2 is small so that the output Vout of the O2 sensor 15 is near the target value Vop, the routine proceeds to step 221, where it is determined whether or not the adaptive law input Uadp is smaller than a predetermined lower limit value NRL.

If the result of determination at step 221 is NO, indicating that $Uadp \geqq NRL$, the routine proceeds to step 222, where it is determined whether or not the adaptive law input Uadp is larger than a predetermined upper limit value NRH. If the result of determination at step 222 is NO, indicating that $NRL \leqq Uadp \leqq NRH$, the routine proceeds to step 223, where the ECU 2 sets the current value FLAFADP(k) of the adaptive correction term to the preceding value FLAFADP(k−1). In other words, the current value of the adaptive correction term FLAFADP is held. Then, the processing for calculating the adaptive correction term FLAFADP is terminated.

On the other hand, if the result of determination at step 222 is YES, indicating that $Uadp>NRH$, the routine proceeds to step 224, where the ECU 2 sets the current value FLAFADP(k) of the adaptive correction term to the sum of the preceding value FLAFADP(k−1) and a predetermined update value X_FLAFDLT [FLAFADP(k−1)+X_FLAFDLT], followed by termination of the processing for calculating the adaptive correction term FLAFADP.

On the other hand, if the result of determination at step 221 is YES, indicating that $Uadp<NRL$, the routine proceeds to step 225, where the ECU 2 sets the current value FLAFADP(k) of the adaptive correction term to a value calculated by subtracting the predetermined update value X_FLAFDLT from the preceding value FLAFADP(k−1)

[FLAFADP(k−1)−X_FLAFDLT], followed by termination of the processing for calculating the adaptive correction term FLAFADP.

As described above, the control apparatus 1 according to the first embodiment can appropriately eliminate a slippage in control timing between the input and output of a controlled object which has the target air/fuel ratio KCMD as a control input and the output Vout of the O2 sensor 15 as the output, and exhibits the dynamic characteristic with relatively large phase delay, dead time and the like, thereby making it possible to improve the stability and controllability of the control and accordingly improve the post-catalyst exhaust gas characteristic.

In the following, control apparatuses according to a second through an eighth embodiment of the present invention will be described with reference to FIGS. 38–46. In the following description on the respective embodiments, components identical or equivalent to those in the first embodiment are designated the same reference numerals, and description thereon will be omitted as appropriate.

First, a control apparatus according to a second embodiment will be described with reference to FIG. 38. The control apparatus 201 in the second embodiment differs from the control apparatus 1 in the first embodiment only in the on-board identifier 23. Specifically, the on-board identifier 23 in the first embodiment calculates the model parameters a1, a2, b1 based on KACT, Vout, and ϕop (KCMD), whereas the on-board identifier 23 in the second embodiment calculates the model parameters a1, a2, b1 based on Vout and ϕop.

Figure 26:
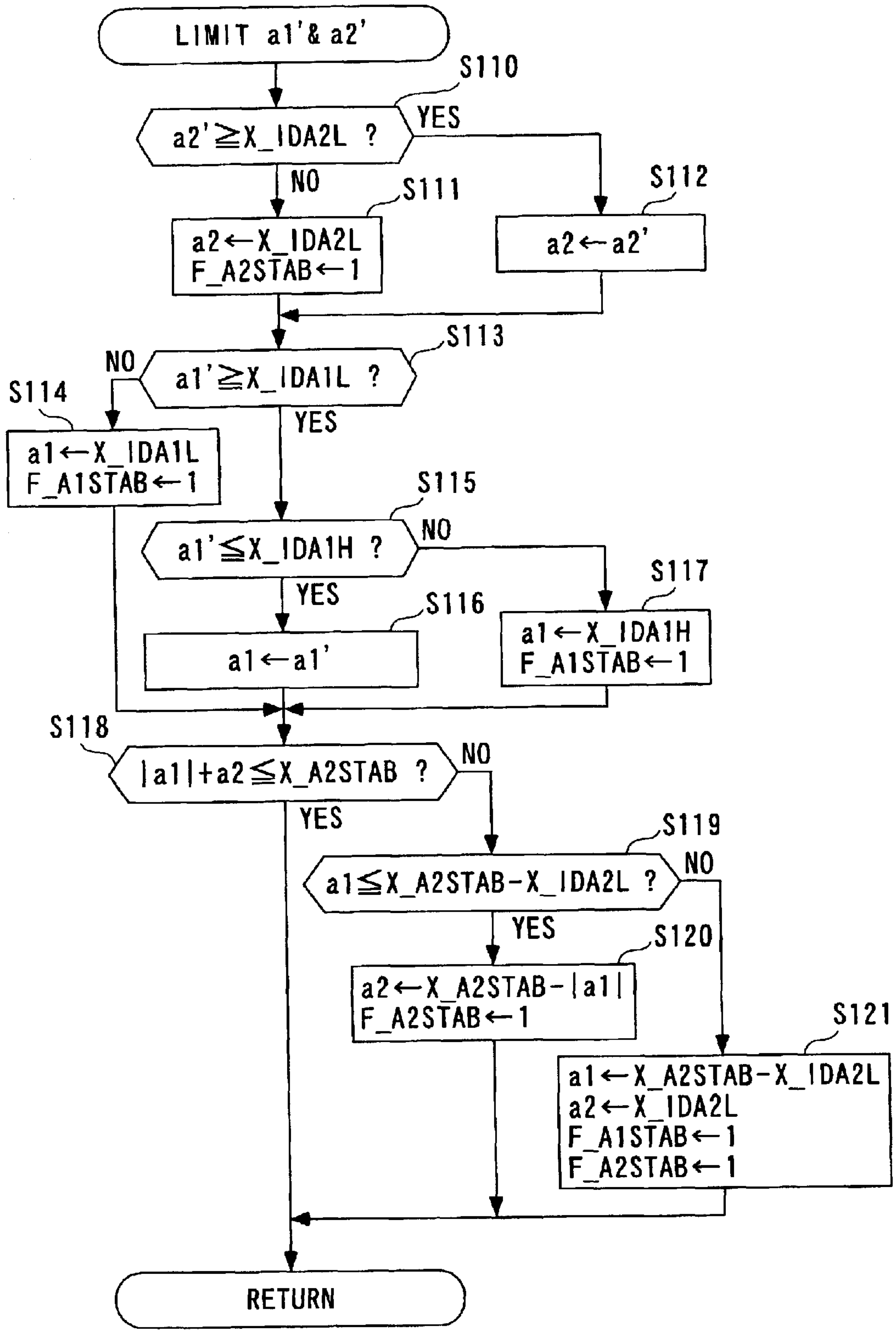
FIG. 26 is a flow chart illustrating a routine for executing the processing for limiting identified values a1' and a2' at step 101 in FIG. 25.
Figure 28:
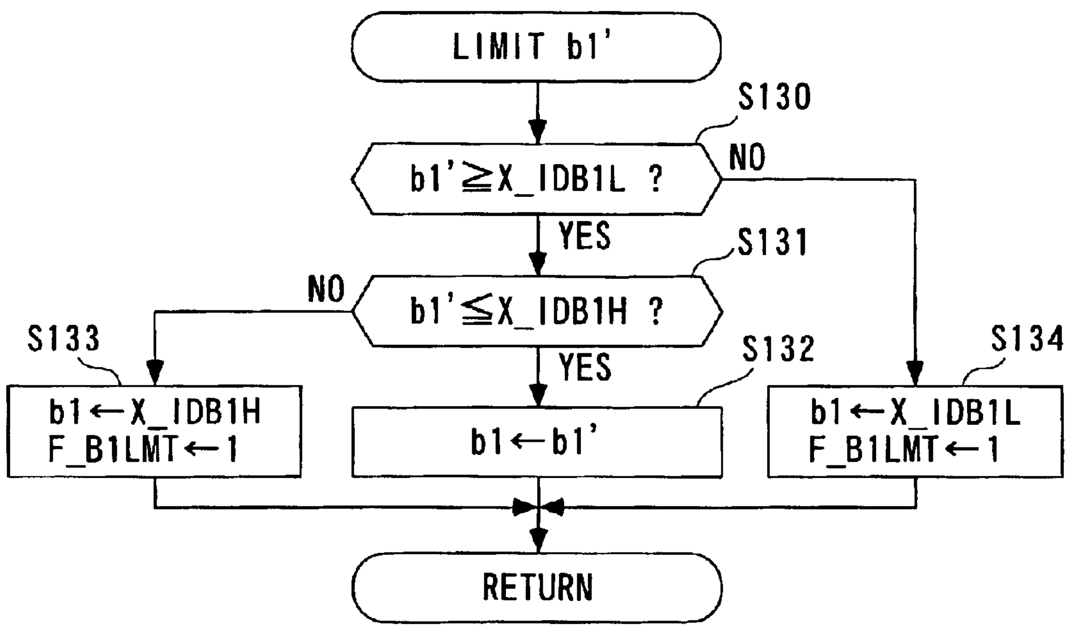
FIG. 28 is a flow chart illustrating a routine for executing the processing for limiting an identified value b1' at step 102 in FIG. 25.

More specifically, the on-board identifier 23 calculates identified values a1', a2', b1' for the model parameters in accordance with the identification algorithm expressed by the equations (8)–(15) in FIG. 5 in place of the identification algorithm expressed by the equations (16)–(23) in FIG. 6 used in the first embodiment, and limits the identified values a1', a2', b1', as illustrated in FIGS. 26, 28, to calculate the model parameters a1, a2, b1. Though no specific program is shown for the processing performed by the on-board identifier 23, such a program may be organized substantially similar to that used in the first embodiment. The control apparatus 201 according to the second embodiment can provide similar advantages to the control apparatus 1 according to the first embodiment.

Next, a control apparatus according to a third embodiment will be described with reference to FIG. 39. As illustrated, the control apparatus 301 in the third embodiment differs from the control apparatus 1 in the first embodiment only in the state predictor 22. Specifically, the state predictor 22 in the first embodiment calculates the predicted value PREVO2 based on a1, a2, b1, KACT, Vout, and ϕop(KCMD), whereas the state predictor 22 in the third embodiment calculates the predicted value PREVO2 based on a1, a2, b1, Vout, and ϕop.

More specifically, the state predictor 22 in the third embodiment calculates the predicted value PREVO2 of the output deviation VO2 in accordance with the prediction algorithm expressed by the equation (6) in FIG. 4, in place of the prediction algorithm expressed by the equation (7) in FIG. 4 used in the first embodiment. Though no specific program is shown for the processing performed by the state predictor 22, such a program may be organized substantially similar to that used in the first embodiment. The control apparatus 301 according to the third embodiment can provide similar advantages to the control apparatus 1 according to the first embodiment.

Next, a control apparatus according to a fourth embodiment will be described with reference to FIG. 40. As illustrated, the control apparatus 401 according to the fourth embodiment differs from the control apparatus 1 according to the first embodiment only in that a schedule type DSM controller 20A, a schedule type state prediction sliding mode controller 21A, and a parameter scheduler 28 (model parameter setting means) are used to calculate the model parameters a1, a2, b1 in place of the ADSM controller 20, PRISM controller 21, and on-board identifier 23.

The parameter scheduler 28 first calculates the exhaust gas volume AB_SV in accordance with the aforementioned equation (44) based on the engine rotational speed NE and intake pipe inner absolute pressure PBA. Next, the parameter scheduler 28 calculates the model parameters a1, a2, b1 in accordance with the exhaust gas volume AB_SV using a table shown in FIG. 41.

In the table sown in FIG. 41, the model parameter a1 is set to a smaller value as the exhaust gas volume AB_SV is larger. Contrary to the model parameter a1, the model parameters a2, b1 are set to larger values as the exhaust gas volume AB_SV is larger. This is because the output of the controlled object, i.e., the output Vout of the O2 sensor 15 becomes more stable as the exhaust gas volume AB_SV is increased, whereas the output Vout of the O2 sensor becomes oscillatory as the exhaust gas volume AB_SV is decreased.

The schedule type DSM controller 20A calculates the target air/fuel ratio KCMD in a DSM controller 24 similar to that in the first embodiment, using the model parameters a1, a2, b1 calculated as described above. Likewise, the schedule type state prediction sliding mode controller 21A calculates the target air/fuel ratio KCMD in an SLD controller 25 similar to that in the first embodiment, using the model parameters a1, a2, b1 calculated as described above.

The control apparatus 401 according to the fourth embodiment can provide similar advantages to the control apparatus 1 according to the first embodiment. In addition, the model parameters a1, a2, b1 can be more rapidly calculated using the parameter scheduler 28 than using the on-board identifier 23. It is therefore possible to improve the responsibility of the control and more rapidly ensure a favorable post-catalyst exhaust gas characteristic.

Next, a control apparatus according to a fifth embodiment will be described with reference to FIG. 42. The control apparatus 501 according to the fifth embodiment differs from the control apparatus 1 according to the first embodiment only in that an SDM controller 29 is used in place of the DSM controller 24 of the control apparatus 1 in the first embodiment. The SDM controller 29 calculates the control input ϕop(k) in accordance with a control algorithm which applies the ΣΔ modulation algorithm based on the predicted value PREVO2(k).

Figure 42:
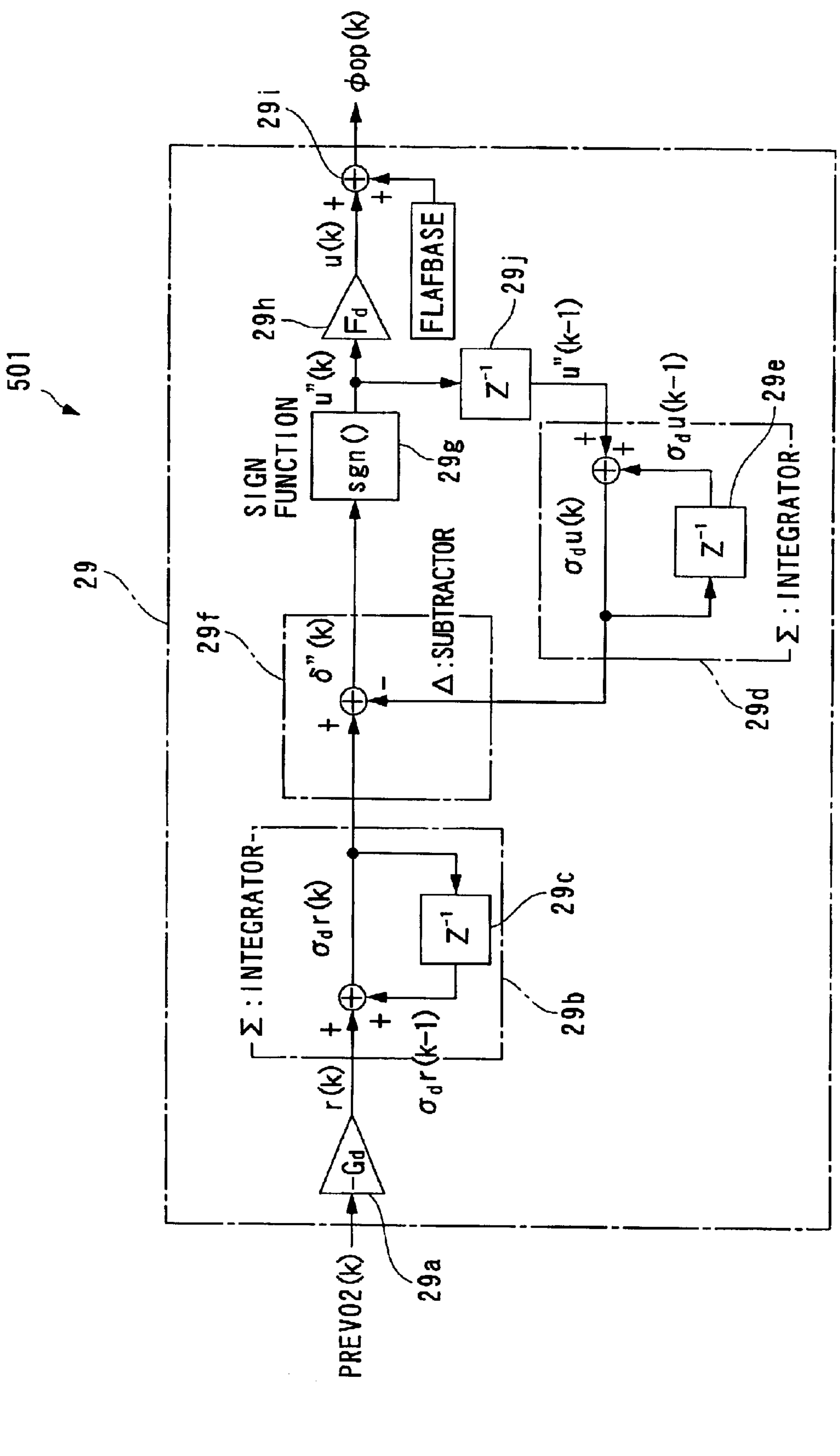
FIG. 42 is a block diagram generally illustrating the configuration of an SDM controller in a control apparatus according to a fifth embodiment.

Specifically, in the SDM controller 29 illustrated in FIG. 42, an inverting amplifier 29*a* generates a reference signal r(k) as the product of the value of −1, gain $G_d$ for reference signal, and predicted value PREVO2(k). Next, an integrator 29*b* generates a reference signal integrated value $\sigma_d r(k)$ as the sum of a reference signal integrated value $\sigma_d r(k-1)$ delayed by a delay element 29*c* and the reference signal r(k). On the other hand, an integrator 29*d* generates an SDM signal integrated value $\sigma_d u(k)$ as the sum of an SDM signal integrated value $\sigma_d u(k-1)$ delayed by a delay element 29*e*, and an SDM signal u"(k−1) delayed by a delay element 29*j*. Then, a subtractor 29*f* generates a deviation signal δ"(k) of the SDM signal integrated value $\sigma_d u(k)$ from the reference signal integrated value $\sigma_d r(k)$.

Next, a quantizer 29*g* (sign function) generates an SDM signal u"(k) as the sign of the deviation signal δ"(k). Then, an amplifier 29*h* generates an amplified SDM signal u(k) by amplifying the SDM signal u"(k) by a predetermined gain $F_d$. Then, an adder 29*i* generates the control input ϕop(k) as the sum of the amplified SDM signal u(k) and a predetermined reference value FLAFBASE.

The foregoing control algorithm of the SDM controller 29 is expressed by the following equations (45)–(51):

$$r(k)=-1\cdot Gd\cdot PREVO2(k) \quad (45)$$

$$\sigma_d r(k)=\sigma_d r(k-1)+r(k) \quad (46)$$

$$\sigma_d u(k)=\sigma_d u(k-1)+u''(k-1) \quad (47)$$

$$\delta''(k)=\sigma_d r(k)-\sigma_d u(k) \quad (48)$$

$$u''(k)=sgn(\delta''(k)) \quad (49)$$

$$u(k)=F_d\cdot u''(k) \quad (50)$$

$$\Phi op(k)=FLAFBASE+u(k) \quad (51)$$

where $G_d$ and $F_d$ represent gains. The sign function sgn(δ"(k)) takes the value of 1 (sgn(δ"(k) )=1) when δ"(k)≧0, and −1 (sgn(δ"(k))=−1) when δ"(k)<0 (alternatively, sgn(δ"(k)) may be set to 0 (sgn(δ"(k)=0) when δ"(k)=0.

The ΣΔ modulation algorithm in the control algorithm of the SDM controller 29 is characterized in that the SDM signal u(k) can be generated (calculated) such that the reference signal r(k) is reproduced at the output of the controlled object when the SDM signal u(k) is inputted to the control object, as is the case with the aforementioned ΔΣ modulation algorithm. In other words, the SDM controller 29 has the characteristic of generating the control input ϕop(k) similar to the aforementioned DSM controller 24. Therefore, the control apparatus 501 according to the fifth embodiment, which utilizes the SDM controller 29, can provide similar advantages to the control apparatus 1 according to the first embodiment. Though no specific program is shown for the SDM controller 29, such a program may be organized substantially similar to the DSM controller 24.

Next, a control apparatus according to a sixth embodiment will be described with reference to FIG. 43. The control apparatus 601 according to the sixth embodiment differs from the control apparatus 1 according to the first embodiment only in that a DM controller 30 is used in place of the DSM controller 24. The DM controller 30 calculates the control input ϕop(k) in accordance with a control algorithm which applies a Δ modulation algorithm based on the predicted value PREVO2(k).

Specifically, as illustrated in FIG. 43, in the DM controller 30, an inverting amplifier 30*a* generates the reference signal r(k) as the product of the value of −1, gain Gd for reference signal, and predicted value PREVO2 (k). An integrator 30*b* generates a DM signal integrated value $\delta_d$u(k) as the sum of a DM signal integrated value $\delta_d$u(k−1) delayed by a delay element 30 and a DM signal u"(k−1) delayed by a delay element 30*h*. Then, a subtractor 30*d* generates a deviation signal δ"(k) of the DM signal integrated value $\delta_d$u(k) from the reference signal r(k).

Next, a quantizer 30*e* (sign function) generates a DM signal u"(k) as a sign of the deviation signal δ"(k). Then, an amplifier 30*f* generates an amplified DM signal u(k) by amplifying the DM signal u"(k) by a predetermined gain $F_d$. Next, an adder 30*g* generates the control input ϕop(k) as the sum of the amplified DM signal u(k) and the predetermined reference value FLAFBASE.

The foregoing control algorithm of the DM controller 30 is expressed by the following equations (52)–(57):

$$r(k)=-1\cdot Gd\cdot PREVO2(k) \quad (52)$$

$$\sigma_d u(k)=\sigma_d u(\text{i } k-1)+u''(k-1) \quad (53)$$

$$\delta''(k)=r(k)-\sigma_d u(k) \quad (54)$$

$$u''(k)=sgn(\delta''(k)) \quad (55)$$

$$u(k)=F_d\cdot u''(k) \quad (56)$$

$$\Phi op(k)=FLAFBASE+u(k) \quad (57)$$

where $G_d$ and $F_d$ represents gains. The sign function sgn(δ"(k)) takes the value of 1 (sgn(δ"(k) )=1) when δ"(k)≧0, and −1 (sgn(δ"(k) )=−1) when δ"(k)<0 (alternatively, sgn(δ"(k) may be set to 0 (sgn(δ"(k)=0) when δ"(k)=0.

The control algorithm of the DM controller 30, i.e., the Δ modulation algorithm is characterized in that the DM signal u(k) can be generated (calculated) such that the reference signal r(k) is reproduced at the output of the controlled object when the DM signal u(k) is inputted to the controlled object, as is the case with the aforementioned ΔΣ modulation algorithm and ΣΔ modulation algorithm. In other words, the DM controller 30 has the characteristic of generating the control input ϕop(k) similar to the aforementioned DSM controller 24 and SDM controller 29. Therefore, the control apparatus 601 according to the sixth embodiment, which utilizes the DM controller 30, can provide similar advantages to the control apparatus 1 according to the first embodiment. Though no specific program is shown for the DM controller 30, such a program may be organized substantially similar to the DSM controller 24.

Figure 44:
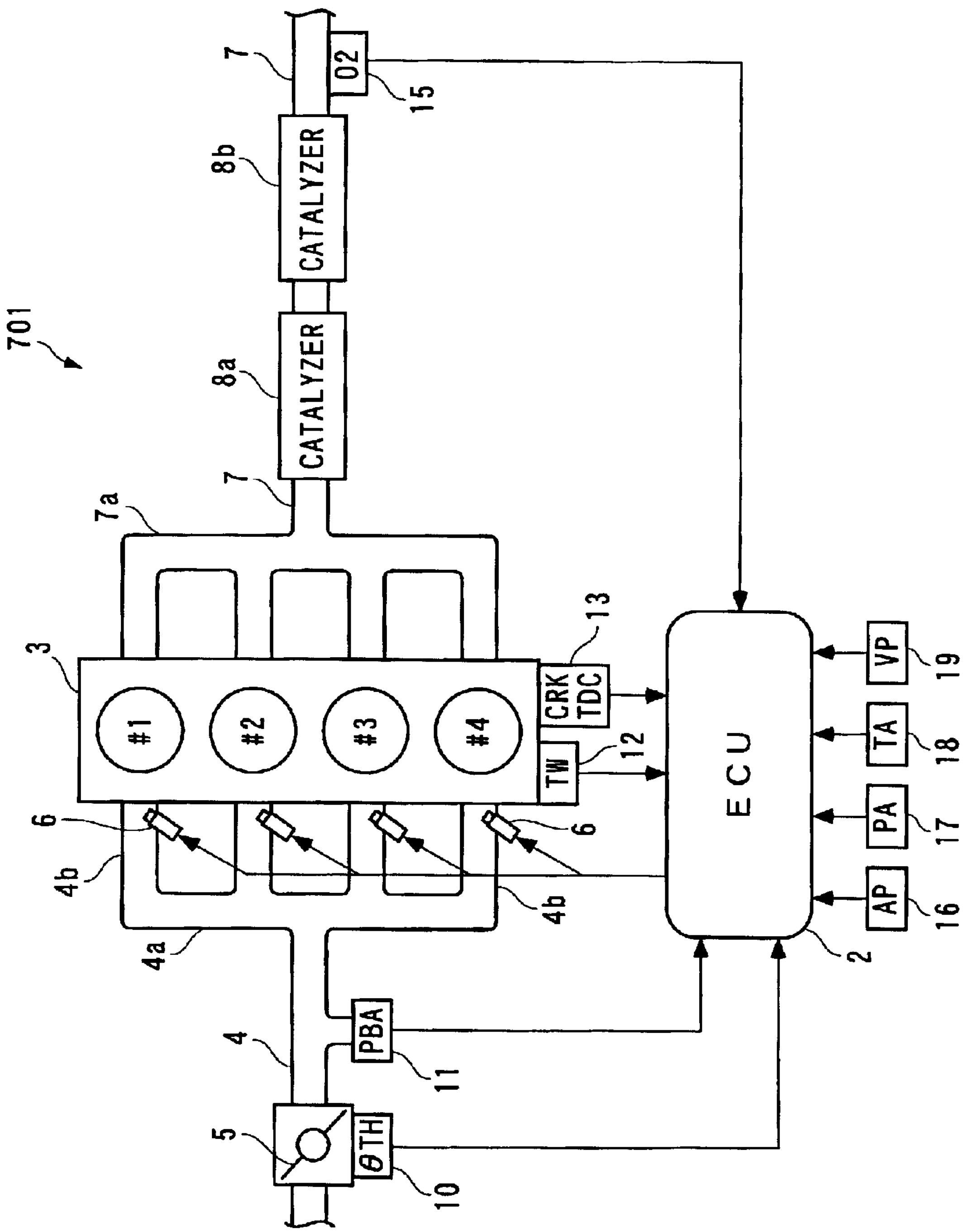
FIG. 44 is a block diagram generally illustrating a control apparatus according to a seventh embodiment, and an internal combustion engine to which the control apparatus is applied.

Next, a control apparatus according to a seventh embodiment will be described with reference to FIGS. 44 and 45. As illustrated in FIG. 44, the control apparatus 701 according to the seventh embodiment differs from the control apparatus 1 according to the first embodiment only in that the engine 3 is not provided with the LAF sensor 14, and the O2 sensor 15 is disposed downstream of the second catalyzer 8*b*.

Figure 45:
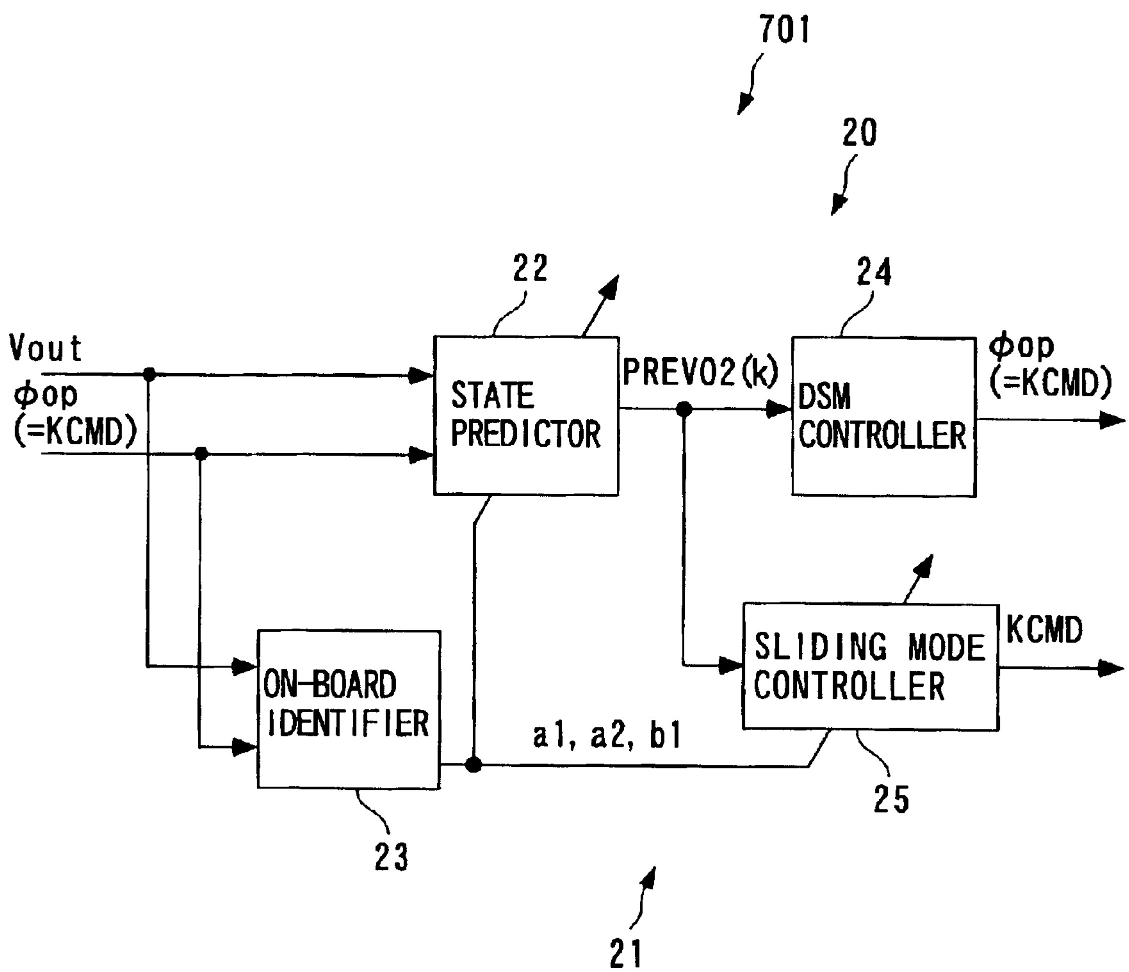
FIG. 45 is a block diagram generally illustrating the configuration of a control apparatus according to a seventh embodiment.

Since the LAF sensor 14 is not provided, the control apparatus 701 relies on the on-board identifier 23 to calculate the model parameters a1, a2, b1 based on the output Vout of the O2 sensor 15, and the control input ϕop(k) (target air/fuel ratio KCMD), as illustrated in FIG. 45. In other words, the on-board identifier 23 calculates the identified values a1', a2', b1' for the model parameters in accordance with the identification algorithm expressed by the equation (8)–(15) in FIG. 5, and limits these identified values in the manner described above to calculate the model parameters a1, a2, b1.

Further, the state predictor 22 calculates the predicted value PREVO2 of the output deviation VO2 based the model parameters a1, a2, b1, output Vout of the O2 sensor 15, and control input ϕop. In other words, the state predictor 22 calculates the predicted value PREVO2 of the output deviation VO2 in accordance with the prediction algorithm expressed by the equation (6) in FIG. 4. Though no specific programs are shown for the processing performed by the state predictor 22 and on-board identifier 23, such programs may be organized substantially similar to those in the first embodiment. Other programs may also be organized in a similar manner to those in the first embodiment.

The control apparatus 701 according to the seventh embodiment as described above can provide similar advantages to the control apparatus 1 according to the first embodiment. Particularly, when the air/fuel ratio is controlled only by the O2 sensor 15, as in the seventh embodiment, by setting the gain KRDSM for reference signal value to different values at steps 192–194 in FIG. 34 for controlling exhaust gases to be leaner and richer to converge the target air/fuel ratio KCMD to the target value Vop at different rates, the control apparatus 701 can provide a satisfactory post-catalyst exhaust gas characteristic without fail for changing the air/fuel ratio of the air/fuel mixture to be richer and leaner. In addition, since the suitable post-catalyst exhaust gas characteristic can be ensured without using the LAF sensor 14, the manufacturing cost can be saved correspondingly.

Figure 46:
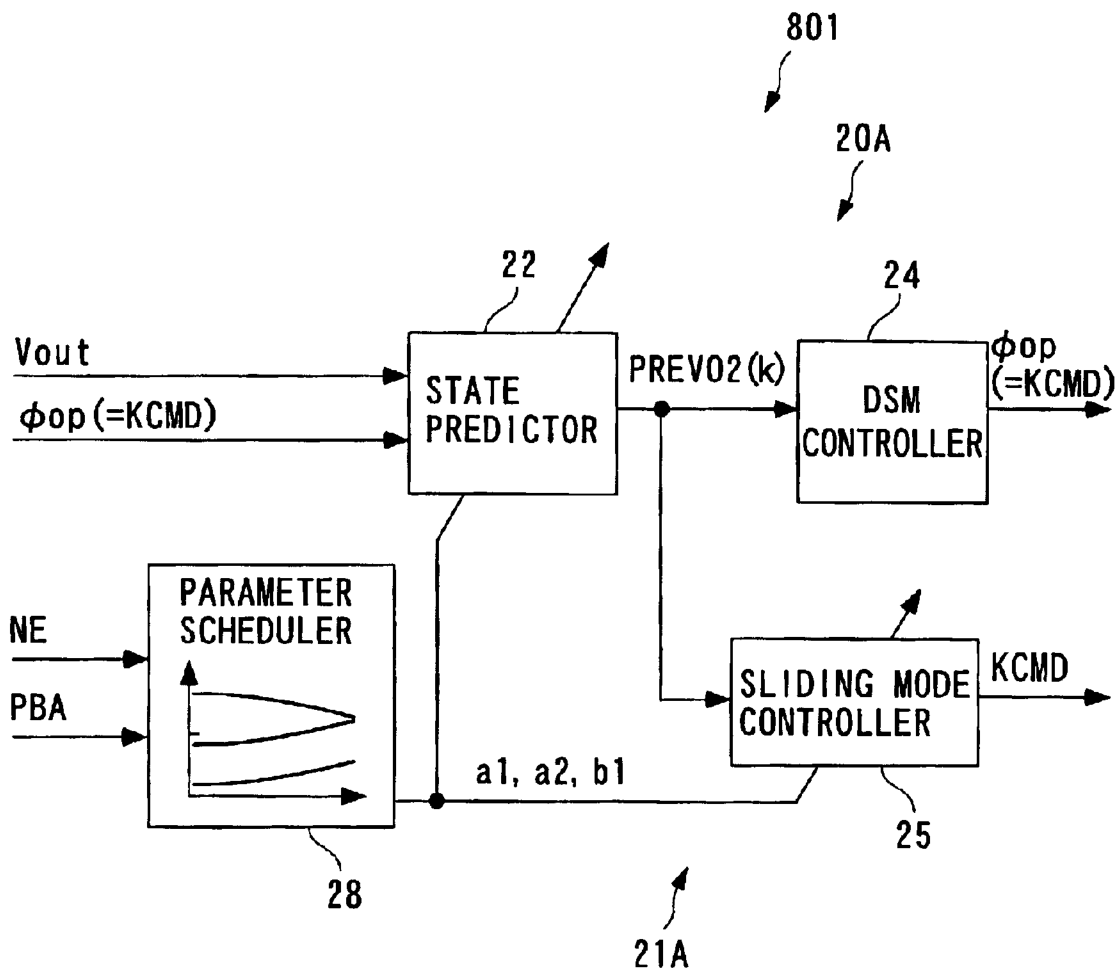
FIG. 46 is a block diagram generally illustrating the configuration of a control apparatus according to an eighth embodiment.

Next, a control apparatus according to an eighth embodiment will be described with reference to FIG. 46. As illustrated, the control apparatus 801 according to the eighth embodiment differs from the control apparatus 701 according to the seventh embodiment in that the ADSM controller 20, PRISM controller 21, and on-board identifier 23 in the seventh embodiment are replaced with the schedule type DSM controller 20A, schedule type state prediction sliding mode controller 21A, and parameter scheduler 28 in the fourth embodiment. These controllers 20A, 21A and parameter scheduler 28 are configured in a manner similar to those in the fourth embodiment. The control apparatus 801 according to the eighth embodiment can provide similar advantages to the control apparatus 701 according to the seventh embodiment. In addition, the model parameters a1, a2, b1 can be calculated faster when the parameter scheduler 28 is used than when the on-board identifier 23 is used. This can improve the responsibility of the control and more rapidly ensure a satisfactory post-catalyst exhaust gas characteristic.

The foregoing embodiments have illustrated exemplary configurations of the control apparatus according to the present invention for controlling the air/fuel ratio of the internal combustion engine 3. It should be understood, however, that the present invention is not limited to the foregoing embodiments, but can be widely applied to control apparatuses for controlling other arbitrary controlled objects. In addition, the ADSM controller 20 and PRISM controller 21 may be implemented in hardware in place of the programs as illustrated in the embodiments.

As described above, the control apparatus according to the present invention can eliminate a slippage in control timing between the input and output of a controlled object, even when the controlled object exhibits the dynamic characteristic with relatively large phase delay, dead time, and the like, thereby improving the stability and controllability of the control.

What is claimed is:

1. A control apparatus comprising:

predicted value calculating means for calculating a predicted value of a value indicative of an output of a controlled object based on a prediction algorithm; and control input calculating means for calculating a control input to said controlled object based on one modulation algorithm selected from a Δ modulation algorithm, a ΔΣ modulation algorithm, and a ΣΔ modulation algorithm for controlling the output of said controlled object in accordance with said calculated predicted value.

2. A control apparatus according to claim 1, wherein:

said predicted value calculating means calculates said predicted value in accordance with at least one of said calculated control input and a value which reflects a control input inputted to said controlled object, and the output of said controlled object, based on said prediction algorithm.

3. A control apparatus according to claim 1, wherein said prediction algorithm is an algorithm based on a controlled object model which has a variable associated with a value indicative of one of said control input and said value which reflects a control input inputted to said controlled object, and a variable associated with a value indicative of the output of said controlled object.

4. A control apparatus according to claim 3, wherein said value indicative of the output of said controlled object is an output deviation which is a deviation of the output of said controlled object from a predetermined target value.

5. A control apparatus according to claim 3, wherein said value indicative of one of said control input and said, value which reflects a control input inputted to said controlled object is one of a deviation of said control input from a predetermined reference value, and a deviation of said value which reflects a control input inputted to said controlled object from said predetermined reference value.

6. A control apparatus according to claim 1, wherein said control input calculating means calculates an intermediate value in accordance with said predicted value based on said one modulation algorithm, and calculates said control input based on said calculated intermediate value multiplied by a predetermined gain.

7. A control apparatus according to claim 6, further comprising:

gain parameter detecting means for detecting a gain parameter indicative of a gain characteristic of said controlled object; and gain setting means for setting said predetermined gain in accordance with said detected gain parameter.

8. A control apparatus according to claim 1, wherein:

said control input calculating means calculates a second intermediate value in accordance with said predicted value based on said one modulation algorithm, and adds a predetermined value to said calculated second intermediate value to calculate said control input.

9. A control apparatus according to claim 1, wherein:

said predicted value calculating means calculates a prediction time from the time at which said control input is inputted to said controlled object to the time at which said control input is reflected to the output of said controlled object in accordance with a dynamic characteristic of said controlled object, and said predicted value calculating means calculates said predicted value in accordance with said calculated prediction time.

10. A control apparatus according to claim 2, wherein:

said controlled object comprises a downstream air/fuel ratio sensor disposed at a location downstream of a catalyst in an exhaust passage of an internal combustion engine for detecting an air/fuel ratio of exhaust gases which have passed through said catalyst, and the output of said controlled object is an output of said downstream air/fuel ratio sensor;

said value indicative of the output of said controlled object is an output deviation of an output of said downstream air/fuel ratio sensor from a predetermined target value;

said control input to said controlled object is a target air/fuel ratio of an air/fuel mixture supplied to said internal combustion engine;

said value reflecting a control input inputted to said controlled object is an output of an upstream air/fuel ratio sensor disposed at a location upstream of said catalyst in said exhaust passage for detecting an air/fuel ratio of exhaust gases which have not passed through said catalyst;

said predicted value calculating means calculates the predicted value of said output deviation in accordance with at least one of said target air/fuel ratio of the air/fuel mixture supplied to said internal combustion engine, the output of said upstream air/fuel ratio sensor, and the output of said downstream air/fuel ratio sensor based on said prediction algorithm; and said control input calculating means comprises air/fuel ratio calculating means for calculating said target air/fuel ratio of the air/fuel mixture supplied to said internal combustion engine for converging the output of said downstream air/fuel ratio sensor to said predetermined target value in accordance with the calculated predicted value of said output deviation based on said one modulation algorithm.

11. A control apparatus according to claim 10, further comprising:

operating condition detecting means for detecting an operating condition of said internal combustion engine, wherein said predicted value calculating means calculates a prediction time from the time at which the air/fuel mixture is supplied to said internal combustion engine in said target air/fuel ratio to the time at which said target air/fuel ratio is reflected to the output of said downstream air/fuel ratio sensor in accordance with the detected operating condition of said internal combustion engine, and said predicted value calculating means calculates the predicted value of said output deviation further in accordance with said calculated prediction time.

12. A control apparatus according to claim 10, further comprising:

operating condition detecting means for detecting an operating condition of said internal combustion engine, wherein said air/fuel ratio calculating means includes:

intermediate value calculating means for calculating an intermediate value of said target air/fuel ratio of the air/fuel mixture supplied to said internal combustion engine in accordance with the predicted value of said output deviation based on said one modulation algorithm;

gain setting means for setting a gain in accordance with said detected operating condition of said internal combustion engine; and target air/fuel ratio calculating means for calculating said target air/fuel ratio of the air/fuel mixture supplied to said internal combustion engine based on said calculated intermediate value multiplied by said set gain.

13. A control apparatus according to claim 10, further comprising:

multiplying means for multiplying said calculated predicted value of said output deviation by a correction coefficient; and correction coefficient setting means for setting said correction coefficient to a smaller value when the predicted value of said output deviation is equal to or larger than a predetermined value than when the predicted value of said output deviation is smaller than said predetermined value, wherein said air/fuel ratio calculating means calculates said target air/fuel ratio of the air/fuel mixture in accordance with the predicted value of said output deviation multiplied by said correction coefficient based on said one modulation algorithm.

14. A control apparatus according to claim 2, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said value indicative of the output of said controlled object is an output deviation of an output of said air/fuel ratio sensor from a predetermined target value;

said control input to said controlled object is a target air/fuel ratio of an air/fuel mixture supplied to said internal combustion engine;

said predicted value calculating means calculates the predicted value of said output deviation in accordance with said target air/fuel ratio of the air/fuel mixture supplied to said internal combustion engine, and the output of said air/fuel ratio sensor based on said prediction algorithm; and said control input calculating means includes an air/fuel ratio calculating means for calculating said target air/fuel ratio of the air/fuel mixture supplied to said internal combustion engine for converging the output of said air/fuel ratio sensor to said predetermined target value in accordance with said calculated predicted value of said output deviation based on said one modulation algorithm.

15. A control apparatus according to claim 14, further comprising:

operating condition detecting means for detecting an operating condition of said internal combustion engine, wherein said predicted value calculating means calculates a prediction time from the time at which the air/fuel mixture is supplied to said internal combustion engine in said target air/fuel ratio to the time at which said target air/fuel ratio is reflected to the output of said air/fuel ratio sensor in accordance with the detected operating condition of said internal combustion engine, and said predicted value calculating means calculates the predicted value of said output deviation further in accordance with said calculated prediction time.

16. A control apparatus according to claim 14, further comprising:

operating condition detecting means for detecting an operating condition of said internal combustion engine, wherein said air/fuel ratio calculating means includes:

intermediate value calculating means for calculating an intermediate value of said target air/fuel ratio of the air/fuel mixture supplied to said internal combustion engine in accordance with the predicted value of said output deviation based on said one modulation algorithm;

gain setting means for setting a gain in accordance with said detected operating condition of said internal combustion engine; and target air/fuel ratio calculating means for calculating said target air/fuel ratio of the air/fuel mixture supplied to said internal combustion engine based on said calculated intermediate value multiplied by said set gain.

17. A control apparatus according to claim 14, further comprising:

multiplying means for multiplying said calculated predicted value of said output deviation by a correction coefficient; and correction coefficient setting means for setting said correction coefficient to a smaller value when the predicted value of said output deviation is equal to or larger than a predetermined value than when the predicted value of said output deviation is smaller than said predetermined value, wherein said air/fuel ratio calculating means calculates said target air/fuel ratio of the air/fuel mixture in accordance with the predicted value of said output deviation multiplied by said correction coefficient based on said one modulation algorithm.

18. A control apparatus comprising:

control input calculating means for calculating a control input to a controlled object based on one modulation algorithm selected from a Δ modulation algorithm, a ΔΣ modulation algorithm, and a ΣΔ modulation algorithm, and a controlled object model which models said controlled object, for controlling an output of said controlled object wherein said controlled object model is built as a discrete time system model, and said control apparatus further comprises on-board identifying means for sequentially on-board identifying model parameters of said controlled object model in accordance with one of said calculated control input and a value reflecting a control input inputted to said controlled object, and the output of said controlled object.

19. A control apparatus according to claim 18, wherein said identifying means includes:

identification error calculating means for calculating an identification error of said model parameters;

filtering means for filtering said calculated identification error in a predetermined manner; and parameter determining means for determining said model parameters based on said filtered identification error.

20. A control to according to claim 19, wherein:

said filtering means sets a filtering characteristic for said filtering in accordance with a dynamic characteristic of said controlled object.

21. A control apparatus according to claim 18, wherein:

said controlled object model comprises an input variable indicative of one of said control input and said value reflecting a control input inputted to said controlled object, and an output variable indicative of the output of said controlled object, and said identifying means identifies a model parameter multiplied by said input variable and a model parameter multiplied by said output variable such that said model parameters fall within respective predetermined restriction ranges.

22. A control apparatus according to claim 21, wherein:

said output variable comprises a plurality of time-series data of output variables which are multiplied by a plurality of model parameters, respectively, and said identifying means identifies said plurality of model parameters such that a combination of said model parameters falls within said predetermined restriction range.

23. A control apparatus according to claim 21, wherein:

said identifying means further includes restriction range setting means for setting said predetermined restriction range in accordance with a dynamic characteristic of said controlled object.

24. A control apparatus according to claim 21, wherein:

said output variable is a deviation of the output of said controlled object from a predetermined target value; and said input variable is one of a deviation of said control input from a predetermined reference value, and a deviation of the value reflecting a control input inputted to said controlled object from said predetermined reference value.

25. A control apparatus according to claim 18, wherein:

said identifying means further includes weighting parameter setting means for identifying said model parameters based on a weighted identification algorithm which uses weighting parameters for determining behaviors of said model parameters, and setting said weighting parameters in accordance with a dynamic characteristic of said controlled object.

26. A control apparatus according to claim 18, wherein:

said identifying means further includes dead time setting means for setting a dead time between one of the control input inputted to said controlled object and the value reflecting the control input inputted to said controlled object and the output of said controlled object in accordance with a dynamic characteristic of said controlled object, said dead time being used in the identification algorithm.

27. A control apparatus according to claim 18, wherein:

said control input calculating means calculates a predicted value of a value indicative of the output of said controlled object based on a prediction algorithm which applies said controlled object model, and calculates said control input in accordance with said calculated predicted value based on said one modulation algorithm.

28. A control apparatus according to claim 27, wherein:

said control input calculating means calculates a prediction time from the time at which said control input is inputted to said controlled object to the time at which said control input is reflected to the output of said controlled object in accordance with a dynamic characteristic of said controlled object, and said control input calculating means calculates said predicted value in accordance with said calculated prediction time based on said prediction algorithm.

29. A control apparatus according to claim 18, wherein:

said control input calculating means calculates an intermediate value based on said controlled object model and said one modulation algorithm, and said control input calculating means calculates said control input based on said calculated intermediate value multiplied by a predetermined gain.

30. A control apparatus according to claim 29, further comprising:

gain parameter detecting means for detecting a gain parameter indicative of a gain characteristic of said controlled object; and gain setting means for setting said predetermined gain in accordance with said detected gain parameter.

31. A control apparatus according to claim 18, wherein:

said control input calculating means calculates a second intermediate value in accordance with said predicted value based on said one modulation algorithm, and said control input calculating means calculates said control input by adding a predetermined value to said calculated second intermediate value.

32. A control apparatus according to claim 18, wherein:

said controlled object comprises a downstream air/fuel ratio sensor disposed at a location downstream of a catalyst in an exhaust passage of an internal combustion engine for detecting an air/fuel ratio of exhaust gases which have passed through said catalyst, and the output of said controlled object is an output of said downstream air/fuel ratio sensor;

said control input to said controlled object is a target air/fuel ratio of an air/fuel mixture supplied to said internal combustion engine;

said value reflecting a control input inputted to said controlled object is an output of an upstream air/fuel ratio sensor disposed at a location upstream of said catalyst in said exhaust passage of said internal combustion engine for detecting an air/fuel ratio of exhaust gases which have not passed through said catalyst;

said controlled object model is a model which has a variable associated with a value indicative of the output of said downstream air/fuel ratio sensor, and a variable associated with one of a value indicative of said target air/fuel ratio and the output of said upstream air/fuel ratio sensor;

said identifying means sequentially identifies a model parameter multiplied by the value indicative of the output of said downstream air/fuel ratio sensor, and a model parameter multiplied by one of the value indicative of said target air/fuel ratio and a value indicative of the output of said upstream air/fuel ratio sensor in accordance with one of the output of said upstream air/fuel ratio sensor and said target air/fuel ratio, and the output of said downstream air/fuel ratio sensor; and said control input calculating means includes air/fuel ratio calculating means for calculating said target air/fuel ratio of the air/fuel mixture supplied to said internal combustion engine for converging the output of said downstream air/fuel ratio sensor to a predetermined target value based on said one modulation algorithm and said controlled object model.

33. A control apparatus according to claim 32, wherein:

said value indicative of the output of said downstream air/fuel ratio sensor is an output deviation which is a deviation of the output of said downstream air/fuel ratio sensor from said predetermined target value;

said value indicative of the output of said upstream air/fuel ratio sensor is an upstream output deviation which is a deviation of the output of said upstream air/fuel ratio sensor from a predetermined reference value;

said value indicative of said target air/fuel ratio is an air/fuel ratio deviation which is a deviation of said target air/fuel ratio from said predetermined reference value;

said controlled object model is a model which has a variable associated with said output deviation, and a variable associated with one of said air/fuel ratio deviation and said upstream output deviation; and said identifying means identifies a model parameter multiplied by said output deviation, and a model parameter multiplied by one of said air/fuel ratio deviation and said upstream output deviation such that said parameters fall within respective predetermined restriction ranges.

34. A control apparatus according to claim 33, wherein:

said output deviation comprises a plurality of time-series data of said output deviation;

said control apparatus further comprises operating condition detecting means for detecting an operating condition of said internal combustion engine; and said identifying means further includes restriction range setting means for identifying a plurality of model parameters respectively multiplied by the plurality of time-series data of said output deviation such that a combination of said model parameters falls within said predetermined restriction range, and setting said predetermined restriction range in accordance with the detected operating condition of said internal combustion engine.

35. A control apparatus according to claim 32, further comprising:

operating condition detecting means for detecting an operating condition of said internal combustion engine, wherein said identifying means further includes weighting parameter setting means for identifying said model parameters based on a weighted identification algorithm which uses weighting parameters for determining behaviors of said model parameters, and setting said weighting parameters in accordance with the detected operating condition of said internal combustion engine.

36. A control apparatus according to claim 32, further comprising:

operating condition detecting means for detecting an operating condition of said internal combustion engine, wherein said identifying means further includes dead time setting means for identifying said model parameters based on an identification algorithm which uses a dead time between the output of said upstream air/fuel ratio sensor and the output of said downstream air/fuel ratio sensor, and setting said dead time in accordance with the detected operating condition of said internal combustion engine.

37. A control apparatus according to claim 32, further comprising:

operating condition detecting means for detecting an operating condition of said internal combustion engine, wherein said air/fuel ratio calculating means includes:

prediction time calculating means for calculating a prediction time from the time at which the air/fuel mixture is supplied to said internal combustion engine in said target air/fuel ratio to the time at which said target air/fuel ratio is reflected to the output of said downstream air/fuel ratio sensor in accordance with the detected operating condition of said internal combustion engine;

predicted value calculating means for calculating a predicted value of the value indicative of said target air/fuel ratio in accordance with said calculated prediction time based on a prediction algorithm which applies said controlled object model; and target air/fuel ratio calculating means for calculating said target air/fuel ratio in accordance with said calculated predicted value based on said one modulation algorithm.

38. A control apparatus according to claim 37, further comprising:

multiplying means for multiplying said predicted value by a correction coefficient; and correction coefficient setting means for setting said correction coefficient to be a smaller value when said predicted value is equal to or larger than a predetermined value than when said predicted value is smaller than said predetermined value, wherein said air/fuel ratio calculating means calculates said target air/fuel ratio of the air/fuel mixture in accordance with said predicted value multiplied by said correction coefficient based on said one modulation algorithm.

39. A control apparatus according to claim 32, further comprising:

operating condition detecting means for detecting an operating condition of said internal combustion engine, wherein said air/fuel ratio calculating means further includes:

intermediate value calculating means for calculating an intermediate value of said target air/fuel ratio of the air/fuel mixture supplied to said internal combustion engine based on said controlled object model and said one modulation algorithm;

gain setting means for setting a gain in accordance with the detected operating condition of said internal combustion engine; and target air/fuel ratio calculating means for calculating said target air/fuel ratio based on said calculated intermediate value multiplied by said set gain.

40. A control apparatus according to claim 18, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

the control input to said controlled object is a target air/fuel ratio of an air/fuel mixture supplied to said internal combustion engine;

said controlled object model is a model which has a variable associated with a value indicative of the output of said air/fuel ratio sensor, and a variable associated with a value indicative of said target air/fuel ratio;

said identifying means sequentially identifies a model parameter multiplied by the value indicative of the output of said air/fuel ratio sensor, and a model parameter multiplied by the value indicative of said target air/fuel ratio in accordance with the output of said air/fuel ratio sensor and said target air/fuel ratio of the air/fuel mixture; and said control input calculating means includes air/fuel ratio calculating means for calculating said target air/fuel ratio of the air/fuel mixture supplied to said internal combustion engine for converging the output of said air/fuel ratio sensor to a predetermined target value based on said one modulation algorithm and said controlled object model.

41. A control apparatus according to claim 40, wherein:

said value indicative of the output of said air/fuel ratio sensor is an output deviation which is a deviation of the output of said air/fuel ratio sensor from said predetermined target value;

said value indicative of said target air/fuel ratio is an air/fuel ratio deviation which is a deviation of said target air/fuel ratio from a predetermined reference value;

said controlled object model is a model which has variables associated with said output deviation and said air/fuel ratio deviation; and said identifying means identifies a model parameter multiplied by said output deviation, and a model parameter multiplied by said air/fuel ratio deviation such that said model parameters fall within respective predetermined restriction ranges.

42. A control apparatus according to claim 41, wherein:

said output deviation comprises a plurality of time-series data of said output deviation;

said control apparatus further comprises operating condition detecting means for detecting an operating condition of said internal combustion engine; and said identifying means further includes restriction range setting means for identifying a plurality of model parameters respectively multiplied by the plurality of time-series data of said output deviation such that a combination of said model parameters falls within said predetermined restriction range, and setting said predetermined restriction range in accordance with the detected operating condition of said internal combustion engine.

43. A control apparatus according to claim 40, further comprising:

operating condition detecting means for detecting an operating condition of said internal combustion engine, wherein said identifying means further includes weighting parameter setting means for identifying said model parameters based on a weighted identification algorithm which uses weighting parameters for determining behaviors of said model parameters, and setting said weighting parameters in accordance with the detected operating condition of said internal combustion engine.

44. A control apparatus according to claim 40, further comprising:

operating condition detecting means for detecting an operating condition of said internal combustion engine, wherein said air/fuel ratio calculating means includes:

prediction time calculating means for calculating a prediction time from the time at which the air/fuel mixture is supplied to said internal combustion engine in said target air/fuel ratio to the time at which said target air/fuel ratio is reflected to the output of said air/fuel ratio sensor in accordance with the detected operating condition of said internal combustion engine;

predicted value calculating means for calculating a predicted value of the value indicative of said target air/fuel ratio in accordance with said calculated prediction time based on a prediction algorithm which applies said controlled target model; and target air/fuel ratio calculating means for calculating said target air/fuel ratio in accordance with said calculated predicted value based on said one modulation algorithm.

45. A control apparatus according to claim 44, further comprising:

multiplying means for multiplying said predicted value by a correction coefficient; and correction coefficient setting means for setting said correction coefficient to be a smaller value when said predicted value is equal to or larger than a predetermined value than when said predicted value is smaller than said predetermined value, wherein said target air/fuel ratio calculating means calculates said target air/fuel ratio of the air/fuel mixture in accordance with said predicted value multiplied by said correction coefficient based on said one modulation algorithm.

46. A control apparatus according to claim 40, further comprising:

operating condition detecting means for detecting an operating condition of said internal combustion engine, wherein said air/fuel ratio calculating means further includes:

intermediate value calculating means for calculating an intermediate value of said target air/fuel ratio of the air/fuel mixture supplied to said internal combustion engine based on said controlled object model and said one modulation algorithm;

gain setting means for setting a gain in accordance with said detected operating condition of said internal combustion engine; and target air/fuel ratio calculating means for calculating said target air/fuel ratio based on said calculated intermediate value multiplied by said set gain.

47. A control apparatus according to claim 18, further comprising:

parameter detecting means for detecting a dynamic characteristic parameter indicative of a change in a dynamic characteristic of said controlled object; and model parameter setting means for setting model parameters of said controlled object model in accordance with said detected dynamic characteristic parameter.

48. A control apparatus according to claim 47, wherein:

said control input calculating means calculates a predicted value of a value indicative of the output of said controlled object based on a prediction algorithm which applies said controlled object model, and said control input calculating means calculates said control input in accordance with said calculated predicted value based on said one modulation algorithm.

49. A control apparatus according to claim 48, wherein:

said control input calculating means calculates a prediction time from the time at which said control input is inputted to said controlled object to the time at which said control input is reflected to the output of said controlled object in accordance with the dynamic characteristic parameter of said controlled object, and said control input calculating means calculates said predicted value in accordance with said calculated prediction time based on said prediction algorithm.

50. A control apparatus according to claim 47, wherein:

said control input calculating means calculates an intermediate value based on said controlled object model and said one modulation algorithm, and calculates said control input based on said calculated intermediate value multiplied by a predetermined gain.

51. A control apparatus according to claim 50, further comprising:

gain parameter detecting means for detecting a gain parameter indicative of a gain characteristic of said controlled object; and gain setting means for setting said predetermined gain in accordance with said detected gain parameter.

52. A control apparatus according to claim 47, wherein:

said control input calculating means calculates a second intermediate value in accordance with said predicted value based on said one modulation algorithm, and said control input calculating means calculates said control input by adding a predetermined value to said calculated second intermediate value.

53. A control apparatus according to claim 47, wherein:

said controlled object model has a variable associated with at least one of a deviation of said control input from a predetermined reference value, and the value reflecting a control input inputted to said controlled object from said predetermined reference value, and a variable associated with a deviation of the output of said controlled object from a predetermined target value.

54. A control apparatus according to claim 47, wherein:

said controlled object comprises a downstream air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said control input to said controlled object is the target air/fuel ratio of the air/fuel mixture supplied to said internal combustion engine;

said controlled object thodel is a model representative of a relationship between the output of said downstream air/fuel ratio sensor and said target air/fuel ratio;

said parameter detecting means comprises operating condition detecting means for detecting an operating condition of said internal combustion engine;

said model parameter setting means sets model parameters of said controlled object model in accordance with the detected operating condition of said internal combustion engine;

said control apparatus further comprises an upstream air/fuel ratio sensor disposed at a location upstream of said catalyst in said exhaust passage of said internal combustion engine; and said control input calculating mean includes:

predicted value calculating means for calculating a predicted value of a value indicative of the output of said downstream air/fuel ratio sensor in accordance with the output of said downstream air/fuel ratio sensor, the output of said upstream air/fuel ratio sensor, and said target air/fuel ratio of the air/fuel mixture based on a prediction algorithm which applies said controlled object model; and air/fuel ratio calculating means for calculating said target air/fuel ratio of the air/fuel mixture supplied to said internal combustion engine for converging the output of said downstream air/fuel ratio sensor to a predetermined target value in accordance with said calculated predicted value based on said one modulation algorithm.

55. A control apparatus according to claim 54, wherein:

said predicted value calculating means calculates a prediction time from the time at which the air fuel mixture is supplied to said internal combustion engine in said target air/fuel ratio to the time at which said target air/fuel ratio is reflected to the output of said downstream air/fuel ratio sensor, in accordance with an operating condition of said internal combustion engine, and said predicted value calculating means calculates said predicted value further in accordance with said calculated prediction time.

56. A control apparatus according to claim 54, wherein:

said air/fuel ratio calculating means includes:

intermediate value calculating means for calculating an intermediate value of said target air/fuel ratio of the air/fuel mixture supplied to said internal combustion engine in accordance with said calculated predicted value based on said one modulation algorithm;

gain setting means for setting a gain in accordance with an operating condition of said internal combustion engine; and target air/fuel ratio calculating means for calculating said target air/fuel ratio of the air/fuel mixture supplied to said internal combustion engine for converging the output of said downstream air/fuel ratio sensor to a predetermined target value based on said calculated intermediate value multiplied by said set gain.

57. A control apparatus according to claim 54, further comprising:

multiplying means for multiplying said predicted value by a correction coefficient; and correction coefficient setting means for setting said correction coefficient to be a smaller value when said predicted value is equal to or larger than a predetermined value than when said predicted value is smaller than said predetermined value, wherein said air/fuel ratio calculating means calculates said target air/fuel ratio of the air/fuel mixture in accordance with said predicted value multiplied by said correction coefficient based on said one modulation algorithm.

58. A control apparatus according to claim 47, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said control input to said controlled object is the target air/fuel ratio of the air/fuel mixture supplied to said internal combustion engine;

said controlled object model is a model representative of a relationship between the output of said air/fuel ratio sensor and said target air/fuel ratio;

said parameter detecting means comprises operating condition detecting means for detecting an operating condition of said internal combustion engine;

said model parameter setting means sets model parameters of said controlled object model in accordance with the detected operating condition of said internal combustion engine; and said control input calculating means includes air/fuel ratio calculating means for calculating said target air/fuel ratio of the air/fuel mixture supplied to said internal combustion engine for converging the output of said air/fuel ratio sensor to a predetermined target value based on said one modulation algorithm and said controlled object model.

59. A control apparatus according to claim 58, wherein:

said air/fuel ratio calculating means includes:

predicted value calculating means for calculating a predicted value of a value indicative of the output of said air/fuel ratio sensor in accordance with the output of said air/fuel ratio sensor and said target air/fuel ratio based on a prediction algorithm which applies said controlled object model; and target air/fuel ratio calculating means for calculating said target air/fuel ratio of the air/fuel mixture supplied to said internal combustion engine in accordance with said calculated predicted value based on said one modulation algorithm.

60. A control apparatus according to claim 59, wherein:

said predicted value calculating means calculates a prediction time from the time at which the air/fuel mixture is supplied to said internal combustion engine in said target air/fuel ratio to the time at which said target air/fuel ratio is reflected to the output of said air/fuel ratio sensor in accordance with an operating condition of said internal combustion engine, and said predicted value calculating means calculates a predicted value of a value indicative of the output of said air/fuel ratio sensor further in accordance with said calculated prediction time.

61. A control apparatus according to claim 59, wherein said target air/fuel ratio calculating means includes:

intermediate value calculating means for calculating an intermediate value of said target air/fuel ratio of the air/fuel mixture supplied to said internal combustion engine in accordance with said predicted value based said one modulation algorithm;

gain setting means for setting a gain in accordance with the operating condition of said internal combustion engine; and target air/fuel ratio determining means for determining a target air/fuel ratio of the air/fuel mixture supplied to said internal combustion engine based on said calculated intermediate value multiplied by said set gain.

62. A control apparatus according to claim 59, further comprising:

multiplying means for multiplying said predicted value by a correction coefficient; and correction coefficient setting means for setting said correction coefficient to be a smaller value when said predicted value is equal to or larger than a predetermined value than when said predicted value is smaller than said predetermined value, wherein said target air/fuel ratio calculating means calculates said target air/fuel ratio of the air/fuel mixture in accordance with said predicted value multiplied by said correction coefficient based on said one modulation algorithm.

63. A control method comprising the steps of:

calculating a predicted value of a value indicative of an output of a controlled object based on a prediction algorithm; and calculating a control input to said controlled object based on one modulation algorithm selected from a Δ modulation algorithm, a ΔΣ modulation algorithm, and a ΣΔ modulation algorithm for controlling the output of said controlled object in accordance with said calculated predicted value.

64. A control method according to claim 63, wherein:

said step of calculating a predicted value includes calculating said predicted value in accordance with at least one of said calculated control input and a value which reflects a control input inputted to said controlled object, and the output of said controlled object, based on said prediction algorithm.

65. A control method according to claim 63, wherein said prediction algorithm is an algorithm based on a controlled object model which has a variable associated with a value indicative of one of said control input and said value which reflects a control input inputted to said controlled object, and a variable associated with a value indicative of the output of said controlled object.

66. A control method according to claim 65, wherein said value indicative of the output of said controlled object is an output deviation which is a deviation of the output of said controlled object from a predetermined target value.

67. A control method according to claim 65, wherein said value indicative of one of said control input and said value which reflects a control input inputted to said controlled object is one of a deviation of said control input from a predetermined reference value, and a deviation of said value which reflects a control input inputted to said controlled object from said predetermined reference value.

68. A control method according to claim 63, wherein said step of calculating a control input includes:

calculating an intermediate value in accordance with said predicted value based on said one modulation algorithm; and calculating said control input based on said calculated intermediate value multiplied by a predetermined gain.

69. A control method according to claim 68, further comprising the steps of:

detecting a gain parameter indicative of a gain characteristic of said controlled object; and setting said predetermined gain in accordance with said detected gain parameter.

70. A control method according to claim 63, wherein:

said step of calculating a control input includes calculating a second intermediate value in accordance with said predicted value based on said one modulation algorithm, and adding a predetermined value to said calculated second intermediate value to calculate said control input.

71. A control method according to claim 63, wherein said step of calculating a predicted value includes:

calculating a predicted value includes calculating a prediction time from the time at which said control input is inputted to said controlled object to the time at which said control input is reflected to the output of said controlled object in accordance with a dynamic characteristic of said controlled object; and calculating said predicted value in accordance with said calculated prediction time.

72. A control method according to claim 64, wherein:

said controlled object comprises a downstream air/fuel ratio sensor disposed at a location downstream of a catalyst in an exhaust passage of an internal combustion engine for detecting an air/fuel ratio of exhaust gases which have passed through said catalyst, and the output of said controlled object is an output of said downstream air/fuel ratio sensor;

said value indicative of the output of said controlled object is an output deviation of an output of said downstream air/fuel ratio sensor from a predetermined target value;

said control input to said controlled object is a target air/fuel ratio of an air/fuel mixture supplied to said internal combustion engine;

said value reflecting a control input inputted to said controlled object is an output of an upstream air/fuel ratio sensor disposed at a location upstream of said catalyst in said exhaust passage for detecting an air/fuel ratio of exhaust gases which have not passed through said catalyst;

said step of calculating a predicted value includes calculating the predicted value of said output deviation in accordance with at least one of said target air/fuel ratio of the air/fuel mixture supplied to said internal combustion engine, the output of said upstream air/fuel ratio sensor, and the output of said downstream air/fuel ratio sensor based on said prediction algorithm; and said step of calculating a control input includes calculating said target air/fuel ratio of the air/fuel mixture supplied to said internal combustion engine for converging the output of said downstream air/fuel ratio sensor to said predetermined target value in accordance with the calculated predicted value of said output deviation based on said one modulation algorithm.

73. A control method according to claim 72, further comprising the step of detecting an operating condition of said internal combustion engine, wherein said step of calculating a predicted value includes:

calculating a prediction time from the time at which the air/fuel mixture is supplied to said internal combustion engine in said target air/fuel ratio to the time at which said target air/fuel ratio is reflected to the output of said downstream air/fuel ratio sensor in accordance with the detected operating condition of said internal combustion engine; and calculating the predicted value of said output deviation further in accordance with said calculated prediction time.

74. A control method according to claim 72, further comprising the step of detecting an operating condition of said internal combustion engine, wherein said step of calculating said target air/fuel ratio includes:

calculating an intermediate value of said target air/fuel ratio of the air/fuel mixture supplied to said internal combustion engine in accordance with the predicted value of said output deviation based on said one modulation algorithm;

setting a gain in accordance with said detected operating condition of said internal combustion engine; and calculating said target air/fuel ratio of the air/fuel mixture supplied to said internal combustion engine based on said calculated intermediate value multiplied by said set gain.

75. A control method according to claim 72, further comprising the steps of:

multiplying said calculated predicted value of said output deviation by a correction coefficient; and setting said correction coefficient to a smaller value when the predicted value of said output deviation is equal to or larger than a predetermined value than when the predicted value of said output deviation is smaller than said predetermined value, wherein said step of calculating said target air/fuel ratio includes calculating said target air/fuel ratio of the air/fuel mixture in accordance with the predicted value of said output deviation multiplied by said correction coefficient based on said one modulation algorithm.

76. A control method according to claim 64, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said value indicative of the output of said controlled object is an output deviation of an output of said air/fuel ratio sensor from a predetermined target value;

said control input to said controlled object is a target air/fuel ratio of an air/fuel mixture supplied to said internal combustion engine;

said step of calculating a predicted value includes calculating the predicted value of said output deviation in accordance with said target air/fuel ratio of the air/fuel mixture supplied to said internal combustion engine, and the output of said air/fuel ratio sensor based on said prediction algorithm; and said step of calculating a control input includes calculating said target air/fuel ratio of the air/fuel mixture supplied to said internal combustion engine for converging the output of said air/fuel ratio sensor to said predetermined target value in accordance with said calculated predicted value of said output deviation based on said one modulation algorithm.

77. A control method according to claim 76, further comprising the step of detecting an operating condition of said internal combustion engine, wherein said step of calculating a predicted value includes:

calculating a prediction time from the time at which the air/fuel mixture is supplied to said internal combustion engine in said target air/fuel ratio to the time at which said target air/fuel ratio is reflected to the output of said air/fuel ratio sensor in accordance with the detected operating condition of said internal combustion engine; and calculating the predicted value of said output deviation further in accordance with said calculated prediction time.

78. A control method according to claim 76, further comprising the step of detecting an operating condition of said internal combustion engine, wherein said step of calculating said air/fuel ratio includes:

calculating an intermediate value of said target air/fuel ratio of the air/fuel mixture supplied to said internal combustion engine in accordance with the predicted value of said output deviation based on said one modulation algorithm;

setting a gain in accordance with said detected operating condition of said internal combustion engine; and calculating said target air/fuel ratio of the air/fuel mixture supplied to said internal combustion engine based on said calculated intermediate value multiplied by said set gain.

79. A control method according to claim 76, further comprising the steps of:

multiplying said calculated predicted value of said output deviation by a correction coefficient; and setting said correction coefficient to a smaller value when the predicted value of said output deviation is equal to or larger than a predetermined value than when the predicted value of said output deviation is smaller than said predetermined value, wherein said step of calculating said target air/fuel ratio includes calculating said target air/fuel ratio of the air/fuel mixture in accordance with the predicted value of said output deviation multiplied by said correction coefficient based on said one modulation algorithm.

80. A control method comprising the step of:

calculating a control input to a controlled object based on one modulation algorithm selected from a Δ modulation algorithm, a ΔΣ modulation algorithm, and a ΣΔ modulation algorithm, and a controlled object model which models said controlled object, for controlling an output of said controlled object wherein said controlled object model is built as a discrete time system model, and said control method further comprises the step of sequentially on-board identifying model parameters of said controlled object model in accordance with one of said calculated control input and a value reflecting a control input inputted to said controlled object, and the output of said controlled object.

81. A control method according to claim 80, wherein said step of identifying includes:

calculating an identification error of said model parameters;

filtering said calculated identification error in a predetermined manner; and determining said model parameters based on said filtered identification error.

82. A control method according to claim 81, wherein:

said step of filtering includes setting a filtering characteristic for said filtering in accordance with a dynamic characteristic of said controlled object.

83. A control method according to claim 80, wherein:

said controlled object model comprises an input variable indicative of one of said control input and said value reflecting a control input inputted to said controlled object, and an output variable indicative of the output of said controlled object, and said step of identifying includes identifying a model parameter multiplied by said input variable and a model parameter multipliedby said output variable such that said model parameters fall within respective predetermined restriction ranges.

84. A control method according to claim 83, wherein:

said output variable comprises a plurality of time-series data of output variables which are multiplied by a plurality of model parameters, respectively, and said step of identifying includes identifying said plurality of model parameters such that a combination of said model parameters falls within said predetermined restriction range.

85. A control method according to claim 83, wherein:

said step of identifying further includes setting said predetermined restriction range in accordance with a dynamic characteristic of said controlled object.

86. A control method according to claim 83, wherein:

said output variable is a deviation of the output of said controlled object from a predetermined target value; and said input variable is one of a deviation of said control input from a predetermined reference value, and a deviation of the value reflecting a control input inputted to said controlled object from said predetermined reference value.

87. A control method according to claim 80, wherein:

said step of identifying further includes identifying said model parameters based on a weighted identification algorithm which uses weighting parameters for determining behaviors of said model parameters, and setting said weighting parameters in accordance with a dynamic characteristic of said controlled object.

88. A control method according to claim 80, wherein:

said step of identifying further includes setting a dead time between one of the control input inputted to said controlled object and the value reflecting the control input inputted to said controlled object and the output of said controlled object in accordance with a dynamic characteristic of said controlled object, said dead time being used in the identification algorithm.

89. A control method according to claim 80, wherein said step of calculating a control input includes:

calculating a predicted value of a value indicative of the output of said controlled object based on a prediction algorithm which applies said controlled object model; and calculating said control input in accordance with said calculated predicted value based on said one modulation algorithm.

90. A control method according to claim 89, wherein said step of calculating a control input includes:

calculating a prediction time from the time at which said control input is inputted to said controlled object to the time at which said control input is reflected to the output of said controlled object in accordance with a dynamic characteristic of said controlled object; and calculating said predicted value in accordance with said calculated prediction time based on said prediction algorithm.

91. A control method according to claim 80, wherein said step of calculating a control input includes:

calculating an intermediate value based on said controlled object model and said one modulation algorithm; and calculating said control input based on said calculated intermediate value multiplied by a predetermined gain.

92. A control method according to claim 91, further comprising the steps of:

detecting a gain parameter indicative of a gain characteristic of said controlled object; and setting said predetermined gain in accordance with said detected gain parameter.

93. A control method according to claim 80, wherein said step of calculating a control input includes:

calculating a second intermediate value in accordance with said predicted value based on said one modulation algorithm; and calculating said control input by adding a predetermined value to said calculated second intermediate value.

94. A control method according to claim 80, wherein:

said controlled object comprises a downstream air/fuel ratio sensor disposed at a location downstream of a catalyst in an exhaust passage of an internal combustion engine for detecting an air/fuel ratio of exhaust gases which have passed through said catalyst, and the output of said controlled object is an output of said downstream air/fuel ratio sensor;

said control input to said controlled object is a target air/fuel ratio of an air/fuel mixture supplied to said internal combustion engine;

said value reflecting a control input inputted to said controlled object is an output of an upstream air/fuel ratio sensor disposed at a location upstream of said catalyst in said exhaust passage of said internal combustion engine for detecting an air/fuel ratio of exhaust gases which have not passed through said catalyst;

said controlled object model is a model which has a variable associated with a value indicative of the output of said downstream air/fuel ratio sensor, and a variable associated with one of a value indicative of said target air/fuel ratio and the output of said upstream air/fuel ratio sensor;

said step of identifying includes sequentially identifying a model parameter multiplied by the value indicative of the output of said downstream air/fuel ratio sensor, and a model parameter multiplied by one of the value indicative of said target air/fuel ratio and a value indicative of the output of said upstream air/fuel ratio sensor in accordance with one of the output of said upstream air/fuel ratio sensor and said target air/fuel ratio, and the output of said downstream air/fuel ratio sensor; and said step of calculating a control input includes calculating said target air/fuel ratio of the air/fuel mixture supplied to said internal combustion engine for converging the output of said downstream air/fuel ratio sensor to a predetermined target value based on said one modulation algorithm and said controlled object model.

95. A control method according to claim 94, wherein:

said value indicative of the output of said downstream air/fuel ratio sensor is an output deviation which is a deviation of the output of said downstream air/fuel ratio sensor from said predetermined target value;

said value indicative of the output of said upstream air/fuel ratio sensor is an upstream output deviation which is a deviation of the output of said upstream air/fuel ratio sensor from a predetermined reference value;

said value indicative of said target air/fuel ratio is an air/fuel ratio deviation which is a deviation of said target air/fuel ratio from said predetermined reference value;

said controlled object model is a model which has a variable associated with said output deviation, and a variable associated with one of said air/fuel ratio deviation and said upstream output deviation; and said step of identifying includes identifying a model parameter multiplied by said output deviation, and a model parameter multiplied by one of said air/fuel ratio deviation and said upstream output deviation such that said parameters fall within respective predetermined restriction ranges.

96. A control method according to claim 95, wherein:

said output deviation comprises a plurality of time-series data of said output deviation;

said control method further comprises the step of detecting an operating condition of said internal combustion engine; and said step of identifying further includes identifying a plurality of model parameters respectively multiplied by the plurality of time-series data of said output deviation such that a combination of said model parameters falls within said predetermined restriction range, and setting said predetermined restriction range in accordance with the detected operating condition of said internal combustion engine.

97. A control method according to claim 94, further comprising the step of detecting an operating condition of said internal combustion engine, wherein said step of identifying further includes identifying said model parameters based on a weighted identification algorithm which uses weighting parameters for determining behaviors of said model parameters, and setting said weighting parameters in accordance with the detected operating condition of said internal combustion engine.

98. A control method according to claim 94, further comprising the step of detecting an operating condition of said internal combustion engine, wherein said step of identifying further includes identifying said model parameters based on an identification algorithm which uses a dead time between the output of said upstream air/fuel ratio sensor and the output of said downstream air/fuel ratio sensor, and setting said dead time in accordance with the detected operating condition of said internal combustion engine.

99. A control method according to claim 94, further comprising the step of detecting an operating condition of said internal combustion engine, wherein said step of calculating said target air/fuel ratio includes:

calculating a prediction time from the time at which the air/fuel mixture is supplied to said internal combustion engine in said target air/fuel ratio to the time at which said target air/fuel ratio is reflected to the output of said downstream air/fuel ratio sensor in accordance with the detected operating condition of said internal combustion engine;

calculating a predicted value of the value indicative of said target air/fuel ratio in accordance with said calculated prediction time based on a prediction algorithm which applies said controlled object model; and calculating said target air/fuel ratio in accordance with said calculated predicted value based on said one modulation algorithm.

100. A control method according to claim 99, further comprising the steps of:

multiplying said predicted value by a correction coefficient; and setting said correction coefficient to be a smaller value when said predicted value is equal to or larger than a predetermined value than when said predicted value is smaller than said predetermined value, wherein said step of calculating said target air/fuel ratio includes calculating said target air/fuel ratio of the air/fuel mixture in accordance with said predicted value multiplied by said correction coefficient based on said one modulation algorithm.

101. A control method according to claim 94, further comprising the step of detecting an operating condition of said internal combustion engine, wherein said step of calculating said target air/fuel ratio further includes:

calculating an intermediate value of said target air/fuel ratio of the air/fuel mixture supplied to said internal combustion engine based on said controlled object model and said one modulation algorithm;

setting a gain in accordance with the detected operating condition of said internal combustion engine; and calculating said target air/fuel ratio based on said calculated intermediate value multiplied by said set gain.

102. A control method according to claim 80, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said control input to said controlled object is a target air/fuel ratio of an air/fuel mixture supplied to said internal combustion engine;

said controlled object model is a model which has a variable associated with a value indicative of the output of said air/fuel ratio sensor, and a variable associated with a value indicative of said target air/fuel ratio;

said step of identifying includes sequentially identifying a model parameter multiplied by the value indicative of the output of said air/fuel ratio sensor, and a model parameter multiplied by the value indicative of said target air/fuel ratio in accordance with the output of said air/fuel ratio sensor and said target air/fuel ratio of the air/fuel mixture; and said step of calculating a control input includes calculating said target air/fuel ratio of the air/fuel mixture supplied to said internal combustion engine for converging the output of said air/fuel ratio sensor to a predetermined target value based on said one modulation algorithm and said controlled object model.

103. A control method according to claim 102, wherein:

said value indicative of the output of said air/fuel ratio sensor is an output deviation which is a deviation of the output of said air/fuel ratio sensor from said predetermined target value;

said value indicative of said target air/fuel ratio is an air/fuel ratio deviation which is a deviation of said target air/fuel ratio from a predetermined reference value;

said controlled object model is a model which has variables associated with said output deviation and said air/fuel ratio deviation; and said step of identifying includes identifying a model paranieter multiplied by said output deviation, and a model parameter multiplied by said air/fuel ratio deviation such that said model parameters fall within respective predetermined restriction ranges.

104. A control method according to claim 103, wherein:

said output deviation comprises a plurality of time-series data of said output deviation;

said control method further comprises the step of detecting an operating condition of said internal combustion engine; and said step of identifying further includes identifying a plurality of model parameters respectively multiplied by the plurality of time-series data of said output deviation such that a combination of said model parameters falls within said predetermined restriction range, and setting said predetermined restriction range in accordance with the detected operating condition of said internal combustion engine.

105. A control method according to claim 102, further comprising the step of detecting an operating condition of said internal combustion engine, wherein said step of identifying further includes identifying said model parameters based on a weighted identification algorithm which uses weighting parameters for determining behaviors of said model parameters, and setting said weighting parameters in accordance with the detected operating condition of said internal combustion engine.

106. A control method according to claim 102, further comprising the step of detecting an operating condition of said internal combustion engine, wherein said step of calculating said air/fuel ratio includes:

calculating a prediction time from the time at which the air/fuel mixture is supplied to said internal combustion engine in said target air/fuel ratio to the time at which said target air/fuel ratio is reflected to the output of said air/fuel ratio sensor in accordance with the detected operating condition of said internal combustion engine;

calculating a predicted value of the value indicative of said target air/fuel ratio in accordance with said calculated prediction time based on a prediction algorithm which applies said controlled target model; and calculating said target air/fuel ratio in accordance with said calculated predicted value based on said one modulation algorithm.

107. A control method according to claim 106, further comprising the steps of:

multiplying said predicted value by a correction coefficient; and setting said correction coefficient to be a smaller value when said predicted value is equal to or larger than a predetermined value than when said predicted value is smaller than said predetermined value, wherein said step of calculating said target air/fuel ratio includes calculating said target air/fuel ratio of the air/fuel mixture in accordance with said predicted value multiplied by said correction coefficient based on said one modulation algorithm.

108. A control method according to claim 102, further comprising the step of detecting an operating condition of said internal combustion engine, wherein said step of calculating said target air/fuel ratio further includes:

calculating an intermediate value of said target air/fuel ratio of the air/fuel mixture supplied to said internal combustion engine based on said controlled object model and said one modulation algorithm;

setting a gain in accordance with said detected operating condition of said internal combustion engine; and calculating said target air/fuel ratio based on said calculated intermediate value multiplied by said set gain.

109. A control method according to claim 80, further comprising the steps of:

detecting a dynamic characteristic parameter indicative of a change in a dynamic characteristic of said controlled object; and setting model parameters of said controlled object model in accordance with said detected dynamic characteristic parameter.

110. A control method according to claim 109, wherein said step of calculating a control input includes:

calculating a predicted value of a value indicative of the output of said controlled object based on a prediction algorithm which applies said controlled object model; and calculating said control input in accordance with said calculated predicted value based on said one modulation algorithm.

111. A control method according to claim 110, wherein said step of calculating a control input includes:

calculating a prediction time from the time at which said control input is inputted to said controlled object to the time at which said control input is reflected to the output of said controlled object in accordance with the dynamic characteristic parameter of said controlled object; and calculating said predicted value in accordance with said calculated prediction time based on said prediction algorithm.

112. A control method according to claim 109, wherein said step of calculating a control input includes:

calculating an intermediate value based on said controlled object model and said one modulation algorithm; and calculating said control input based on said calculated intermediate value multiplied by a predetermined gain.

113. A control method according to claim 112, further comprising the steps of:

detecting a gain parameter indicative of a gain characteristic of said controlled object; and setting said predetermined gain in accordance with said detected gain parameter.

114. A control method according to claim 109, wherein:

said step of calculating a control input includes:

calculating a second intermediate value in accordance with said predicted value based on said one modulation algorithm; and calculating said control input by adding a predetermined value to said calculated second intermediate value.

115. A control method according to claim 109, wherein:

said controlled object model has a variable associated with at least one of a deviation of said control input from a predetermined reference value, and the value reflecting a control input inputted to said controlled object from said predetermined reference value, and a variable associated with a deviation of the output of said controlled object from a predetermined target value.

116. A control method according to claim 109, wherein:

said controlled object comprises a downstream air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said control input to said controlled object is the target air/fuel ratio of the air/fuel mixture supplied to said internal combustion engine;

said controlled object model is a model representative of a relationship between the output of said downstream air/fuel ratio sensor and said target air/fuel ratio;

said step of detecting a parameter includes detecting an operating condition of said internal combustion engine;

said step of setting model parameters includes setting model parameters of said controlled object model in accordance with the detected operating condition of said internal combustion engine; and said step of calculating a control input includes:

calculating a predicted value of a value indicative of the output of said downstream air/fuel ratio sensor in accordance with the output of said downstream air/fuel ratio sensor, an output of an upstream air/fuel ratio sensor disposed at a location upstream of said catalyst in said exhaust passage of said internal combustion engine, and said target air/fuel ratio of the air/fuel mixture based on a prediction algorithm which applies said controlled object model; and calculating said target air/fuel ratio of the air/fuel mixture supplied to said internal combustion engine for converging the output of said downstream air/fuel ratio sensor to a predetermined target value in accordance with said calculated predicted value based on said one modulation algorithm.

117. A control method according to claim 116, wherein said step of calculating a predicted value includes:

calculating a prediction time from the time at which the air fuel mixture is supplied to said internal combustion engine in said target air/fuel ratio to the time at which said target air/fuel ratio is reflected to the output of said downstream air/fuel ratio sensor, in accordance with an operating condition of said internal combustion engine; and calculating said predicted value further in accordance with said calculated prediction time.

118. A control method according to claim 116, wherein:

said step of calculating said target air/fuel ratio includes:

calculating an intermediate value of said target air/fuel ratio of the air/fuel mixture supplied to said internal combustion engine in accordance with said calculated predicted value based on said one modulation algorithm;

setting a gain in accordance with an operating condition of said internal combustion engine; and calculating said target air/fuel ratio of the air/fuel mixture supplied to said internal combustion engine for converging the output of said downstream air/fuel ratio sensor to a predetermined target value based on said calculated intermediate value multiplied by said set gain.

119. A control method according to claim 116, further comprising the steps of:

multiplying said predicted value by a correction coefficient; and setting said correction coefficient to be a smaller value when said predicted value is equal to or larger than a predetermined value than when said predicted value is smaller than said predetermined value, wherein said step of calculating said target air/fuel ratio includes calculating said target air/fuel ratio of the air/fuel mixture in accordance with said predicted value multiplied by said correction coefficient based on said one modulation algorithm.

120. A control method according to claim 109, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said control input to said controlled object is the target air/fuel ratio of the air/fuel mixture supplied to said internal combustion engine;

said controlled object model is a model representative of a relationship between the output of said air/fuel ratio sensor and said target air/fuel ratio;

said step of detecting a parameter includes detecting an operating condition of said internal combustion engine;

said step of setting model parameters includes setting model parameters of said controlled object model in accordance with the detected operating condition of said internal combustion engine; and said step of calculating a control includes calculating said target air/fuel ratio of the air/fuel mixture supplied to said internal combustion engine for converging the output of said air/fuel ratio sensor to a predetermined target value based on said one modulation algorithm and said controlled object model.

121. A control method according to claim 120, wherein:

said step of calculating said target air/fuel ratio includes:

calculating a predicted value of a value indicative of the output of said air/fuel ratio sensor in accordance with the output of said air/fuel ratio sensor and said target air/fuel ratio based on a prediction algorithm which applies said controlled object model; and calculating said target air/fuel ratio of the air/fuel mixture supplied to said internal combustion engine in accordance with said calculated predicted value based on said one modulation algorithm.

122. A control method according to claim 121, wherein said step of calculating a predicted value includes:

calculating a prediction time from the time at which the air/fuel mixture is supplied to said internal combustion engine in said target air/fuel ratio to the time at which said target air/fuel ratio is reflected to the output of said air/fuel ratio sensor in accordance with an operating condition of said internal combustion engine; and calculating a predicted value of a value indicative of the output of said air/fuel ratio sensor further in accordance with said calculated prediction time.

123. A control method according to claim 121, wherein said step of calculating said target air/fuel ratio includes:

calculating an intermediate value of said target air/fuel ratio of the air/fuel mixture supplied to said internal combustion engine in accordance with said predicted value based said one modulation algorithm;

setting a gain in accordance with the operating condition of said internal combustion engine; and determining a target air/fuel ratio of the air/fuel mixture supplied to said internal combustion engine based on said calculated intermediate value multiplied by said set gain.

124. A control method according to claim 121, further comprising the steps of:

multiplying said predicted value by a correction coefficient; and setting said correction coefficient to be a smaller value when said predicted value is equal to or larger than a predetermined value than when said predicted value is smaller than said predetermined value, wherein said step of calculating said target air/fuel ratio includes calculating said target air/fuel ratio of the air/fuel mixture in accordance with said predicted value multiplied by said correction coefficient based on said one modulation algorithm.

125. An engine control unit including a control program for causing a computer to calculate a predicted value of a value indicative of an output of a controlled object based on a prediction algorithm; and calculate a control input to said controlled object based on one modulation algorithm selected from a $\Delta$ modulation algorithm, a $\Delta\Sigma$ modulation algorithm, and a $\Sigma\Delta$ modulation algorithm for controlling the output of said controlled object in accordance with said calculated predicted value.

126. An engine control unit according to claim 125, wherein said control program causes the computer to calculate a predicted value includes calculating said predicted value in accordance with at least one of said calculated control input and a value which reflects a control input inputted to said controlled object, and the output of said controlled object, based on said prediction algorithm.

127. An engine control unit according to claim 125, wherein said prediction algorithm is an algorithm based on a controlled object model which has a variable associated with a value indicative of one of said control input and said value which reflects a control input inputted to said controlled object, and a variable associated with a value indicative of the output of said controlled object.

128. An engine control unit according to claim 127, wherein said value indicative of the output of said controlled object is an output deviation which is a deviation of the output of said controlled object from a predetermined target value.

129. An engine control unit according to claim 127, wherein said value indicative of one of said control input and said value which reflects a control input inputted to said controlled object is one of a deviation of said control input from a predetermined reference value, and a deviation of said value which reflects a control input inputted to said controlled object from said predetermined reference value.

130. An engine control unit according to claim 125, wherein said control program causes the computer to calculate an intermediate value in accordance with said predicted value based on said one modulation algorithm, and calculate said control input based on said calculated intermediate value multiplied by a predetermined gain.

131. An engine control unit according to claim 130, wherein said control program further causes the computer to detect a gain parameter indicative of a gain characteristic of said controlled object; and set said predetermined gain in accordance with said detected gain parameter.

132. An engine control unit according to claim 125, wherein said control program causes the computer to calculate a second intermediate value in accordance with said predicted value based on said one modulation algorithm; and add a predetermined value to said calculated second intermediate value to calculate said control input.

133. An engine control unit according to claim 125, wherein said control program causes the computer to calculate a predicted value includes calculating a prediction time from the time at which said control input is inputted to said controlled object to the time at which said control input is reflected to the output of said controlled object in accordance with a dynamic characteristic of said controlled object; and calculate said predicted value in accordance with said calculated prediction time.

134. An engine control unit according to claim 126, wherein:

said controlled object comprises a downstream air/fuel ratio sensor disposed at a location downstream of a catalyst in an exhaust passage of an internal combustion engine for detecting an air/fuel ratio of exhaust gases which have passed through said catalyst, and the output of said controlled object is an output of said downstream air/fuel ratio sensor;

said value indicative of the output of said controlled object is an output deviation of an output of said downstream air/fuel ratio sensor from a predetermined target value;

said control input to said controlled object is a target air/fuel ratio of an air/fuel mixture supplied to said internal combustion engine;

said value reflecting a control input inputted to said controlled object is an output of an upstream air/fuel ratio sensor disposed at a location upstream of said catalyst in said exhaust passage for detecting an air/fuel ratio of exhaust gases which have not passed through said catalyst; and said engine control unit causes the computer to calculate the predicted value of said output deviation in accordance with at least one of said target air/fuel ratio of the air/fuel mixture supplied to said internal combustion engine, the output of said upstream air/fuel ratio sensor, and the output of said downstream air/fuel ratio sensor based on said prediction algorithm; and calculate said target air/fuel ratio of the air/fuel mixture supplied to said internal combustion engine for converging the output of said downstream air/fuel ratio sensor to said predetermined target value in accordance with the calculated predicted value of said output deviation based on said one modulation algorithm.

135. An engine control unit according to claim 134, wherein said control program further causes the computer to detect an operating condition of said internal combustion engine; calculate a prediction time from the time at which the air/fuel mixture is supplied to said internal combustion engine in said target air/fuel ratio to the time at which said target air/fuel ratio is reflected to the output of said downstream air/fuel ratio sensor in accordance with the detected operating condition of said internal combustion engine; and calculate the predicted value of said output deviation further in accordance with said calculated prediction time.

136. An engine control unit according to claim 134, wherein said control program further causes the computer to detect an operating condition of said internal combustion engine; calculate an intermediate value of said target air/fuel ratio of the air/fuel mixture supplied to said internal combustion engine in accordance with the predicted value of said output deviation based on said one modulation algorithm; set a gain in accordance with said detected operating condition of said internal combustion engine; and calculate said target air/fuel ratio of the air/fuel mixture supplied to said internal combustion engine based on said calculated intermediate value multiplied by said set gain.

137. An engine control unit according to claim 134, wherein said control program further causes the computer to multiply said calculated predicted value of said output deviation by a correction coefficient; set said correction coefficient to a smaller value when the predicted value of said output deviation is equal to or larger than a predetermined value than when the predicted value of said output deviation is smaller than said predetermined value; and calculate said target air/fuel ratio of the air/fuel mixture in accordance with the predicted value of said output deviation multiplied by said correction coefficient based on said one modulation algorithm.

138. An engine control unit according to claim 126, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said value indicative of the output of said controlled object is an output deviation of an output of said air/fuel ratio sensor from a predetermined target value;

said control input to said controlled object is a target air/fuel ratio of an air/fuel mixture supplied to said internal combustion engine; and said control program causes the computer to calculate the predicted value of said output deviation in accordance with said target air/fuel ratio of the air/fuel mixture supplied to said internal combustion engine, and the output of said air/fuel ratio sensor based on said prediction algorithm; and calculate said target air/fuel ratio of the air/fuel mixture supplied to said internal combustion engine for converging the output of said air/fuel ratio sensor to said predetermined target value in accordance with said calculated predicted value of said output deviation based on said one modulation algorithm.

139. An engine control unit according to claim 138, wherein said control program further causes the computer to detect an operating condition of said internal combustion engine; calculate a prediction time from the time at which the air/fuel mixture is supplied to said internal combustion engine in said target air/fuel ratio to the time at which said target air/fuel ratio is reflected to the output of said air/fuel ratio sensor in accordance with the detected operating condition of said internal combustion engine; and calculate the predicted value of said output deviation further in accordance with said calculated prediction time.

140. An engine control unit according to claim 138, wherein said control program further causes the computer to detect an operating condition of said internal combustion engine; calculate an intermediate value of said target air/fuel ratio of the air/fuel mixture supplied to said internal combustion engine in accordance with the predicted value of said output deviation based on said one modulation algorithm; set a gain in accordance with said detected operating condition of said internal combustion engine; and calculate said target air/fuel ratio of the air/fuel mixture supplied to said internal combustion engine based on said calculated intermediate value multiplied by said set gain.

141. An engine control unit according to claim 138, wherein said control program further causes the computer to multiply said calculated predicted value of said output deviation by a correction coefficient; set said correction coefficient to a a predetermined value than when the predicted value of said output deviation is smaller than said predetermined value; and calculate said target air/fuel ratio of the air/fuel mixture in accordance with the predicted value of said output deviation multiplied by said correction coefficient based on said one modulation algorithm.

142. An engine control unit including a control program for causing a computer to calculate a control input to a controlled object based on one modulation algorithm selected from a Δ modulation algorithm, a ΔΣ modulation algorithm, and a ΣΔ modulation algorithm, and a controlled object model which models said controlled object, for controlling an output of said controlled object, wherein said controlled object model is built as a discrete time system model, and said control program further causes the computer to sequentially on-board identify model parameters of said controlled object model in accordance with one of said calculated control input and a value reflecting a control input inputted to said controlled object, and the output of said controlled object.

143. An engine control unit according to claim 142, wherein said control program causes the computer to calculate an identification error of said model parameters; filter said calculated identification error in a predetermined manner; and determine said model parameters based on said filtered identification error.

144. An engine control unit according to claim 143, wherein said control program causes the computer to set a filtering characteristic for said filtering in accordance with a dynamic characteristic of said controlled object.

145. An engine control unit according to claim 142, wherein:

said controlled object model comprises an input variable indicative of one of said control input and said value reflecting a control input inputted to said controlled object, and an output variable indicative of the output of said controlled object, and said control program causes the computer to identify a model parameter multiplied by said input variable and a model parameter multiplied by said output variable such that said model parameters fall within respective predetermined restriction ranges.

146. An engine control unit according to claim 145, wherein:

said output variable comprises a plurality of time-series data of output variables which are multiplied by a plurality of model parameters, respectively, and said control program causes the computer to identify said plurality of model parameters such that a combination of said model parameters falls within said predetermined restriction range.

147. An engine control unit according to claim 145, wherein said control program causes the engine to set said predetermined restriction range in accordance with a dynamic characteristic of said controlled object.

148. An engine control unit according to claim 145, wherein:

said output variable is a deviation of the output of said controlled object from a predetermined target value; and said input variable is one of a deviation of said control input from a predetermined reference value, and a deviation of the value reflecting a control input inputted to said controlled object from said predetermined reference value.

149. An engine control unit according to claim 142, wherein said control program causes the computer to identify said model parameters based on a weighted identification algorithm which uses weighting parameters for determining behaviors of said model parameters; and set said weighting parameters in accordance with a dynamic characteristic of said controlled object.

150. An engine control unit according to claim 142, wherein said control program causes the computer to set a dead time between one of the control input inputted to said controlled object and the value reflecting the control input inputted to said controlled object and the output of said controlled object in accordance with a dynamic characteristic of said controlled object, said dead time being used in the identification algorithm.

151. An engine control unit according to claim 142, wherein said control program causes the computer to calculate a predicted value of a value indicative of the output of said controlled object based on a prediction algorithm which applies said controlled object model; and calculate said control input in accordance with said calculated predicted value based on said one modulation algorithm.

152. An engine control unit according to claim 151, wherein said control program causes the computer to calculate a prediction time from the time at which said control input is inputted to said controlled object to the time at which said control input is reflected to the output of said controlled object in accordance with a dynamic characteristic of said controlled object; and calculate said predicted value in accordance with said calculated prediction time based on said prediction algorithm.

153. An engine control unit according to claim 142, wherein said control program causes the computer to calculate an intermediate value based on said controlled object model and said one modulation algorithm; and calculate said control input based on said calculated intermediate value multiplied by a predetermined gain.

154. An engine control unit according to claim 153, wherein said control program further causes the computer to detect a gain parameter indicative of a gain characteristic of said controlled object; and set said predetermined gain in accordance with said detected gain parameter.

155. An engine control unit according to claim 142, wherein said control program causes the computer to calculate a second intermediate value in accordance with said predicted value based on said one modulation algorithm; and calculate said control input by adding a predetermined value to said calculated second intermediate value.

156. An engine control unit according to claim 142, wherein:

said controlled object comprises a downstream air/fuel ratio sensor disposed at a location downstream of a catalyst in an exhaust passage of an internal combustion engine for detecting an air/fuel ratio of exhaust gases which have passed through said catalyst, and the output of said controlled object is an output of said downstream air/fuel ratio sensor;

said control input to said controlled object is a target air/fuel ratio of an air/fuel mixture supplied to said internal combustion engine;

said value reflecting a control input inputted to said controlled object is an output of an upstream air/fuel ratio sensor disposed at a location upstream of said catalyst in said exhaust passage of said internal combustion engine for detecting an air/fuel ratio of exhaust gases which have not passed through said catalyst;

said controlled object model is a model which has a variable associated with a value indicative of the output of said downstream air/fuel ratio sensor, and a variable associated with one of a value indicative of said target air/fuel ratio and the output of said upstream air/fuel ratio sensor; and said control program causes the computer to sequentially identify a model parameter multiplied by the value indicative of the output of said downstream air/fuel ratio sensor, and a model parameter multiplied by one of the value indicative of said target air/fuel ratio and a value indicative of the output of said upstream air/fuel ratio sensor in accordance with one of the output of said upstream air/fuel ratio sensor and said target air/fuel ratio, and the output of said downstream air/fuel ratio sensor; and calculate said target air/fuel ratio of the air/fuel mixture supplied to said internal combustion engine for converging the output of said downstream air/fuel ratio sensor to a predetermined target value based on said one modulation algorithm and said controlled object model.

157. An engine control unit according to claim 156, wherein:

said value indicative of the output of said downstream air/fuel ratio sensor is an output deviation which is a deviation of the output of said downstream air/fuel ratio sensor from said predetermined target value;

said value indicative of the output of said upstream air/fuel ratio sensor is an upstream output deviation which is a deviation of the output of said upstream air/fuel ratio sensor from a predetermined reference value;

said value indicative of said target air/fuel ratio is an air/fuel ratio deviation which is a deviation of said target air/fuel ratio from said predetermined reference value;

said controlled object model is a model which has a variable associated with said output deviation, and a variable associated with one of said air/fuel ratio deviation and said upstream output deviation; and said control program causes the computer to identify a model parameter multiplied by said output deviation, and a model parameter multiplied by one of said air/fuel ratio deviation and said upstream output deviation such that said parameters fall within respective predetermined restriction ranges.

158. An engine control unit according to claim 157, wherein:

said output deviation comprises a plurality of time-series data of said output deviation;

said control program further causes the computer to detect an operating condition of said internal combustion engine; identify a plurality of model parameters respectively multiplied by the plurality of time-series data of said output deviation such that a combination of said model parameters falls within said predetermined restriction range; and set said predetermined restriction range in accordance with the detected operating condition of said internal combustion engine.

159. An engine control unit according to claim 156, wherein said control program further causes the computer to detect an operating condition of said internal combustion engine; identify said model parameters based on a weighted identification algorithm which uses weighting parameters for determining behaviors of said model parameters; and set said weighting parameters in accordance with the detecte operating condition of said internal combustion engine.

160. An engine control unit according to claim 156, wherein said control program further causes the computer to detect an operating condition of said internal combustion engine; identify said model parameters based on an identification algorithm which uses a dead time between the output of said upstream air/fuel ratio sensor and the output of said downstream air/fuel ratio sensor; and set said dead time in accordance with the detected operating condition of said internal combustion engine.

161. An engine control unit according to claim 156, wherein said control program further causes the computer to detect an operating condition of said internal combustion engine; calculate a prediction time from the time at which the air/fuel mixture is supplied to said internal combustion engine in said target air/fuel ratio to the time at which said target air/fuel ratio is reflected to the output of said downstream air/fuel ratio sensor in accordance with the detected operating condition of said internal combustion engine; calculate a predicted value of the value indicative of said target air/fuel ratio in accordance with said calculated prediction time based on a prediction algorithm which applies said controlled object model; and calculate said target air/fuel ratio in accordance with said calculated predicted value based on said one modulation algorithm.

162. An engine control unit according to claim 161, wherein said control program further causes the computer to multiply said predicted value by a correction coefficient; set said correction coefficient to be a smaller value when said predicted value is equal to or larger than a predetermined value than when said predicted value is smaller than said predetermined value; and calculate said target air/fuel ratio of the air/fuel mixture in accordance with said predicted value multiplied by said correction coefficient based on said one modulation algorithm.

163. An engine control unit according to claim 156, wherein said control program further causes the computer to detect an operating condition of said internal combustion engine; calculate an intermediate value of said target air/fuel ratio of the air/fuel mixture supplied to said internal combustion engine based on said controlled object model and said one modulation algorithm; set a gain in accordance with the detected operating condition of said internal combustion engine; and calculate said target air/fuel ratio based on said calculated intermediate value multiplied by said set gain.

164. An engine control unit according to claim 142, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said control input to said controlled object is a target air/fuel ratio of an air/fuel mixture supplied to said internal combustion engine;

said controlled object model is a model which has a variable associated with a value indicative of the output of said air/fuel ratio sensor, and a variable associated with a value indicative of said target air/fuel ratio; and said control program causes the computer to sequentially identify a model parameter multiplied by the value indicative of the output of said air/fuel ratio sensor, and a model parameter multiplied by the value indicative of said target air/fuel ratio in accordance with the output of said air/fuel ratio sensor and said target air/fuel ratio of the air/fuel mixture; and calculate said target air/fuel ratio of the air/fuel mixture supplied to said internal combustion engine for converging the output of said air/fuel ratio sensor to a predetermined target value based on said one modulation algorithm and said controlled object model.

165. An engine control unit according to claim 164, wherein:

said value indicative of the output of said air/fuel ratio sensor is an output deviation which is a deviation of the output of said air/fuel ratio sensor from said predetermined target value;

said value indicative of said target air/fuel ratio is an air/fuel ratio deviation which is a deviation of said target air/fuel ratio from a predetermined reference value;

said controlled object model is a model which has variables associated with said output deviation and said air/fuel ratio deviation; and said control program causes the computer to identify a model parameter multiplied by said output deviation, and a model parameter multiplied by said air/fuel ratio deviation such that said model parameters fall within respective predetermined restriction ranges.

166. An engine control unit according to claim 165, wherein:

said output deviation comprises a plurality of time-series data of said output deviation; and said control program further causes the computer to detect an operating condition of said internal combustion engine; identify a plurality of model parameters respectively multiplied by the plurality of time-series data of said output deviation such that a combination of said model parameters falls within said predetermined restriction range; and set said predetermined restriction range in accordance with the detected operating condition of said internal combustion engine.

167. An engine control unit according to claim 164, wherein said control program further causes the computer to detect an operating condition of said internal combustion engine; identify said model parameters based on a weighted identification algorithm which uses weighting parameters for determining behaviors of said model parameters; and set said weighting parameters in accordance with the detected operating condition of said internal combustion engine.

168. An engine control unit according to claim 164, wherein said control program further causes the computer to detect an operating condition of said internal combustion engine; calculate a prediction time from the time at which the air/fuel mixture is supplied to said internal combustion engine in said target air/fuel ratio to the time at which said target air/fuel ratio is reflected to the output of said air/fuel ratio sensor in accordance with the detected operating condition of said internal combustion engine; calculate a predicted value of the value indicative of said target air/fuel ratio in accordance with said calculated prediction time based on a prediction algorithm which applies said controlled target model; and calculate said target air/fuel ratio in accordance with said calculated predicted value based on said one modulation algorithm.

169. An engine control unit according to claim 168, wherein said control program further causes the computer to multiply said predicted value by a correction coefficient; set said correction coefficient to be a smaller value when said predicted value is equal to or larger than a predetermined value than when said predicted value is smaller than said predetermined value; calculate said target air/fuel ratio of the air/fuel mixture in accordance with said predicted value multiplied by said correction coefficient based on said one modulation algorithm.

170. An engine control unit according to claim 164, wherein said control program further causes the computer to detect an operating condition of said internal combustion engine; calculate an intermediate value of said target air/fuel ratio of the air/fuel mixture supplied to said internal combustion engine based on said controlled object model and said one modulation algorithm; set a gain in accordance with said detected operating condition of said internal combustion engine; and calculate said target air/fuel ratio based on said calculated intermediate value multiplied by said set gain.

171. An engine control unit according to claim 142, wherein said control program further causes the computer to detect a dynamic characteristic parameter indicative of a change in a dynamic characteristic of said controlled object; and set model parameters of said controlled object model in accordance with said detected dynamic characteristic parameter.

172. An engine control unit according to claim 171, wherein said control program causes the computer to calculate a predicted value of a value indicative of the output of said controlled object based on a prediction algorithm which applies said controlled object model; and calculate said control input in accordance with said calculated predicted value based on said one modulation algorithm.

173. An engine control unit according to claim 172, wherein said control program causes the computer to calculate a prediction time from the time at which said control input is inputted to said controlled object to the time at which said control input is reflected to the output of said controlled object in accordance with the dynamic characteristic parameter of said controlled object; and calculate said predicted value in accordance with said calculated prediction time based on said prediction algorithm.

174. An engine control unit according to claim 171, wherein said control program causes the computer to calculate an intermediate value based on said controlled object model and said one modulation algorithm; and calculate said control input based on said calculated intermediate value multiplied by a predetermined gain.

175. An engine control unit according to claim 174, wherein said control program further causes the computer to detect a gain parameter indicative of a gain characteristic of said controlled object; and set said predetermined gain in accordance with said detected gain parameter.

176. An engine control unit according to claim 171, wherein said control program causes the computer to calculate a second intermediate value in accordance with said predicted value based on said one modulation algorithm; and calculate said control input by adding a predetermined value to said calculated second intermediate value.

177. An engine control unit according to claim 171, wherein:

said controlled object model has a variable associated with at least one of a deviation of said control input from a predetermined reference value, and the value reflecting a control input inputted to said controlled object from said predetermined reference value, and a variable associated with a deviation of the output of said controlled object from a predetermined target value.

178. An engine control unit according to claim 171, wherein:

said controlled object comprises a downstream air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said control input to said controlled object is the target air/fuel ratio of the air/fuel mixture supplied to said internal combustion engine;

said controlled object model is a model representative of a relationship between the output of said downstream air/fuel ratio sensor and said target air/fuel ratio; and said control program causes the computer to detect an operating condition of said internal combustion engine; set model parameters of said controlled object model in accordance with the detected operating condition of said internal combustion engine; calculate a predicted value of a value indicative of the output of said downstream air/fuel ratio sensor in accordance with the output of said downstream air/fuel ratio sensor, an output of an upstream air/fuel ratio sensor disposed at a location upstream of said catalyst in said exhaust passage of said internal combustion engine, and said target air/fuel ratio of the air/fuel mixture based on a prediction algorithm which applies said controlled object model; and calculate said target air/fuel ratio of the air/fuel mixture supplied to said internal combustion engine for converging the output of said downstream air/fuel ratio sensor to a predetermined target value in accordance with said calculated predicted value based on said one modulation algorithm.

179. An engine control unit according to claim 178, wherein said control program causes the computer to calculate a prediction time from the time at which the air fuel mixture is supplied to said internal combustion engine in said target air/fuel ratio to the time at which said target air/fuel ratio is reflected to the output of said downstream air/fuel ratio sensor, in accordance with an operating condition of said internal combustion engine; and calculate said predicted value further in accordance with said calculated prediction time.

180. An engine control unit according to claim 178, wherein said control program causes the computer to calculate an intermediate value of said target air/fuel ratio of the air/fuel mixture supplied to said internal combustion engine in accordance with said calculated predicted value based on said one modulation algorithm; set a gain in accordance with an operating condition of said internal combustion engine; and calculate said target air/fuel ratio of the air/fuel mixture supplied to said internal combustion engine for converging the output of said downstream air/fuel ratio sensor to a predetermined target value based on said calculated intermediate value multiplied by said set gain.

181. An engine control unit according to claim 178, wherein said control program further causes the computer to multiply said predicted value by a correction coefficient; set said correction coefficient to be a smaller value when said predicted value is equal to or larger than a predetermined value than when said predicted value is smaller than said predetermined value; and calculate said target air/fuel ratio of the air/fuel mixture in accordance with said predicted value multiplied by said correction coefficient based on said one modulation algorithm.

182. An engine control unit according to claim 171, wherein:

said controlled object comprises an air/fuel ratio sensor disposed at a location downstream of a catalyst in an exhaust pipe of an internal combustion engine for detecting an air/fuel ratio of exhaust gases which have passed through said catalyst, and the output of said controlled object is an output of said downstream air/fuel ratio sensor;

said control input to said controlled object is the target air/fuel ratio of the air/fuel mixture supplied to said internal combustion engine;

said controlled object model is a model representative of a relationship between the output of said air/fuel ratio sensor and said target air/fuel ratio; and said control program causes the computer to detect a parameter includes detecting an operating condition of said internal combustion engine; set model parameters of said controlled object model in accordance with the detected operating condition of said internal combustion engine; and calculate said target air/fuel ratio of the air/fuel mixture supplied to said internal combustion engine for converging the output of said air/fuel ratio sensor to a predetermined target value based on said one modulation algorithm and said controlled object model.

183. An engine control unit according to claim 182, wherein said control program causes the computer to calculate a predicted value of a value indicative of the output of said air/fuel ratio sensor in accordance with the output of said air/fuel ratio sensor and said target air/fuel ratio based on a prediction algorithm which applies said controlled object model; and calculate said target air/fuel ratio of the air/fuel mixture supplied to said internal combustion engine in accordance with said calculated predicted value based on said one modulation algorithm.

184. An engine control unit according to claim 183, wherein control program causes the computer to calculate a prediction time from the time at which the air/fuel mixture is supplied to said internal combustion engine in said target air/fuel ratio to the time at which said target air/fuel ratio is reflected to the output of said air/fuel ratio sensor in accordance with an operating condition of said internal combustion engine; and calculate a predicted value of a value indicative of the output of said air/fuel ratio sensor further in accordance with said calculated prediction time.

185. An engine control unit according to claim 183, wherein said control program causes the computer to calculate an intermediate value of said target air/fuel ratio of the air/fuel mixture supplied to said internal combustion engine in accordance with said predicted value based said one modulation algorithm; set a gain in accordance with the operating condition of said internal combustion engine; and determine a target air/fuel ratio of the air/fuel mixture supplied to said internal combustion engine based on said calculated intermediate value multiplied by said set gain.

186. An engine control unit according to claim 183, wherein said control program further causes the computer to multiply said predicted value by a correction coefficient; set said correcton coefficient to be a smaller value when said predicted value is equal to or larger than a predetermined value than when sid predicted value is smaller than said predetermined value; and calculate said target air/fuel ratio of the air/fuel mixture in accordance with said predicted value multiplied by said correction coefficient based on said one modulation algorithm.

* * * * *